US012726740B2

(12) United States Patent
Prevratil et al.

(10) Patent No.: US 12,726,740 B2
(45) Date of Patent: Sep. 1, 2026

(54) HIGH FIBER COUNT CABLE DISTRIBUTION SYSTEMS, APPARATUSES, AND METHODS

(71) Applicant: CORNING RESEARCH & DEVELOPMENT CORPORATION, Corning, NY (US)

(72) Inventors: Karyne Poissant Prevratil, Fort Worth, TX (US); Diana Rodriguez, Mansfield, TX (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 332 days.

(21) Appl. No.: 17/946,264

(22) Filed: Sep. 16, 2022

(65) Prior Publication Data

US 2023/0101187 A1 Mar. 30, 2023

Related U.S. Application Data

(60) Provisional application No. 63/250,323, filed on Sep. 30, 2021.

(51) Int. Cl.
*G02B 6/44* (2006.01)
*H04Q 1/02* (2006.01)

(52) U.S. Cl.
CPC ......... *H04Q 1/136* (2013.01); *G02B 6/44524* (2023.05); *G02B 6/44528* (2023.05)

(58) Field of Classification Search
CPC .................................................... G02B 6/4452
See application file for complete search history.

(56) References Cited

U.S. PATENT DOCUMENTS

| | | | |
|---|---|---|---|
| 5,737,475 | A | 4/1998 | Regester |
| 6,424,781 | B1 | 7/2002 | Puetz et al. |

(Continued)

FOREIGN PATENT DOCUMENTS

| | | | |
|---|---|---|---|
| CN | 109994890 | A | 7/2019 |
| CN | 211831057 | U | 10/2020 |

(Continued)

OTHER PUBLICATIONS

European Patent Application No. 22198507.0, Extended European Search Report, dated Feb. 3, 2023; 11 pages; European Patent Office.

*Primary Examiner* — Uyen Chau N Le
*Assistant Examiner* — Hoang Q Tran
(74) *Attorney, Agent, or Firm* — Kapil U. Banakar

(57) ABSTRACT

A fiber optic cable apparatus is provided including a housing and at least one fiber optic connection equipment provided in the housing. The fiber optic connection equipment is configured to enable routing of a plurality of optical fibers within a volume of 200 cubic feet or less. The plurality of optical fibers includes at least 20,000 optical fibers, provided by one or more fiber optic input cables and output cables, the fiber optic input cables having one or more first groupings of optical fibers and the fiber optic output cables having one or more second groupings of optical fibers. The fiber optic connection equipment is further configured to provide for connection within the housing of the fiber optic input cables to the fiber optic output cables. The at least one of the one or more first groupings is different than at least one of the one or more second groupings.

24 Claims, 92 Drawing Sheets

(56) References Cited

U.S. PATENT DOCUMENTS

| | | | | |
|---|---|---|---|---|
| 7,623,749 | B2 * | 11/2009 | Reagan | G02B 6/44526 385/135 |
| 9,494,758 | B2 * | 11/2016 | Holmberg | G02B 6/4457 |
| 11,295,135 | B2 | 4/2022 | Brun et al. | |
| 11,374,808 | B2 | 6/2022 | Brun et al. | |
| 2004/0074852 | A1 | 4/2004 | Knudsen et al. | |
| 2008/0298763 | A1 * | 12/2008 | Appenzeller | G02B 6/4478 385/135 |
| 2011/0304313 | A1 | 12/2011 | Diab | |
| 2015/0006502 | A1 | 1/2015 | Chang et al. | |
| 2015/0030323 | A1 | 1/2015 | Lawson et al. | |
| 2015/0212286 | A1 * | 7/2015 | Vongseng | G02B 6/44526 385/135 |
| 2017/0076504 | A1 | 3/2017 | Oar et al. | |
| 2018/0284377 | A1 * | 10/2018 | Chiron | G02B 6/4446 |
| 2021/0325614 | A1 | 10/2021 | Childers et al. | |

FOREIGN PATENT DOCUMENTS

| | | | |
|---|---|---|---|
| WO | 2021/242559 | A1 | 12/2021 |
| WO | 2021/242560 | A1 | 12/2021 |
| WO | 2021/242561 | A1 | 12/2021 |
| WO | 2021/243110 | A1 | 12/2021 |

* cited by examiner

HIGH FIBER COUNT CABLE DISTRIBUTION SYSTEMS, APPARATUSES, AND METHODS

PRIORITY APPLICATION

This application claims the benefit of priority of U.S. Provisional Application No. 63/250,323, filed on Sep. 30, 2021, the content of which is relied upon and incorporated herein by reference in its entirety.

FIELD OF THE INVENTION

Embodiments of the present invention relate to various apparatus, systems, and methods for enabling secure routing and accurate connection of fibers, such as in a high fiber density setting.

BACKGROUND OF THE INVENTION

The large growth of the Internet has led businesses and other organizations to develop large scale data centers for organizing, processing, storing and/or disseminating large amounts of data. Data centers contain a wide range of information technology (IT) equipment including, for example, servers, networking switches, routers, storage systems, etc. Data centers further include a large amount of cabling and cabinets to organize and interconnect the IT equipment in the data center. Modem data centers may include multi-building campuses having, for example, one primary or main building and a number of auxiliary buildings in close proximity to the main building. IT equipment in the buildings on the campus is typically interconnected by one or more local fiber optic networks.

In order to organize the IT equipment in the data center, the buildings on the campus are typically divided into rooms or other identifiable physical spaces. Each room may then include multiple cabinets that are arranged in identifiable rows within the room. Each of the cabinets may then be further divided into housings/frames/shelves which hold the IT equipment. Each piece of IT equipment may include one or more ports for providing a data connection to another piece of IT equipment to form a network. For example, the cabinets may include a plurality of patch panels, each having a plurality of ports for making connections with other ports. Thus, the physical location of various ports in the data center may be designated by building, room, row, cabinet, housing/frame/shelf, panel, and finally by installation port.

In data centers, optical fibers are often distributed between various locations, including Main Distribution Frames (MDF) and Intermediate Distribution Frames (IDF). To connect these optical fibers within the data centers, an extremely large number of individual patches are often required. Where Middle of Row (MoR) architectures are used, local area network (LAN)/storage area network (SAN) switches are often provided in the middle of a network row within a cabinet, requiring even more patching. Connection of these optical fibers requires management of thousands of individually pigtailed optics (of a large variety of lengths), and these pigtailed optics are routed from one cabinet to the next. Mapping and connecting the pigtailed optics to the correct port presents significant challenges, as this requires a significant amount of time and also requires finesse to avoid mapping errors.

Due to the inability to overcome challenges with mapping and connecting the pigtailed optics to the correct ports, MDFs, IDFs, and other distribution frames generally manage a lower number of fiber optic cables or a lower density of fiber optic cables. As the density of distribution frames increases, significant challenges arise that others have been unable to overcome. At higher densities, several fiber optic cables and associated connectors are provided having a similar appearance, and this often causes installers to improperly install the fiber optic cables. Further, many high fiber count solutions require specific tools to aid in installation of the fibers into small spaces. Even where an installer properly installs a fiber optic cable, the similar appearance of fiber optic cables forces the installer to operate more slowly, causing the time required to complete the installation process to multiply. Some have attempted to color code fiber optic cables and portions of the distribution frames, but this approach in isolation is impractical where a significant number of fiber optic cables are used. Implementing colors also requires significant effort in the manufacturing process. Additionally, where complex routing schemes are provided within the distribution frames, simply determining the correct installation port can be an arduous task for an installer. For example, where a transpose mapping, shuffle mapping, or arbitrary mapping is used, the operational complexity may lead to even higher levels of human error by the installer and a significant increase in the installation time.

Some attempt to label every end point with a machine readable code or a human readable code attached to a barrel label, a flag tag, or incorporated into or adhered to the connector. Where this has been done, persistently visible components must be provided to ensure that an installer can read or scan the code. These persistently visible components increase the clutter and reduce the visibility within the distribution frames. Additionally, some have also attempted to provide color schemes to facilitate connection of fiber optic cables in the correct sequence and position. While these approaches may be effective when a small number of fiber optic cables are used, these approaches are much less effective where the number of cables is increased. Additionally, these approaches often take up too much space. Further, the sheer quantity of end points makes these approaches time consuming and impractical, creating mechanical interference (between the labels and the limited space for fiber optic cable routing) that jam up the installation process with the labels.

SUMMARY OF THE INVENTION

A fiber optic cable apparatus is provided in several different embodiments discussed herein. The fiber optic cable apparatus may place a very large number of connections into a highly concentrated, ultra high-density connectivity and cable management rack. Despite the high number of fiber optic cable connectors that may be installed to the panel on an input side and an output side, the fiber optic cable apparatus and other features described herein may permit the efficient and accurate installation of fiber optic cable connectors without the use of tools (e.g., an installer can use their hands to install the cables and plug in the connectors). The features and approaches described herein may permit the efficient and accurate installation of fiber optic cable connectors even where fiber optic cables and their associated connectors are similar in appearance. Mapping approaches may reduce the risk of human error and may quickly provide a user with the correct installation port, even where complex routing schemes are used.

Additionally, fiber optic cables may be attached in installation ports, and information regarding the fiber optic cables, the installation ports, and other components may be associated and saved in memory. This may provide a convenient approach for logging information regarding installation at a single location. Creating a log with network components, their location, their connectivity in a data center, and the routing of network components typically lacks standardization. Even where users attempt to log this information, users often use ad hoc approaches that may be inconsistent with approaches used by others, and these ad hoc approaches may be indecipherable by others. By logging the information in one location, the risk of losing information, saving the information in multiple locations, or use of inconsistent logging approaches can be averted. Additional details about logging are discussed in international application No. PCT/US2021/032845, titled "Automated Logging of Patching Operations via Mixed Reality Based Labeling", filed on May 18, 2021, the contents of which is relied upon and incorporated herein by reference in its entirety.

Transformable brackets are also provided in several embodiments. These transformable brackets may be configured to be selectively attached to a dust cap, to a fiber optic connector, or a Multi-Fiber Push-On ("MPOMPO") connector (e.g., according to standard TIA-604-5; 2019). The transformable bracket may initially be attached to a dust cap and may provide a visible identifier, which may be human readable or machine readable, on the transformable bracket. The identifier may enable guiding of a user to the correct port, and then the transformable bracket may be removed from the dust cap and attached to a fiber optic connector or an MPO connector housing for the fiber optic cable. Once the fiber optic cable is attached to an adapter and/or a panel, the identifier on the transformable bracket may remain visible for users. Thus, because the transformable bracket is removable, the identifier on the bracket may remain visible when needed, and the bracket may be removed to provide enhanced visibility and reduced clutter so that a fiber optic cable may be installed in the correct position, and thereafter reattached to enable visualization of an appropriate label for the now associated cable and port. Additionally, an elongated body of the transformable bracket may provide a location where transformable bracket identifiers may be provided, while fiber optic cables or connectors associated with the transformable bracket may be too small to effectively present an identifier that can be interpreted by the human eye or by an image capture device.

Various approaches described herein may permit fiber optic connectors to be managed in an organized manner, and the approaches permit changes in fiber groupings within a data center. The approaches allow customers to avoid running individual fiber optic connectors between cabinets, with fibers instead being grouped into first groupings of input fibers and second groupings of output fibers.

In this disclosure, fiber optic cables may be referred to based on the number of optical fibers provided. For example, a fiber optic cable comprising one-hundred forty-four (144) optical fibers may be referred to as a "144F" fiber optic cable. More generally, in this disclosure, the short-hand "X-F" or "XF" is used for convenience to refer to a number (X) of optical fibers (F). Accordingly, a fiber optic cable may be referred to as a XF fiber optic cable to indicate the "count" of optical fibers included in the fiber optic cable. The term "fiber grouping" is intended to be used in a similar manner, i.e. associate a total number of optical fibers with a given fiber optic cable. Different "fiber groupings" refers to fiber optic cables with different optical fiber counts (e.g., 144F, 256F, etc.).

Cable retention clips and cable strain relief systems may be provided to assist in the connection of fiber optic cables within a housing. A pinching force may be applied on the body of a cable retention clip to shift the cable retention clip into a compressed state. The cable retention clip may have tabs that are configured to fit within apertures in a cable retention plate. The cable retention clip and cable retention plate may be attached together, and this may be done to secure a fiber optic cable between the cable retention clip and the cable retention plate. The cable retention plate may also include a friction element, and the friction element may contact an outer sheath of the fiber optic cable to provide strain relief to the fiber optic cable to prevent the fiber optic cable from shifting along an axis.

In an example embodiment, a fiber optic cable apparatus is provided. The fiber optic cable apparatus may comprise a housing and at least one fiber optic connection equipment provided in the housing. The fiber optic connection equipment may be configured to enable routing of a plurality of optical fibers within a volume of 200 cubic feet or less. The plurality of optical fibers may comprise at least twenty-thousand (20,000) optical fibers, and the plurality of optical fibers may be provided by fiber optic input cables and fiber optic output cables, the fiber optic input cables having one or more first groupings of optical fibers and the fiber optic output cables having one or more second groupings of optical fibers. The fiber optic connection equipment may be further configured to provide for connection within the housing of the fiber optic input cables to the fiber optic output cables. At least one of the one or more first groupings is different than at least one of the one or more second groupings.

In some embodiments, at least one of the one or more first groupings of fiber optic input cables may be selected from the group consisting of a 3456F cable, a 2880F cable, and a 576F cable. Additionally, at least one of the one or more second groupings of fiber optic output cables may be selected from the group consisting of a 288F cable, a 144F cable, a 96F cable, and a 24F cable.

In some embodiments, first groupings of fiber optic input cables may include 3456F cables, and second groupings of fiber optic output cables may include 288F cables and 96F cables. In other embodiments, first groupings of fiber optic input cables may include at least one of 2880F cables or 144F cables, and second groupings of fiber optic output cables may include 576F cables.

In some embodiments, fiber optic connection equipment may include one or more shelves. Each of the one or more shelves may include a panel that is configured to support connection of a plurality of the fiber optic input cables on an input side to a plurality of the fiber optic output cables on an output side. Each of the one or more shelves may be configured to route at least three thousand four hundred fifty six (3,456) fibers on the input side and at least three thousand four hundred fifty six (3,456) fibers on the output side within a shelf volume. In some embodiments, the shelf volume is 20 cubic feet or less, but the shelf volume may even be 8.2 cubic feet or less.

In some embodiments, a plurality of the one or more shelves are arranged in a vertical-stack. The housing may define a shelving portion and a cable routing portion. The cable routing portion may have a top with an opening, and the opening may be configured to receive at least one of fiber optic input cables having the one or more first groupings of optical fibers and at least one of the fiber optic output cables having the one or more second groupings therethrough.

In some embodiments, the fiber optic connection equipment may include at least two mounting plates extending horizontally into the cable routing portion toward the shelving portion. Each of the at least two mounting plates may comprise an attachment feature that may be configured to secure one of the input cables or the output cables. The at least two mounting plates may be configured to securely position the fiber optic input cables or the fiber optic output cables in staggered positions within the cable routing portion.

In some embodiments, the fiber optic connection equipment may include at least one panel. The at least one panel may include a plurality of adapters. Each adapter of the plurality of adapters may be configured to receive, on an input side, an input connector for fibers from the fiber optic input cables. Each adapter of the plurality of adapters may be configured to receive, on an output side, an output connector for fibers for the fiber optic output cables. In some embodiments, the fiber optic connection equipment may be modular.

In some embodiments, the plurality of adapters may include at least 70 adapters. The plurality of adapters may even include at least 144 adapters in some embodiments.

In some embodiments, the at least one panel may include ten panels. In some embodiments, the at least one panel may be oriented vertically. Each adapter of the plurality of adapters may be configured to receive a horizontally oriented input connector and a horizontally oriented output connector.

In some embodiments, the plurality of fibers may comprise at least twenty-five thousand (25,000) fibers. The plurality of fibers may even comprise at least thirty thousand ((30,000) fibers or at least thirty four thousand five hundred sixty (34,560) fibers in some embodiments.

In another example embodiment, a fiber optic cable apparatus is provided. The fiber optic cable apparatus may include a housing and fiber optic connection equipment provided in the housing. The fiber optic connection equipment may be configured to enable routing of a plurality of optical fibers, and the plurality of optical fibers may be provided by fiber optic input cables and fiber optic output cables. The fiber optic input cables having one or more first groupings of optical fibers and the fiber optic output cables having one or more second groupings of optical fibers, the one or more first groupings being different than the one or more second groupings. The fiber optic connection equipment may be further configured to provide for connection within the housing of the fiber optic input cables to the fiber optic output cables. The housing may be configured to hold a plurality of the one or more shelves arranged in a vertical-stack. The housing may define a shelving portion and a cable routing portion. The cable routing portion may have a top with an opening, and the opening may be configured to receive at least one of the fiber optic input cables and at least one of the fiber optic output cables therethrough.

In some embodiments, each of the one or more shelves may include a panel that is configured to enable connection of a plurality of the fiber optic input cables on an input side to a plurality of the fiber optic output cables on an output side to define the second groupings of the fiber optic output cables. Each of the one or more shelves may be configured to route at least two thousand (2,000) fibers on the input side and at least two thousand (2,000) fibers on the output side within a volume of 8.2 cubic feet or less.

In some embodiments, each of the one or more shelves includes a panel that may include a plurality of adapters. Each adapter of the plurality of adapters may be configured to receive, on an input side, an input connector for fibers from the fiber optic input cables. Each adapter of the plurality of adapters may be configured to receive, on an output side, an output connector for fibers for the fiber optic output cables. The plurality of adapters may include at least 70 adapters.

In another example embodiment, a fiber optic cable apparatus is provided. The fiber optic cable apparatus may include a housing, a plurality of shelves, and a plurality of panels. Each of the plurality of shelves may have a panel from the plurality of panels attached thereto. The plurality of shelves may be configured to be attached to the housing. The plurality of shelves and the plurality of panels may be configured to enable routing of a plurality of optical fibers, and the plurality of optical fibers may be provided by fiber optic input cables and fiber optic output cables, the fiber optic input cables having one or more first groupings of optical fibers and the fiber optic output cables having one or more second groupings of optical fibers, the one or more first groupings being different than the one or more second groupings. In some embodiments, the plurality of shelves and the plurality of panels may be further configured to provide for connection within the housing of the fiber optic input cables to the fiber optic output cables. The housing may be configured to hold the plurality of shelves arranged in a vertical-stack. The housing may define a shelving portion and a cable routing portion. Additionally, the cable routing portion may have a top with an opening, and the opening may be configured to receive at least one of the fiber optic input cables and at least one of the fiber optic output cables therethrough.

In some embodiments, the shelves may have an input side and an output side. A shelf of the plurality of shelves may be configured to receive at least 100 fibers per cubic foot on the input side, and the shelf may be configured to receive at least 100 fibers per cubic foot on the output side. In some related embodiments, the shelf may be configured to receive at least 172 fibers per cubic foot on the input side, and the shelf may be configured to receive at least 172 fibers per cubic foot on the output side.

In some embodiments, each of the plurality of panels has a panel input side and a panel output side. A panel of the plurality of panels may be configured to receive at least 500 fibers per square foot on the panel input side, and the panel may be configured to receive at least 500 fibers per square foot on the panel output side. In some related embodiments, the panel is configured to receive at least 864 fibers per square foot on the input side, and the panel is configured to receive at least 864 fibers per square foot on the output side.

Further areas of applicability of the present invention will become apparent from the detailed description provided hereinafter. It should be understood that the detailed description and specific examples, while indicating example preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein.

DETAILED DESCRIPTION

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

Like numerals within FIGS. 1A-1N, 2A-2B, 3A-3H, 4A-4C, 5A-5L, 6A-6L, 7A-7L, 8A-8J, 9A-9J, 10A-10J, 11A-11D, and 12 are intended to refer to similar features. For example, elements 646, 746, 846, and 946 each refer to a transformable bracket, and elements 524, 624, 724, and 824 each refer to an adapter.

Unless otherwise noted, two components are "attached" when the two components are directly attached or indirectly attached together. Two components may be indirectly attached together where one or more intermediate components connect the two components. Similarly, unless otherwise noted two components are "secured" when the two components are directly secured or indirectly secured together.

Figure 1A:
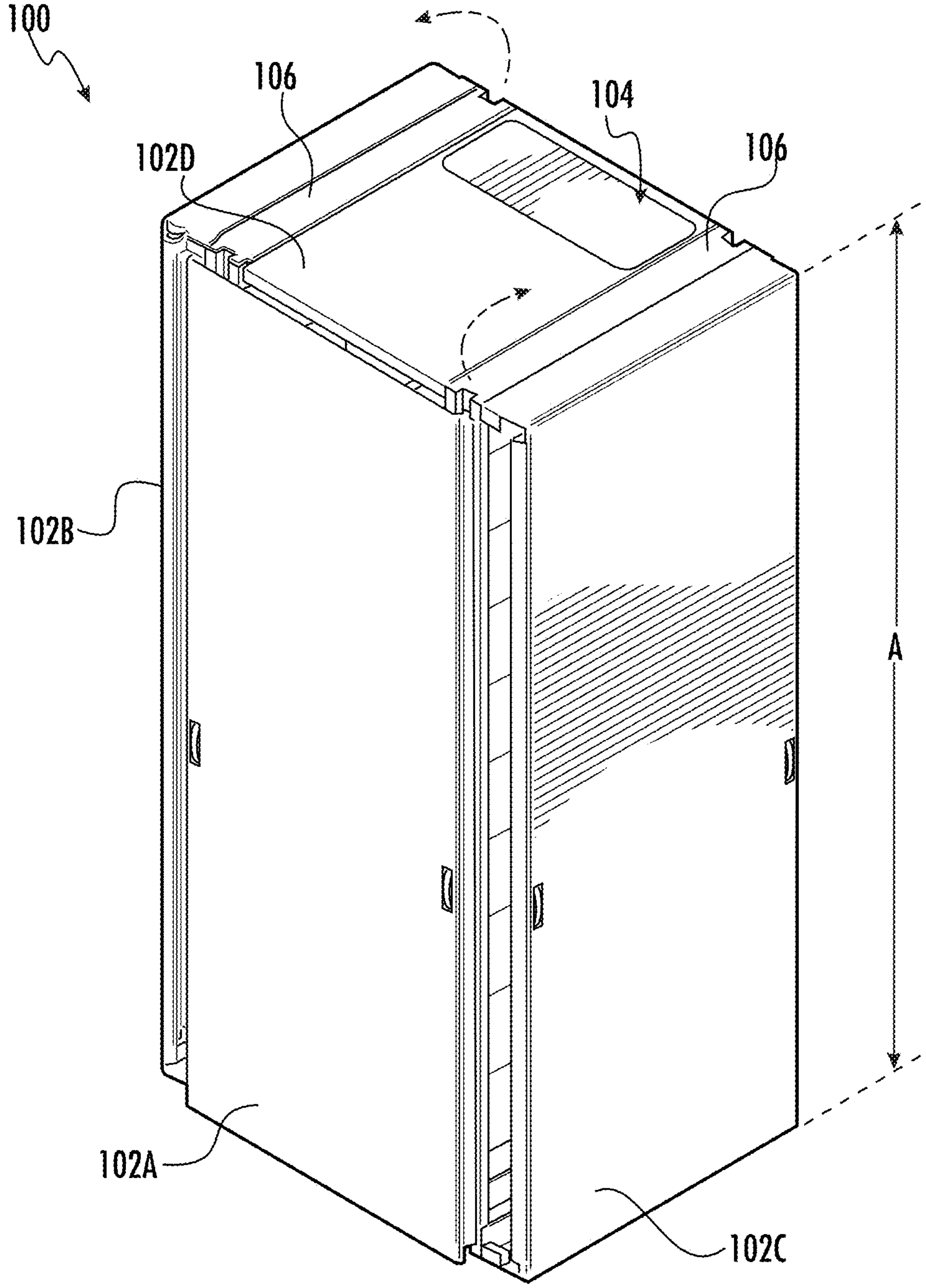
FIG. 1A is a perspective view illustrating an example fiber optic cable apparatus, in accordance with some embodiments discussed herein.
Figure 1B:
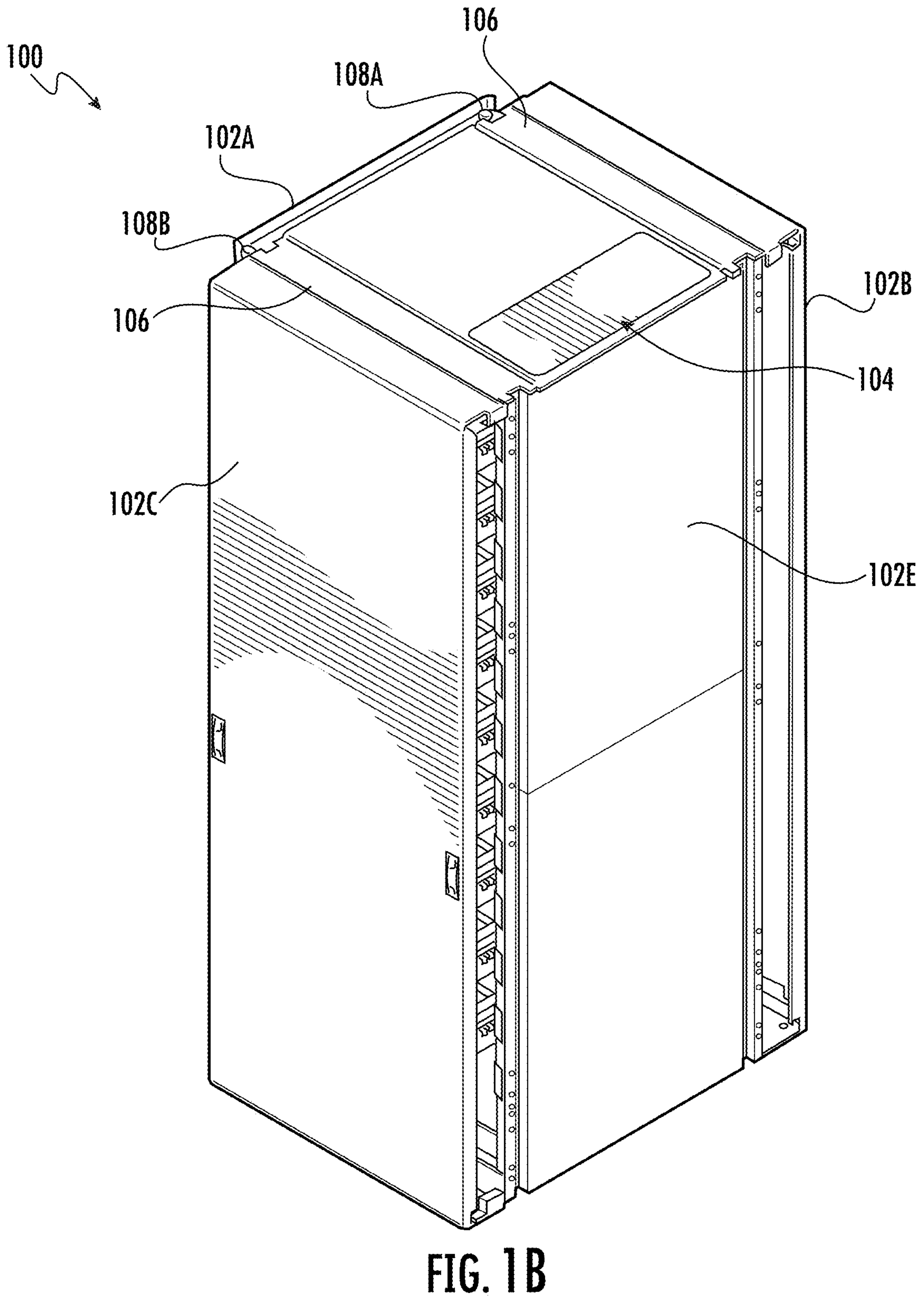
FIG. 1B is a rear perspective view illustrating the fiber optic cable apparatus of FIG. 1A, in accordance with some embodiments discussed herein.
Figure 1C:
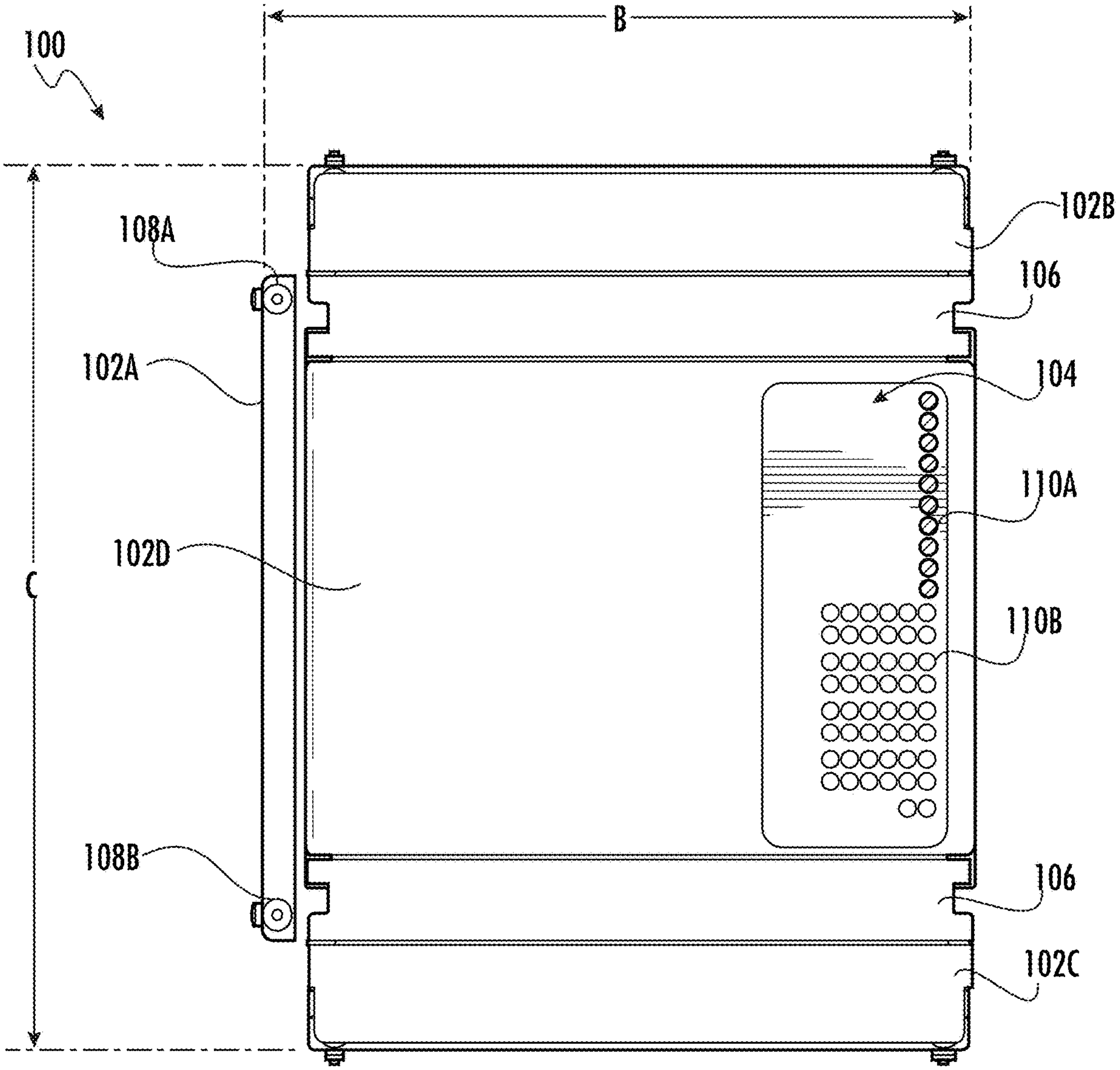
FIG. 1C is a top view illustrating the fiber optic cable apparatus of FIG. 1A, where input fiber optic cables and output fiber optic cables are illustrated, in accordance with some embodiments discussed herein.
Figure 1D:
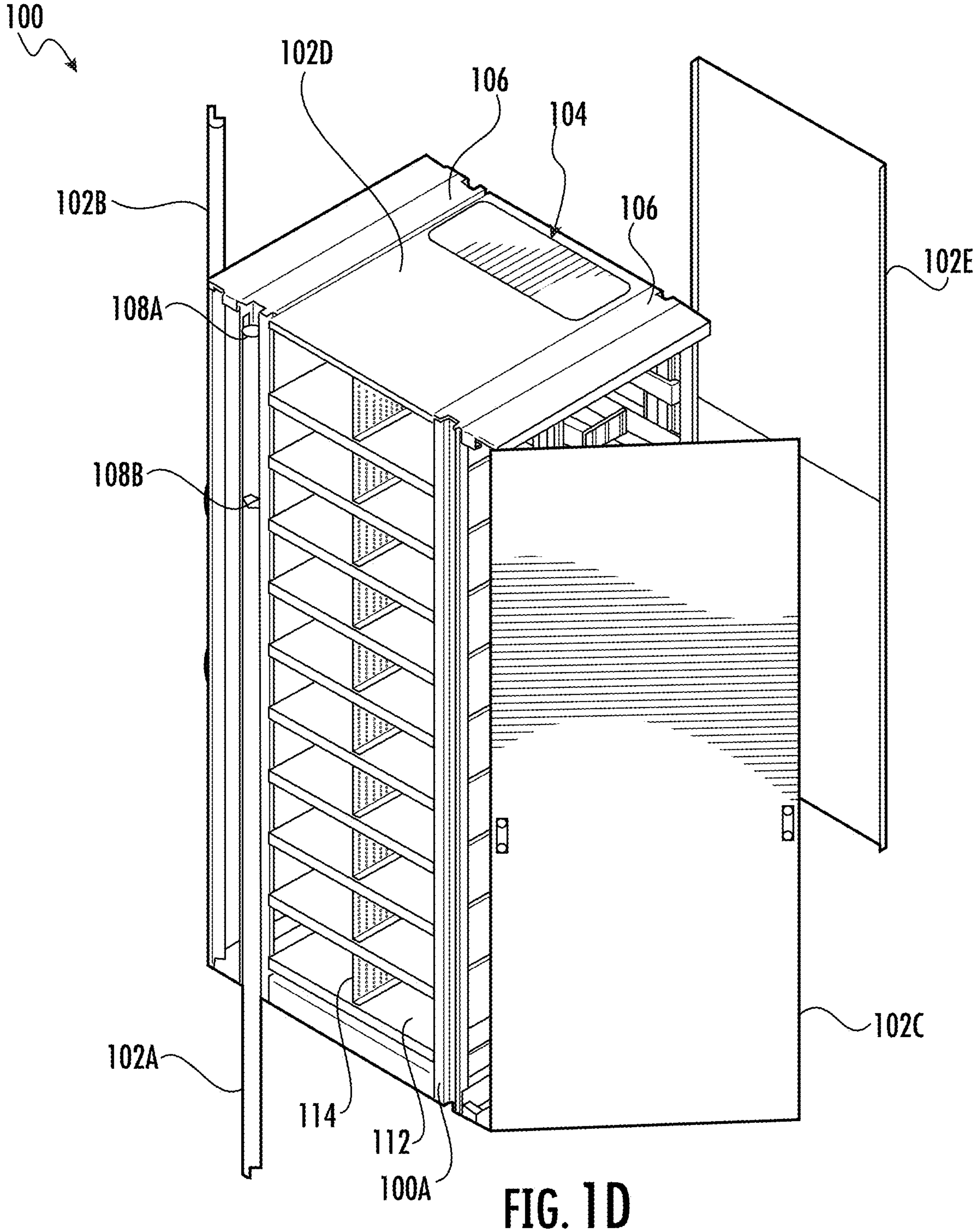
FIG. 1D is a perspective view illustrating the fiber optic cable apparatus of FIG. 1A, where doors and covers are opened or removed, in accordance with some embodiments discussed herein.
Figure 1E:
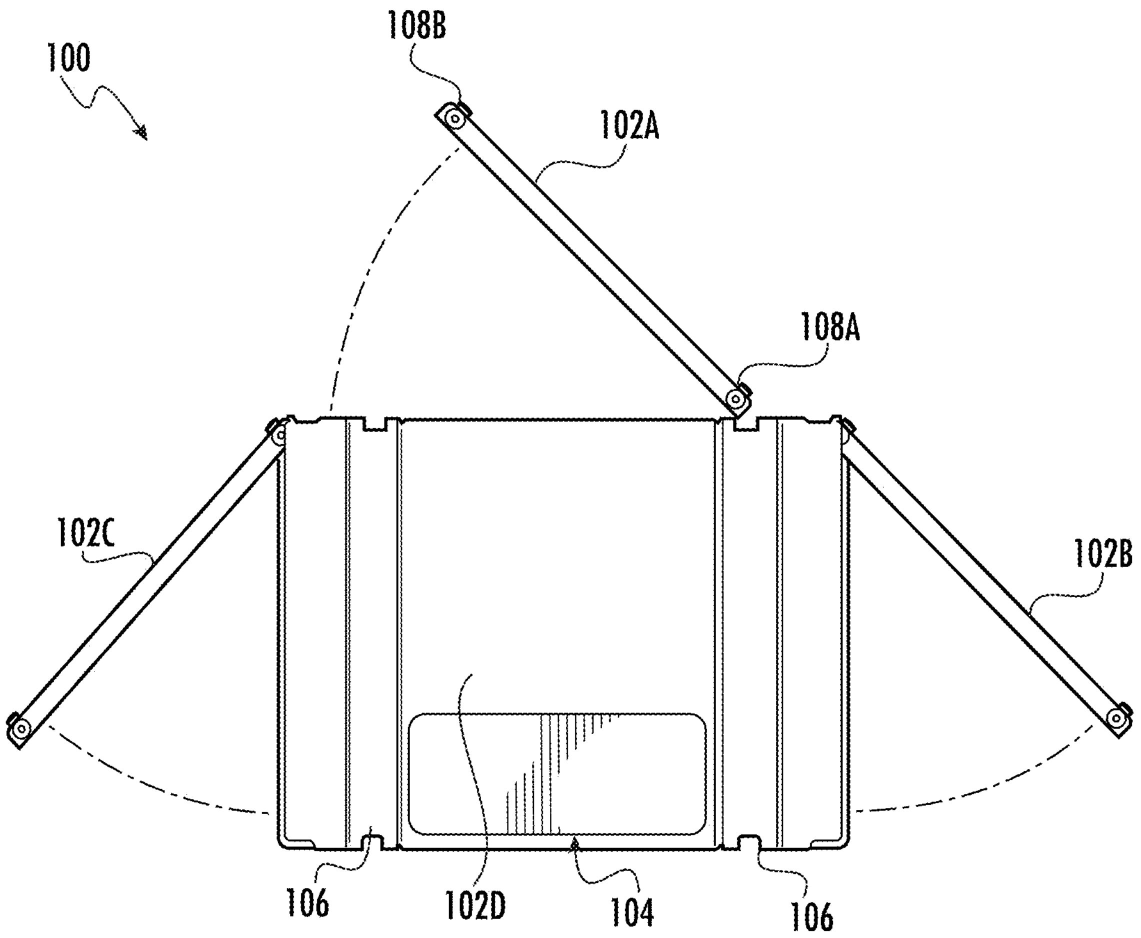
FIG. 1E is a top view illustrating the fiber optic cable apparatus of FIG. 1A, where doors are opened, in accordance with some embodiments discussed herein.
Figure 1F:
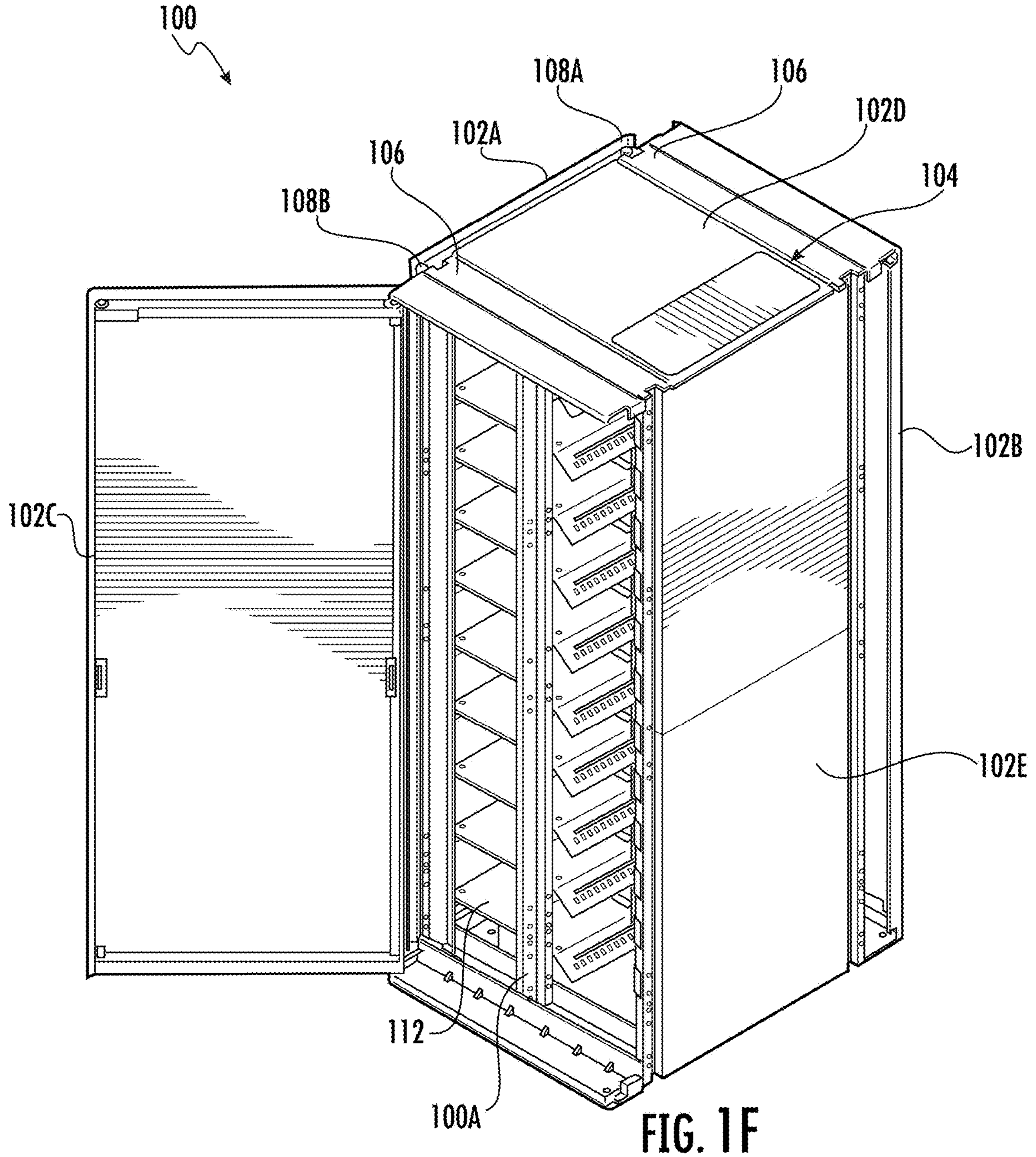
FIG. 1F is a rear perspective view illustrating the fiber optic cable apparatus of FIG. 1A, where a side door is opened, in accordance with some embodiments discussed herein.

A fiber optic cable apparatus is provided in some embodiments. The fiber optic cable apparatus may enable fibers to be densely packed within the fiber optic cable apparatus, and the fiber optic cable apparatus may include features that permit a user to efficiently complete the installation of fibers. FIG. 1A is a perspective view illustrating a fiber optic cable apparatus 100. FIG. 1B is a rear perspective view illustrating the fiber optic cable apparatus 100 of FIG. 1A, and FIG. 1C is a top view illustrating the fiber optic cable apparatus 100 of FIG. 1A. Additionally, FIGS. 1D through 1F illustrate the fiber optic cable apparatus 100 of FIG. 1A where various doors or covers are opened or removed. FIG. 1D is a perspective view illustrating the fiber optic cable apparatus 100 of FIG. 1A where doors and covers are opened or removed, FIG. 1E is a top view illustrating the fiber optic cable apparatus 100 of FIG. 1A where doors are opened, and FIG. 1F is a rear perspective view illustrating the fiber optic cable apparatus 100 of FIG. 1A where a side door is opened.

The fiber optic cable apparatus 100 may include a housing 100A (see FIG. 1D, 1F) as well as several different doors and covers. In the embodiment illustrated in FIG. 1A, a front door 102A, a left-side door 102B, a right-side door 102C, a top cover 102D, and a rear cover 102E are provided. An opening 104 may be provided in the top cover 102D, and this opening 104 may permit input fiber optic cables, input fibers, output fiber optic cables, and output fibers to extend into the fiber optic cable apparatus 100. The opening 104 may be provided above the cable routing portion 199B (see FIG. 1G) so that material inserted through the opening 104 enters into the cable routing portion 199B. The opening 104 may be configured to receive at least one input cable (see, e.g., 110A, FIG. 1H) comprising one of the one or more first groupings of fiber optic input cables and at least one output cable (see, e.g., 110B, FIG. 1H) comprising one of the one or more second groupings of fiber optic output cables therethrough. When no cables or fibers are inserted through the opening 104, a cover may be provided over the opening 104.

The fiber optic cable apparatus 100 may include edge portions 106 proximate to the top cover 102D. In some embodiments, the edge portions 106 may rotate upwardly as indicated by the arrows provided in FIG. 1A. This may enable increased access to internal portions of the fiber optic cable apparatus 100. However, rotatable edge portions 106 may not be provided in other embodiments.

One or more hinges 108 (108A, 108B) may be provided on the front door 102A. The hinges 108 may provide an axis about which the front door 102A may rotate so that the internal portions of the fiber optic cable apparatus 100 may be accessed. In some embodiments, such as the one illustrated in FIG. 1B, two hinges 108 may be provided on the front door 102A, and the front door 102A may be rotated about either hinge 108 (e.g., be left opening or right opening). These hinges 108 may be secured to the remainder of the fiber optic cable apparatus 100 through the use of magnetism or other fasteners, and the hinges 108 may be selectively engaged or disengaged from the fiber optic cable apparatus 100.

The fiber optic cable apparatus 100 may generally possess any volume. However, in the embodiment illustrated in FIG. 1A, the fiber optic cable apparatus 100 has a rectangular shape and has a height A. In some embodiments, the height A may range from 3.94 feet to 9 feet. In the illustrated embodiment, the height A is 8 feet. As illustrated in FIG. 1C, the fiber optic cable apparatus 100 may also have a depth B and a width C. In some embodiments, the depth B may range from 23 inches to 36 inches. In the illustrated embodiment, the depth B is 36 inches. In some embodiments, the width C may range from 14 inches to 50 inches. In the illustrated embodiment, the width C is 41 inches.

In some embodiments, the fiber optic cable apparatus 100 may be 6 feet tall, 3 feet deep, and 4 feet wide and have a volume of 72 cubic feet. In other embodiments, the fiber optic cable apparatus 100 may be 7 feet tall, 4 feet deep, and 3 feet wide and have a volume of 84 cubic feet. The fiber optic cable apparatus 100 may be 5 feet tall, 5 feet deep, and 5 feet wide and have a volume of 125 cubic feet. The fiber optic cable apparatus 100 may be 8 feet tall, 5 feet deep, and 5 feet wide and have a volume of 200 cubic feet. The fiber optic cable apparatus 100 may be 6 feet tall, 5 feet deep, and 5 feet wide and have a volume of 150 cubic feet. The fiber optic cable apparatus 100 may be 5 feet tall, 5 feet deep, and 8 feet wide and have a volume of 200 cubic feet. The fiber optic cable apparatus 100 may be 10 feet tall, 5 feet deep, and 8 feet wide and have a volume of 250 cubic feet. The fiber optic cable apparatus 100 may be 8 feet tall, 2.5 feet deep, and 2.5 feet wide and have a volume of 62.5 cubic feet. The fiber optic cable apparatus 100 may be 4 feet tall, 2 feet deep, and 14 inches wide and have a volume of 9.33 cubic feet. The fiber optic cable apparatus 100 may be 5 feet tall, 5 feet deep, and 8 feet wide and have a volume of 200 cubic feet. The fiber optic cable apparatus 100 may be 9 feet tall, 3 feet deep, and 50 inches wide and have a volume of 112.5 cubic feet. The fiber optic cable apparatus 100 may be 9 feet tall, 3 feet deep, and 3 feet wide and have a volume of 81 cubic feet.

In some embodiments, 12F fiber optic cables may be used as tertiary input cables 110A", the panel may have 12 rows of installation ports, the panel may have 12 columns of installation ports, and the panel may have 144 four total installation ports configured to receive the 12F fiber optic cables so that 1,728 fibers may be selectively attached to the panel on the input side. In some embodiments, 12F fiber optic cables may be used as tertiary input cables 110A", the panel may have 12 rows of installation ports, the panel may have 20 columns of installation ports, and the panel may have 240 total installation ports configured to receive the 12F fiber optic cables so that 2,880 fibers may be selectively attached to the panel on the input side. In some embodiments, 12F fiber optic cables may be used as tertiary input cables 110A", the panel may have 16 rows of installation ports, the panel may have 16 columns of installation ports, and the panel may have 256 total installation ports configured to receive the 12F fiber optic cables so that 3,072 fibers may be selectively attached to the panel on the input side. In some embodiments, 12F fiber optic cables may be used as tertiary input cables 110A", the panel may have 12 rows of installation ports, the panel may have 24 columns of installation ports, and the panel may have 288 total installation ports configured to receive the 12F fiber optic cables so that 3,456 fibers may be selectively attached to the panel on the input side.

In some embodiments, 16F fiber optic cables may be used as tertiary input cables 110A", the panel may have 12 rows of installation ports, the panel may have 10 columns of installation ports, and the panel may have 120 total installation ports configured to receive the 16F fiber optic cables so that 1,920 fibers may be selectively attached to the panel on the input side. In some embodiments, 16F fiber optic cables may be used as tertiary input cables 110A", the panel may have 8 rows of installation ports, the panel may have 16 columns of installation ports, and the panel may have 128 total installation ports configured to receive the 16F fiber optic cables so that 2,048 fibers may be selectively attached to the panel on the input side. In some embodiments, 16F fiber optic cables may be used as tertiary input cables 110A", the panel may have 10 rows of installation ports, the panel may have 18 columns of installation ports, and the panel may have 180 total installation ports configured to receive the 16F fiber optic cables so that 2,880 fibers may be selectively attached to the panel on the input side. In some embodiments, 16F fiber optic cables may be used as tertiary input cables 110A", the panel may have 12 rows of installation ports, the panel may have 18 columns of installation ports, and the panel may have 216 total installation ports configured to receive the 16F fiber optic cables so that 3,456 fibers may be selectively attached to the panel on the input side.

In some embodiments, 24F fiber optic cables may be used as tertiary input cables 110A", the panel may have 12 rows of installation ports, the panel may have 12 columns of installation ports, and the panel may have 144 four total installation ports configured to receive the 24F fiber optic cables so that 3,456 fibers may be selectively attached to the panel on the input side. In some embodiments, 24F fiber optic cables may be used as tertiary input cables 110A", the panel may have 12 rows of installation ports, the panel may have 20 columns of installation ports, and the panel may have 240 total installation ports configured to receive the 24F fiber optic cables so that 5,760 fibers may be selectively attached to the panel on the input side. In some embodiments, 24F fiber optic cables may be used as tertiary input cables 110A", the panel may have 16 rows of installation ports, the panel may have 16 columns of installation ports, and the panel may have 256 total installation ports configured to receive the 24F fiber optic cables so that 6,144 fibers may be selectively attached to the panel on the input side. In some embodiments, 24F fiber optic cables may be used as tertiary input cables 110A", the panel may have 12 rows of installation ports, the panel may have 24 columns of installation ports, and the panel may have 288 total installation ports configured to receive the 24F fiber optic cables so that 6,912 fibers may be selectively attached to the panel on the input side.

In some embodiments, 32F fiber optic cables may be used as tertiary input cables 110A", the panel may have 8 rows of installation ports, the panel may have 6 columns of installation ports, and the panel may have 48 total installation ports configured to receive the 32F fiber optic cables so that 1,536 fibers may be selectively attached to the panel on the input side. In some embodiments, 32F fiber optic cables may be used as tertiary input cables 110A", the panel may have 6 rows of installation ports, the panel may have 15 columns of installation ports, and the panel may have 90 total installation ports configured to receive the 32F fiber optic cables so that 2,880 fibers may be selectively attached to the panel on the input side. In some embodiments, 32F fiber optic cables may be used as tertiary input cables 110A", the panel may have 9 rows of installation ports, the panel may have 12 columns of installation ports, and the panel may have 108 total installation ports configured to receive the 32F fiber optic cables so that 3,456 fibers may be selectively attached to the panel on the input side. In some embodiments, 32F fiber optic cables may be used as tertiary input cables 110A", the panel may have 10 rows of installation ports, the panel may have 12 columns of installation ports, and the panel may have 120 total installation ports configured to receive the 32F fiber optic cables so that 3,840 fibers may be selectively attached to the panel on the input side.

In some embodiments, 48F fiber optic cables may be used as tertiary input cables 110A", the panel may have 9 rows of installation ports, the panel may have 7 columns of installation ports, and the panel may have 63 total installation ports configured to receive the 48F fiber optic cables so that 3,024 fibers may be selectively attached to the panel on the input side. In some embodiments, 48F fiber optic cables may be used as tertiary input cables 110A", the panel may have 6 rows of installation ports, the panel may have 10 columns of installation ports, and the panel may have 60 total installation ports configured to receive the 48F fiber optic cables so that 2,880 fibers may be selectively attached to the panel on the input side. In some embodiments, 48F fiber optic cables may be used as tertiary input cables 110A", the panel may have 6 rows of installation ports, the panel may have 12 columns of installation ports, and the panel may have 72 total installation ports configured to receive the 48F fiber optic cables so that 3,456 fibers may be selectively attached to the panel on the input side.

In some embodiments, 72F fiber optic cables may be used as tertiary input cables 110A", the panel may have 5 rows of installation ports, the panel may have 8 columns of installation ports, and the panel may have 40 total installation ports configured to receive the 72F fiber optic cables so that 2,880 fibers may be selectively attached to the panel on the input side. In some embodiments, 72F fiber optic cables may be used as tertiary input cables 110A", the panel may have 6 rows of installation ports, the panel may have 8 columns of installation ports, and the panel may have 48 total installation ports configured to receive the 72F fiber optic cables so that 3,456 fibers may be selectively attached to the panel on the input side.

While the various combinations of fiber optic cable sizes, number of installation port rows, and number of installation columns are provided, other combinations may be used as well. Additionally, while these combinations are discussed for the input side, it should be understood that similar combinations may be provided on the output side. Combinations are discussed for tertiary input cables 110A", but it should be understood that these combinations may apply for secondary output cables 110B', secondary input cables, 110A', tertiary output cables 110B", or other cables.

FIG. 1C also illustrates various input and output fiber optic cables being received within the opening 104. In the illustrated embodiment of FIG. 1C, ten primary input cables 110A and fifty primary output cables 110B are received in the opening 104. In this example, the primary input cables 110A may be 2880F input cables and the primary output cables 110B may be 576F cables. However, secondary input and output cables and other fibers may be received through the opening 104 as well. Additionally, a different number of input cables and output cables may be provided through the opening in other embodiments, and the primary input cables 110A and the primary output cables 110B may possess different sizes in other embodiments.

Looking now at FIG. 1D, the doors 102A, 102B, and 102C are opened and the back cover 102D are removed so that fiber optic connection equipment provided within the fiber optic cable apparatus 100 may be seen. This fiber optic connection equipment includes shelves 112 and panels 114. In the illustrated embodiment, ten shelves 112 and ten panels 114 are provided, but any number of shelves 112 and panels 114 may be used. For example, only three shelves 112 may be used, or only six shelves 112 may be used. As illustrated in FIG. 1D, the housing 100A may be configured to hold some or all of the shelves 112 arranged in a vertical-stack. Panels 114 may be configured to enable connection of a plurality of the fiber optic input cables on an input side of the panel 114 to redistribute the plurality of the fiber optic input cables into a plurality of the fiber optic output cables on an output side. Fiber optic input cables may be grouped in first groupings, and fiber optic output cables may be grouped in second groupings, and the panel 114 may assist in defining the second groupings of the fiber optic output cables. In some embodiments, each of the one or more shelves 112 may be configured to route at least three thousand four hundred fifty six (3,456) fibers on the input side and at least three thousand four hundred fifty six (3,456) fibers on the output side within a volume of 20 cubic feet or less. However, in other embodiments, the shelf may have a volume of 15 feet or less, 10 feet or less, or even 8.2 cubic feet or less. This density may be accomplished while still allowing a user to attach fiber optic cables by hand (e.g., as opposed to needing specific installation tools that may be required in some high fiber density situations). In some embodiments, the shelves 112 may be configured to receive at least 100 fibers per cubic foot on the input side and at least 100 fibers per cubic foot on the output side, and the shelves 112 may even be configured to receive at least 172 fibers per cubic foot on the input side and at least 172 fibers per cubic foot on the output side in some embodiments.

The fiber optic connection equipment, including the shelves 112 and the panels 114, may be modular. The modular nature of components may provide enhanced lighting within the fiber optic cable apparatus 100, allowing a person installing fiber optic cables therein increased visibility so that he or she may accurately install the fiber optic cables. Fiber optic connection equipment may also tend to obscure fiber optic cables, installation ports, etc., so the modular nature of this equipment may be beneficial to improve visibility. Installation of fiber optic cables may be difficult due to the high density of fiber optic cables, but modularity may also allow increased access to the necessary installation ports and other areas within the fiber optic cable apparatus 100 so that installation is made easier. In this regard, the shelves 112 can be installed one at a time, and the fiber optic cable can be routed for one shelf at a time, allowing for easier access to connect the various fiber optic cables to the panels 114, etc. (e.g., without shelves already placed above the currently worked on shelf). The modular nature also allows for increased customization, with the space between shelves 112 being tailored to the needs of the user. The modular nature also allows users to use as many or as little pieces of fiber optic connection equipment as necessary. Modularity may also be beneficial in reducing shipping costs as the necessary components can be sent in a smaller volume than the final assembled fiber optic cable apparatus 100.

In some embodiments, fiber optic connection equipment may be configured to enable routing of a plurality of fibers within a volume of 400 cubic feet or less. In some embodiments, the fiber optic connection equipment may be configured to enable routing of at least twenty-thousand (20,000) fibers within a volume of 400 cubic feet or less. The fiber optic connection equipment may even be configured to enable routing of twenty-five thousand (25,000) fibers or thirty thousand (30,000) fibers within a volume of 400 cubic feet or less. In other embodiments, the fiber optic connection equipment may even be configured to enable routing of these fibers within a volume of 300 cubic feet, within a volume of 200 cubic feet, or even within a volume of 60 cubic feet. Notably, such densities can be achieved within such volumes even without a user needing to use installation tools, making installation of cables within various embodiments of the present invention toolless.

Various fiber optic cable apparatuses described herein include fiber optic connection equipment that may be used to assist in routing cables. FIGS. 1G-1N illustrate various types of example fiber optic connection equipment that may be used.

Figure 1G:
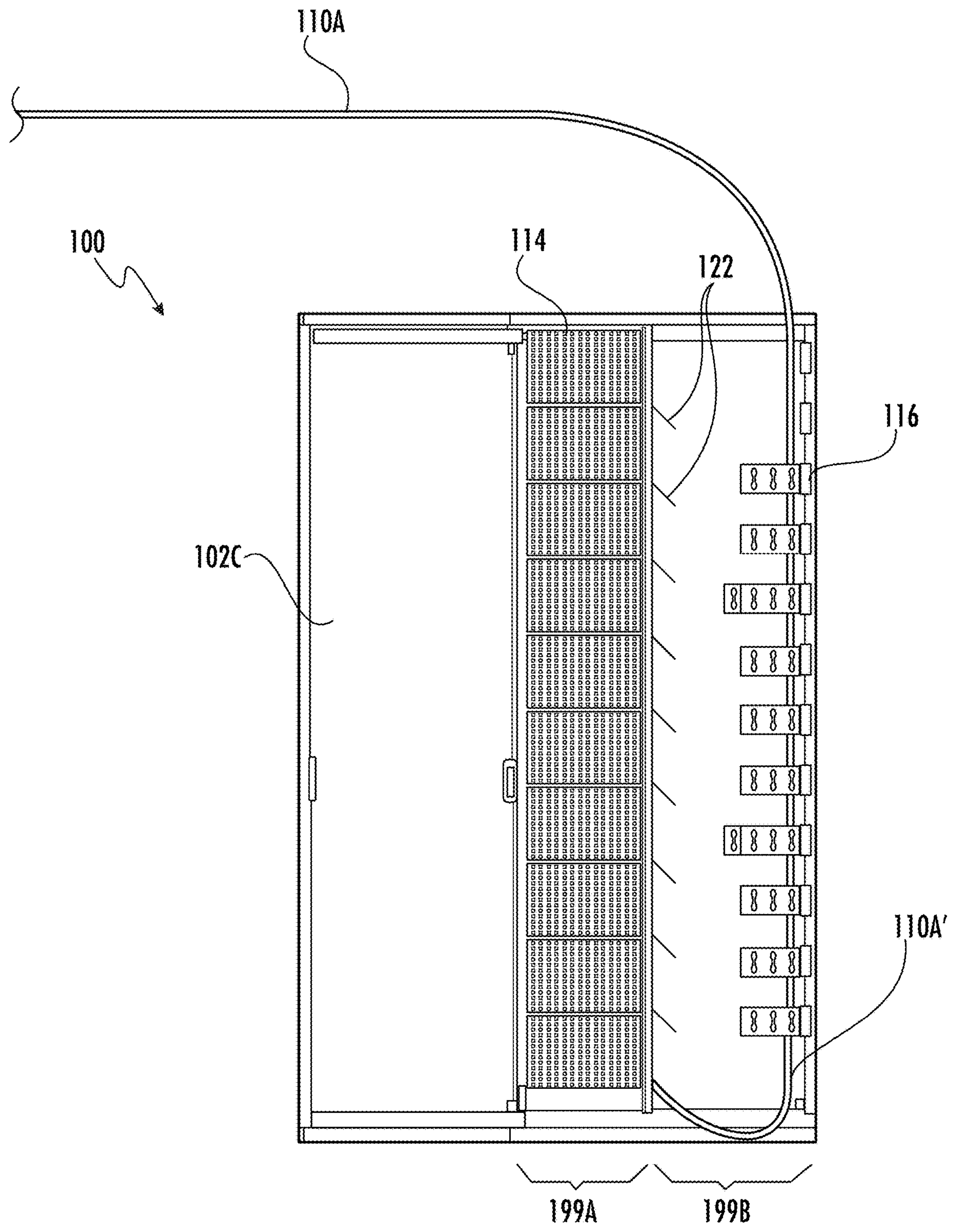
FIG. 1G is a side view illustrating the fiber optic cable apparatus of FIG. 1A, where a side door is opened and where the routing of input fiber optic cables can be seen, in accordance with some embodiments discussed herein.

Looking now at FIG. 1G, another schematic side view is shown illustrating the fiber optic cable apparatus 100 with the door 102C opened. The fiber optic cable apparatus 100 may include a shelving portion 199A on the left and a cable routing portion 199B on the right. In FIG. 1G, the routing of primary input cables 110A within these portions may be seen. Fiber optic connection equipment may be provided in the form of mounting plates 116. The mounting plates 116 may be modular so that users may use as many or as little mounting plates 116 as necessary. Mounting plates 116 may be provided in the cable routing portion 199B.

As illustrated in FIG. 1G, a primary input cable 110A is inserted into the fiber optic cable apparatus 100. The primary input cable 110A may be attached to a mounting plate 116 and allowed to fall towards the bottom of the fiber optic cable apparatus 100. Outer sheathing 227A (see FIG. 2A) on the primary input cable 110A may be removed so that secondary input cables 110A' provided within the primary input cable 110A may be exposed. The secondary input cables 110A' may extend proximate to the front plate 122 and may be selectively attached to the front plate 122, such as described further herein. Exterior sheathing 272B (see FIG. 2A) on the secondary input cables 110A' may be removed so that tertiary input cables 210A" (see FIG. 2A) within the secondary input cables 110A' may be exposed, and the tertiary input cables 210A" may be selectively attached to an adapter 324 (see FIG. 3B) within a panel 114.

Mounting plates 116 may be provided at staggered positions within the cable routing portion 199B of the fiber optic cable apparatus 100. For example, the mounting plates 116 may be provided at different heights within the fiber optic cable apparatus 100, and the mounting plates 116 may be provided at the same height but at different depths (e.g. positioned at various locations along a direction normal to the image shown in FIG. 1G) within the fiber optic cable apparatus 100. By staggering the position of the mounting plates 116 in this manner, input cables and/or output cables may be securely positioned in staggered positions, more cables may be received within the fiber optic cable apparatus 100, the cables may be better organized, and a user may more efficiently install the materials within the fiber optic cable apparatus 100. The mounting plates 116 may extend horizontally into the cable routing portion 199B towards the shelving portion 199A. An attachment feature may be provided to assist in selectively securing input cables and/or output cables to the mounting plates 116.

Figure 1H:
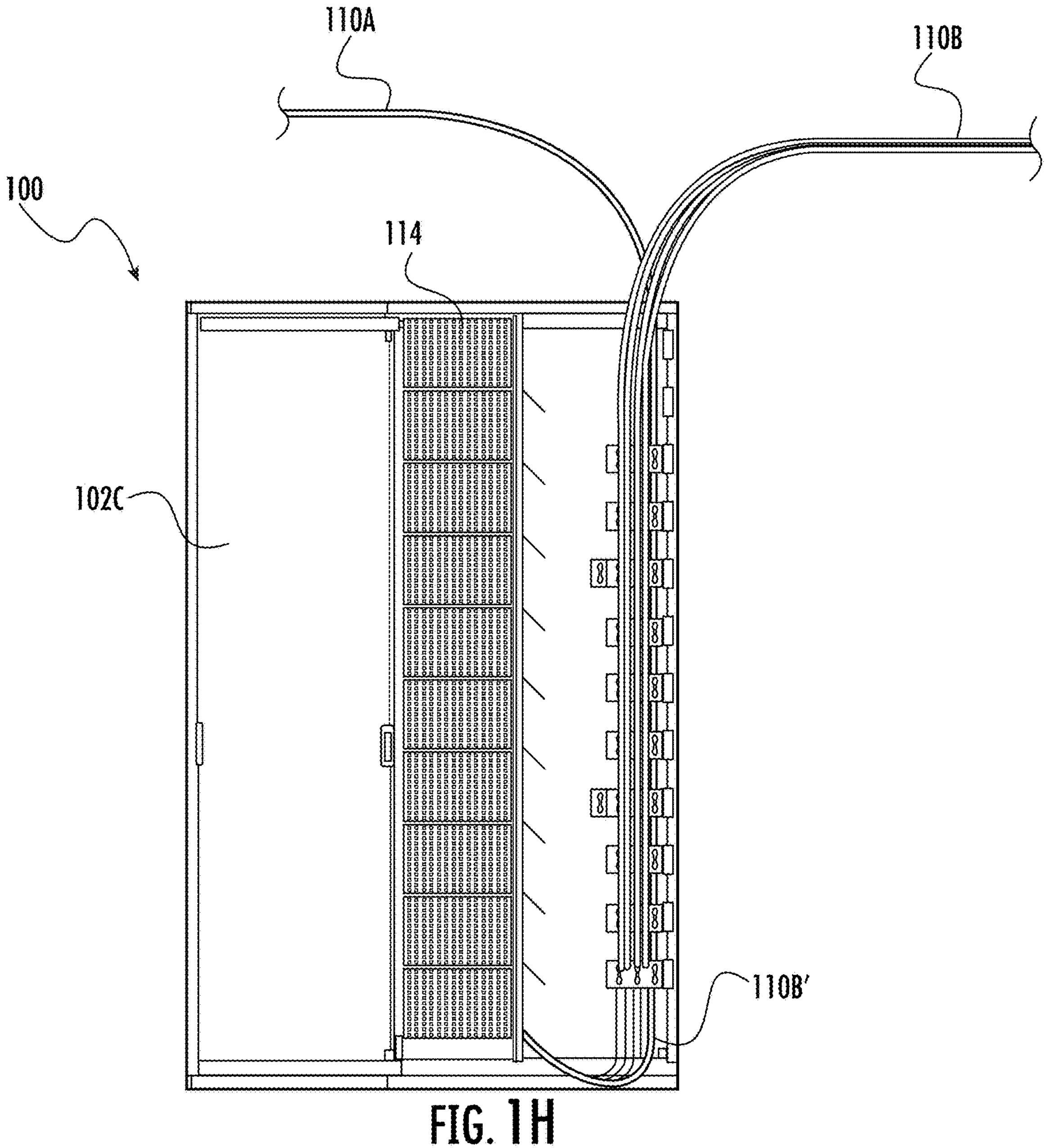
FIG. 1H is a side view illustrating the fiber optic cable apparatus of FIG. 1A, where a side door is opened and where the routing of input fiber optic cables and output fiber optic cables can be seen, in accordance with some embodiments discussed herein.

FIG. 1H is a schematic view illustrating the fiber optic cable apparatus 100 of FIG. 1A where the routing of primary input cables 110A and primary output cables 110B can be seen. The routing of primary input cables 110A, secondary input cables 110A', and tertiary input cables 210A" (see FIG. 2A) may be completed as discussed above in reference to FIG. 1G. Primary output cables 110B may be routed into the fiber optic cable apparatus 100 in a similar manner. Primary output cables 110B may be attached to a mounting plate 116 and allowed to fall towards the bottom of the fiber optic cable apparatus 100. Outer sheathing on the primary output cable 110B may be removed so that secondary output cables 110B' provided within the primary output cable 110B may be exposed. The secondary output cables 110B' may extend proximate to the front plate 122 and may be routed by fiber optic connection equipment at the front plate 122 towards a panel 114. Secondary output cables 110B' may then be selectively attached to adapters 324 (see FIG. 3B) on the panel 114. Input cables may be installed on one side of the panel 114 (e.g. the front side in FIG. 1H), and output cables may be installed on the opposite side of the panel 114 (e.g. the back side in FIG. 1H). While only primary and secondary output cables are illustrated in FIG. 1H, additional levels of cable sizes (e.g. tertiary output cables, quaternary output cables, quintenary output cables, etc.) may be used in other embodiments.

Figure 1I:
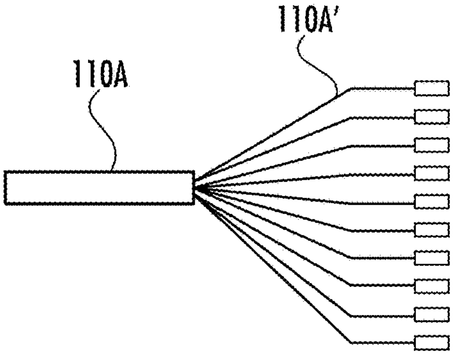
FIG. 1I is a schematic view illustrating an example primary input cable that is split into multiple secondary input cables, in accordance with some embodiments discussed herein.
Figure 1J:
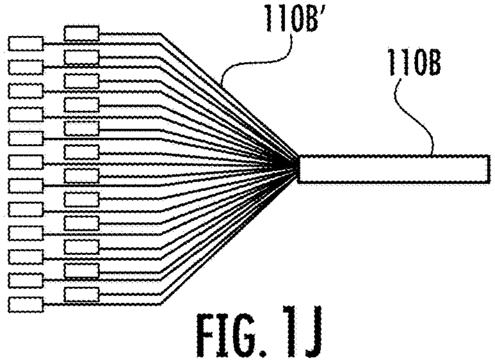
FIG. 1J is a schematic view illustrating an example primary output cable that is formed from multiple secondary output cables, in accordance with some embodiments discussed herein.

Various routing approaches may be used. The routing approach described above may permit a large number of fibers to be installed within a confined space. Outer sheathing (see, e.g., 227A, FIG. 2A) on primary input cables 110A and primary output cables 110B may be removed to expose secondary input cables 110A' and secondary output cables 110B' therein. This is illustrated in FIGS. 1I and 1J. The fiber optic cables may be split in a variety of ways to tailor the system as desired. A wide variety of primary cables, secondary cables, and tertiary cables may be used. For example, 3456F cables (fiber optic cables having 3456 fibers), 2880F cables, 576F cables, 288F cables, 144F cables, and 96F cables may be used, but other types of fiber optic cables may also be used. In some embodiments, the primary input cables 110A may be 3456F cables, and the 3456F cables may contain twelve (12) secondary input cables 110A' in the form of 288F cables. In other embodiments, the major input cables 110A may be 2880F cables, and the 2880F cables may contain ten (10) secondary input cables 110A' in the form of 288F cables. Tertiary input cables 110A" may be provided in the form of 24F cables, but other sized fiber optic cables may be used as well. For example, 12F, 16F, 32F, 48F, and 72F cables may be used. Where 24F tertiary input cables 110A" are used, a 288F secondary input cable 110A' may be split to form twelve (12) different 24F tertiary input cables 110A".

Figure 1K:
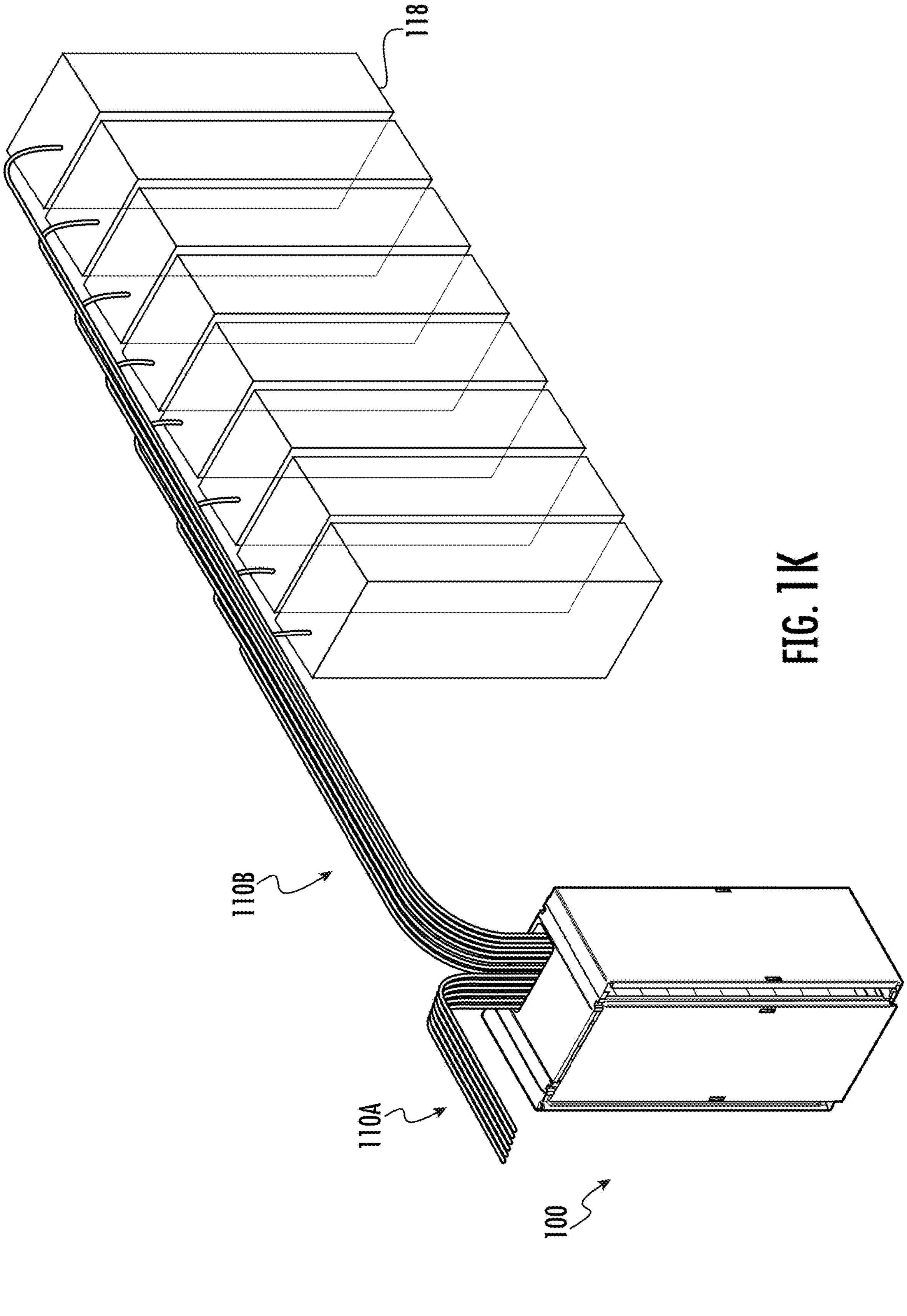
FIG. 1K is a perspective explanatory view illustrating the routing of primary output cables to various locations, in accordance with some embodiments discussed herein.

Looking now at FIG. 1K, a schematic view is shown illustrating the routing of primary output cables 110B to various locations 118. As noted above, different groupings may be used for the fiber optic output cables as sizes of the output cables may be selected to tailor the system as desired by the user. Primary output cables 110A of different sizes may be routed to various locations 118 within the same building, or the primary output cables 110A may be routed over long distances to several different locations. In some embodiments, different groupings may have the same number of cables, but different cables may be redistributed differently between the groupings.

Figure 1L:
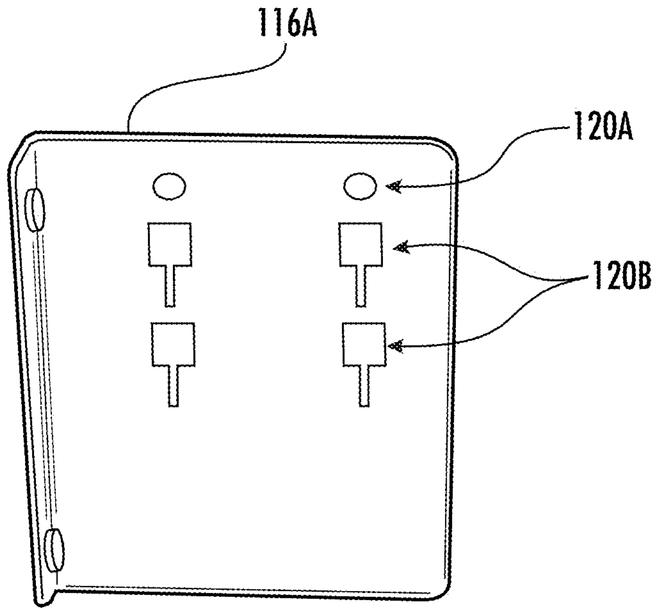
FIG. 1L is a front perspective view illustrating an example first mounting plate on which input fiber optic cables and output fiber optic cables may be secured, in accordance with some embodiments discussed herein.
Figure 1M:
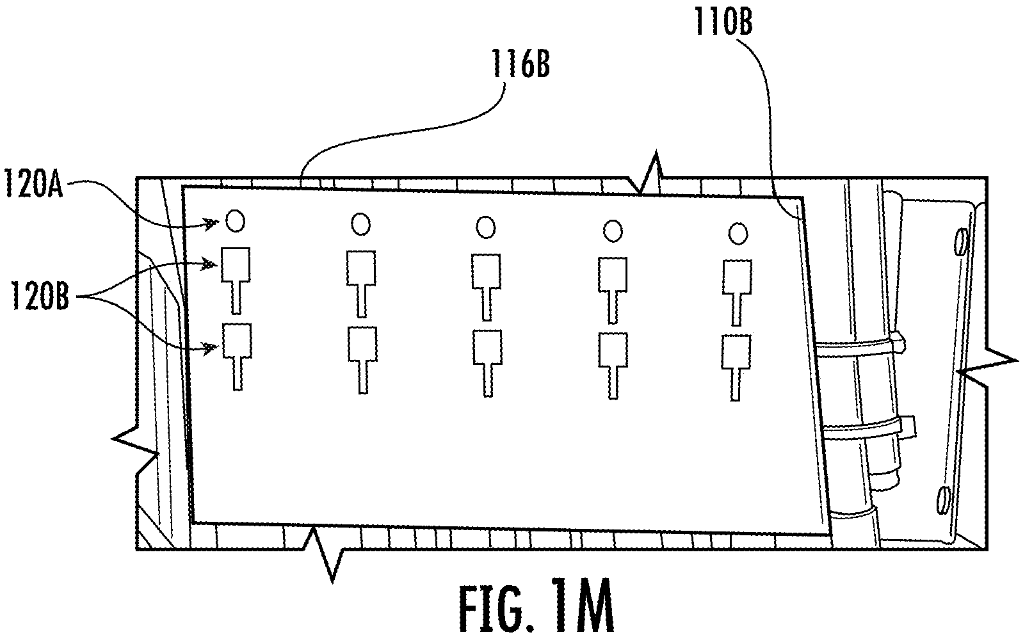
FIG. 1M is a front perspective view illustrating an example second mounting plate on which input fiber optic cables and output fiber optic cables may be secured, in accordance with some embodiments discussed herein.

In FIGS. 1L and 1M, fiber optic connection equipment in the form of mounting plates 116 (see FIG. 1G) are illustrated. These mounting plates 116 may assist in routing cables. FIG. 1L is a front view illustrating a first mounting plate 116A on which input cables and output cables may be secured, and FIG. 1M is a front view illustrating a second mounting plate 116B on which input cables and output cables may be secured. The first mounting plate 116A and the second mounting plate 116B may both include slots in which other fiber optic connection equipment may be attached. First slots 120A are provided, and these may possess a circular shape as illustrated in FIGS. 1L and 1M. Second slots 120B are also provided, and these may possess a rectangular shape with an additional slit towards the bottom of the slot. Slots having other shapes may also be used. In the illustrated embodiment of FIG. 1L, the first mounting plate 116A contains two first slots 120A and four second slots 120B. In the illustrated embodiment of FIG. 1M, the second mounting plate 116B contains six first slots 120A and twelve second slots 120B. As illustrated in FIG. 1M, a primary output cable 110B is attached to the second mounting plate 116B. This may be done by fastening the primary output cable 110B to a second slot 120B. Twelve different primary output cables 110B may be secured on the second mounting plate 116B, with six secured on one side and another six secured on the opposite side. In some embodiments, input cables may be attached to the first mounting plate 116A and output cables may be attached to the second mounting plate 116B.

Figure 1N:
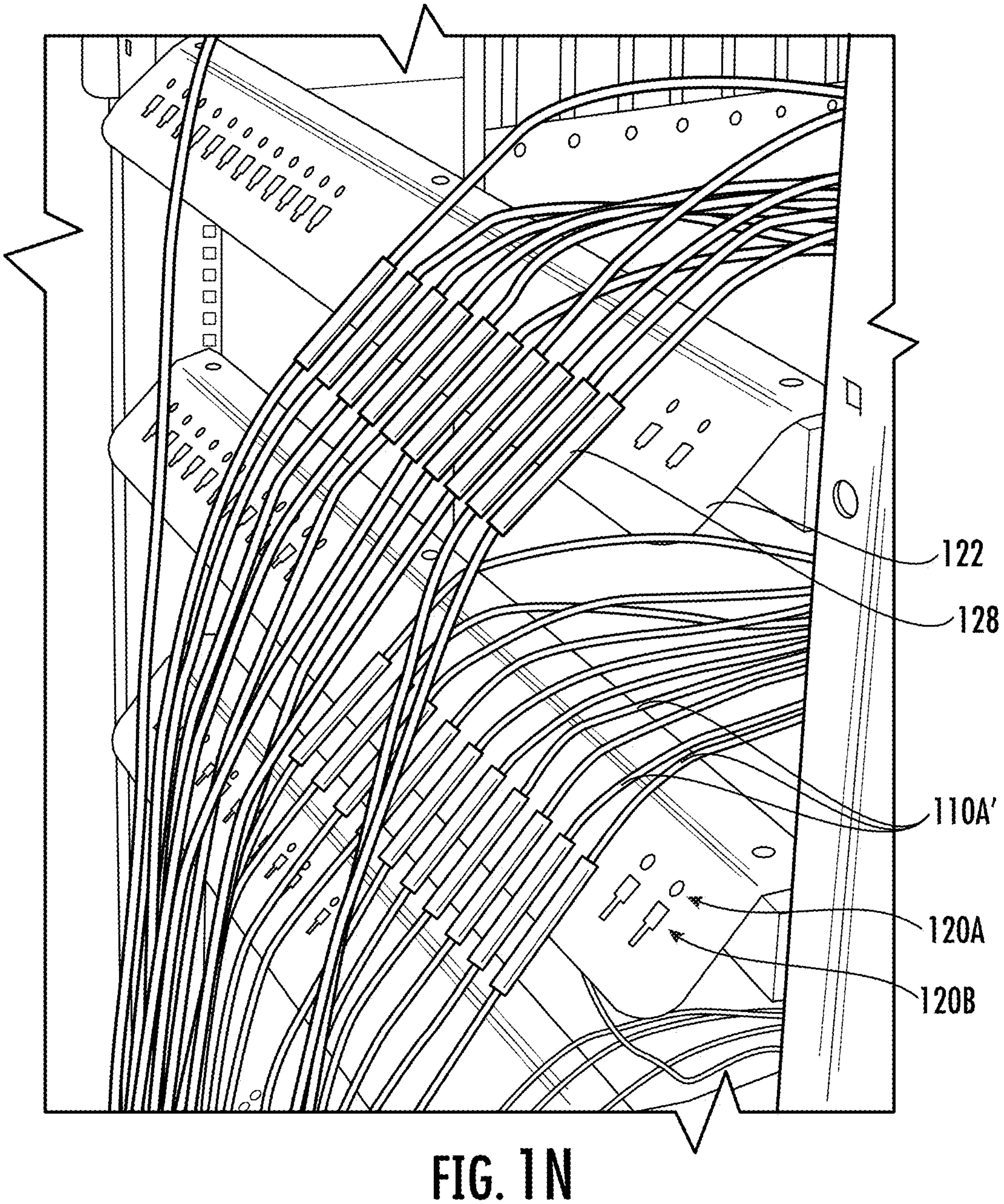
FIG. 1N is a perspective view illustrating various secondary input cables being routed in the fiber optic cable apparatus, in accordance with some embodiments discussed herein.

In FIG. 1N, a perspective view is shown illustrating various secondary input cables 110A' being routed in the fiber optic cable apparatus 100 (see FIG. 1A). As noted in reference to FIG. 1G, secondary input cables 110A' may be routed to a front plate 122. Similar to the first mounting plate 116A and the second mounting plate 116B, the front plate 122 may include first slots 120A and second slots 120B. RSU clips 128 may be used to connect the secondary input cables 110A' to the front plate 122. RSU clips 328 may be seen in greater detail in FIG. 3D. The secondary input cables 110A' may be color coded to help guide the user, or some other human readable indicators may be provided to assist in installation.

Figure 2A:
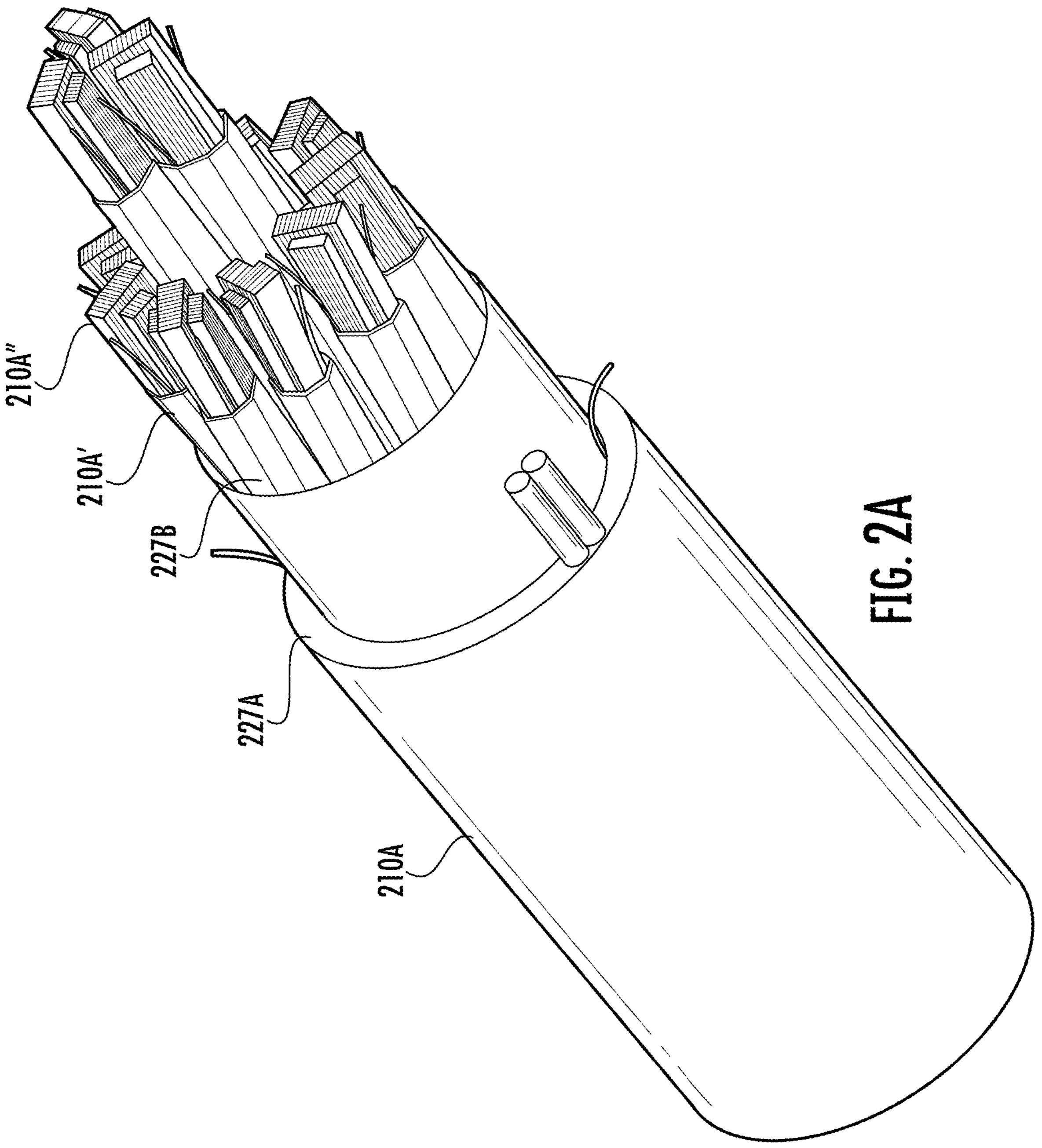
FIG. 2A is a schematic view illustrating an example primary input cable and various secondary input cables provided therein, in accordance with some embodiments discussed herein.
Figure 2B:
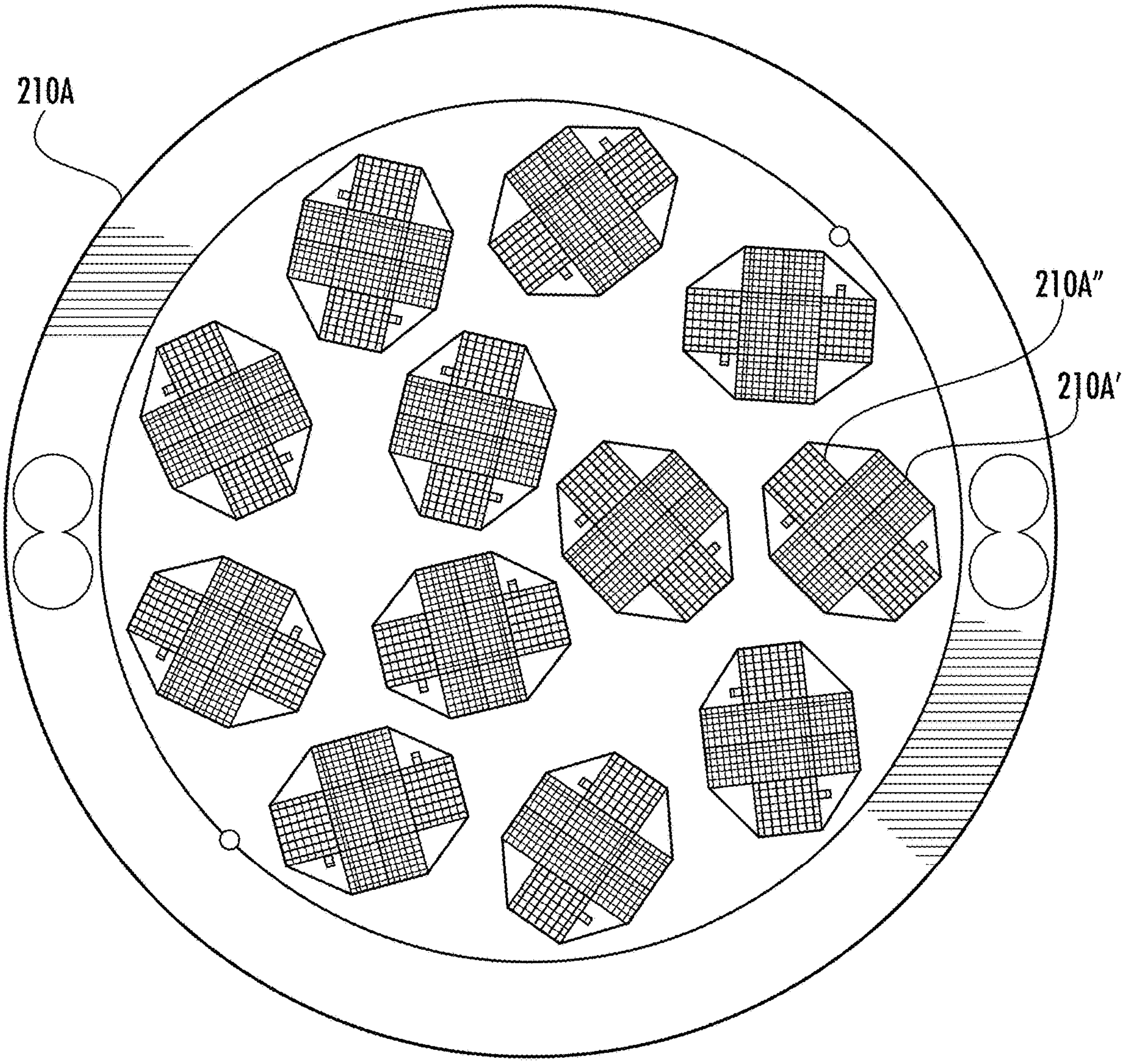
FIG. 2B is a schematic, cross-sectional view illustrating the primary input cable of FIG. 2A, in accordance with some embodiments discussed herein.

Primary input cables and primary output cables may be used, and these may contain a differing number of secondary input cables and secondary output cables having differing sizes. FIG. 2A is a schematic view illustrating a primary input cable 210A and various secondary input cables 210A' provided therein. Additionally, FIG. 2B is a schematic, cross-sectional view illustrating a primary input cable 210A and various secondary input cables 210A' provided therein.

As illustrated in FIG. 2A, the primary input cable 210A may include an outer sheathing 227A, and the primary input cable 210A may include a plurality of secondary input cables 210A'. The exterior sheathing 227B of the secondary input cables 210A' may be color coded to assist a user during installation. Tertiary input cables 210A" may be provided within the exterior sheathing 227B of the secondary input cables 210A'. Tertiary input cables 210A" are illustrated without any fiber optic connectors 434 (see FIG. 4A) attached so that the tertiary input cables 210A" may be seen. While FIG. 2A illustrates a primary input cable 210A, a primary output cable 110B (see FIGS. 1H and 1J) may also have secondary and/or tertiary cables secured therein in some embodiments.

Primary input cables, secondary input cables, tertiary input cables, primary output cables, secondary output cables, and tertiary output cables are discussed herein to describe cables that are provided within other cables. Any number of "levels" for the cables may be used, for example only primary output cables may be used in some embodiments. Alternatively, four or more "levels" may be used so that quaternary cables, quinary cables, etc. may be provided within tertiary cables.

Figure 3A:
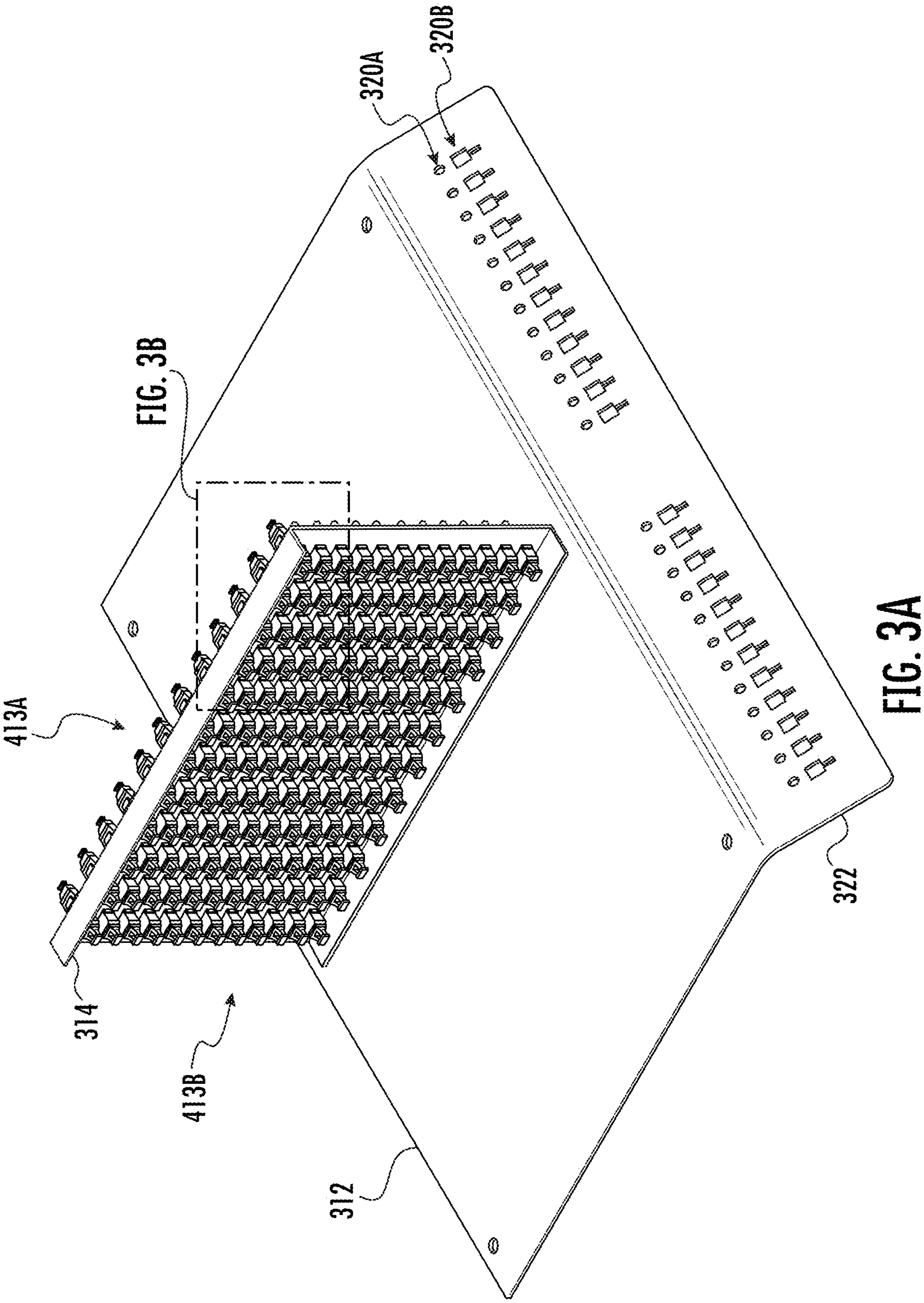
FIG. 3A is a perspective view illustrating example fiber optic connection equipment in the form of a shelf and a panel, in accordance with some embodiments discussed herein.
Figure 3B:
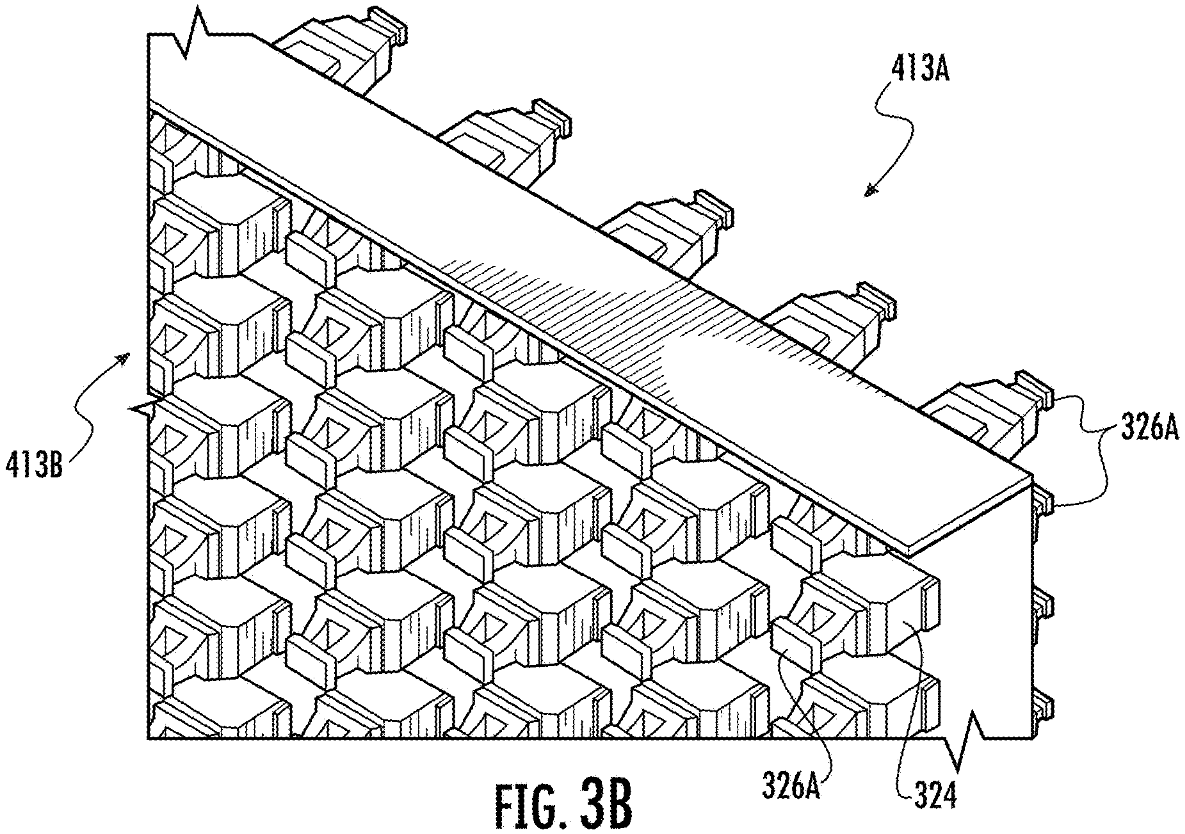
FIG. 3B is an enhanced perspective view of the panel illustrated in FIG. 3A where various adapters within the panel may be more easily seen, in accordance with some embodiments discussed herein.
Figure 3C:
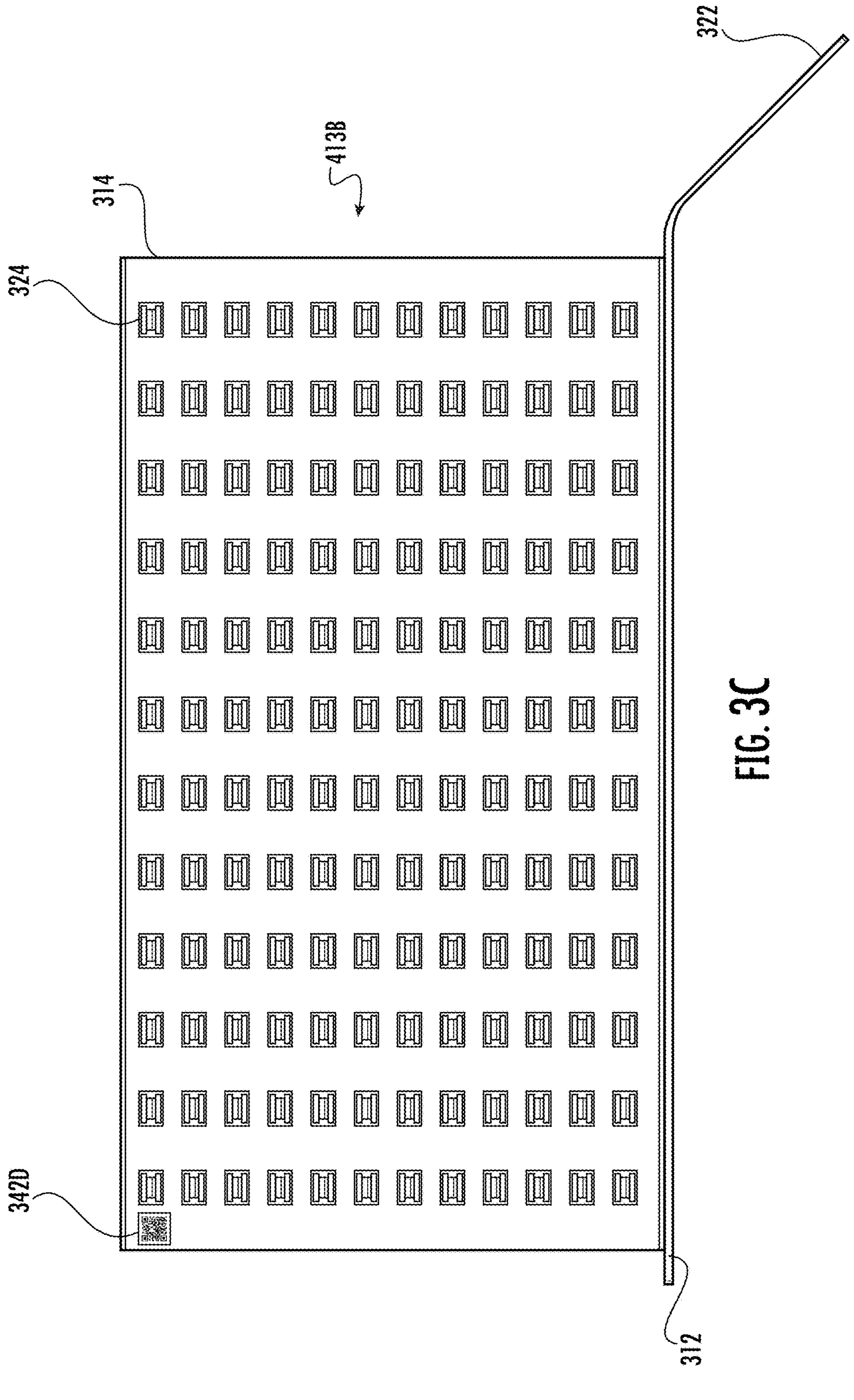
FIG. 3C is a side view illustrating the shelf and the panel of FIG. 3A, in accordance with some embodiments discussed herein.

Various pieces of fiber optic connection equipment may be used to assist in routing cables within the fiber optic cable apparatus 100 (see FIG. 1A). FIG. 3A is a perspective view illustrating fiber optic connection equipment in the form of a shelf 312 and a panel 314, and FIG. 3B is an enhanced perspective view of the panel 314 illustrated in FIG. 3A where various adapters 324 within the panel 314 may be more easily seen. FIG. 3C is a side view illustrating the shelf 312 and the panel 314 of FIG. 3A.

Figure 3D:
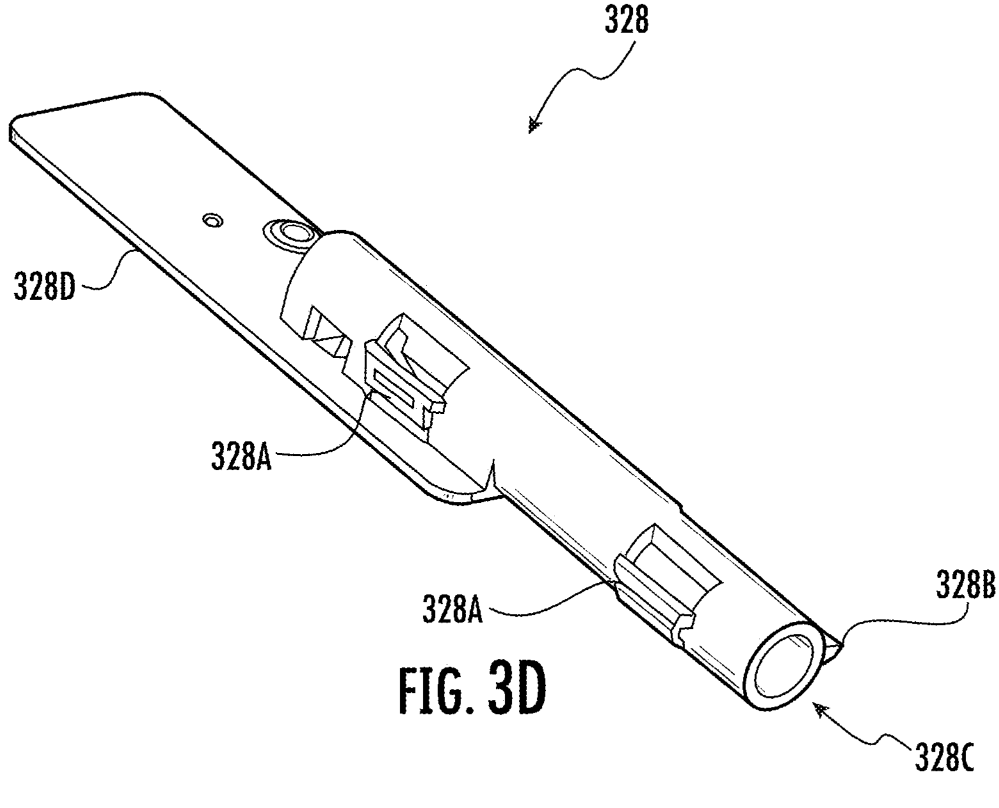
FIG. 3D is a perspective view illustrating an example ribbon sub unit ("RSU") clip that may be used to assist in routing fiber optic cables, in accordance with some embodiments discussed herein.

Looking first at FIGS. 3A and 3C, a shelf 312 can be seen with a panel 314 attached to the shelf 312. A front plate 322 may be attached to the shelf 312. In some embodiments, the front plate 322 may be integral to the shelf 312, but the front plate 322 may be provided as a separate part that is fastened to the shelf 312 in other embodiments. In some embodiments, the shelf 312 may be a 5U shelf that is configured to fit into a volume within the housing 100A (see FIG. 1D). A 5U shelf may have a height of 5 rack units, with each rack unit being approximately 1.75 inches. Thus, the height of a 5U shelf is 8.75 inches. As illustrated in FIG. 3A, the front plate 322 may be provided at an angle relative to the top surface of the shelf 312. In other embodiments, the front plate 322 may be coplanar with the top surface of the shelf 312, the front plate 322 may extend in a plane that is normal to the top surface of the shelf 312, or the front plate 322 may be provided at another angle (e.g., 45 degrees, 30 degrees, 75 degrees, etc.). Similar to the mounting plates illustrated in FIGS. 1L and 1M, the front plate may include first slots 320A and second slots 320B. First slots 320A may possess a circular shape, and second slots 320B may possess a rectangular shape with an additional slit towards the bottom of the slot. Slots having other shapes may also be used. Twenty four (24) first slots 320A and twenty four (24) second slots 320B may be provided on the front plate 322, with twelve (12) first slots 320A and twelve (12) second slots 320B provided on one side of the panel 314 and the remaining slots provided on the other side of the panel 314. In this way, fiber optic cables may be routed as illustrated in FIG. 3G.

As can be seen in FIG. 3C, a panel 314 may be provided, and the panel 314 may include a plurality of adapters 324. Adapters 324 may be attached to the panel 314 with one side of the adapter 324 extending out of an input-side 413A of the panel 314 and with another side of the adapter 324 extending out of an output-side 413B of the panel 314. The adapters 324 may be configured to receive, on an input side 424A (see FIG. 4A), an input fiber optic connector or an input side MPO connector for fibers from fiber optic input cables, and adapters 324 may be configured to receive, on an output side 424B (see FIG. 4A), an output fiber optic connector or an output side MPO connector for fibers for the fiber optic output cables. In some embodiments, at least seventy (70) adapters 324 may be provided in a single panel 314, and a single panel 314 may even include at least one hundred forty four (144) adapters 324 in some embodiments. However, a greater or smaller number of adapters may be provided on a panel (e.g. 50, 100, 200).

In some embodiments, one hundred forty four (144) adapters are provided in the panel with the adapters provided in twelve rows and twelve columns (12×12). However, in other embodiments, adapters may be provided with other numbers of rows and columns. For example, the panel may be 10×12, 10×10, 20×10, 15×15, 5×5, 5×10, etc. on one side. In some embodiments, the number of adapters or the number of installation ports may be different on the input side and the output side. Various cable sizes may be selectively attached to the panel in various embodiments. For example, 3456F cables, 2880F cables, 576F cables, 288F cables, 144F cables, 96F cables, 72F cables, 48F cables, 32F cables, 24F cables, 16F cables, and 12F cables may be used. The same cable size may be used for all of the installation ports in some embodiments, but different sized cables may be used in other embodiments. In some embodiments, the number of adapters on one side (either the input side or the output side) may be between 20 and 200 adapters, and each adapters may be configured to receive between 12 fibers and 576 fibers. In other embodiments, the number of adapters on one side may be between 50 and 160 adapters, and each adapters may be configured to receive between 12 fibers and 288 fibers. In other embodiments, the number of adapters on one side may be between 75 adapters and 150 adapters, and each adapters may be configured to receive between 12 fibers and 288 fibers. In another example embodiment, one hundred forty four (144) adapters are provided, and each adapter may be configured to receive 24 fibers.

In some embodiments, the panel 314 may have an area of approximately 4 square feet, but panels may be provided in other sizes. In some embodiments, the panel 314 may be configured to receive at least 500 fibers per square foot on an input side of the panel 314 and at least 500 fibers per square foot on an output side of the panel 314. The panel 314 may even be configured to receive at least 864 fibers per square foot on an input side of the panel 314 and at least 864 fibers per square foot on an output side of the panel 314. In some embodiments, the panel 314 may include an anchor label identifier 342D, such as discussed herein.

Looking now at FIG. 3B, an enhanced view of the panel 314 may be seen. Adapters 324 may be secured within the panel 314, with an input side 424A (see FIG. 4A) provided on one side of the panel 314 and an output side 424B (see FIG. 4A) provided on the other side of the panel 314. Dust caps 326A and/or dust covers 426B (see FIG. 4B) may be attached to the adapter 324 and on other components to protect the components from dust and other materials (such as during shipping or installation). These dust caps 326A may be removed once a user is ready to connect a cable and an associated connector to the adapter 324. In some embodiments, the first MPO connector housing 432A (see FIG. 4B) may be pre-installed within the adapter 324 at the input side and/or the output side of the adapter 324, and this may further increase the efficiency of a user. First, pre-installation reduces the number of tasks required to be performed by the user. Second, the MPO connector housings are typically larger components than the fiber optic cables and/or ferrules that are being attached to the MPO connector housing, so pre-installation of the first MPO connector housing 432A may permit the total size or diameter of the fiber optic cables to be reduced. This may improve visibility, making the fiber optic cable easier to route through tight spaces. This may also reduce the likelihood of tangling.

Other fiber optic connection equipment may also be used to help manage and route cables within the fiber optic cable apparatus 100. FIG. 3D is a perspective view illustrating an RSU clip 328 that may be used to assist in routing cables. The RSU clip 328 may be opened to receive a fiber optic cable therein, and the RSU clip 328 may then be closed and selectively attached to a front plate 322 (see FIG. 3A) or to some other fiber optic connection equipment. The RSU clip 328 may have latches 328A where the RSU clip 328 may be opened and closed, and the RSU clip 328 may open and close about a hinge 328B once the latches 328A are unlocked. The RSU clip 328 may be configured to selectively secure a fiber optic cable within the recess 328C. Additionally, the RSU clip 328 may include a connection plate 328D with one or more connection projections provided on the bottom of the connection plate 328D. The connection projections may be configured to engage the second slot 320B (see FIG. 3A) or another slot.

Figure 3E:
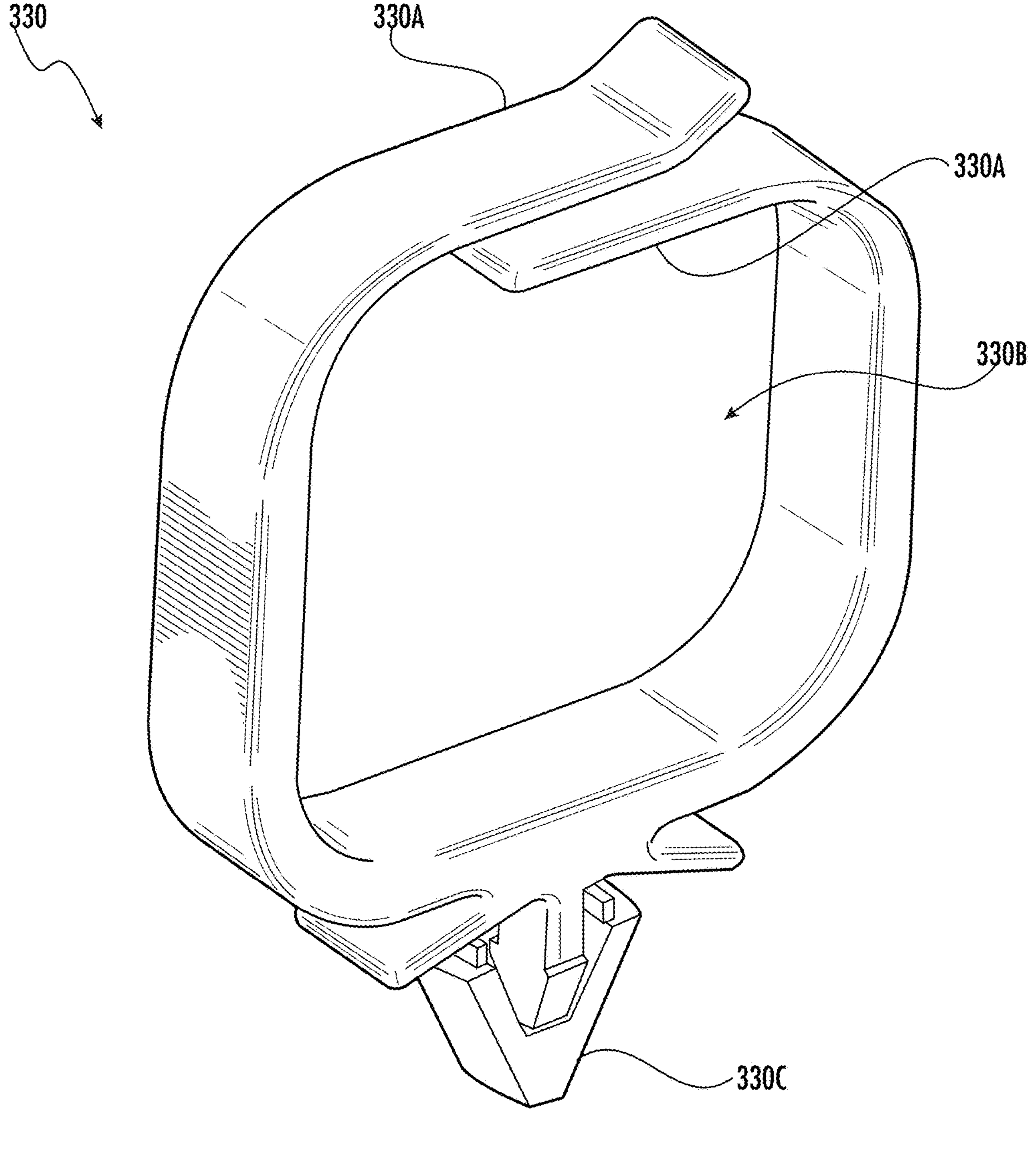
FIG. 3E is a perspective view illustrating an example routing clip that may be used to assist in routing fiber optic cables, in accordance with some embodiments discussed herein.

FIG. 3E is a perspective view illustrating a routing clip 330 that may be used to assist in routing cables. The routing clip 330 has lips 330A that may be selectively spread to provide access to the internal recess 330B. Fiber optic cables may be received between the lips 330A so that they may be maintained within the internal recess 330B. A fastener 330C may be used to connect the routing clip 330 to other fiber optic connection equipment. For example, the fastener 330C may be used to connect the routing clip 330 to a first slot 320A as illustrated in FIG. 3G.

In some embodiments, a plurality of fibers are provided as one or more first groupings of fiber optic input cables, and the plurality of fibers may be redistributed into one or more second groupings of fiber optic output cables. Fiber optic connection equipment (e.g. shelves, panels, etc.) may be configured to provide for connection within the housing 100A of the fiber optic input cables to redistribute the plurality of fibers into second groupings of fiber optic output cables. Fibers can be grouped together within fiber optic input cables of various sizes. For example, fibers may be grouped within 3456F cables, 2880F cables, 576F cables, 288F cables, 144F cables, 96F cables, or 24F cables. However, other fiber optic cable sizes may also be used, or fibers may be grouped together without the use of a fiber optic cable. In one embodiment, the first groupings may include a 3456F cable, a 2880F cable, or a 576F cable, and the second grouping may include a 288F cable, a 144F cable, a 96F cable, or a 24F cable.

Fiber optic connection equipment may assist in redistributing fibers from the first groupings to second groupings, where the first groupings and are different from the second groupings. In one embodiment, the first groupings of fiber optic input cables include 3456F cables, and the second groupings of fiber optic output cables may include an equal number of 288F cables and 96F cables. Thus, one 3456F input cable may be provided for each shelf, and nine 288F and nine 96F output cables may be provided for each shelf. In another embodiment, the first groupings of fiber optic input cables include at least one of 2880F cables or 144F cables, and the second groupings of fiber optic output cables include 576F cables. These are merely two examples of potential groupings, and a wide variety of other grouping combinations may be used.

Figure 3F:
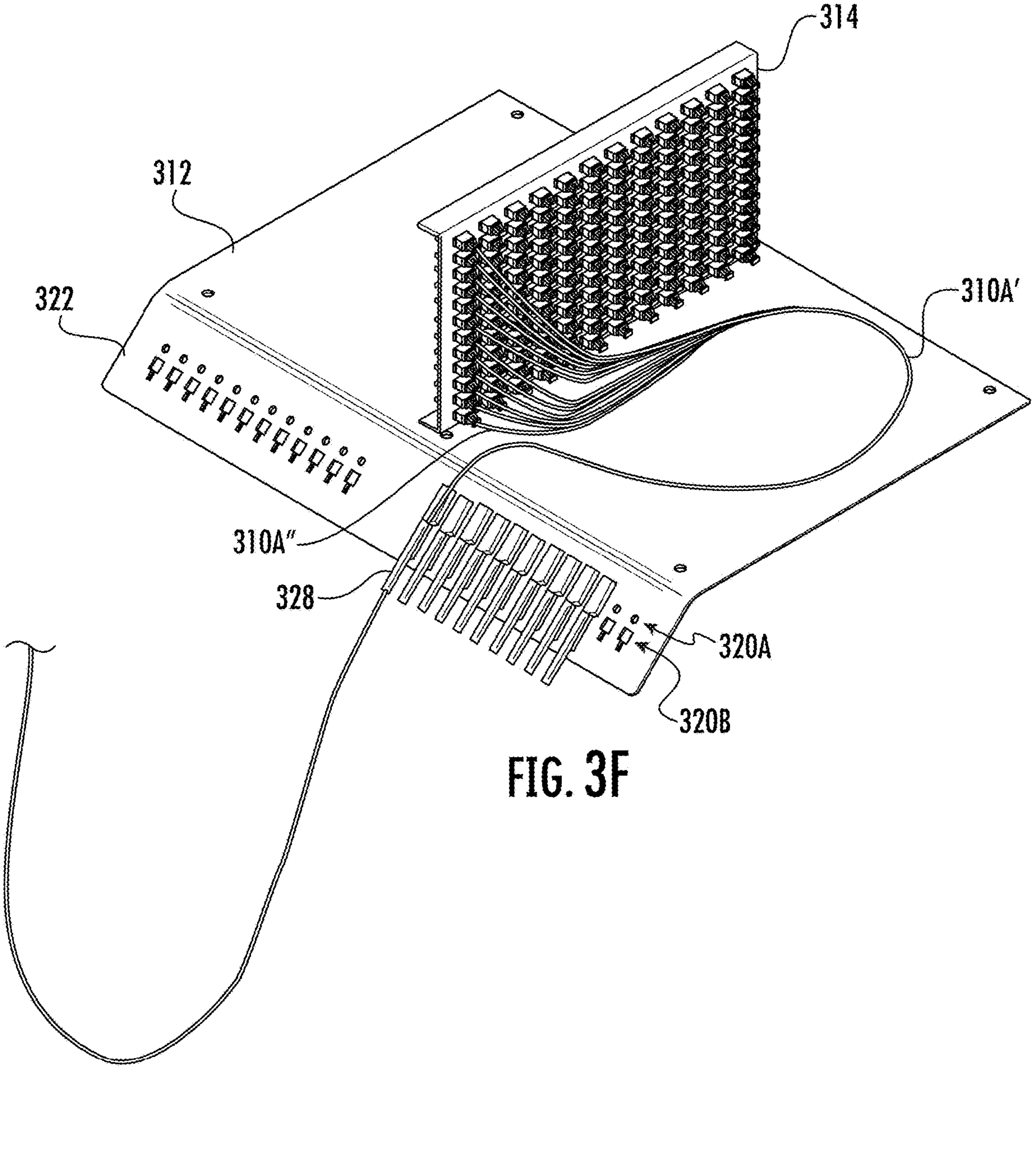
FIG. 3F is a perspective view illustrating the routing of an example secondary input cable into the shelf with the secondary input cable being split into tertiary input cables that are attached in installation ports, in accordance with some embodiments discussed herein.
Figure 3G:
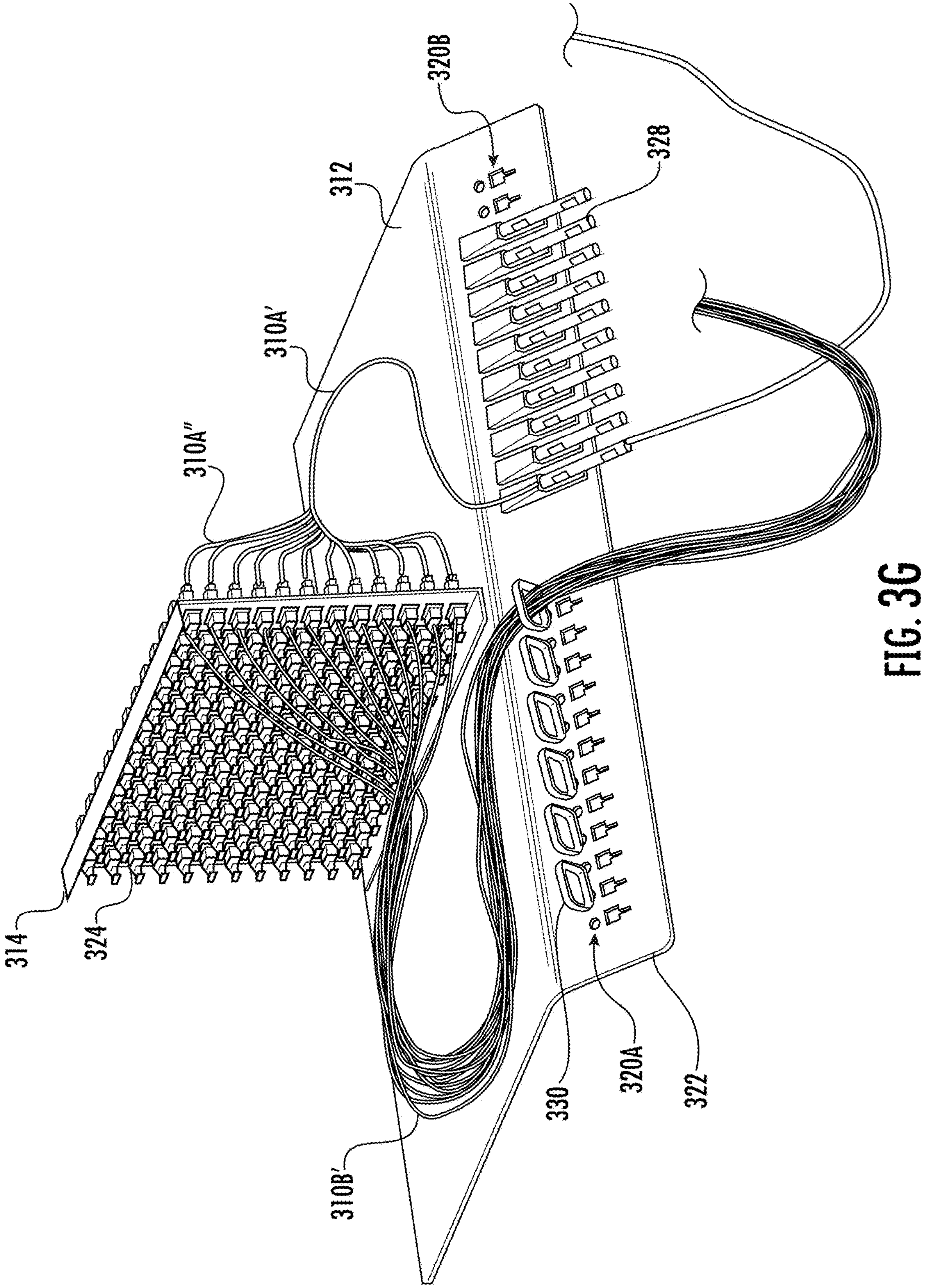
FIG. 3G is a perspective view illustrating the routing of an example secondary input cable into the shelf with the secondary input cable being split into tertiary input cables that are attached in installation ports and the routing and attachment of secondary output cables to installation ports, in accordance with some embodiments discussed herein.

FIGS. 3F and 3G illustrate how various cables may be routed within the fiber optic cable apparatus 100 (see FIG. 1A) using the fiber connection equipment. FIG. 3F is a perspective view illustrating the routing of a secondary input cable 310A' into the shelf 312 with the secondary input cable 310A' being split into tertiary input cables 310A" that are attached to installation ports. FIG. 3G is a perspective view illustrating the routing of a secondary input cable 310A' into the shelf 312 with the secondary input cable 310A' being split into tertiary input cables 310A" that are attached in installation ports with secondary output cables 310B' being routed and attached to installation ports.

Starting with FIG. 3F, a secondary input cable 310A' may be provided. This may be done by removing the outer sheathing 227A (see FIG. 2A) of a primary input cable 210A (see FIG. 2A). The secondary input cable 310A' may be selectively secured within an RSU clip 328, and the RSU clip 328 may be selectively attached to a second slot 320B within the front plate 322. This may be done using connection projections underneath the connection plate 328D. The secondary input cable 310A' may extend through the recess 328C of the RSU clip 328 and towards the panel 314. Between the RSU clip 328 and the panel 314, exterior sheathing 227B of the secondary input cable 310A' may be removed to expose tertiary input cables 310A" provided therein. Once the tertiary input cables 310A" are exposed, these tertiary input cables 310A" may be selectively attached to adapters 324 at the panel 314.

Notably, the tertiary input cables 310A" may be selectively attached to adapters 324 in the panel 314 in any order. In some embodiments, a user may proceed through installation by connecting tertiary input cables 310A" column-by-column, row-by-row, or through some other method. The illustrated panel 314 includes one hundred forty four adapters 324 secured therein, with twelve (12) rows of adapters and twelve columns of adapters 324. This density may be accomplished while still allowing a user to attach fiber optic cables by hand (e.g., as opposed to needing specific installation tools that may be required in some high fiber density situations. A user may use every adapter 324 within the panel 314 if desired, but the user may use only a portion of the adapters 324 in some embodiments.

Now looking at FIG. 3G, the routing of secondary input cables 310A' and tertiary input cables 310A" may be seen. Additionally, the routing of secondary output cables 310B' may also be seen. Secondary output cables 310B' may extend downwardly from a primary output cable as illustrated by the secondary output cables 110B' and primary output cables 110B in FIG. 1H. Outer sheathing on the primary output cables 110B may be removed to expose secondary output cables 110B' provided therein. The secondary output cables 310B' may extend to a routing clip 330 located proximate to the front plate 322. The routing clip 330 may be attached to a first slot 320A within the front plate 322 using the fastener 330C, and the routing clip 330 may organize the secondary output cables 310B'. The routing clip 330 may be used to organize secondary output cables 310B' based on the major output cable 310B from which they originated, the row or column on that the secondary output cables 310B' may be attached to, etc. The secondary output cables 310B' may be secured to an adapter 324 within the panel 314 via a fiber optic connector 560 (see, e.g., FIG. 5J) or an MPO connector housing 432B (see FIG. 4C).

While primary, secondary, and tertiary cables are discussed, it should be understood that primary, secondary, and/or tertiary cables may be attached to the panel in some embodiments, and the routing and splitting of cables described herein is merely exemplary. In one embodiment, fiber optic input cables may include 3456F cables as primary input cables, 288F cables as secondary input cables (with twelve 288F cables provided in each 3456F cable), and 24F cables as tertiary input cables (with twelve 24F cables provided in each 288F cable). In another embodiment, fiber optic input cables may include 2880F cables as primary input cables, 288F cables as secondary input cables (with ten 288F cables provided in each 2880F cable), and 24F cables as tertiary input cables (with twelve 24F cables provided in each 288F cable).

Fiber optic output cables may include 288F cables as primary output cables, and 24F cables as secondary output cables (with twelve 24F cables provided in each 288F cable). In another embodiment, 576F cables may be used as primary output cables, 288F cables may be used as secondary output cables, and 24F cables may be used as tertiary output cables. Other combinations could be used where different sizes of primary output cables are used. For example, a combination of 288F and 96F cables may serve as primary output cables in some embodiments.

In FIG. 3G, fiber optic input cables may be attached to an adapter 324 at an input side 424A (see FIG. 4A) of the adapter 324 and fiber optic output cables may be attached to the same adapter 324 at an output side 424B (see FIG. 4A) of the adapter 324. The fibers may be redistributed from first groupings of fiber optic input cables to second groupings of fiber optic output cables through the use of primary cables and secondary cables having different sizes. In FIG. 3G, the number of fibers in the tertiary input cable 310A" attached to the adapter may be equal to the number of fibers in the secondary output cable 310B'. For example, the tertiary input cable 310A" and the secondary output cable 310B' may both be 24F cables, and this may permit the use of the same sized fiber optic connectors for attachment to a panel 314. The fiber optic cables on the input side 424A of an adapter 324 may map linearly to fiber optic cables on the output side 424B, and this simplicity may lead to a reduction in the number of errors committed by a user as well as increased efficiency in installation. However, in other embodiments, the routing within the panel 314 may be more complex. For example, installation ports may not map linearly, with rows and columns being inverted. In other embodiments, the number of installation ports on the input side may not be equal to the number of installation ports on the output side—for example, one hundred forty four installation ports may be provided on the input side, and thirty six installation ports may be provided on the output side, and four 24F input cables may be attached to installation ports that merge together within an adapter 324 to connect to a 96F output cable.

In some embodiments, users may proceed in an ordered sequence. For example, fiber optic cables may be installed into a panel 314 starting with the bottom adapter 324 in a column, and a user may then progress vertically up the column to install additional fiber optic cables in the adapters 324. Once the desired number of fiber optic cables have been installed in one column, the user may begin installing fiber optic cables in an adjacent column. Once the desired number of fiber optic cables have been installed for a given shelf 312 or panel 314, the user may move to an adjacent shelf 312 and/or an adjacent panel 314 to continue installation there. By installing the fiber optic cables in an ordered sequence, the visibility and/or accessibility of fiber optic cables may be enhanced, allowing an image capture device to see relevant identifiers that may be used to aid in installation. However, other installation sequences may be used.

The approaches described herein may permit fiber optic connectors to be managed in an organized manner, and the approaches permit changes in the size of fiber optic connectors at different positions within a data center. The approaches allows users to avoid running individual fiber optic connectors between cabinets, with fibers instead being grouped into first groupings of input fibers and second groupings of output fibers. Notably, such groupings may vary and can be customized as needed in an efficient and effective manner using various example fiber optic apparatuses described herein.

Figure 3H:
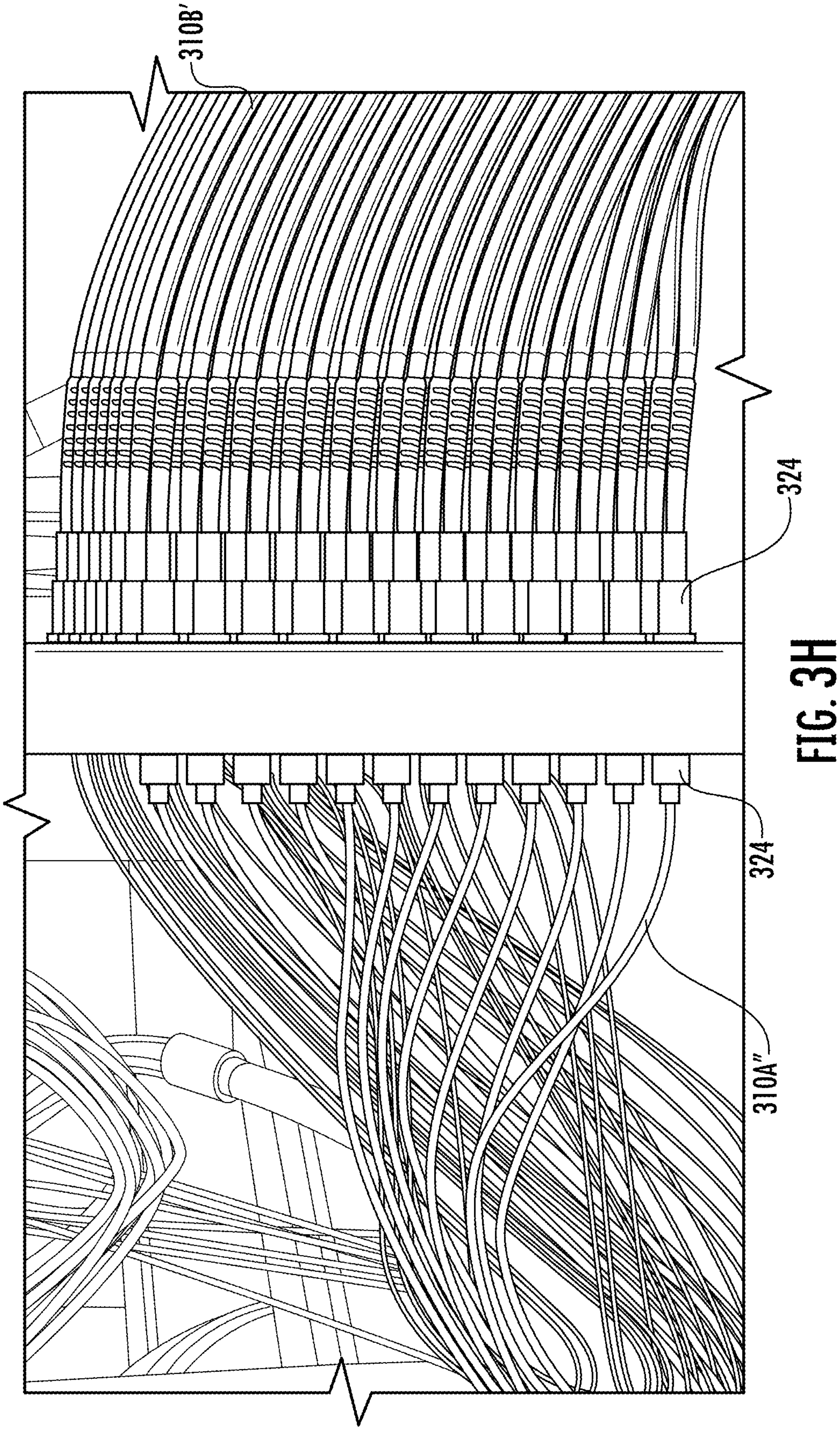
FIG. 3H is a side view illustrating example tertiary input cables and example secondary output cables installed in example adapters within an example panel, in accordance with some embodiments discussed herein.

FIG. 3H is a side view illustrating tertiary input cables 310A" and secondary output cables 310B' attached to adapters 324 within a panel 314 (see FIG. 3G). As illustrated, the fiber optic cables may be attached with a high density. In some embodiments, the tertiary input cables 310A" are 24F cables, meaning that they contain twenty-four fibers. Thus, where one hundred forty four 24F cables are inserted into the adapters 324 of the panel 314, 3456 total fibers may be selectively attached to an individual panel 314. In some embodiments, ten different panels 314 may be provided in a fiber optic cable apparatus 100 (see FIG. 1A). Thus, 34,560 total fibers may be selectively attached to the ten panels 314 within the fiber optic cable apparatus 100. Panels 314 may be oriented vertically, with each adapter 324 being configured to receive a horizontally oriented input connector and a horizontally oriented output connector.

Figure 4A:
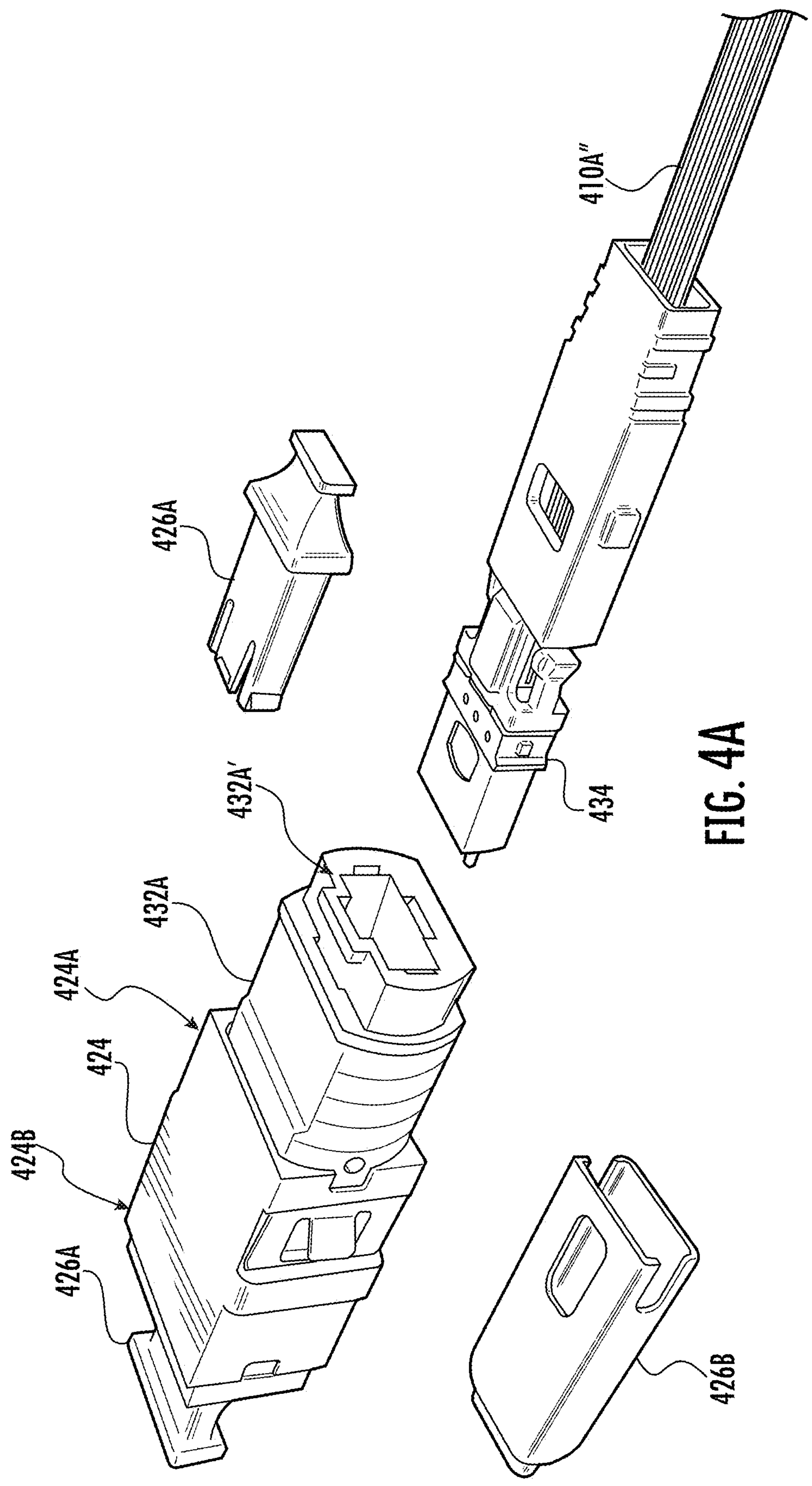
FIG. 4A is a perspective view illustrating an example adapter and various components that may be attached to the adapter, in accordance with some embodiments discussed herein.
Figure 4B:
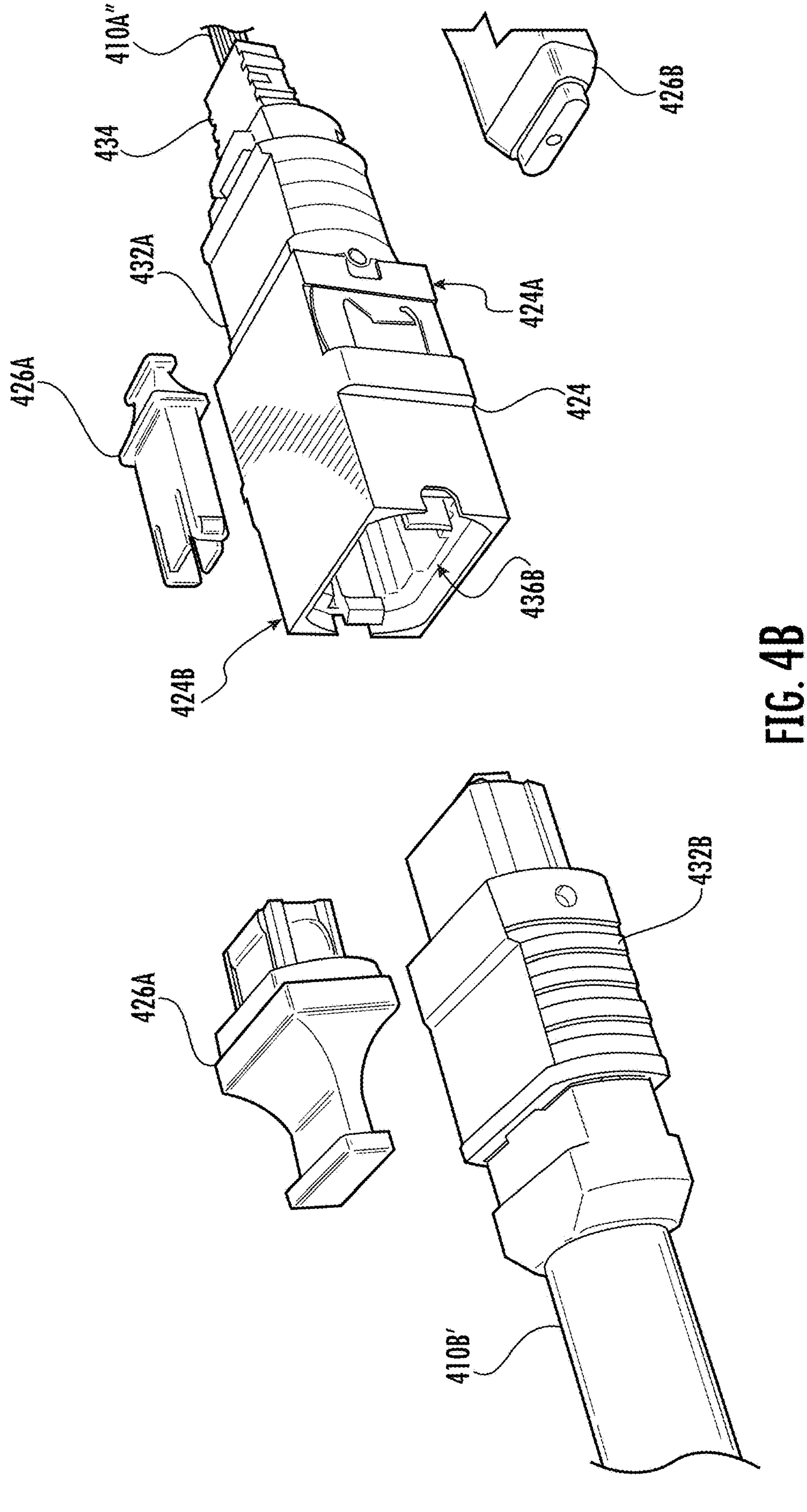
FIG. 4B is a perspective view illustrating the adapter of FIG. 4A and various components that may be attached to the adapter, in accordance with some embodiments discussed herein.
Figure 4C:
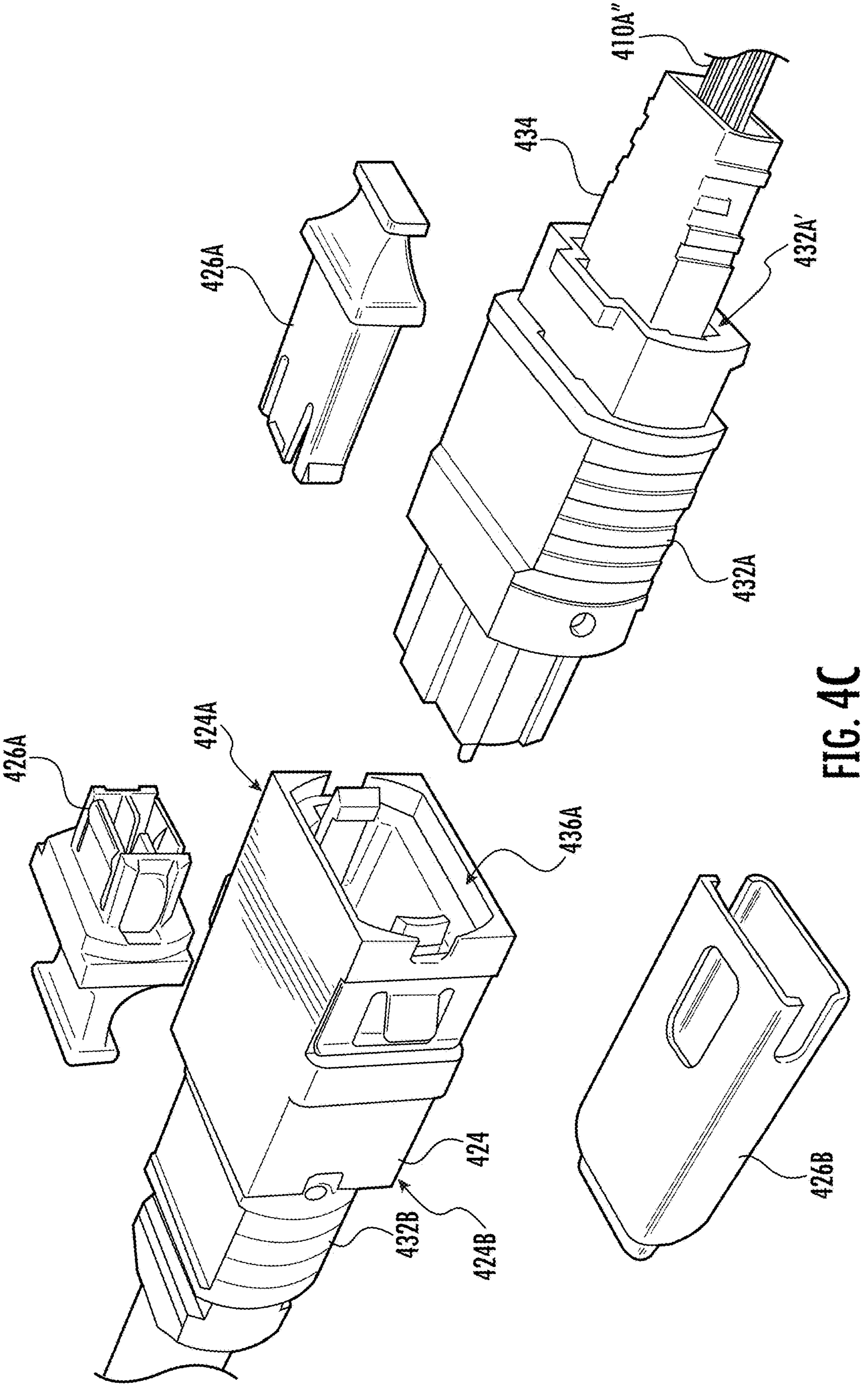
FIG. 4C is a perspective view illustrating the adapter of FIG. 4A with an example first MPO connector housing removed from the adapter, in accordance with some embodiments discussed herein.

An adapter may be used to indirectly connect input cables and output cables. FIGS. 4A-4C illustrate example adapters 424 and other components that may be used with the adapter. Looking first at FIG. 4A, an adapter 424 is provided. A dust cap 426A is provided on the output side 424B of the adapter 424, and this output side 424B is the top-left side of the adapter 424 in FIG. 4A. A first MPO connector housing 432A may be preinstalled on the input side 424A of the adapter 424, and the first MPO connector housing 432A may include a recess 432A'. This recess 432A' may be configured to receive another connector such as the fiber optic connector 434 as illustrated in FIG. 4B. In the embodiment illustrated in FIGS. 4A-4C, the fiber optic connector 434 is a Fast-Track MPO Ferrule, and the fiber optic connector 434 and the first MPO connector housing 432A, when attached, may form a Fast-Track MPO connector. The recess 432A' may also be configured to receive a dust cap 426A to protect the first MPO connector housing 432A from dust and other material when it is not in use.

A tertiary input cable 410A" may also be provided. This tertiary input cable 410A" may be a 24F cable, and a fiber optic connector 434 may be attached to the end of the tertiary input cable 410A". This fiber optic connector 434 may be configured to be received within the recess 432A' of the first MPO connector housing 432A as illustrated in FIG. 4B. A dust cover 426B may be selectively attached to the fiber optic connector 434 when the fiber optic connector 434 is not in use, and this may protect the fiber optic connector 434 from dust and other materials.

Looking now at FIG. 4B, a secondary output cable 410B' is provided. The secondary output cable 410B' may be attached to a second MPO connector housing 432B. The adapter 424 may include an output-side installation port 436B, and this output-side installation port 436B may be configured to receive the second MPO connector housing 432B as illustrated in FIG. 4C. When the adapter 424 is not in use, a dust cap 426A may be attached to the adapter 424 at the output-side installation port 436B.

Looking now at FIG. 4C, the first MPO connector housing 432A may be removed from the adapter 424 as desired. In FIG. 4C, the first MPO connector housing 432A has been removed to make the input-side installation port 436A of the adapter 424 visible.

In some embodiments, a transformable bracket may be used. This transformable bracket may be configured to selectively attach to either a dust cap or a connector associated with a fiber optic cable. The transformable bracket may include a transformable bracket identifier that may identify the transformable bracket, and this transformable bracket identifier may be associated in memory with other identifiers related to a specific port and/or a specific connector. Transformable bracket identifiers may be provided on an elongated body of the transformable bracket so that the identifiers remain visible even in areas having a high density of fiber optic cables. When attached to a connector (such as a fiber optic connector or an MPO connector housing), transformable brackets may assist in guiding cables in a desired direction.

Figure 5A:
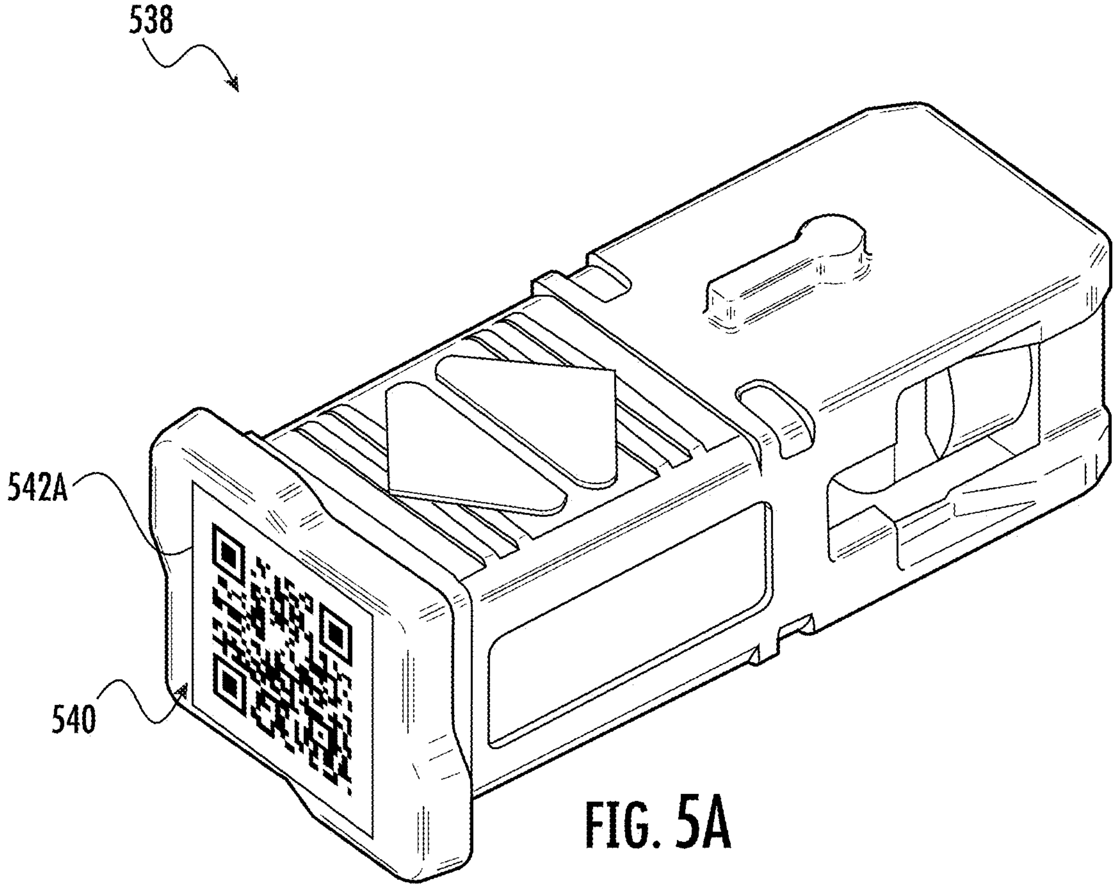
FIG. 5A is a perspective view illustrating an example dust cap that may be configured to be inserted into an adapter, in accordance with some embodiments discussed herein.
Figure 5B:
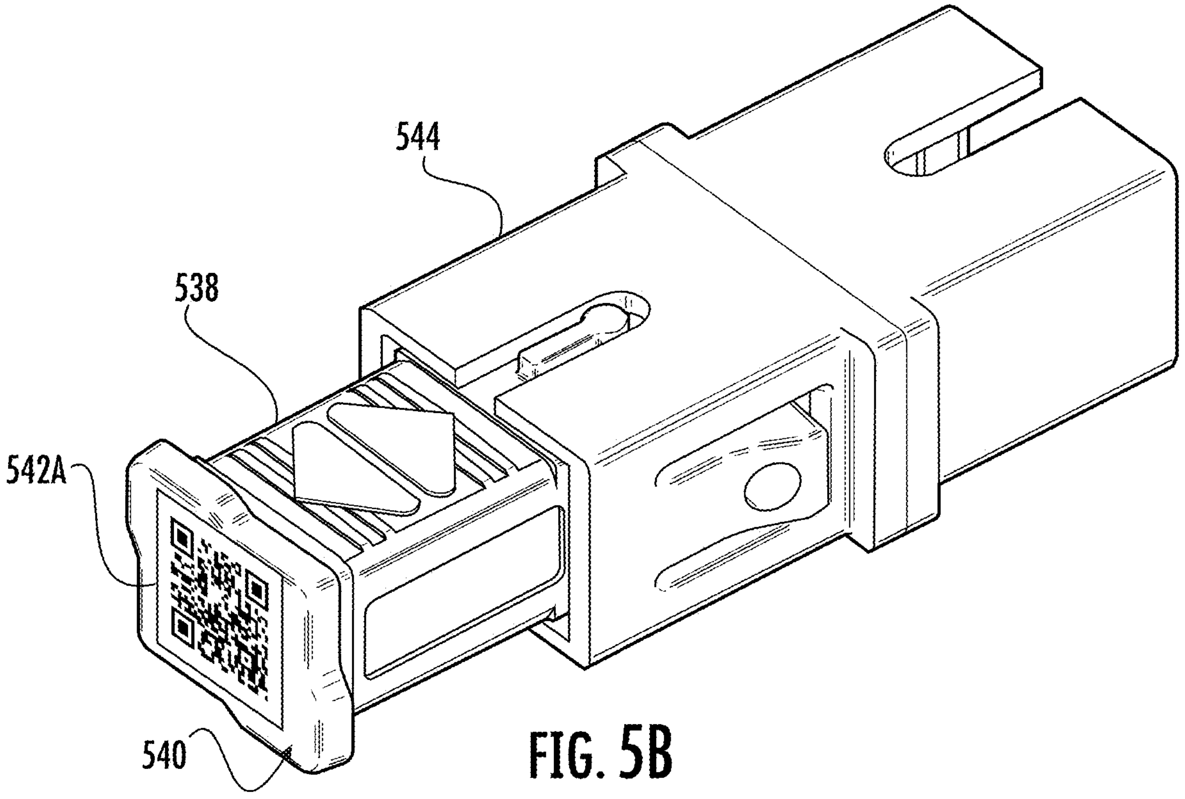
FIG. 5B is a perspective view illustrating the dust cap of FIG. 5A inserted into an example adapter, in accordance with some embodiments discussed herein.

FIGS. 5A and 5B illustrate an example dust cap 538 that may be used. FIG. 5A is a perspective view illustrating the example dust cap 538, and FIG. 5B is a perspective view illustrating the dust cap 538 of FIG. 5A inserted into an example adapter 544. As illustrated in FIG. 5B, the dust cap 538 may include a front surface 540, and a dust cap identifier 542A may be provided. The dust cap 538 may typically be attached to an adapter 544 when the adapter 544 is not in use, and the dust cap identifier 542A may be unique (e.g., to each port) to permit identification of the installation port 436A (see FIG. 4C) within the adapter 424.

Figure 5D:
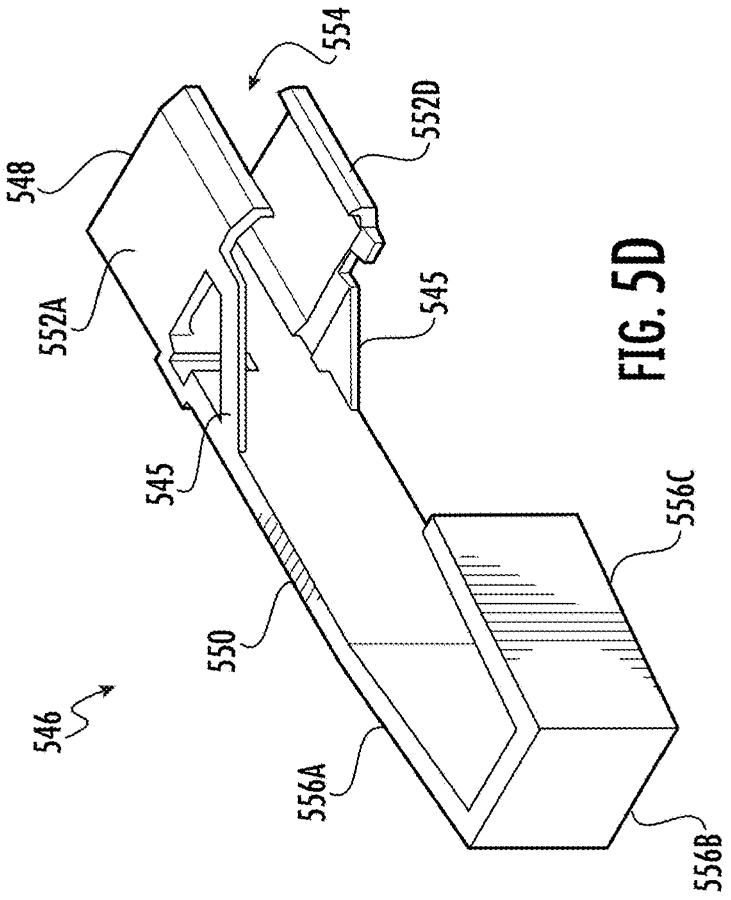
FIG. 5D is another perspective view illustrating the transformable bracket of FIG. 5C, in accordance with some embodiments discussed herein.
Figure 5C:
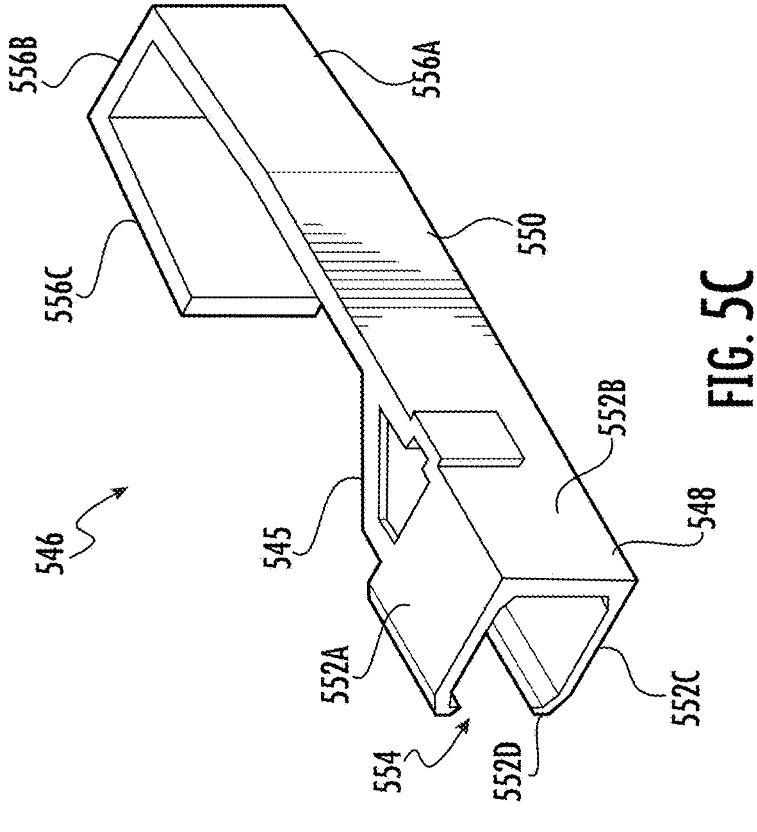
FIG. 5C is a perspective view illustrating an example transformable bracket, in accordance with some embodiments discussed herein.

Transformable brackets may be used that provide several advantages as noted above. FIGS. 5C and 5D show different perspective views illustrating an example transformable bracket 546. The transformable bracket 546 may include a clamp 548, and the clamp 548 may be configured to assist in selectively attaching the transformable bracket 546 to a dust cap 538, to a fiber optic connector 560 (see FIG. 5K), or to a cable. The clamp 548 may include a first side 552A, a second side 552B, a third side 552C, and a fourth side 552D. At the fourth side 552D of the clamp 548, an opening 554 may be provided. The opening 554 may be configured to be spread to permit a dust cap 538 (see FIG. 5E) or a fiber optic connector 560 (see FIG. 5K) to be received through the opening 554 and selectively secured within the clamp 548.

The transformable bracket 546 may also include an elongated body 550 which protrudes outwardly from the clamp 548. The elongated body 550 may form a cantilever off of the clamp 548, and one or more support surfaces 545 may extend from the clamp 548 to the elongated body 550 to provide structural support for the elongated body 550. The elongated body 550 may include a first surface 556A, a second surface 556B, and a third surface 556C. In some embodiments, the first surface 556A may extend from the clamp 548 to the second surface 556B, and the second surface 556B may extend between the first surface 556A and the third surface 556C. The first surface 556A, the second surface 556B, and the third surface 556C may collectively form a routing feature for directing a cable (e.g. 510A" shown in FIG. 5K). The first surface 556A, the second surface 556B, and the third surface 556C may define a C-shape for the routing feature. By providing the third surface 556C, cables that are routed through the routing feature may be better retained within the routing feature, for example, without the third surface 556C, a cable could shift outside of the routing feature. This routing feature may possess a different geometry in other embodiments—for example, the routing feature may include one curved surface, multiple fillets or chamfers, or additional surfaces.

Figure 5E:
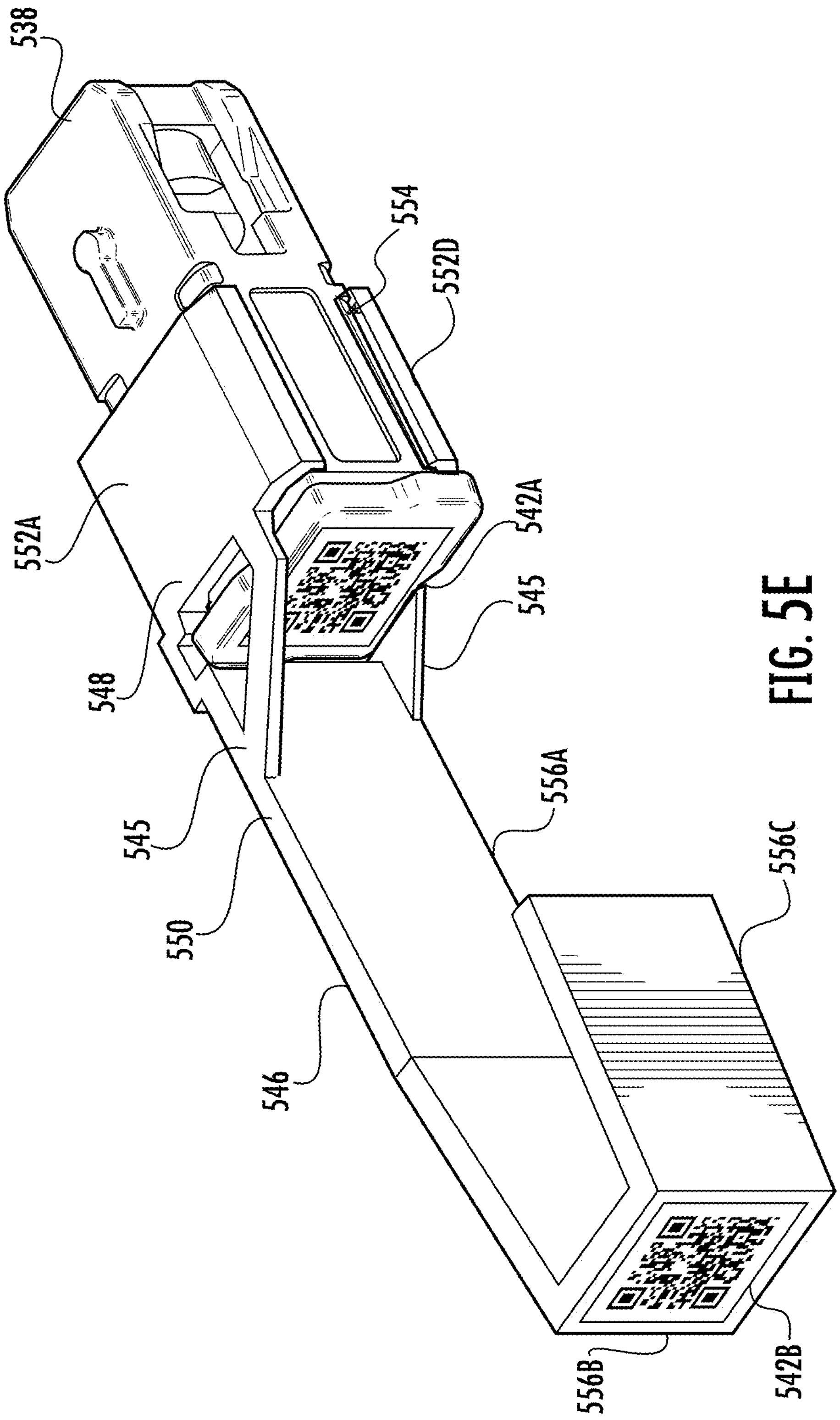
FIG. 5E is a perspective view illustrating an example transformable bracket having a transformable bracket identifier that is attached to the dust cap of FIG. 5A, in accordance with some embodiments discussed herein.
Figure 5F:
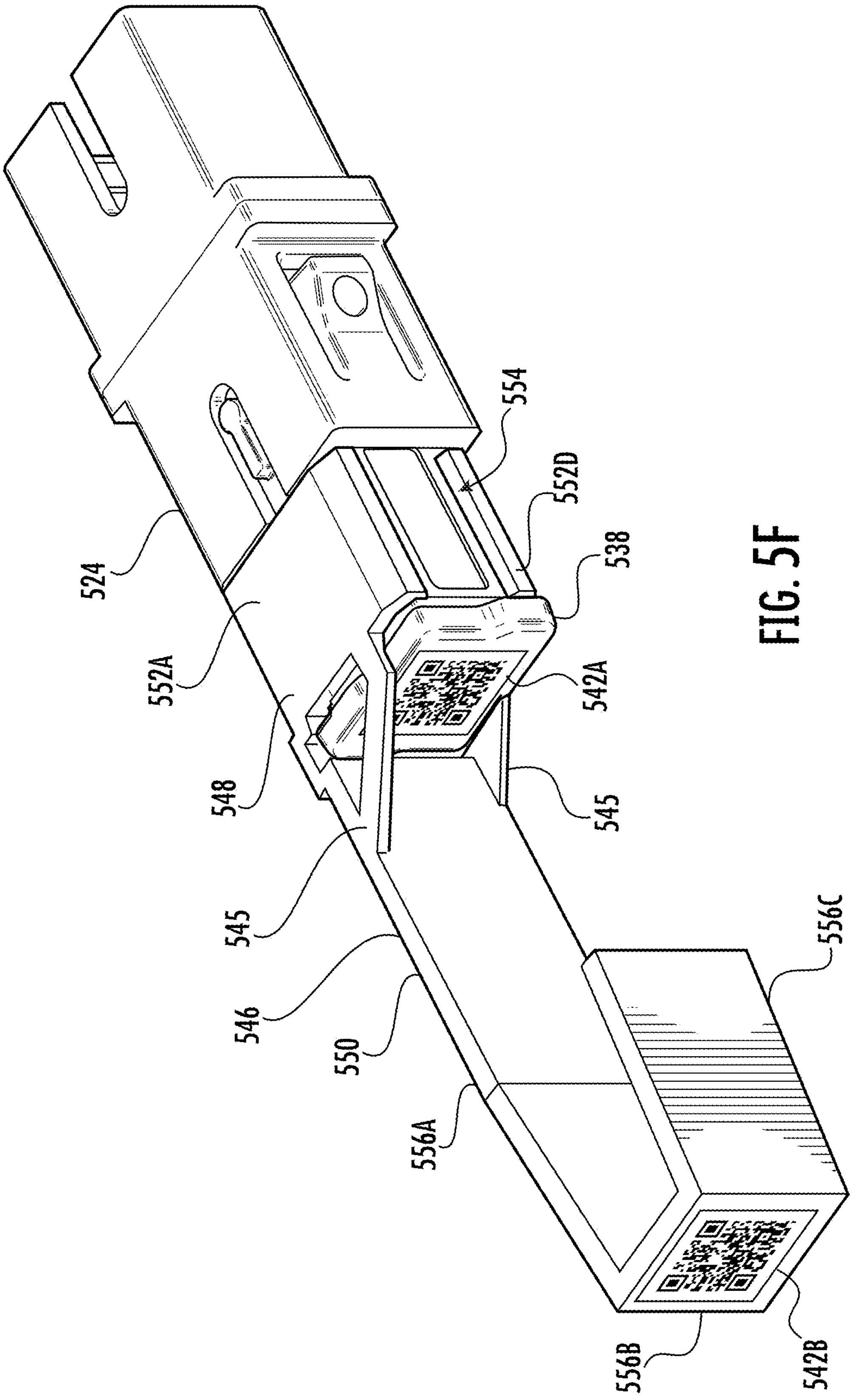
FIG. 5F is a perspective view illustrating the transformable bracket and dust cap of FIG. 5E, where the dust cap is inserted into an adapter, in accordance with some embodiments discussed herein.

FIG. 5E is a perspective view illustrating an example transformable bracket 546 with a transformable bracket identifier 542B, where the transformable bracket 546 is directly attached to the dust cap 538 of FIG. 5A. FIG. 5F is a perspective view illustrating the transformable bracket 546 and dust cap 538 of FIG. 5E where the dust cap 538 is inserted into an adapter 524. The transformable bracket 546 may be positioned on the dust cap 538 to ensure that the transformable bracket identifier 542B remains visible, even where other fiber optic cables are densely packed around the transformable bracket 546 and even if other transformable brackets 546 are provided nearby. As noted above, the opening 554 at the fourth side 552D of the clamp 548 may be widened to permit a dust cap 538 to be received, and the dust cap 538 may then be selectively secured in the clamp 548. Like the dust cap 538, the transformable bracket 546 may include a transformable bracket identifier 542B. The transformable bracket identifier 542B may be unique to each transformable bracket 546. In some embodiments, an image capture device may be used to scan the dust cap identifier 542A and an associated transformable bracket identifier 542B. These identifiers may then be linked together within memory at the device or within memory at another location. Thus, when linked together, scanning a transformable bracket identifier 542B may identify a particular port that the transformable bracket 546 is associated with. When the transformable bracket identifier 542B is scanned and when the transformable bracket identifier 542B is installed on the dust cap 538, the dust cap identifier 542A may be associated with the transformable bracket identifier 542B, and the location of the installation port may also be recorded in memory.

Additionally, cables, transformable brackets, dust caps, and other components may be attached on both an input side and an output side. Identifiers provided on components on the input side may be associated with identifiers on the output side in memory. This may permit a user to simply identify the correct components (e.g. cables) for attachment on one side of the panel (e.g. the output side) based on the components that have already been attached on the other side of the panel (e.g. the input side). This may also permit verification that installed components on one side of the panel 114 (see FIG. 1G) are installed at the correct installation port based on the components installed at a corresponding installation port on the opposite side of the panel 114. Where installation ports are mapped linearly from the input side to the output side of the panel 114, an installation port on the input side may correspond to an installation port in the same relative position on the output side. Where complex, non-linear mapping is provided, an installation port on the input side of the panel 114 may correspond to an installation port in a different position on the output side. By associating identifiers on both sides, the association between components on the input side and output side may be retained in memory. By retaining this in memory, the saved associations may be quickly retrieved from memory in the event that a user wishes to make additional changes to the system. Retaining associations between these input and output side identifiers may also increase the efficiency for users and reduce the potential for errors—otherwise, users would be required to map the installation ports and identify other components themselves, which would be an extremely difficult task (especially where complex, non-linear mapping is provided).

Figure 5G:
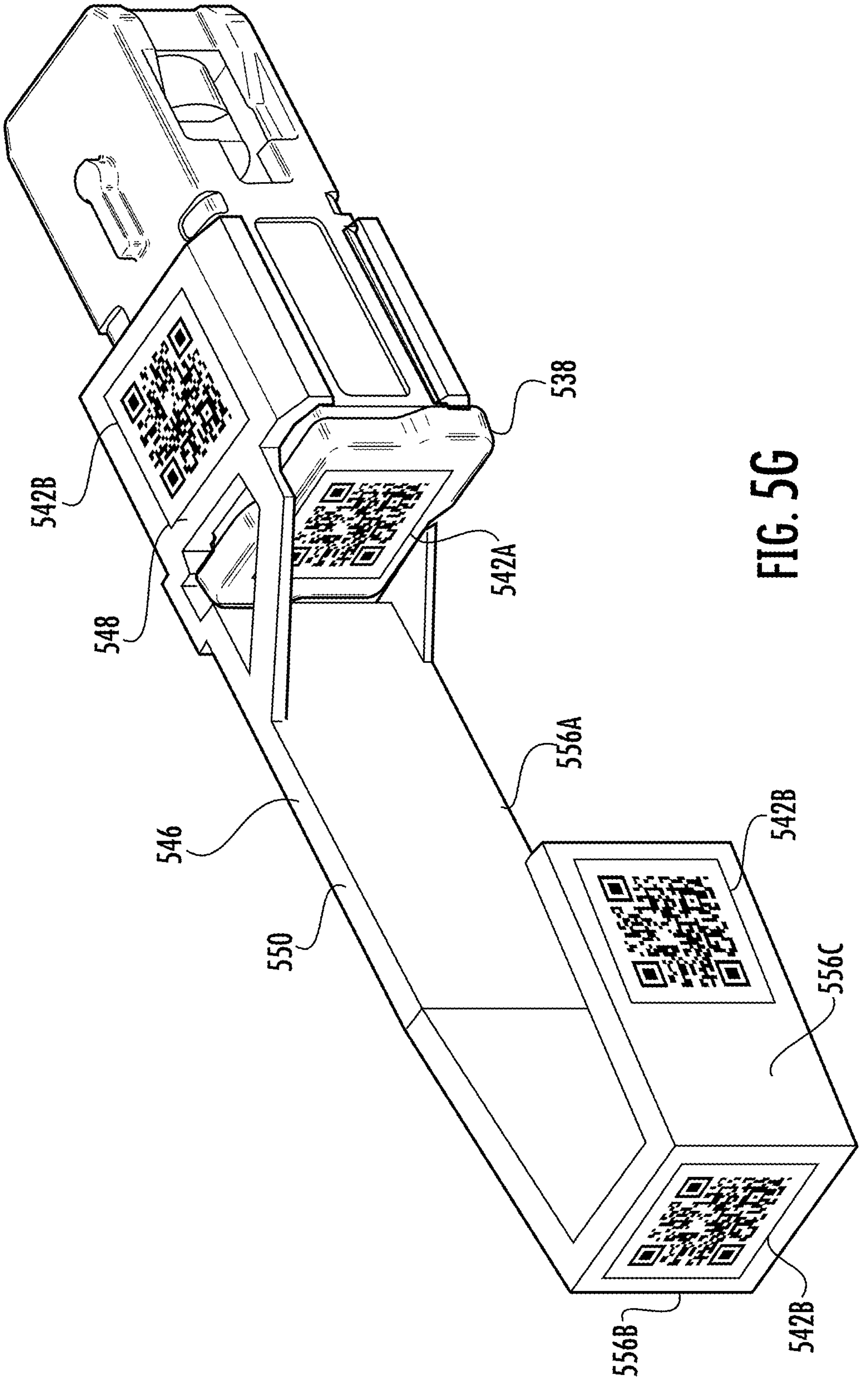
FIG. 5G is a perspective view illustrating another example transformable bracket having additional transformable bracket identifiers that is attached to the dust cap of FIG. 5A, in accordance with some embodiments discussed herein.
Figure 5H:
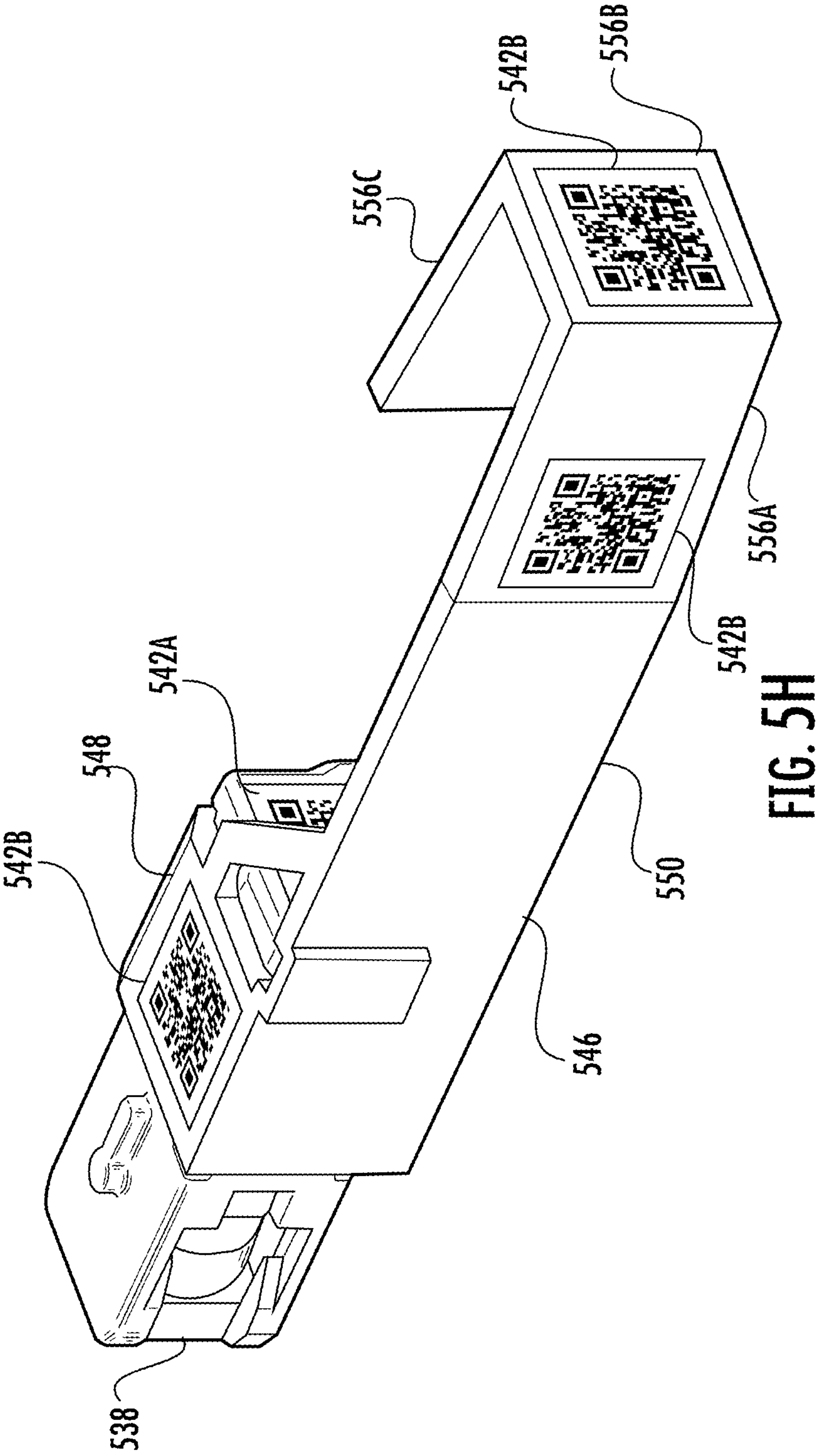
FIG. 5H is another perspective view illustrating the transformable bracket and dust cap of FIG. 5G, in accordance with some embodiments discussed herein.
Figure 5I:
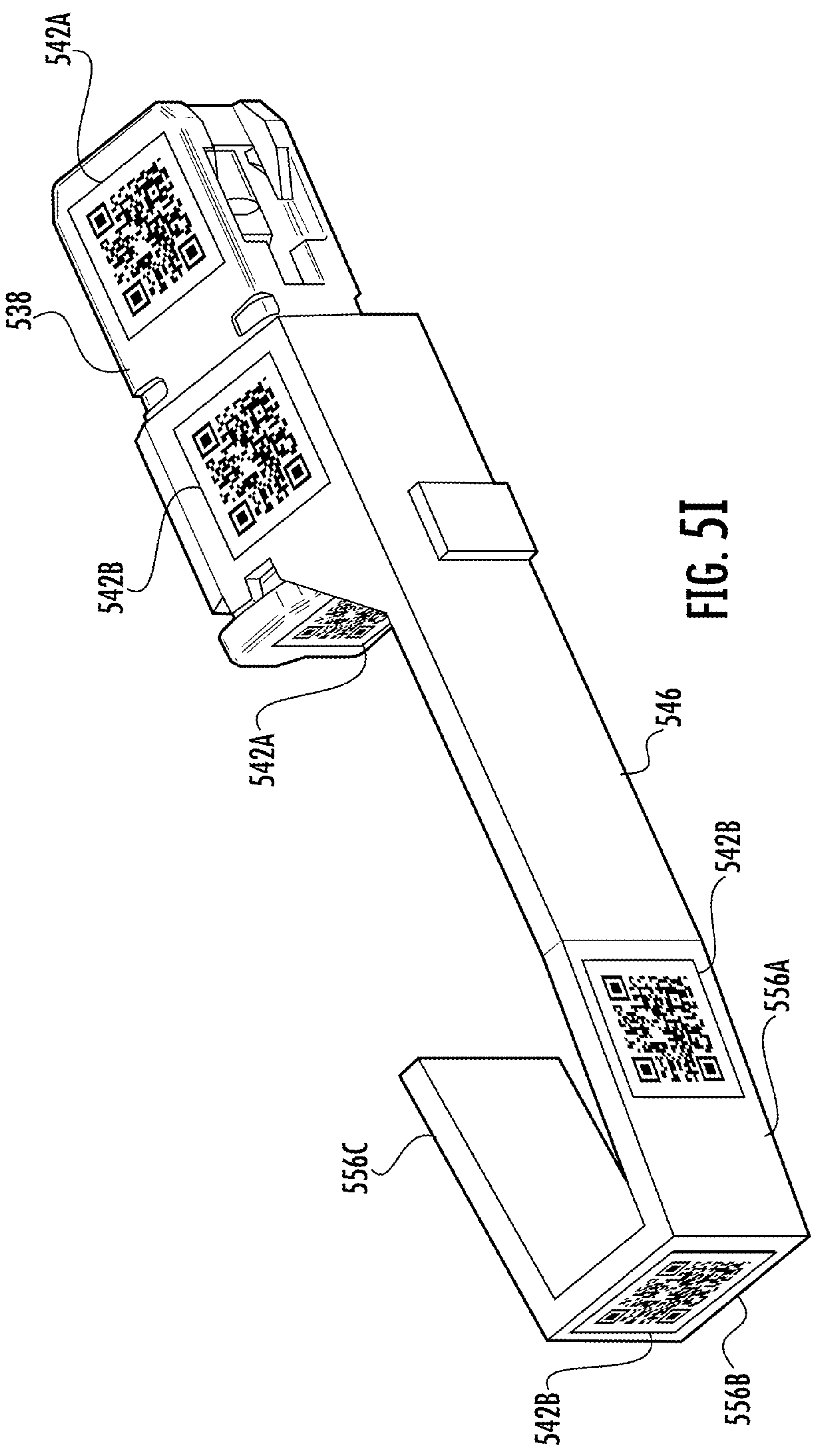
FIG. 5I is a bottom perspective view illustrating the transformable bracket and dust cap of FIG. 5G, in accordance with some embodiments discussed herein.

FIGS. 5G-5I show various perspective views illustrating another example transformable bracket 546 having additional transformable bracket identifiers 542B, that may, for example, be matching but provide for viewing from different perspectives. Transformable bracket identifiers 542B may be provided at a variety of locations on the transformable bracket 546. In some embodiments, only one transformable bracket identifier 542B is provided on the transformable bracket 546, but any number of transformable bracket identifiers 542B may be used. In the illustrated embodiment of FIGS. 5G-5I, transformable bracket identifiers 542B are provided on a first surface 556A, a second surface 556B, and a third surface 556C of an elongated body 550 of the transformable bracket 546, and transformable bracket identifiers 542B are also provided on a first side 552A and a third side 552C of the clamp 548. A transformable bracket identifier 542B may be positioned on the elongated body 550 so that the identifier 542B faces away from the clamp 548.

FIGS. 5G-5I also illustrate dust cap identifiers 542A in various locations on the dust cap 538, with dust cap identifiers 542A provided on a front surface 540 and a bottom surface of the dust cap 538. Each of the dust cap identifiers 542A on a single dust cap 538 may be identical in some embodiments, but this is not required. Additionally, each of the transformable bracket identifiers 542B on a single transformable bracket 546 may be identical in some embodiments, but this is not required.

Figure 5J:
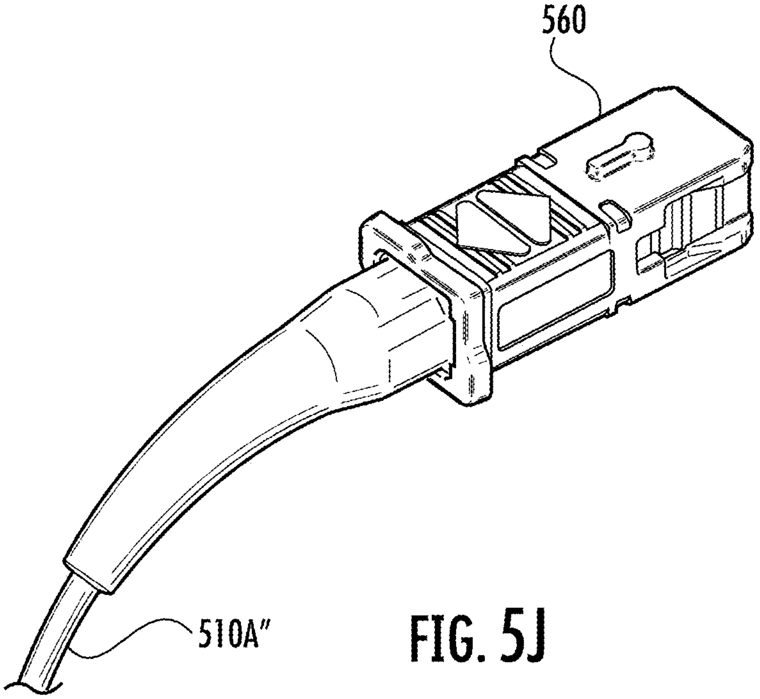
FIG. 5J is a perspective view illustrating an example fiber optic cable and an example fiber optic connector, in accordance with some embodiments discussed herein.
Figure 5K:
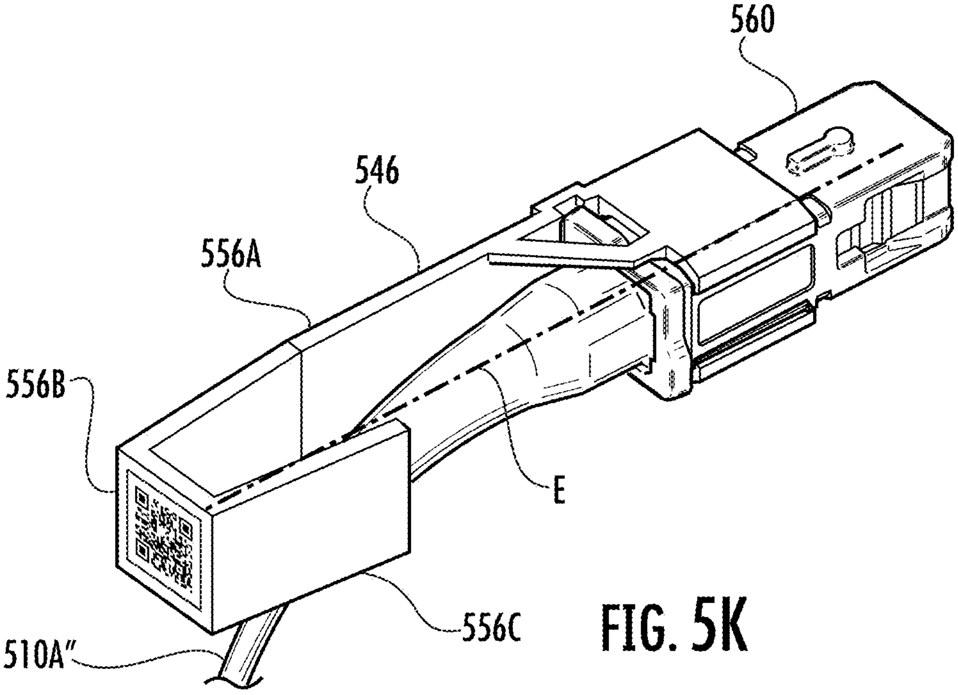
FIG. 5K is a perspective view illustrating the fiber optic cable and the associated fiber optic connector of FIG. 5J with an example transformable bracket attached to the fiber optic connector, in accordance with some embodiments discussed herein.
Figure 5L:
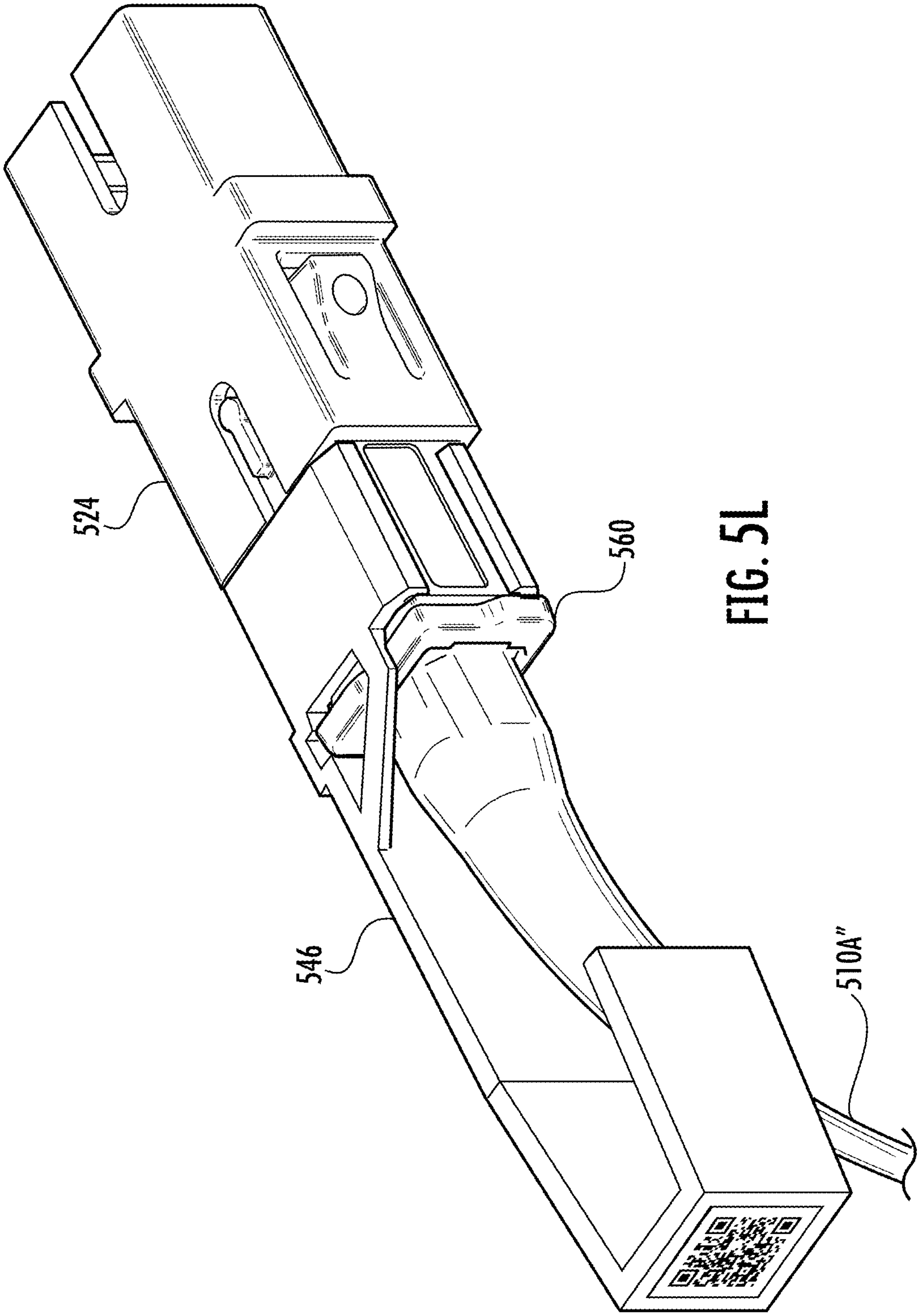
FIG. 5L is a perspective view illustrating the fiber optic cable, the fiber optic connector, and the transformable bracket of FIG. 5J where the fiber optic connector is inserted into an adapter, in accordance with some embodiments discussed herein.

FIG. 5J is a perspective view illustrating an example tertiary input cable 510A" and an example fiber optic connector 560, and FIG. 5K is a perspective view illustrating an example transformable bracket 546 directly attached to the fiber optic connector 560 of FIG. 5J. Additionally, FIG. 5L illustrates the tertiary input cables 510A", the fiber optic connector 560, and the transformable bracket 546 of FIG. 5J where the fiber optic connector 560 is inserted into an adapter 524.

Some features of the transformable bracket 546 are most easily understood by looking at FIG. 5K specifically. As illustrated in FIG. 5K, the clamp 548 (see FIG. 5C) may be configured to orient a fiber optic connector 560 so that a fiber optic cable attached to the fiber optic connector 560 extends at least partially along the axis E. Without the presence of the second surface 556B or the force of gravity (depending on the orientation of the components), the tertiary input cable 510A" would be guided along the axis E. The axis E may intersect with the second surface 556B as illustrated in FIG. 5K. Thus, a tertiary input cable 510A" attached to the fiber optic connector 560 may be prevented from extending further along the axis E, and the tertiary input cable 510A" may be required to bend with respect to the second surface 556B. Due to the presence of the first surface 556A and the third surface 556C, the tertiary input cable 510A" may be urged either up or down. Thus, the first surface 556A, the second surface 556B, and the third surface 556C effectively form a routing feature that may urge cables in a desired direction. Where the transformable bracket 546 is oriented differently, the tertiary input cable 510A" may be urged in other directions.

Other alternative transformable brackets may be used as well. For example, a "scissor-type" transformable bracket may be provided, and features of this "scissor-type" transformable bracket are illustrated in FIGS. 6A-6L.

Figure 6A:
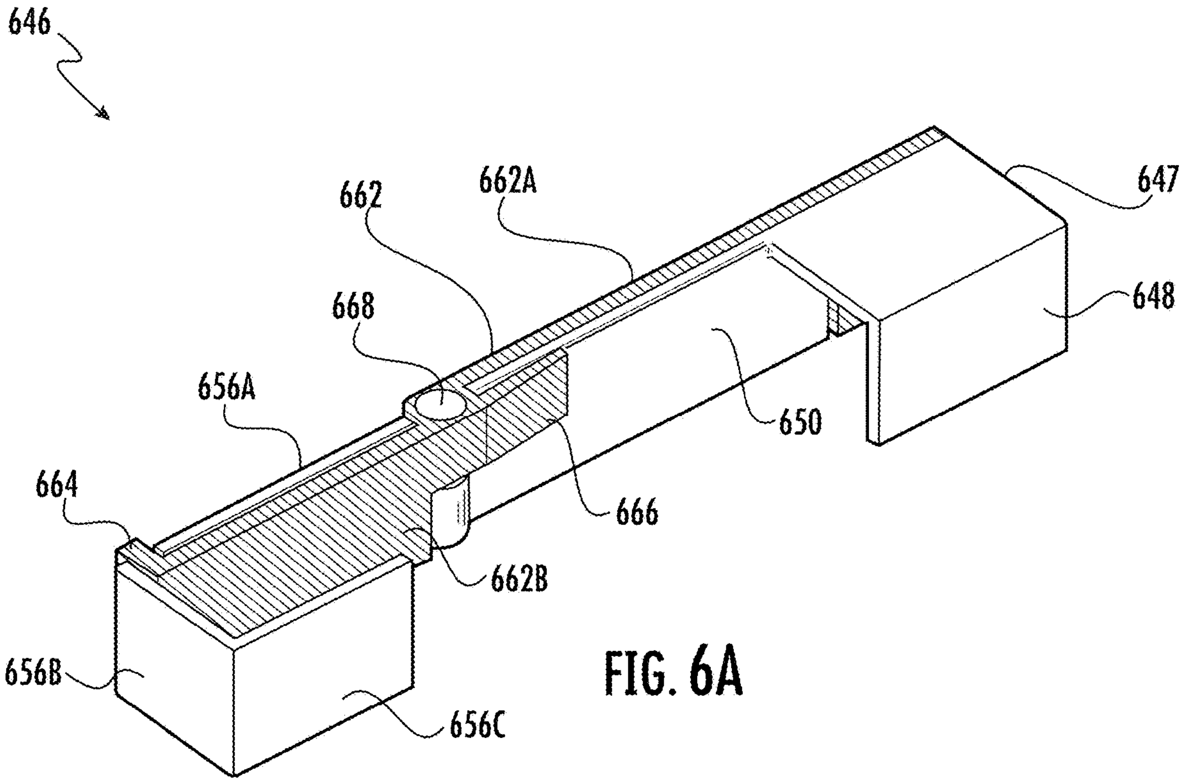
FIG. 6A is a perspective view illustrating another example transformable bracket, in accordance with some embodiments discussed herein.
Figure 6B:
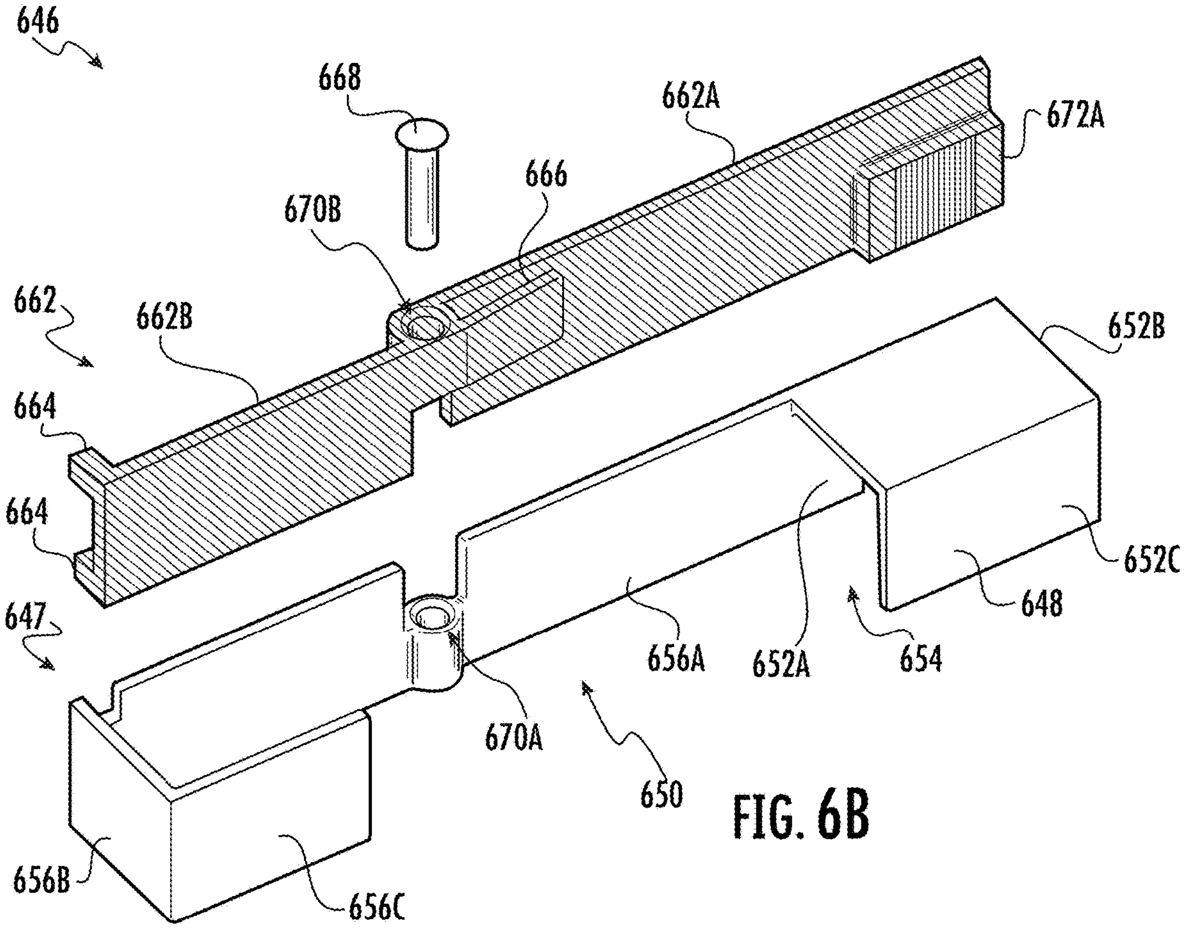
FIG. 6B is an exploded view illustrating various components of the transformable bracket of FIG. 6A, in accordance with some embodiments discussed herein.

Several features of the "scissor-type" transformable bracket 646 may be seen in FIGS. 6A and 6B, which present the bracket in isolation. FIG. 6A is a perspective view illustrating the transformable bracket 646, and FIG. 6B is an exploded view illustrating the transformable bracket 646 of FIG. 6A.

As illustrated, the transformable bracket 646 may include a main part 647 and a locking feature 662. As illustrated in FIG. 6B, the main part 647 may include a clamp 648. This clamp 648 may have a first side 652A, a second side 652B, and a third side 652C. An opening 654 may be provided at a fourth side (the bottom side of the clamp 648 in the example shown in FIG. 6B). A dust cap 538 (see FIG. 5A) or a fiber optic connector 660 (see FIG. 6J) may be received through the opening so that they may be selectively secured in the clamp 648. As illustrated in FIG. 6G, the first side 652 of the clamp 648 may include an opening so that a locking portion 672A of the locking feature 662 may extend into the clamp 648 to assist in selectively securing a dust cap 538 (see FIG. 5A) or a fiber optic connector 660 (see FIG. 6J) in the clamp 648.

Looking again at FIG. 6B, the main part 647 of the transformable bracket 646 may include an elongated body 650. This elongated body 650 may extend outwardly from the clamp 648. The elongated body 650 may include a first surface 656A, a second surface 656B, and a third surface 656C. The first surface 656A may extend between the second surface 656B and the clamp 648. Additionally, the second surface 656B may extend between the first surface 656A and the third surface 656C. A first pin recess 670A may be provided at a first surface 656A of the elongated body 650. This first pin recess 670A may be configured to receive a pin 668.

The locking feature 662 may also include a second pin recess 670B. This second pin recess 670B may be configured to receive the pin 668. The pin 668 may be configured to extend into the first pin recess 670A and the second pin recess 670B to connect the main part 647 and the locking feature 662 together. Once attached, the pin 668 may permit rotation of the locking feature 662 relative to the main part 647.

The locking feature 662 may include a first end 662A and a second end 662B. The second pin recess 670B may separate the first end 662A and the second end 662B. The first end 662A may be configured to be positioned adjacent to the clamp 648, and the second end 662B may be configured to be positioned adjacent to the elongated body 650.

FIGS. 6A and 6B also illustrate tabs 664 provided at the second end 662B of the locking feature 662 and an interference section 666 of the locking feature 662. However, the operation of the tabs 664 and the interference section 666 are best understood using FIGS. 6C-6F as a reference.

Figure 6C:
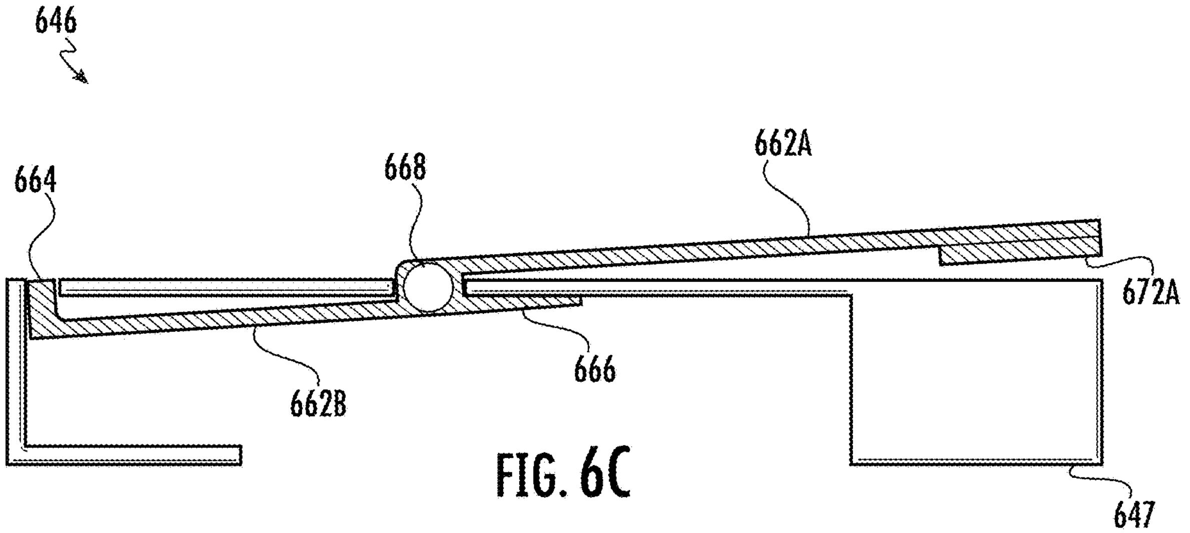
FIG. 6C is a top view illustrating the transformable bracket of FIG. 6A where an example locking feature is in an unlocked state, in accordance with some embodiments discussed herein.
Figure 6D:
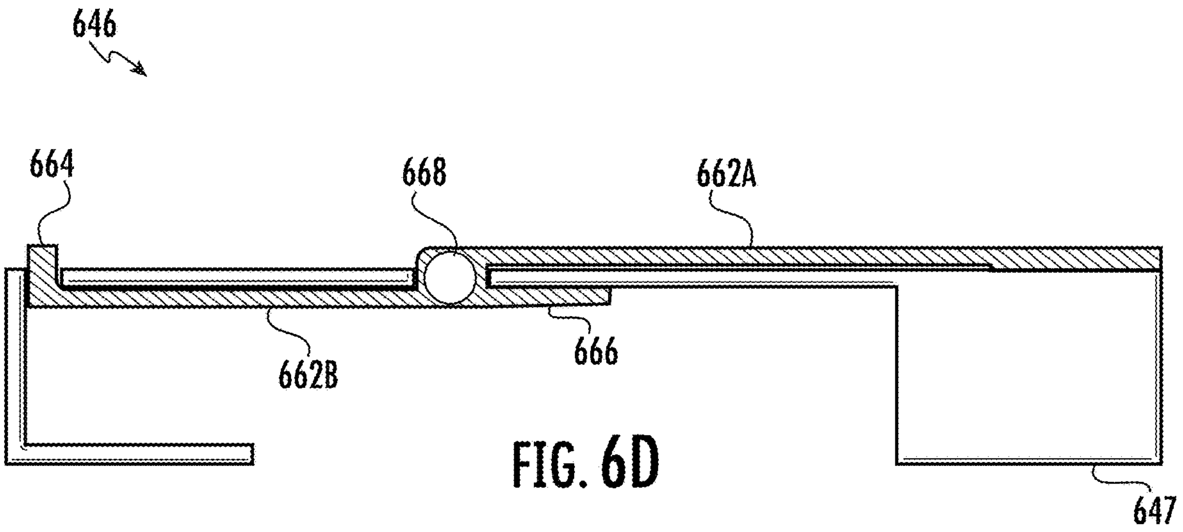
FIG. 6D is a top view illustrating the transformable bracket of FIG. 6A where the locking feature is in a locked state, in accordance with some embodiments discussed herein.
Figure 6E:
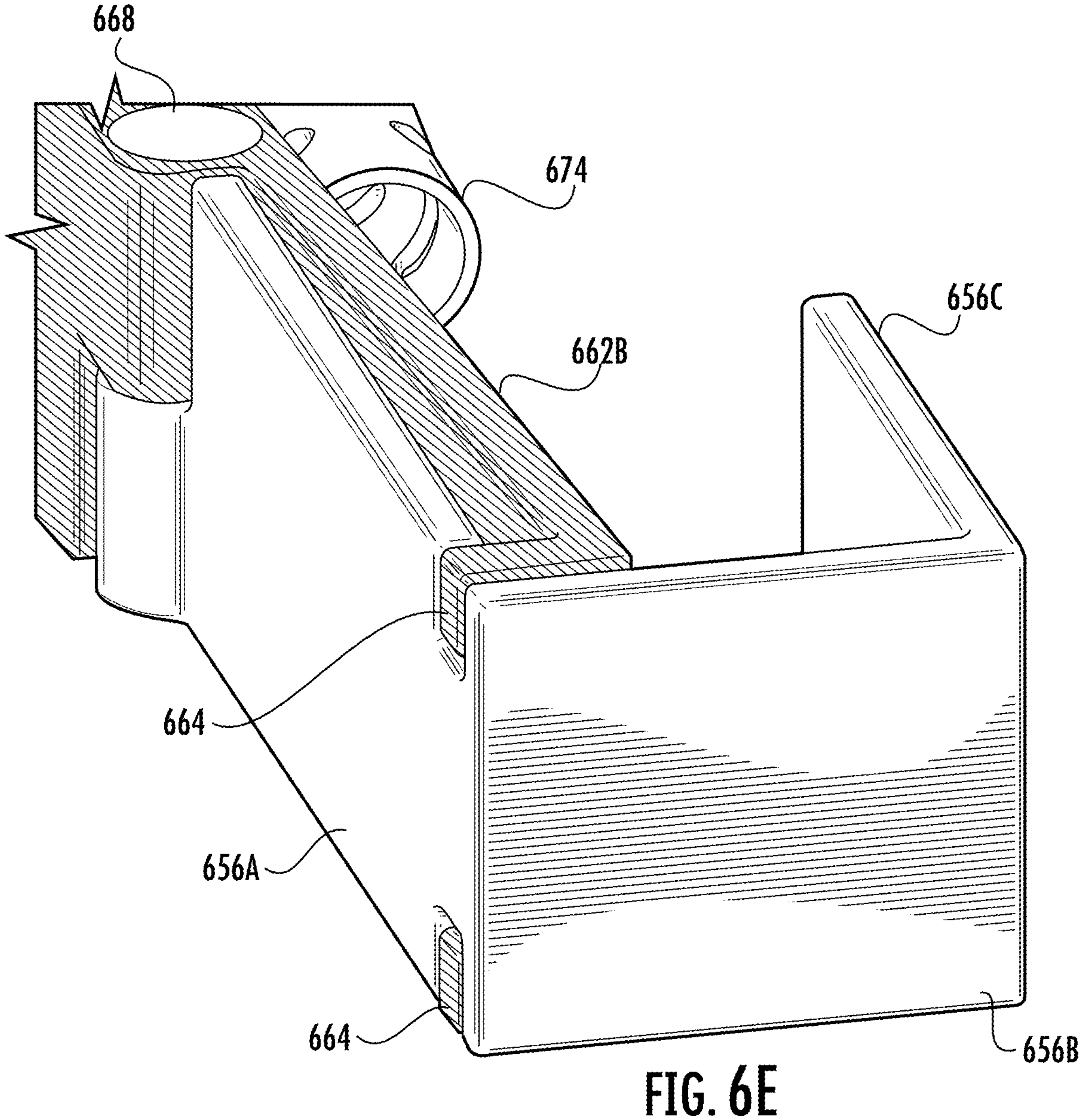
FIG. 6E is an enhanced, perspective view illustrating example tabs of the transformable bracket of FIG. 6A when the locking feature is in an unlocked state, in accordance with some embodiments discussed herein.
Figure 6F:
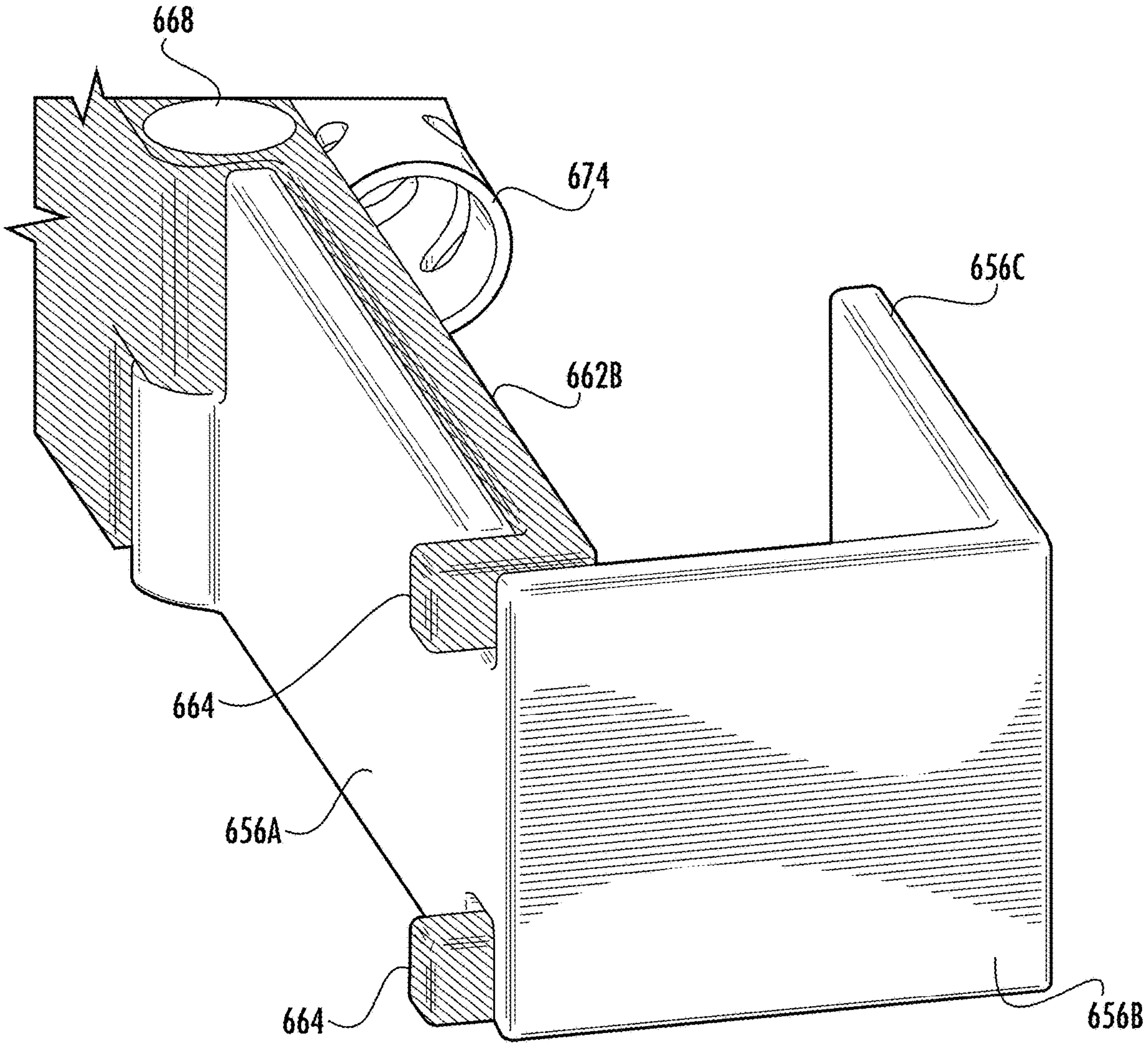
FIG. 6F is an enhanced, perspective view illustrating the tabs of the transformable bracket of FIG. 6E when the locking feature is in a locked state, in accordance with some embodiments discussed herein.
Figure 6G:
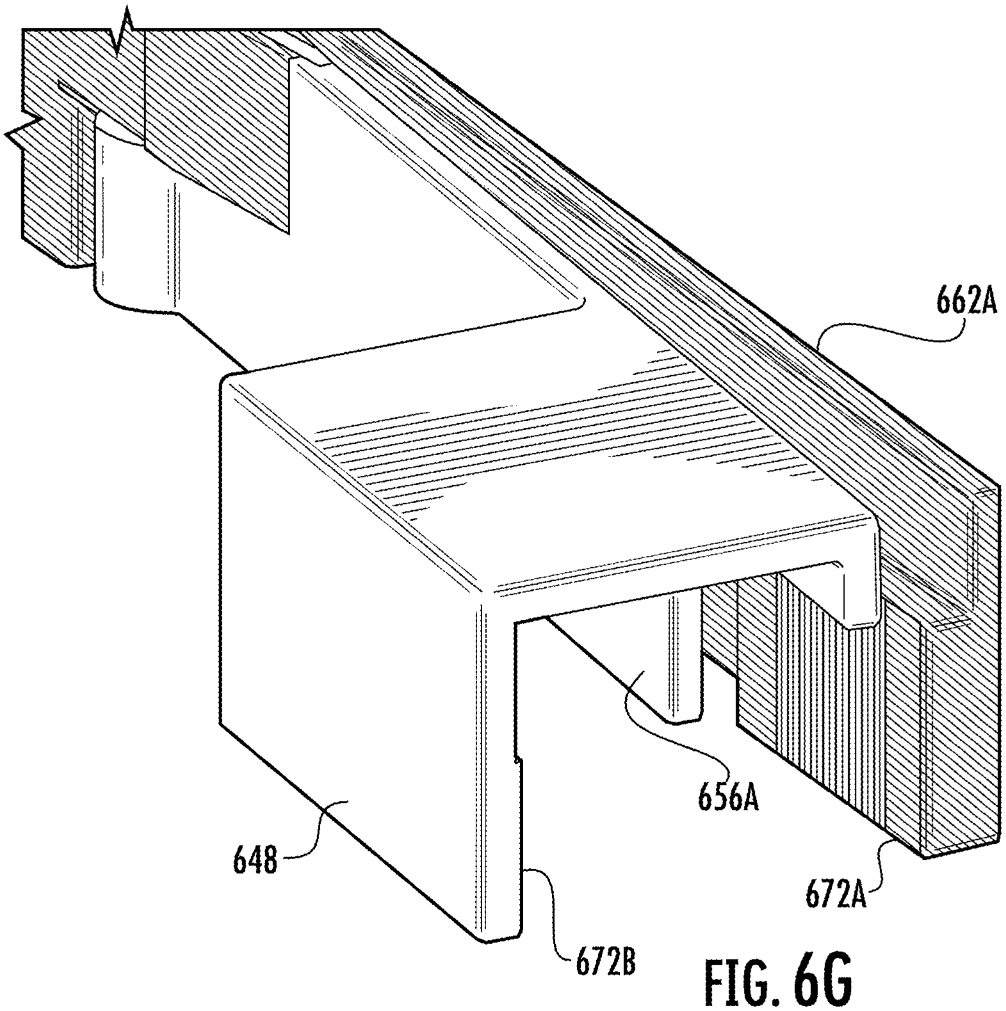
FIG. 6G is an enhanced, perspective view illustrating an example locking portion of the locking feature when the locking feature is in an unlocked state, in accordance with some embodiments discussed herein.

FIG. 6C is a top view illustrating the transformable bracket 646 of FIG. 6A where an example locking feature 662 is in an unlocked state, and FIG. 6D is a top view illustrating the transformable bracket 646 of FIG. 6A where the locking feature 662 is in a locked state. Additionally, FIG. 6E is an enhanced, perspective view illustrating example tabs 664 of the transformable bracket 646 of FIG. 6A when the locking feature 662 is in an unlocked state, and FIG. 6F is an enhanced, perspective view illustrating the tabs 664 of the transformable bracket 646 when the locking feature 662 is in a locked state.

Tabs 664 may be provided at the second end 662B of the locking feature 662. These tabs 664 may be configured to receive a contact force to shift the locking feature 662 from a locked state (illustrated in FIGS. 6D and 6F) to an unlocked state (illustrated in FIGS. 6C and 6E). As the tabs 664 are urged towards the unlocked state, the remainder of the locking feature 662 may rotate about the pin 668. Thus, the locking portion 672A may be moved away from the remainder of the clamp 648 so that a fiber optic connector or a dust cap may be removed or inserted into the clamp 648.

The locking feature 662 may also include an interference section 666. This interference section 666 may be configured to contact a portion of the main part 647 as illustrated in FIG. 6D. The contact between the interference section 666 and the main part 647 may naturally generate a force acting on the locking feature 662. This force may result in a moment on the locking feature 662 about the pin 668 that urges (e.g., biases) the locking feature 662 into a locked state. Thus, where no forces are acting on the tabs 664, the locking feature 662 may naturally be urged into the locked state.

The main part 647 and the locking feature 662 may comprise plastic material or some other material. In some embodiments, the interference section 666 may comprise plastic material or some other deformable material. The interference section 666 may be configured to deform upon contact with the main part 647, and this deformation may be elastic deformation in some embodiments. The contact between the interference section 666 and the main part 647 may create a spring-like effect on the locking feature 662, urging it towards a locked state. While an interference section 666 is described here, other approaches could also be used as well. For example, a linear spring, a rotational spring, or some other component could be used to urge the locking feature 662 into a locked position.

Figure 6H:
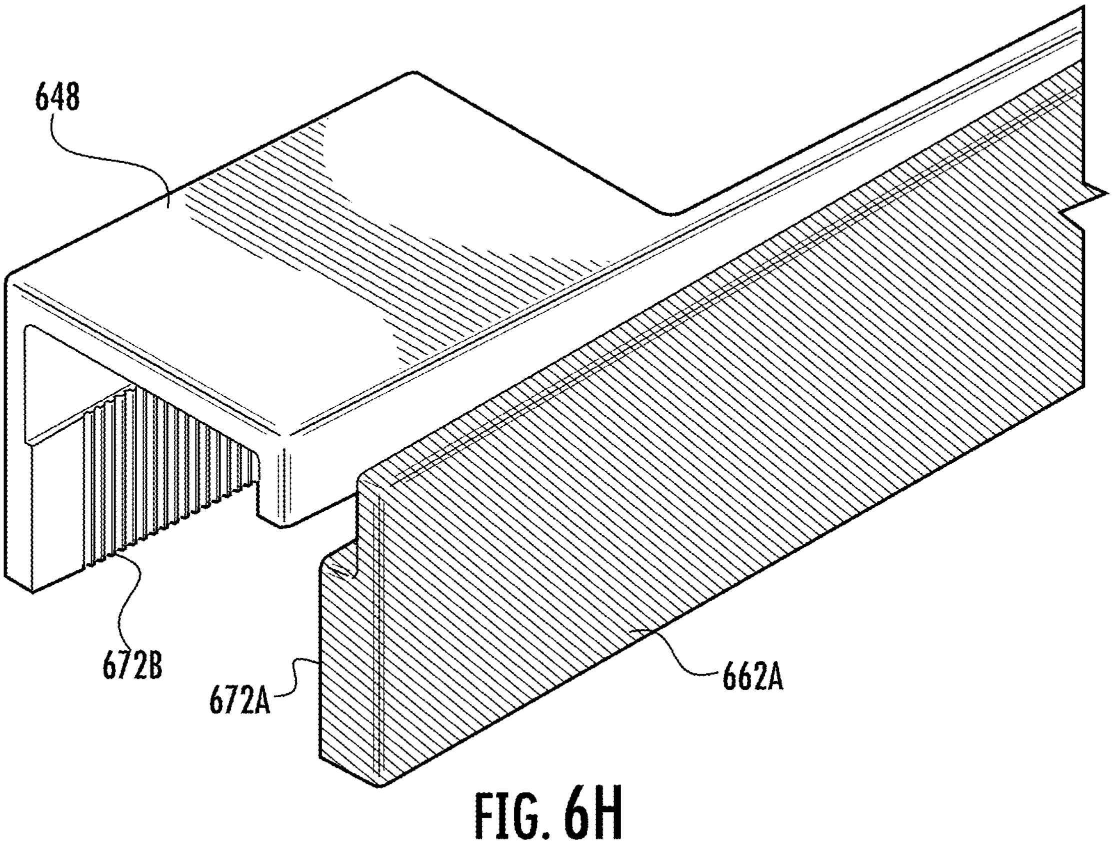
FIG. 6H is another enhanced, perspective view illustrating the locking portion of the locking feature shown in FIG. 6G when the locking feature is in an unlocked state, in accordance with some embodiments discussed herein.
Figure 6I:
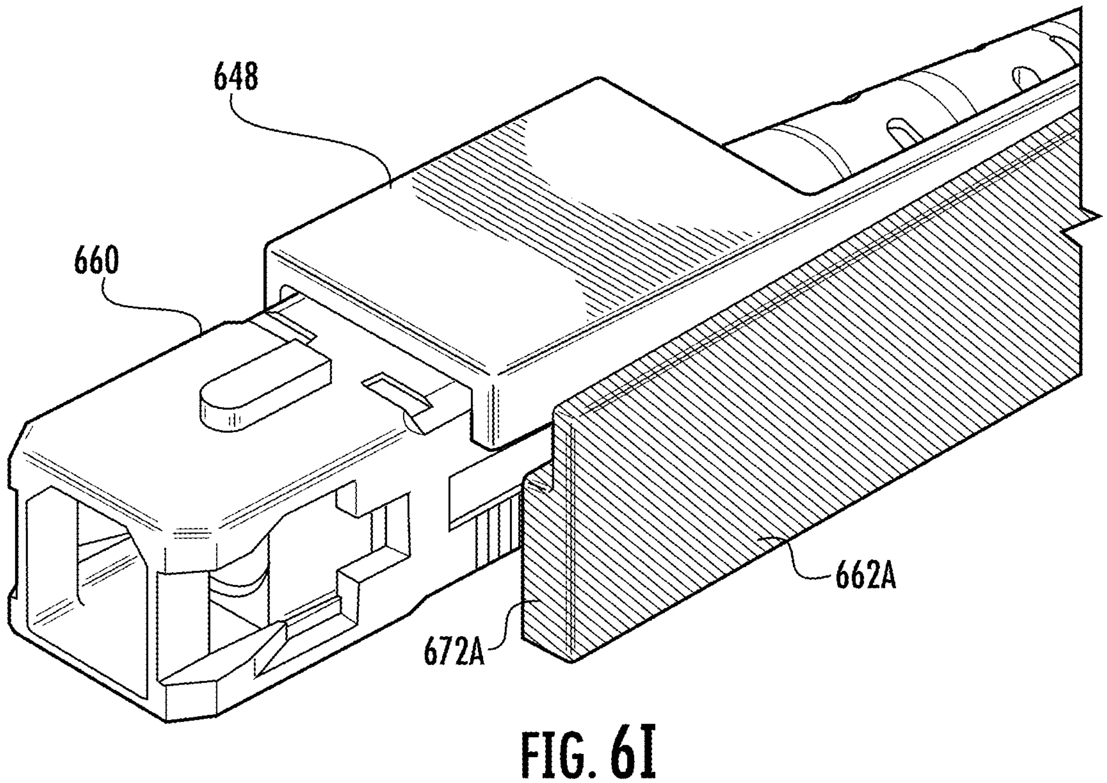
FIG. 6I is an enhanced, perspective view illustrating a fiber optic connector provided within an example clamp of the transformable bracket where the locking portion of the locking feature is in an unlocked state, in accordance with some embodiments discussed herein.
Figure 6J:
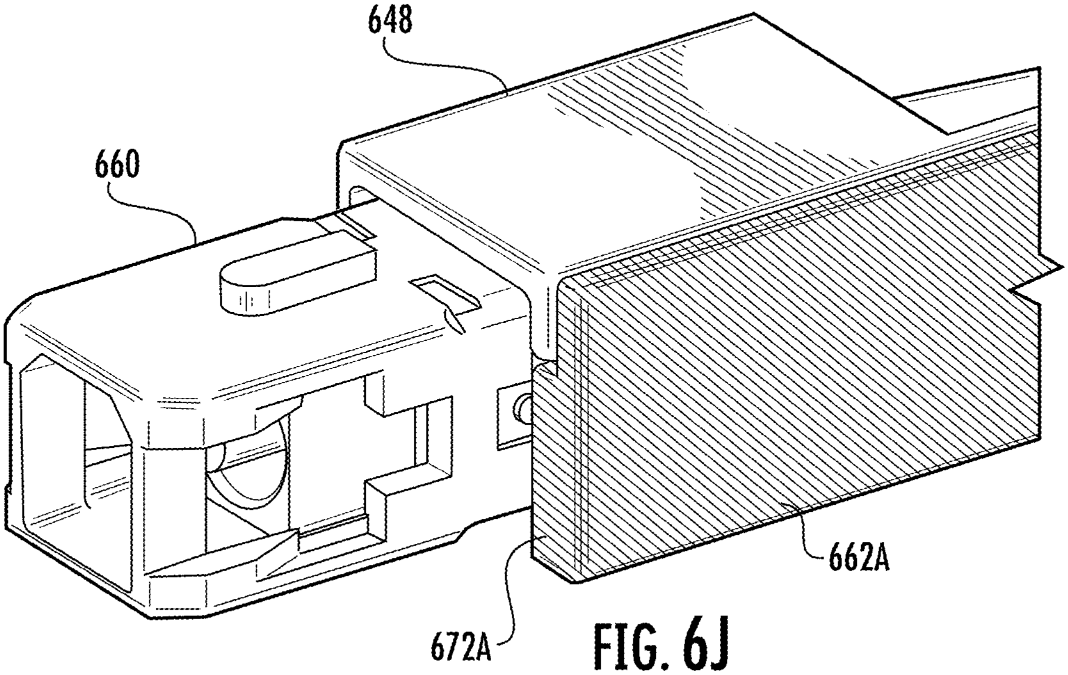
FIG. 6J is an enhanced, perspective view illustrating a fiber optic connector provided within a clamp of the transformable bracket where the locking portion of the locking feature is in a locked state, in accordance with some embodiments discussed herein.

As noted above, the first end 662A of the locking feature 662 (see FIG. 6B) may include a locking portion 672A. FIGS. 6G-6J illustrate the operation of the locking portion 672A. FIG. 6G is an enhanced, perspective view illustrating an example locking portion 672A of the locking feature 662 (see FIG. 6B) when the locking feature 662 is in an unlocked state, and FIG. 6H is another enhanced, perspective view illustrating the locking portion 672A of the locking feature 662 shown in an unlocked state. Additionally, FIG. 6I is an enhanced, perspective view illustrating a fiber optic connector 660 provided within an example clamp 648 of the transformable bracket 646 (see FIG. 6A) where the locking portion 672A of the locking feature 662 is in an unlocked state, and FIG. 6J is an enhanced, perspective view illustrating a fiber optic connector 660 provided within a clamp 648 of the transformable bracket 646 where the locking portion 672A of the locking feature 662 is in a locked state.

As noted above, exerting a force on the tabs 664 (see FIG. 6D) may cause rotation of the locking feature 662 (see FIG. 6D) about the pin 668 (see FIG. 6D), causing the locking feature 662 to shift to an unlocked state. As illustrated in FIG. 6G, at the first end 662A of the locking feature 662, the locking portion 672A may move away from the remainder of the clamp 648. Thus, a dust cap or a fiber optic connector provided within the clamp 648 may be removed, or a dust cap or a fiber optic connector may be inserted into the clamp 648 when the locking feature 662 is in an unlocked state. In a locked state, the first end 662A of the locking feature 662 may contact the remainder of the clamp 648 and the locking portion 672A may extend into the internal volume within the clamp 648. Thus, the locking portion 672A on the locking feature 662 and the locking portion 672B (see FIG. 6H) may selectively secure a dust cap or a fiber optic connector in the internal volume within the clamp 648. The locking portion 672A may be configured so that it may not assist in selectively securing the dust cap or the fiber optic connector in the clamp 648 when the locking feature 662 is in the unlocked state. The locking feature 662 may typically be urged (e.g., biased) to a locked state absent the application of additional force at the tabs 664 or at another location on the locking feature 662.

Figure 6K:
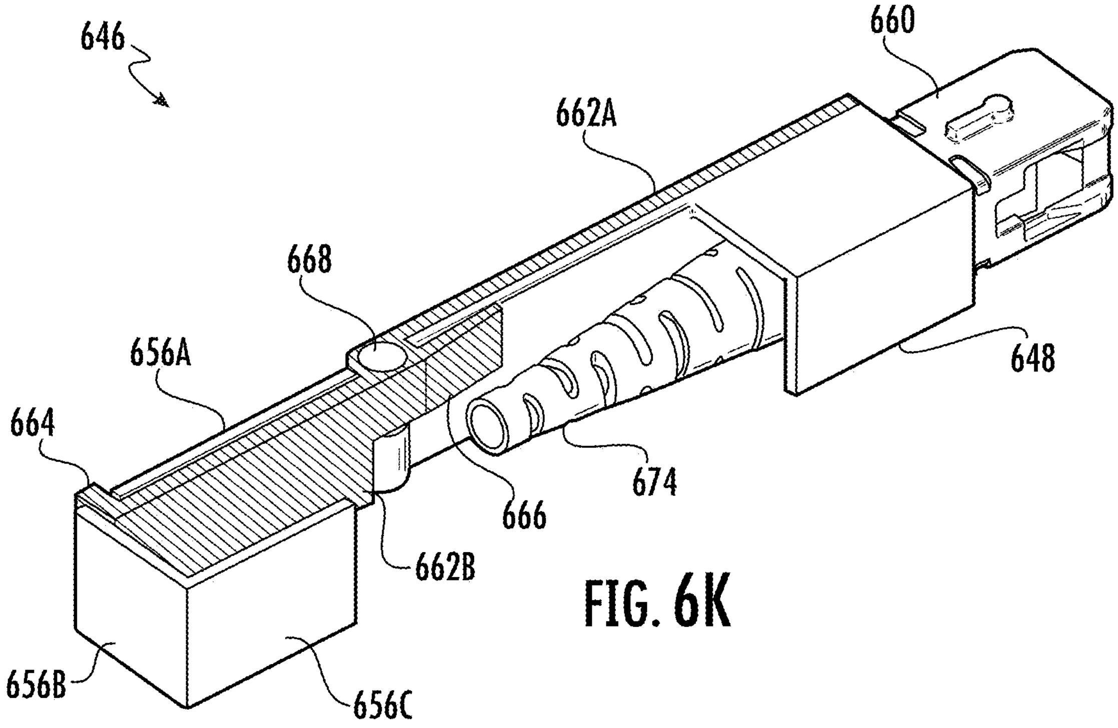
FIG. 6K is another perspective view illustrating the fiber optic connector provided within a clamp of the transformable bracket as illustrated in FIG. 6J where the locking portion of the locking feature is in a locked state, in accordance with some embodiments discussed herein.

Like the transformable bracket 546 described above, the transformable bracket 646 may also assist in guiding fiber optic cables in a desired direction. FIG. 6K is another perspective view illustrating the fiber optic connector 660 provided within a clamp 648 of the transformable bracket 646 as illustrated in FIG. 6J where the locking portion 672A (see FIG. 6I) of the locking feature 662 (see FIG. 6B) is in a locked state, and FIG. 6L is another perspective view illustrating the fiber optic connector 660 and the locked transformable bracket 646 of FIG. 6L where the fiber optic connector 660 is inserted into an adapter 624.

Figure 6L:
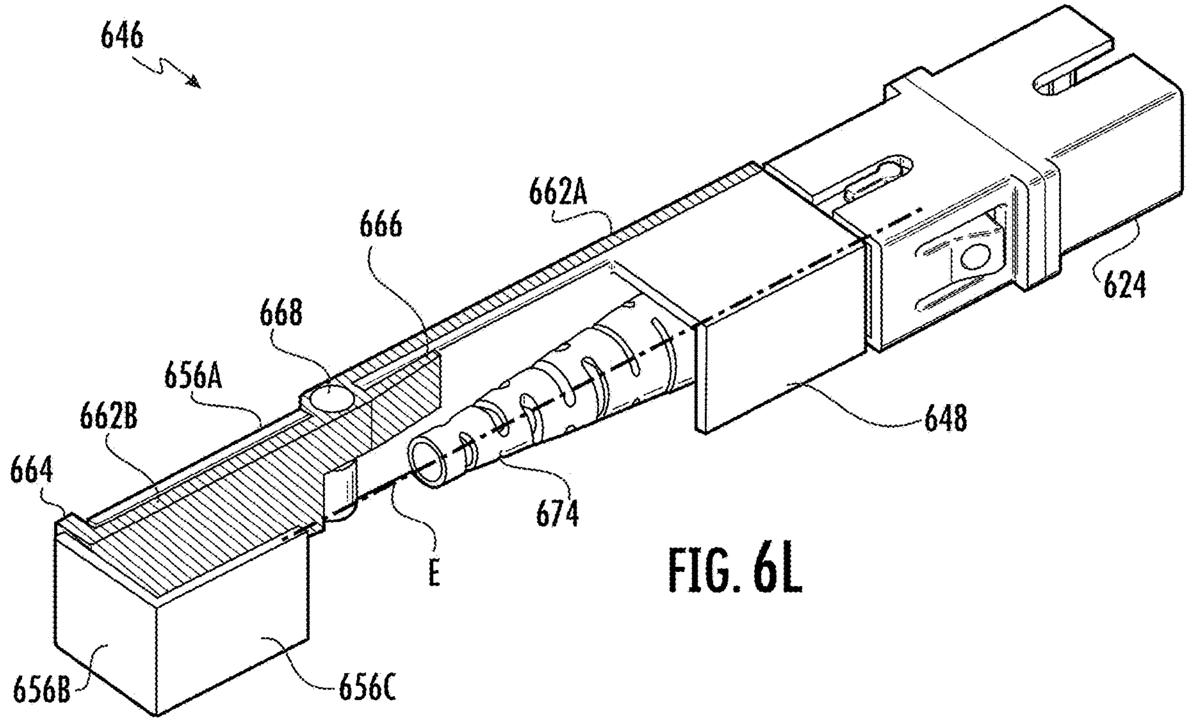
FIG. 6L is another perspective view illustrating the fiber optic connector and the locked transformable bracket of FIG. 6J where the fiber optic connector is inserted into an adapter, in accordance with some embodiments discussed herein.

As illustrated in FIG. 6L, the clamp 648 may be configured to orient a fiber optic connector 660 so that a fiber optic cable attached to the fiber optic connector 660 extends at least partially along the axis E. A cable director 674 may also be provided to cause a cable secured therein to extend at least partially along the axis E. Without the presence of the second surface 656B or the force of gravity (depending on the orientation of the components), a fiber optic cable attached to the fiber optic connector 660 would be guided along the axis E. The axis E may intersect with the second surface 656B as illustrated in FIG. 6L. Thus, a fiber optic cable attached to the fiber optic connector 660 may be required to bend with respect to the second surface 656B. The first surface 656A, the second surface 656B, and the third surface 656C may define a C-shape for the routing feature. Due to the presence of the first surface 656A and the third surface 656C, the fiber optic cable may be urged either up or down. By providing the third surface 656C, cables that are routed through the routing feature may be better retained within the routing feature. Thus, the first surface 656A, the second surface 656B, and the third surface 656C effectively form a routing feature that may urge fiber optic cables in a desired direction. Where the transformable bracket 646 is oriented differently, the fiber optic cables may be urged in other directions.

In some embodiments, duplex fiber optic connectors and duplex adapters may be used. "Duplex type" transformable brackets are contemplated that may accommodate these duplex fiber optic connectors and duplex adapters, and these duplex type transformable brackets are illustrated in FIGS. 7A-7L. Although the following example focuses on duplex connectors, other connector types are contemplated. For example, the fiber optic connectors may be simplex, single optical fiber, connections including, but not limited to Standard Connector or Subscriber Connector (SC) connector or adapters, Lucent Connector (LC) connectors or adapters, or the like. Another example connector includes multi-fiber push-on/pull-off (MPO) connectors (e.g., according to IEC 61754-7). In some examples, the multi-fiber fiber optic components may include very-small form factor (VSFF) connectors or adapters, such as MDC connectors or adapters (sometimes referred to as "mini duplex connectors") offered by U.S. Conec, Ltd. (Hickory, NC), and SN connectors or adapters (sometimes referred to as a Senko Next-generation connectors) offered by Senko Advanced Components, Inc. (Marlborough, MA). Such VSFF connectors or adapters may be particularly useful in the structured optical fiber cable systems in this disclosure, and may be referred to generically as "dual-ferrule VSFF components" due to their common design characteristic of the connectors having two single-fiber ferrules within a common housing (and the adapters being configured to accept such connectors)

Figure 7A:
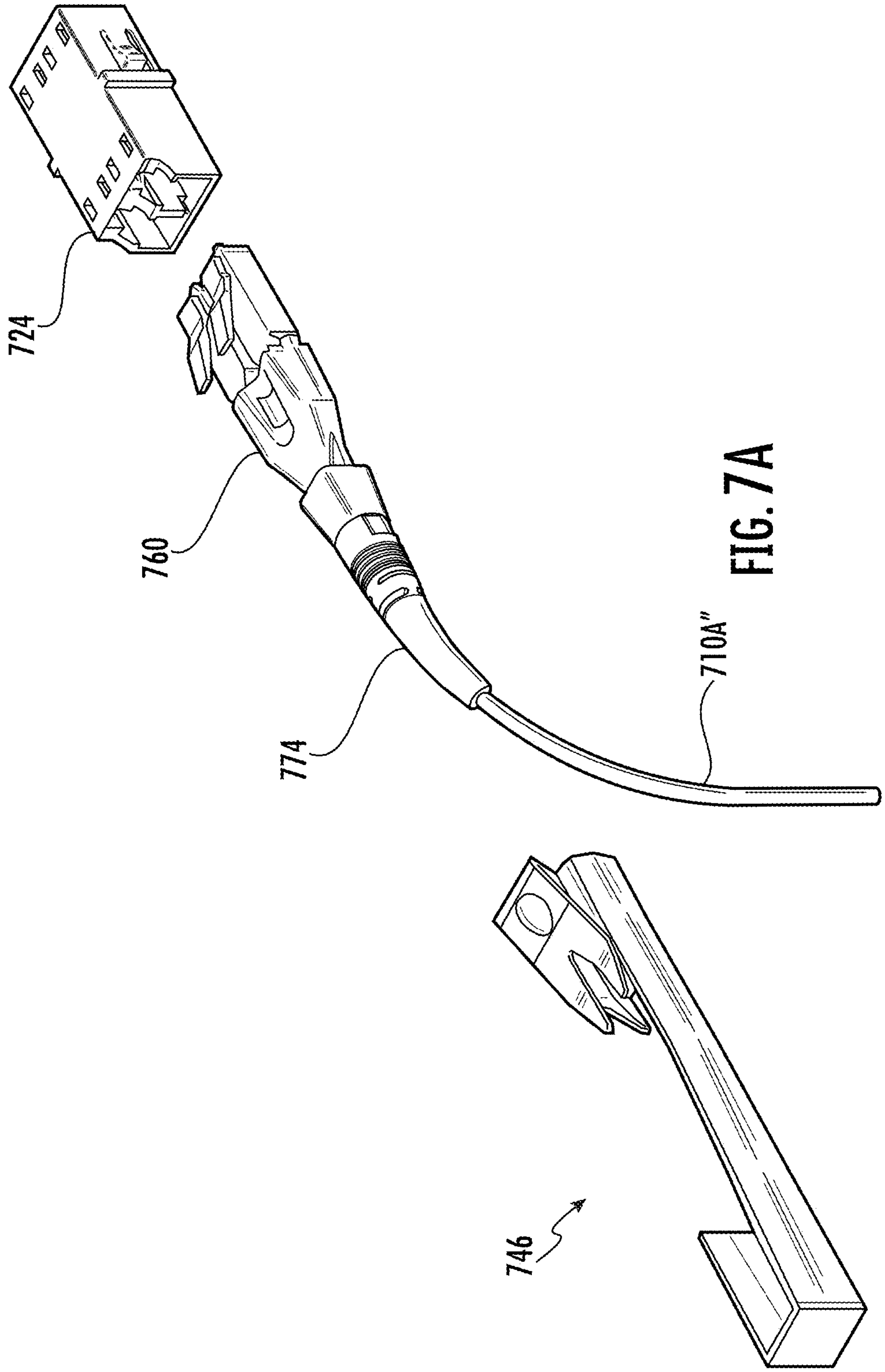
FIG. 7A is an exploded view illustrating another example transformable bracket that may be used with an example duplex fiber optic connector, in accordance with some embodiments discussed herein.

FIG. 7A is an exploded view illustrating an example duplex type transformable bracket 746 that may be used with an example duplex fiber optic connector 760. A duplex adapter 724 and a duplex fiber optic connector 760 may be provided. Additionally, a tertiary input cable 710A" may extend into a cable director 774 so that it may be received at the duplex fiber optic connector 760. The transformable bracket 746 may be used to accommodate the duplex adapter 724 and the duplex fiber optic connector 760.

Figure 7B:
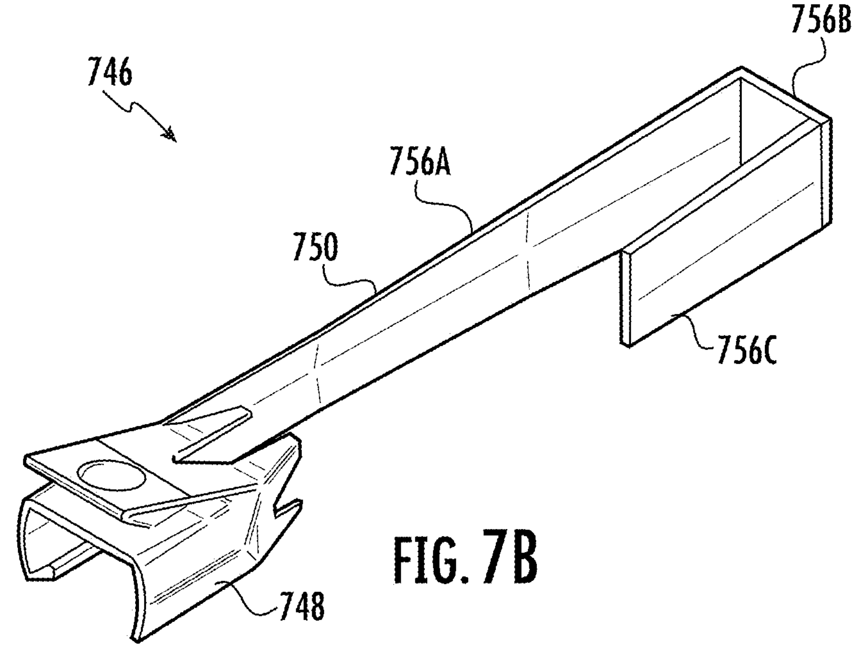
FIG. 7B is a perspective view illustrating the transformable bracket of FIG. 7A, in accordance with some embodiments discussed herein.
Figure 7C:
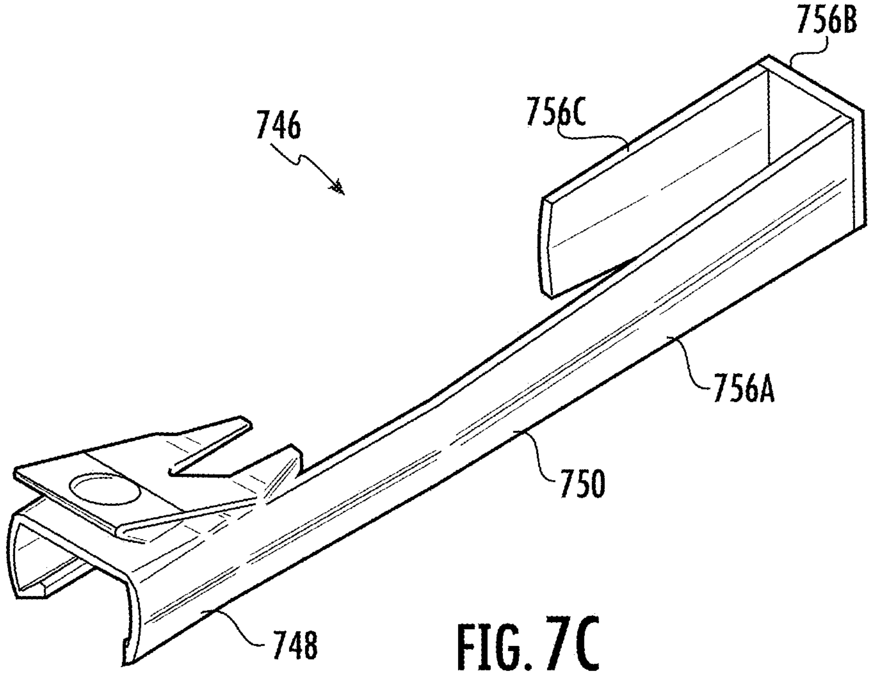
FIG. 7C is a perspective view illustrating another example transformable bracket similar to the transformable bracket of FIG. 7B, in accordance with some embodiments discussed herein.

Additional details of the duplex type transformable bracket 746 can be seen in FIGS. 7B and 7C. FIGS. 7B and 7C are perspective views illustrating similar transformable brackets 746. Similar to the transformable brackets 546, 646 described above, the transformable bracket 746 may include a clamp 748 and an elongated body 750 having a first surface 756A, a second surface 756B, and a third surface 756C.

Figure 7D:
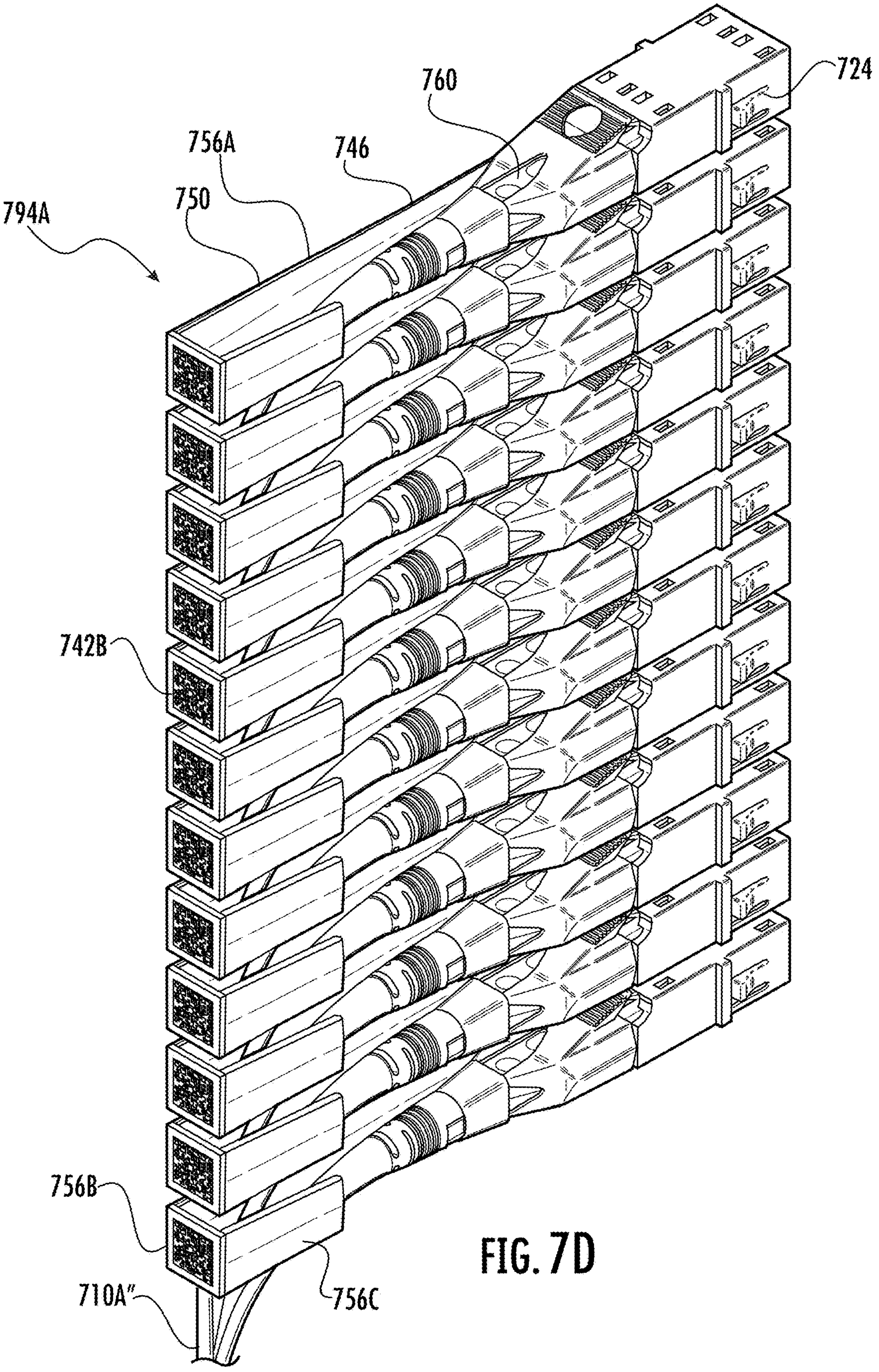
FIG. 7D is a perspective view illustrating transformable brackets similar to the one illustrated in FIG. 7C where the transformable brackets are attached to a plurality of duplex fiber optic connectors, in accordance with some embodiments discussed herein.
Figure 7E:
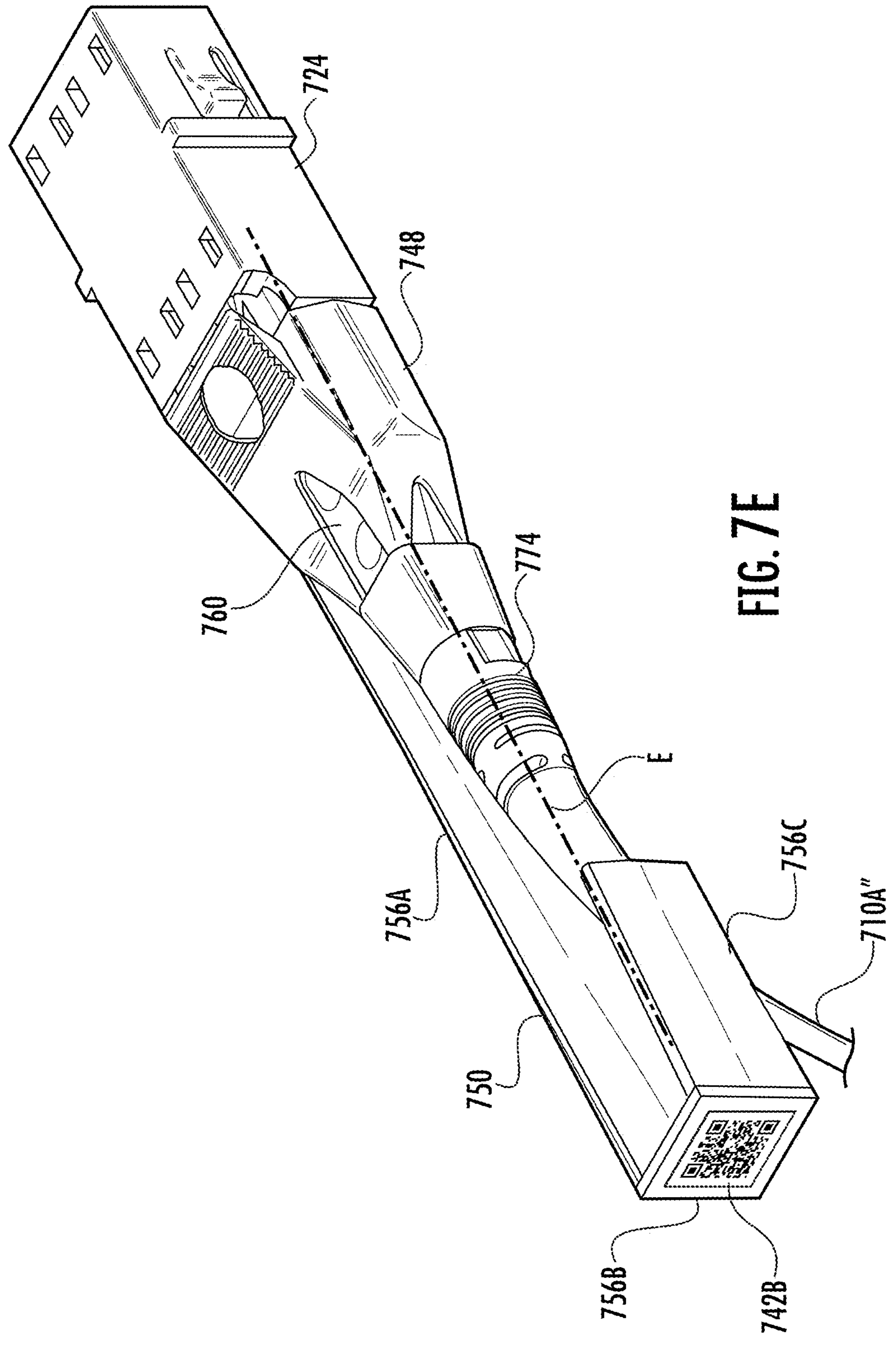
FIG. 7E is a perspective view illustrating an example transformable bracket similar to the one illustrated in FIG. 7C where the transformable bracket is attached to an example duplex fiber optic connector, in accordance with some embodiments discussed herein.

As illustrated in FIGS. 7D and 7E, the transformable brackets 746 may form a routing feature that urges cables in the desired direction. FIG. 7D is a perspective view illustrating transformable brackets 746 similar to the one illustrated in FIG. 7C where the transformable brackets 746 are attached to a plurality of duplex fiber optic connectors 760. As illustrated in FIG. 7E, the clamp 748 may be configured to orient a fiber optic connector 760 (see FIG. 7A) and/or a cable director 774 so that a cable 710A" attached to the fiber optic connector 760 (see FIG. 7A) and/or the cable director 774 extends at least partially along the axis E. Without the presence of the second surface 756B or the force of gravity (depending on the orientation of the components), the tertiary input cable 710A" would be guided along the axis E. The axis E may intersect with the second surface 756B as illustrated in FIG. 7E. Thus, a tertiary input cable 710A" attached to the fiber optic connector 760 (see FIG. 7A) may be required to bend with respect to the second surface 756B. Due to the presence of the first surface 756A and the third surface 756C, the tertiary input cable 710A" may be urged either up or down. Thus, the first surface 756A, the second surface 756B, and the third surface 756C effectively form a C-shaped routing feature that may urge fiber optic cables in a desired direction. Where the transformable bracket 746 is oriented differently, the tertiary input cable 710A" may be urged in other directions.

As illustrated in FIG. 7D, the first surface 756A, the second surface 756B, and the third surface 756C of a plurality of transformable brackets 746 may be aligned to form a vertical cable guide 794A, guiding fiber optic cables along the vertical cable guide 794A.

Figure 7F:
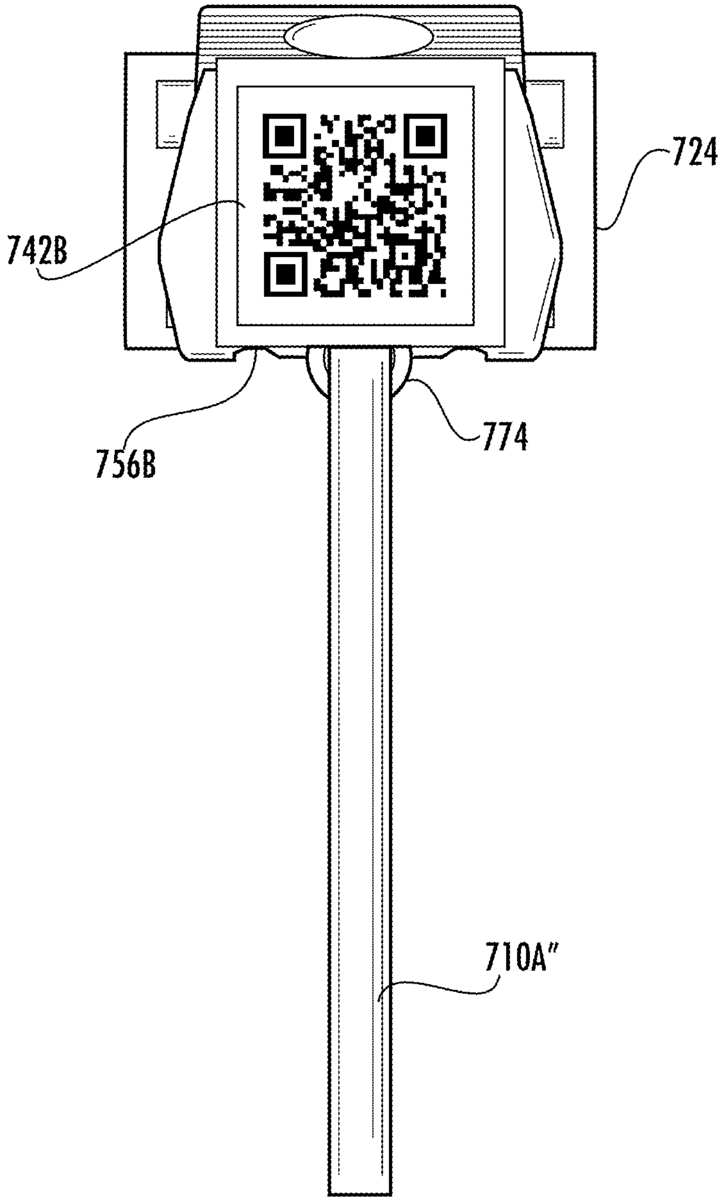
FIG. 7F is a front view illustrating the transformable bracket of FIG. 7E, in accordance with some embodiments discussed herein.
Figure 7G:
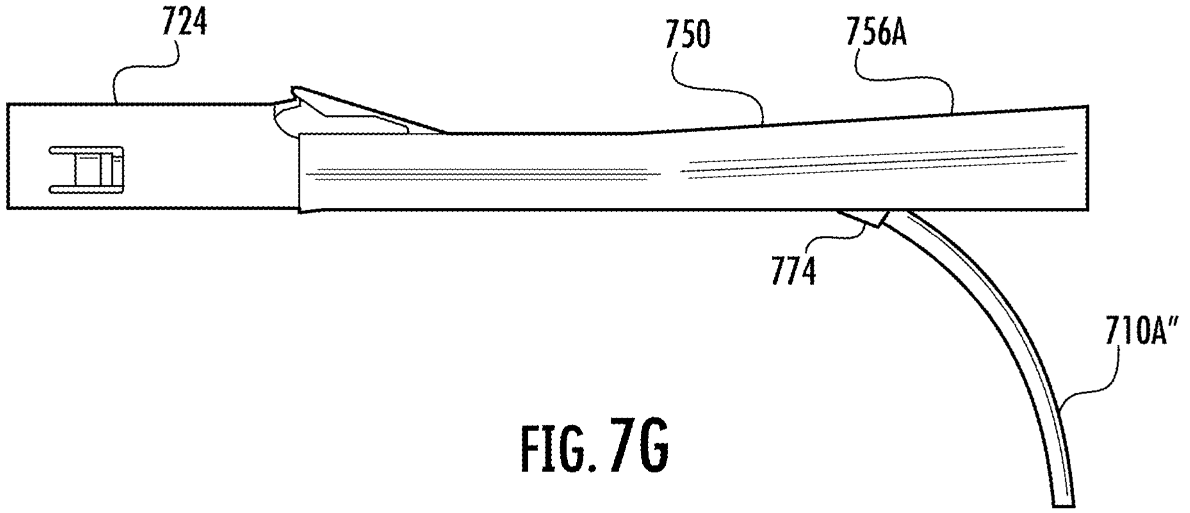
FIG. 7G is a left side view illustrating the transformable bracket of FIG. 7E, in accordance with some embodiments discussed herein.
Figure 7H:
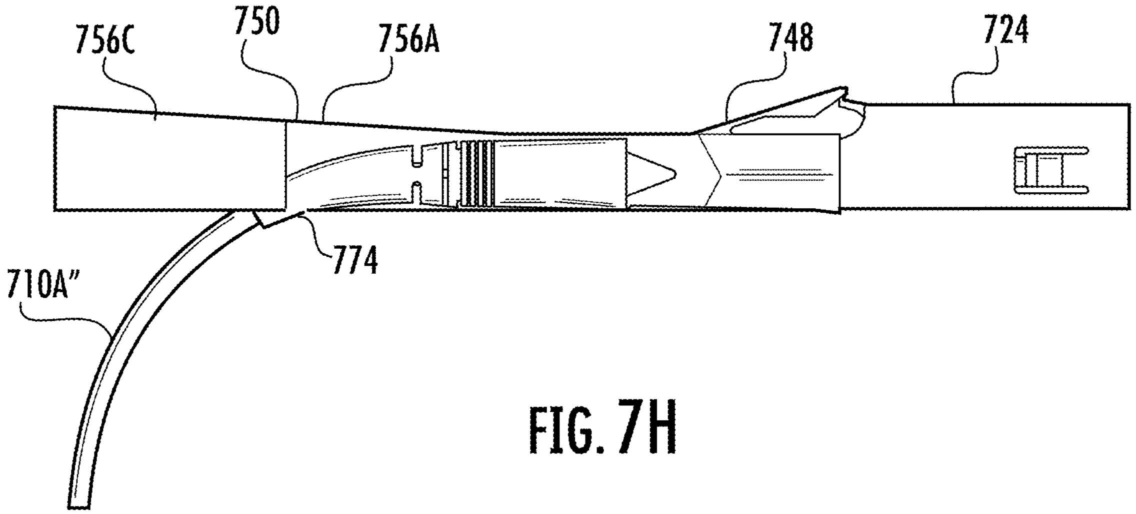
FIG. 7H is a right side view illustrating the transformable bracket of FIG. 7E, in accordance with some embodiments discussed herein.
Figure 7I:
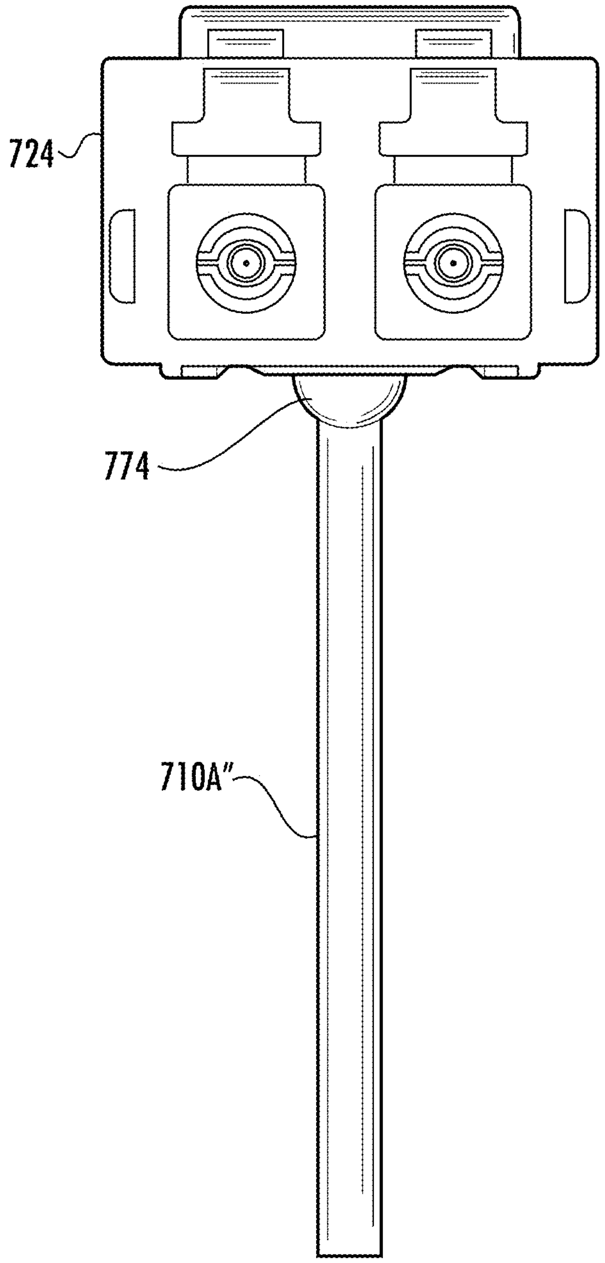
FIG. 7I is a rear view illustrating the duplex fiber optic connector of FIG. 7D, in accordance with some embodiments discussed herein.

While FIG. 7D illustrates a plurality of transformable brackets 746, FIGS. 7E-7I illustrate a single transformable bracket 746 attached to an example duplex fiber optic connector 760 (see FIG. 7A). FIG. 7E is a perspective view illustrating an example transformable bracket 746, FIG. 7F is a front view illustrating the transformable bracket 746 of FIG. 7E, FIG. 7G is a left side view illustrating the transformable bracket 746 of FIG. 7E, FIG. 7H is a right side view illustrating the transformable bracket 746 of FIG. 7E, and FIG. 7I is a rear view illustrating the duplex adapter 724 of FIG. 7A. Like the transformable brackets discussed above, the transformable bracket 746 may include one or more transformable bracket identifiers 742B. A transformable bracket identifier 742B may be provided on the second surface 756B, but similar identifiers may be provided, additionally or alternatively, at other locations on the transformable bracket 746. FIG. 7F illustrates that the transformable bracket identifier 742B may fit within a footprint of the port (to which the duplex adapter 724 is inserted) such that transformable bracket identifier 742B and the second surface 756B do not extend outside of the size of the port as viewed directly onward (e.g., a front plan view)—which enables formation of visible identifiers in a row or column (see e.g., FIGS. 7J and 7L). Notably, adherence to keeping the size of the identifier and surface on which the identifier is placed to be within the footprint of the port is provided in various additional embodiments described herein, as apparent to one of ordinary skill in the art in view of the disclosure provided herein.

Figure 7K:
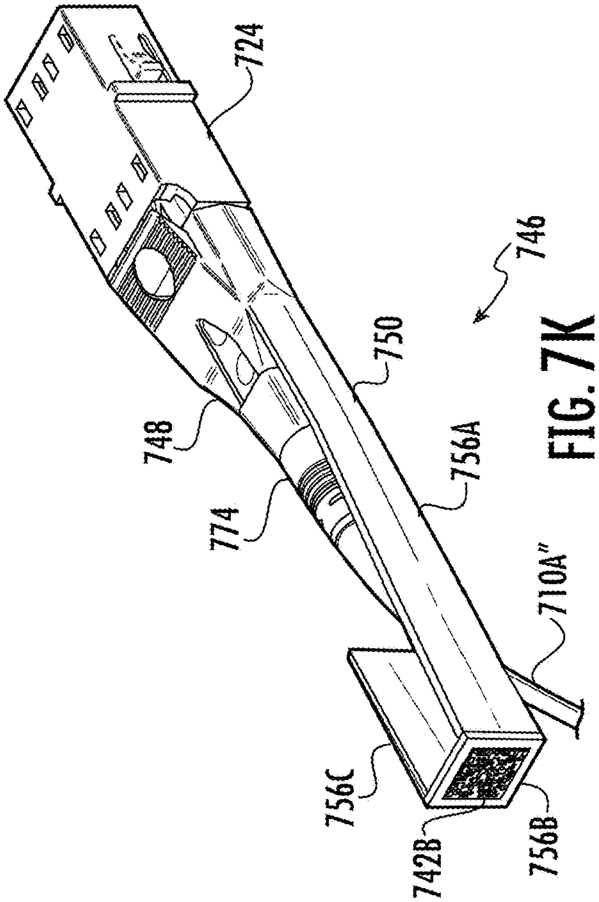
FIG. 7K is a perspective view illustrating an example transformable bracket similar to the one illustrated in FIG. 7B where the transformable bracket is attached to an example duplex fiber optic connector, in accordance with some embodiments discussed herein.
Figure 7J:
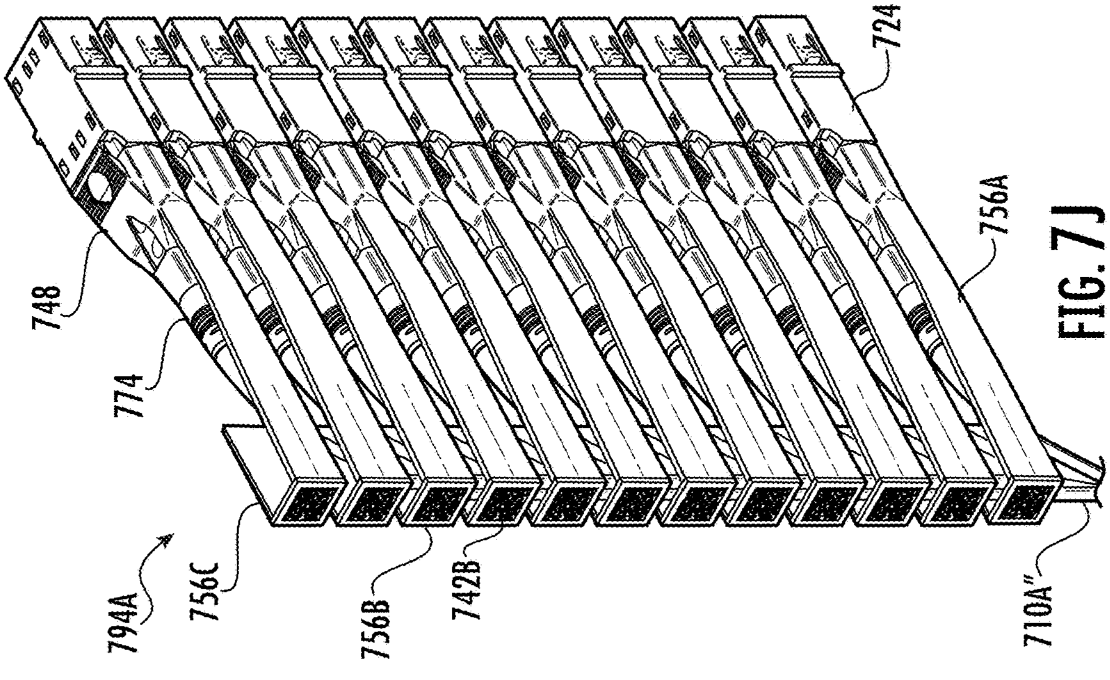
FIG. 7J is a perspective view illustrating example transformable brackets similar to the one illustrated in FIG. 7B where the transformable brackets are attached to a plurality of example duplex fiber optic connectors and where the transformable brackets form an example vertical cable guide, in accordance with some embodiments discussed herein.

In FIGS. 7E-7I, the first surface 756A of the elongated body 750 extends out from left side of the clamp 748. However, the first surface 756A of the elongated body 750 may extend out from the right side of the clamp 748, as illustrated in FIGS. 7J and 7K. FIG. 7J is a perspective view illustrating example transformable brackets 746 similar to the one illustrated in FIG. 7B where the transformable brackets 746 are attached to a plurality of example duplex fiber optic connectors 760 and where the transformable brackets 746 form an example vertical cable guide 794A to guide the fiber optic cables. Additionally, FIG. 7K is a perspective view illustrating a single transformable bracket 746 similar to the one illustrated in FIG. 7B where the example transformable bracket 746 is attached to an example duplex fiber optic connector 760 (see FIG. 7A). As illustrated in FIG. 7J, the first surface 756A, the second surface 756B, and the third surface 756C of each of the transformable brackets 746 may extend vertically. Collectively, the surfaces of each of the transformable brackets 746 may form a vertical cable guide 794A that guides tertiary input cables 710A" upwardly or downwardly.

Figure 7L:
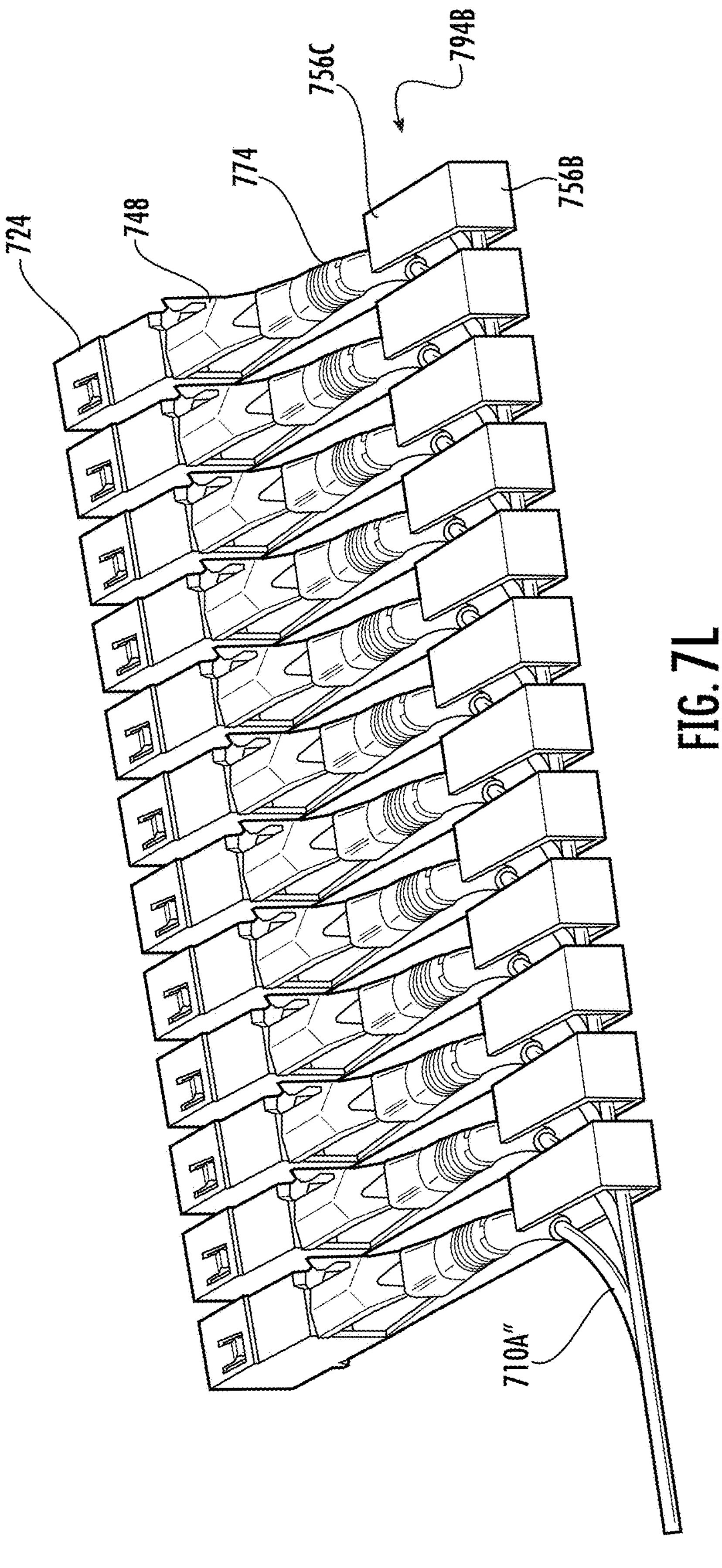
FIG. 7L is a perspective view illustrating example transformable brackets similar to the one illustrated in FIG. 7B where the transformable brackets form a tray or a horizontal cable guide for fiber optic cables, in accordance with some embodiments discussed herein.

Additionally, the orientation of the transformable brackets 746 can be altered in some embodiments. For example, while the transformable brackets 746 illustrated in FIG. 7J are stacked on top of each other so that they collectively form a vertical cable guide 794A, transformable brackets 746 may be provided side-by-side so that they collectively form a tray 794B (e.g., a horizontal cable guide). FIG. 7L is a perspective view illustrating example transformable brackets 746 similar to the one illustrated in FIG. 7B where the transformable brackets 746 form an example tray 794B to tertiary input cables 710A". As illustrated in FIG. 7L, the first surface 756A (see FIG. 7K), the second surface 756B, and the third surface 756C of each of the transformable brackets 746 may extend horizontally (from left to right in FIG. 7L). Collectively, the surfaces of each of the transformable brackets 746 may guide tertiary input cables 710A" to the left or to the right. While vertical and horizontal orientations are illustrated for the transformable brackets 746, it should be understood that the transformable brackets 746 may be provided in other orientations as well.

Figure 8A:
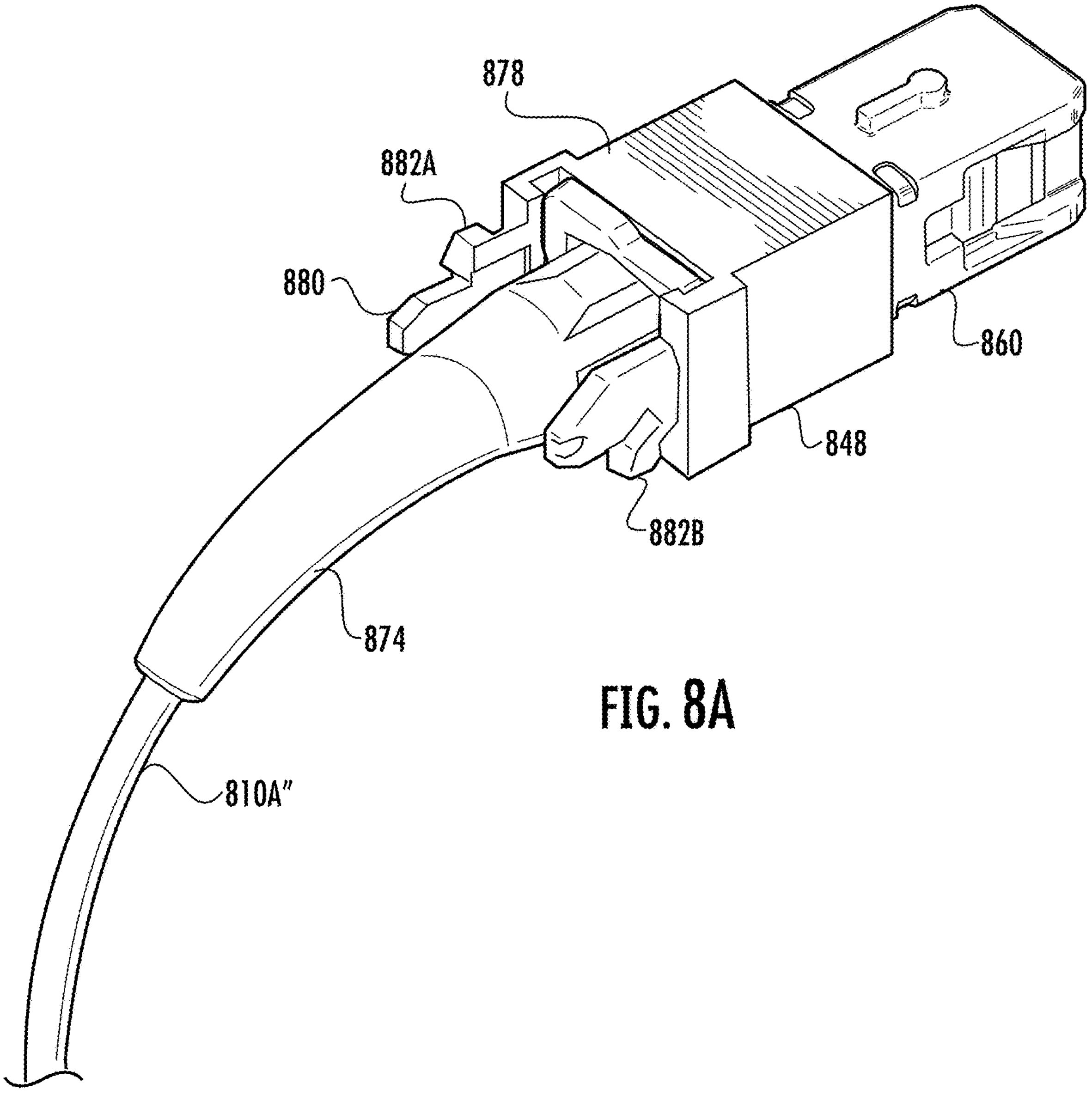
FIG. 8A is a perspective view illustrating an example second part of an example transformable bracket that is attached to a fiber optic connector, in accordance with some embodiments discussed herein.

While the clamp 548 and the elongated body 550 are integrally attached in the transformable bracket 546 of FIGS. 5C-5D, the clamp and the elongated body may be provided on two (or more) separate parts in other embodiments. For example, with reference to FIG. 8B, the transformable bracket 846 may include a first part 847 and a second part 878, and the second part 878 may be directly attached to the fiber optic connector 860 while the first part 847 may be directly attached to the second part 878. FIG. 8A is a perspective view illustrating an example second part 878 of an example transformable bracket 846 that is attached to a fiber optic connector 860, and FIG. 8B is an exploded, perspective view illustrating the first part 847 and the second part 878 of the transformable bracket 846 of FIG. 8A.

Figure 8B:
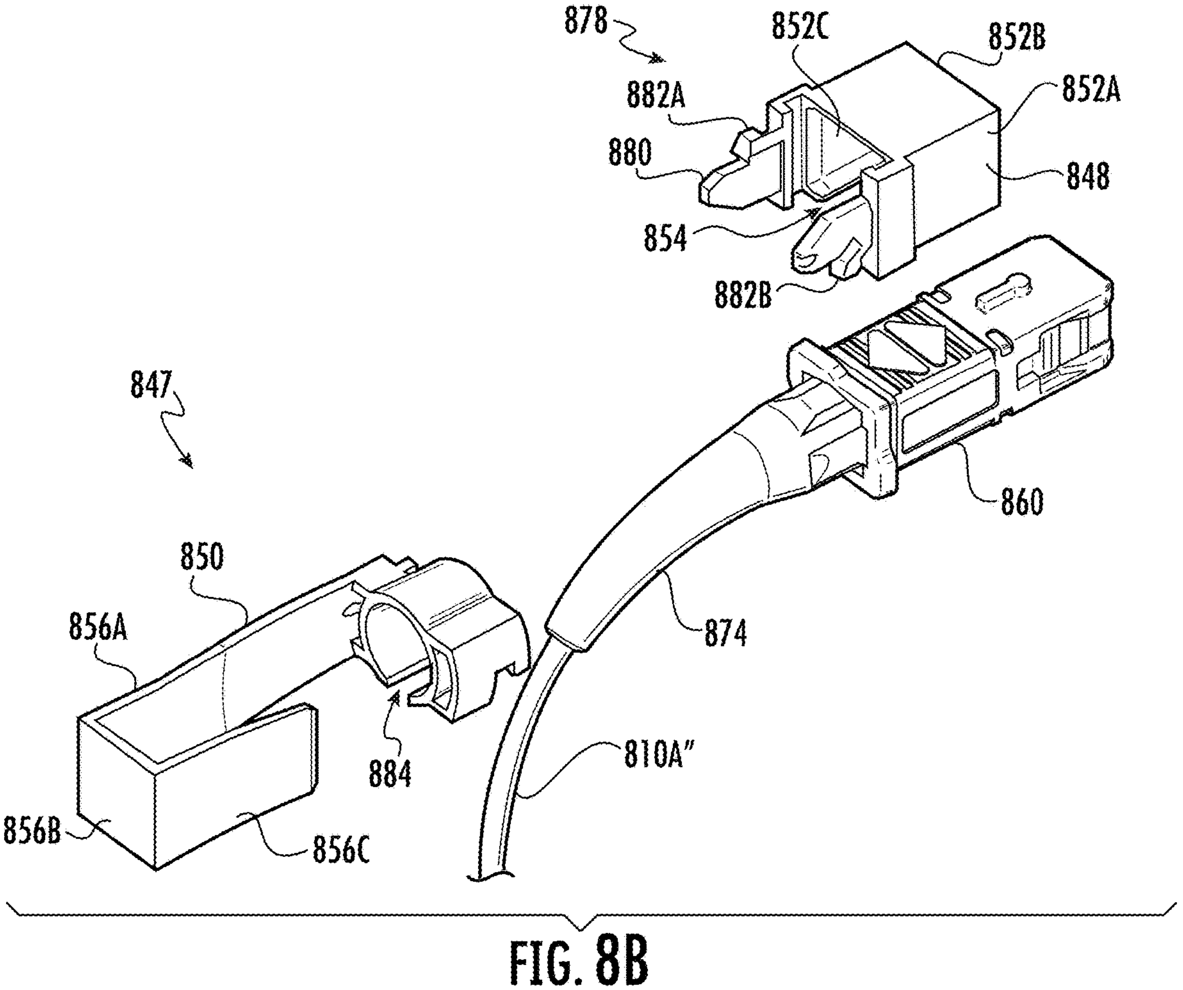
FIG. 8B is an exploded, perspective view further illustrating the first part and the second part of the transformable bracket of FIG. 8A, in accordance with some embodiments discussed herein.

FIG. 8B illustrates various features of the first part 847. An elongated body 850 may be provided on the first part 847, and the elongated body 850 may include a first surface 856A, a second surface 856B, and a third surface 856C. The first surface 856A, a second surface 856B, and a third surface 856C may collectively form a routing feature for directing a fiber optic cable (e.g. 810A") when a fiber optic cable. The first part 847 may define an opening 884 where a fiber optic cable 810A" may be received.

Looking at FIG. 8B, features of the second part 878 may be readily seen. Like the transformable brackets discussed above, the transformable bracket 846 may include a clamp 848, with the clamp 848 being on the second part 878. The clamp 848 may include a first side 852A, a second side 852B, and a third side 852C. On a fourth side (the bottom side in FIG. 8B), an opening 854 may be provided where a dust cap or a fiber optic connector 860 may be received. This opening 854 may permit attachment of the dust cap or the fiber optic connector 860 in the clamp 848.

FIG. 8B illustrates a tertiary input cable 810A" inserted into a cable director 874 and attached to a fiber optic connector 860, with the second part 878 attached to the fiber optic connector 860. However, the second part 878 may be attached to a connector associated with another type of fiber optic cable, such as a primary input cable, a secondary input cable, a primary output cable, a secondary output cable, or a tertiary output cable. Alternatively, the second part 878 may be attached to a dust cap 538 (see FIG. 5A).

Figure 8C:
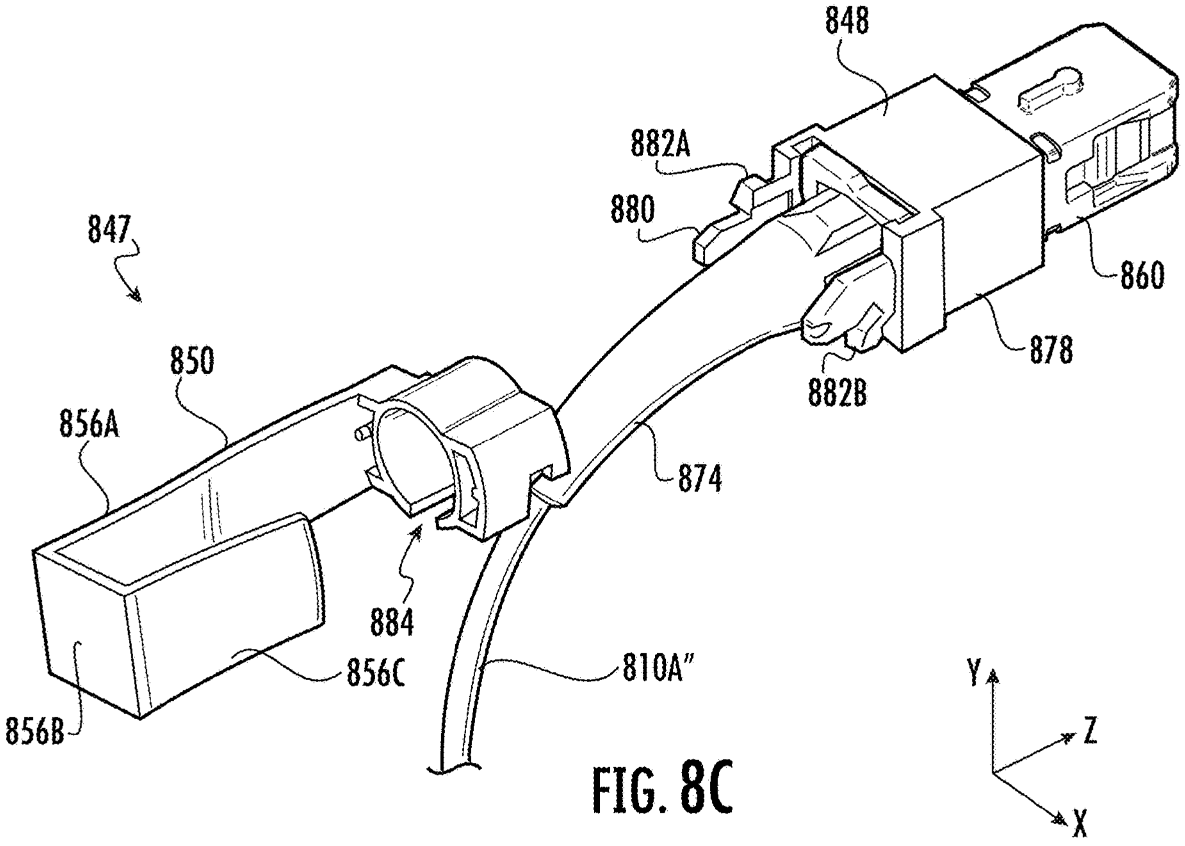
FIG. 8C is a perspective view illustrating the first part and the second part of an example transformable bracket of FIG. 8A where the second part is attached to a fiber optic connector and the first part is shown at a distance from the second part, in accordance with some embodiments discussed herein.

To assemble the transformable bracket 846 to a fiber optic connector 860, the second part 878 of the transformable bracket 846 may be attached to the fiber optic connector 860. FIGS. 8B and 8C illustrate how this may be done. FIG. 8C is a perspective view illustrating the first part 847 and the second part 878 of an example transformable bracket 846 of FIG. 8A where the second part 878 is attached to a fiber optic connector 860 and the first part 847 is shown at a distance from the second part 878. The fiber optic connector 860 and the second part 878 may be provided as shown in FIG. 8B, with the fiber optic connector 860 and the second part 878 being separated from each other. The fiber optic connector 860 may be urged upwardly into the opening 854 (see FIG. 8B) so that the fiber optic connector 860 may be selectively secured within the clamp 848 as illustrated in FIG. 8C.

Figure 8D:
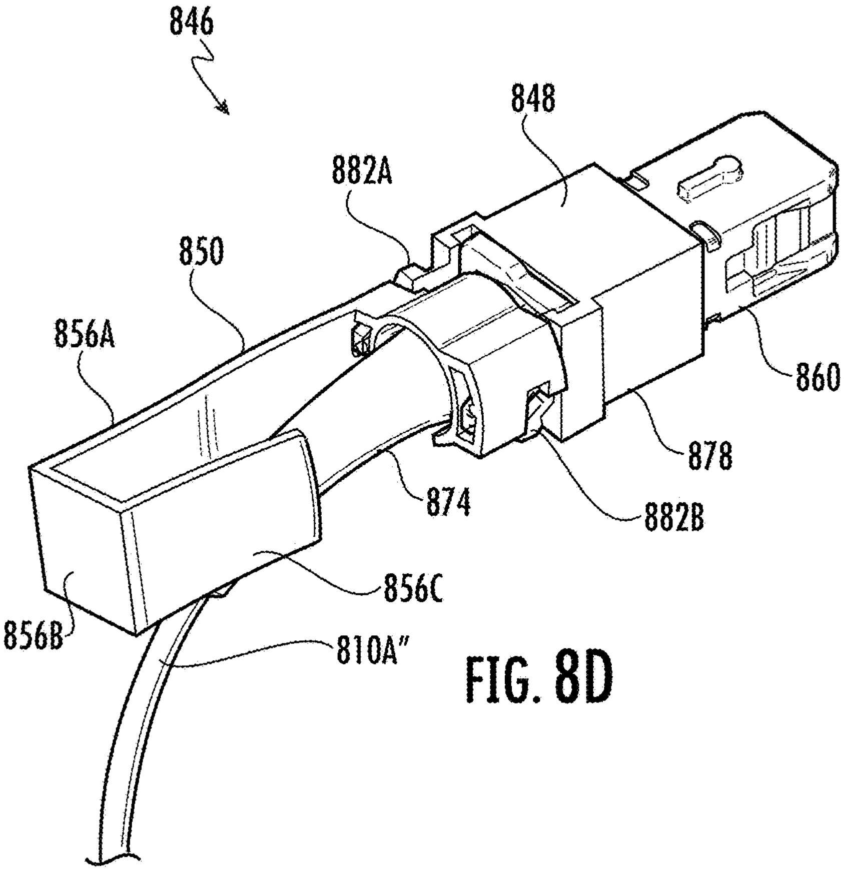
FIG. 8D is a perspective view illustrating the first part and the second part of the transformable bracket of FIG. 8A where the second part is attached to a fiber optic connector and where the first part is positioned on the second part and in an unlocked state, in accordance with some embodiments discussed herein.
Figure 8E:
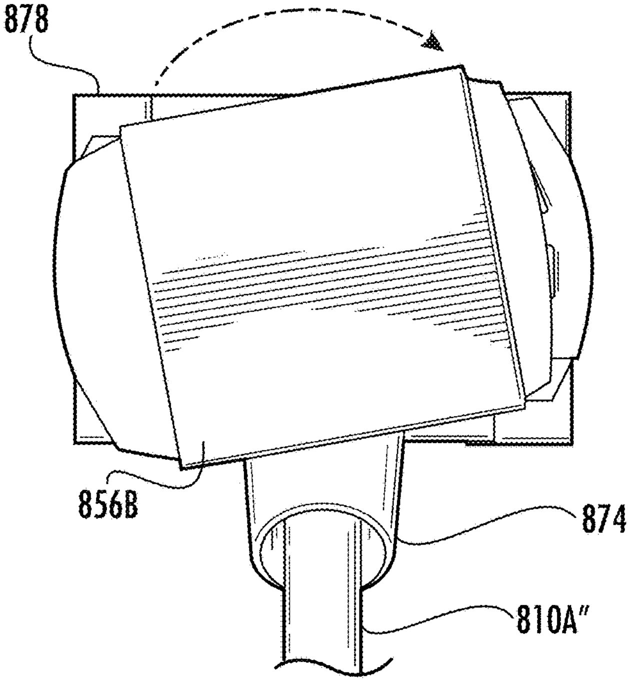
FIG. 8E is a front view illustrating the first part of the transformable bracket of FIG. 8A where the transformable bracket is in an unlocked state, in accordance with some embodiments discussed herein.
Figure 8F:
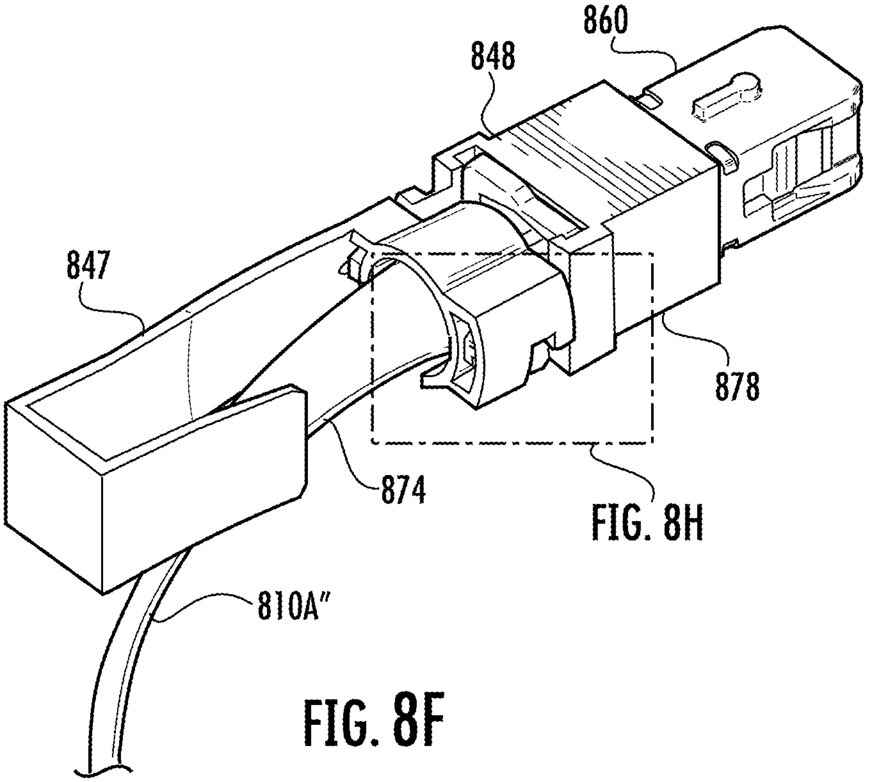
FIG. 8F is a perspective view illustrating the example transformable bracket of FIG. 8D in a locked state, in accordance with some embodiments discussed herein.
Figure 8G:
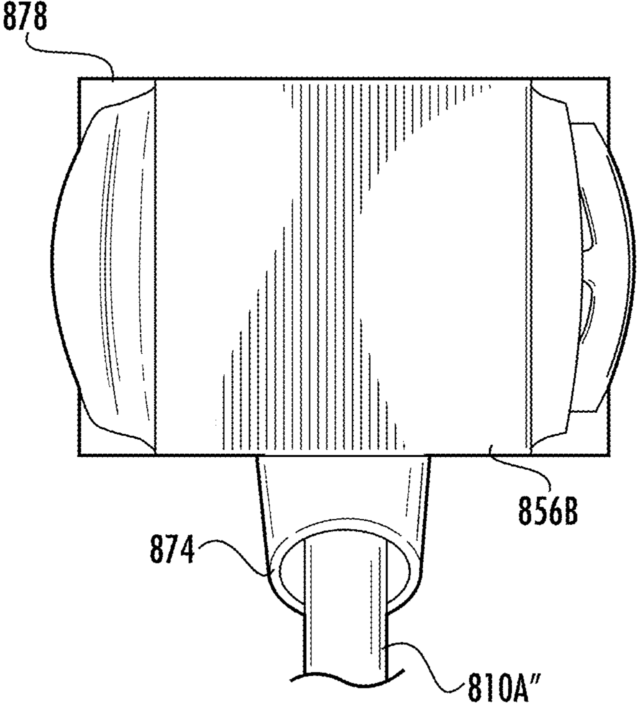
FIG. 8G is a front view illustrating the first part of the transformable bracket of FIG. 8D when the transformable bracket is in a locked state, in accordance with some embodiments discussed herein.
Figure 8H:
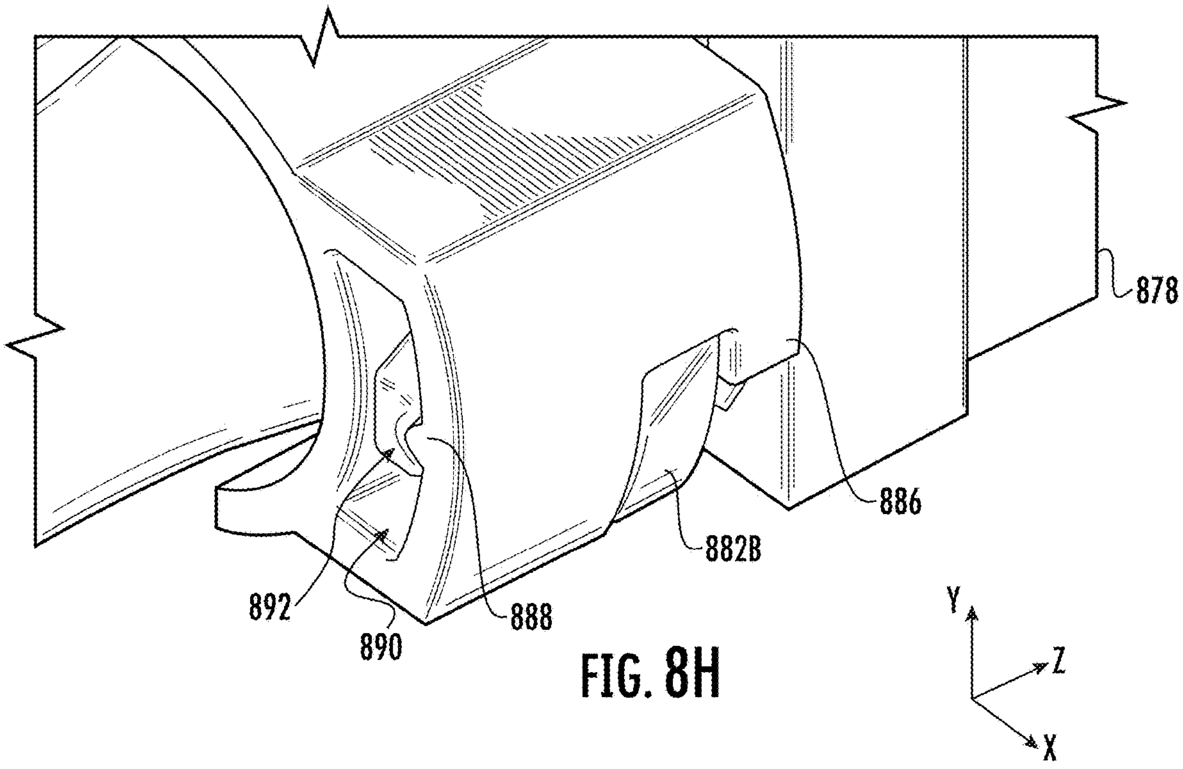
FIG. 8H is an enhanced, perspective view illustrating example engagement features of the first part and the second part of FIG. 8A, in accordance with some embodiments discussed herein.

To assemble the transformable bracket 846 to the fiber optic connector 860, the first part 847 may also be attached to the second part 878. FIGS. 8D-8H show how this may be done. FIG. 8D is a perspective view illustrating the first part 847 and the second part 878 of the transformable bracket 846 of FIG. 8A where the second part 878 is attached to a fiber optic connector 860 and where the first part 847 is positioned on the second part 878 and in an unlocked state. FIG. 8E is a front view illustrating the first part 847 of the transformable bracket 846 of FIG. 8A where the transformable bracket 846 is in an unlocked state. FIG. 8F is a perspective view illustrating the example transformable bracket 846 of FIG. 8D in a locked state. FIG. 8G is a front view illustrating the first part 847 of the transformable bracket 846 of FIG. 8D when the transformable bracket 846 is in a locked state. Additionally, FIG. 8H is an enhanced, perspective view illustrating example engagement features of the first part 847 and the second part 878 of FIG. 8A.

The second part 878 may include protrusions 880 (see FIG. 8C), and the first part 847 may include a corresponding number of voids 890 (see FIG. 8H). The voids 890 may be configured to receive the protrusions 880 so that the movement of the first part 847 is constrained relative to the second part 848 in the relative X and Y directions (as shown in FIGS. 8C and 8H). When the protrusions 880 are received within the voids 890, the first part 847 still remains unconstrained relative to the second part 848 in the Z direction. To constrain the first part 847 relative to the second part 848 in the Z direction, the first part 847 may be rotated in the clockwise direction (from the perspective shown in FIG. 8D-8H). Thus, the elongated body 850 may be configured to be attached to the clamp 848 by rotating the elongated body 850 relative to the clamp 848, but the elongated body 850 may be configured to be attached to the clamp 848 by sliding the elongated body 850 relative to the clamp 848. As shown in FIG. 8H, this rotation may result in engagement between a first engagement feature 886 and a second rotational stop 882B. This rotation may also result in engagement between another engagement feature and the first rotational stop 882A (see FIG. 8B). To prevent rotation of the first part 847 relative to the second part 848, a projection 888 within the first part 847 may enter into a notch 892 within the second part 848, and the second part 848 may retain the projection 888 within the notch 892 (e.g., absent the application of an additional force). Where a user wishes to unlock the second part 848 from the first part 847, the user may simply rotate the second part 848 in a counterclockwise direction relative to the first part 847 with sufficient force to move the projection 888 out of the notch 892.

Figure 8I:
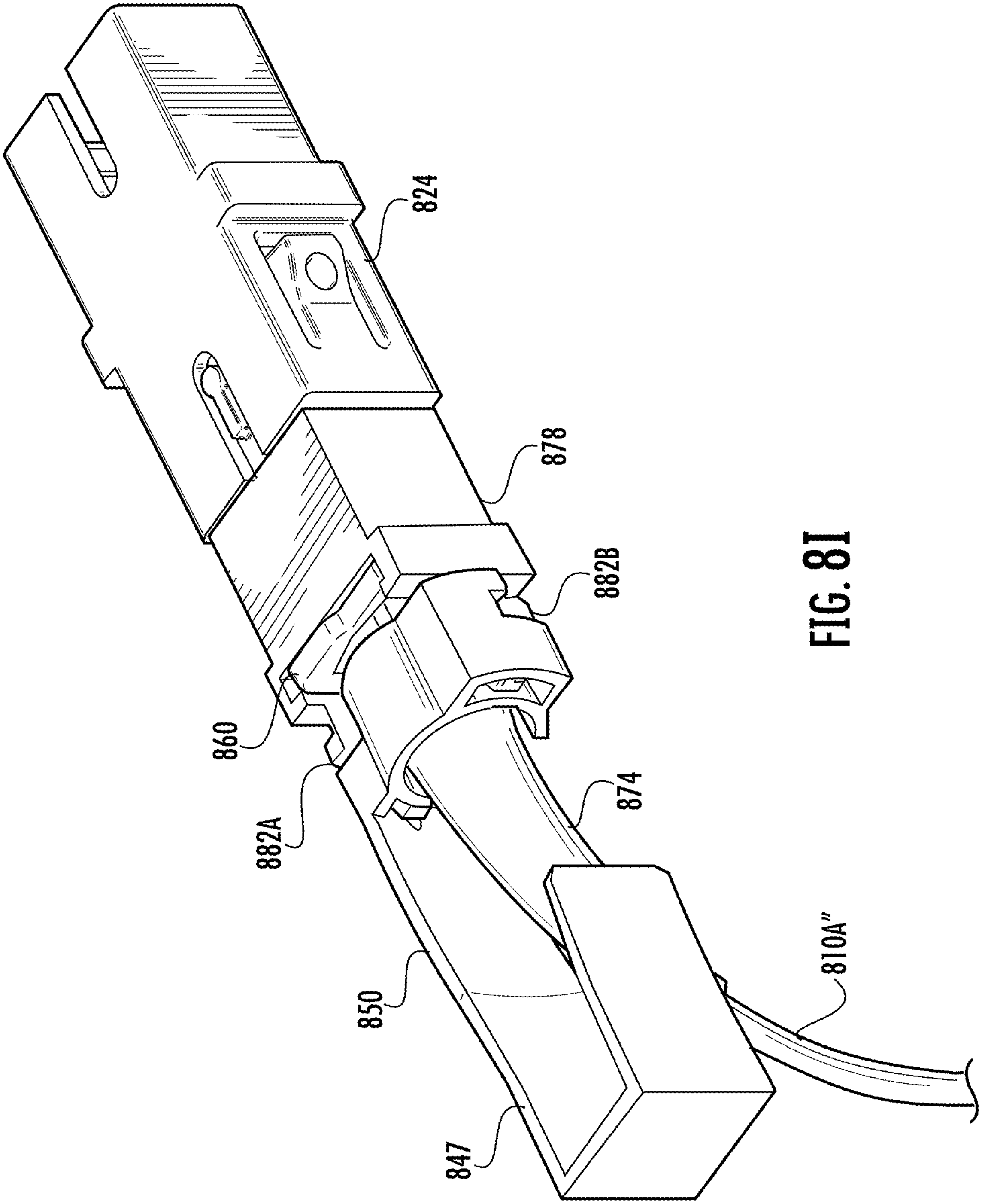
FIG. 8I is a perspective view illustrating the example transformable bracket of FIG. 8D in a locked state where the transformable bracket is attached to a fiber optic connector and where the fiber optic connector is inserted in an example adapter, in accordance with some embodiments discussed herein.

FIG. 8I is a perspective view illustrating the example transformable bracket 846 of FIG. 8D in a locked state where the transformable bracket 846 is attached to a fiber optic connector 860 and where the fiber optic connector 860 is inserted in an example adapter 824. Notably, the components illustrated in FIG. 8I may be assembled in any order. For example, the first part 847 and the second part 848 may be assembled first to assemble the transformable bracket 846, the transformable bracket 846 may then be attached to the fiber optic connector 860, and the fiber optic connector 860 may then be attached to the adapter 824. However, other approaches may be used. For example, the fiber optic connector 860 may be first attached to the adapter 824, the second part 848 may then be attached to the fiber optic connector 860, and the first part 847 may then be attached to the second part 848.

Figure 8J:
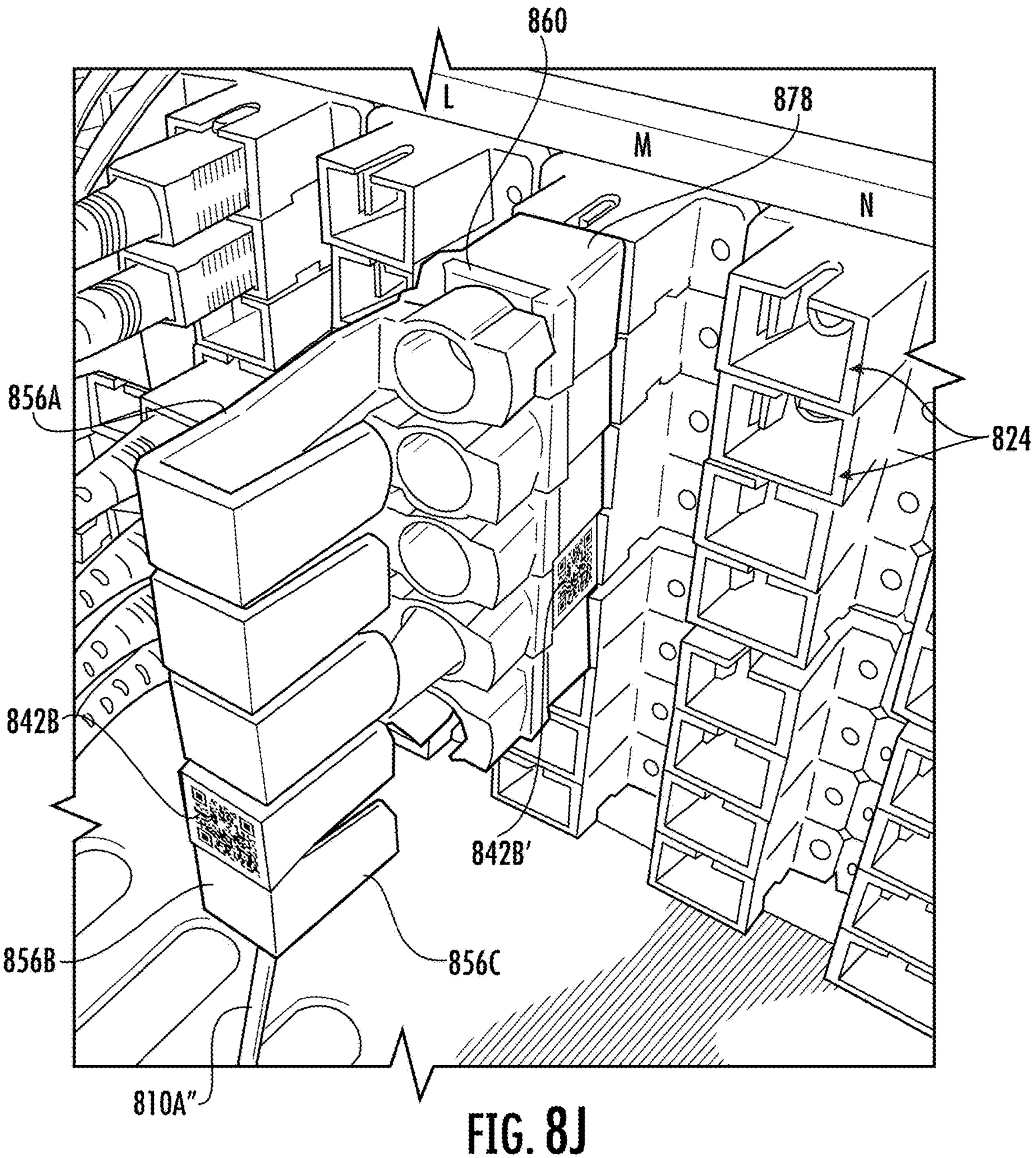
FIG. 8J is a perspective view illustrating a plurality of transformable brackets in a locked state where the transformable brackets are attached to fiber optic connectors and where the fiber optic connectors are inserted in adapters, in accordance with some embodiments discussed herein.

Similar to other embodiments, a plurality of transformable brackets 846 may be attached to adapters 824 so that the transformable brackets 846 collectively form a vertical cable guide for fiber optic cables. FIG. 8J is a perspective view illustrating a plurality of transformable brackets 846 in a locked state where the transformable brackets 846 are attached to fiber optic connectors 860 and where the fiber optic connectors 860 are inserted in adapters 824. The transformable brackets 846 are aligned vertically so that the first sides 856A of the transformable brackets 846 are generally coplanar (some deviations may occur as a result of manufacturing tolerances). The second sides 856B may also be generally coplanar, and the third sides 856C may be generally coplanar as well. The sides 856A, 856B, 856C of the transformable brackets 846 may collectively form a vertical cable guide, resulting in improved organization of cables and improved efficiency for users.

As illustrated in FIG. 8J, multiple transformable bracket identifiers 842B, 842B' may be provided on the transformable bracket 846, with one transformable bracket identifier 842B provided on the first part 847 and with a second transformable bracket identifier 842B' provided on the second part 878. The transformable bracket identifiers 842B, 842B' may be identical in some embodiments, but these identifiers may be different in other embodiments. Where the transformable bracket identifiers 842B, 842B' are different, the identifiers may then be linked together within memory.

Figure 9A:
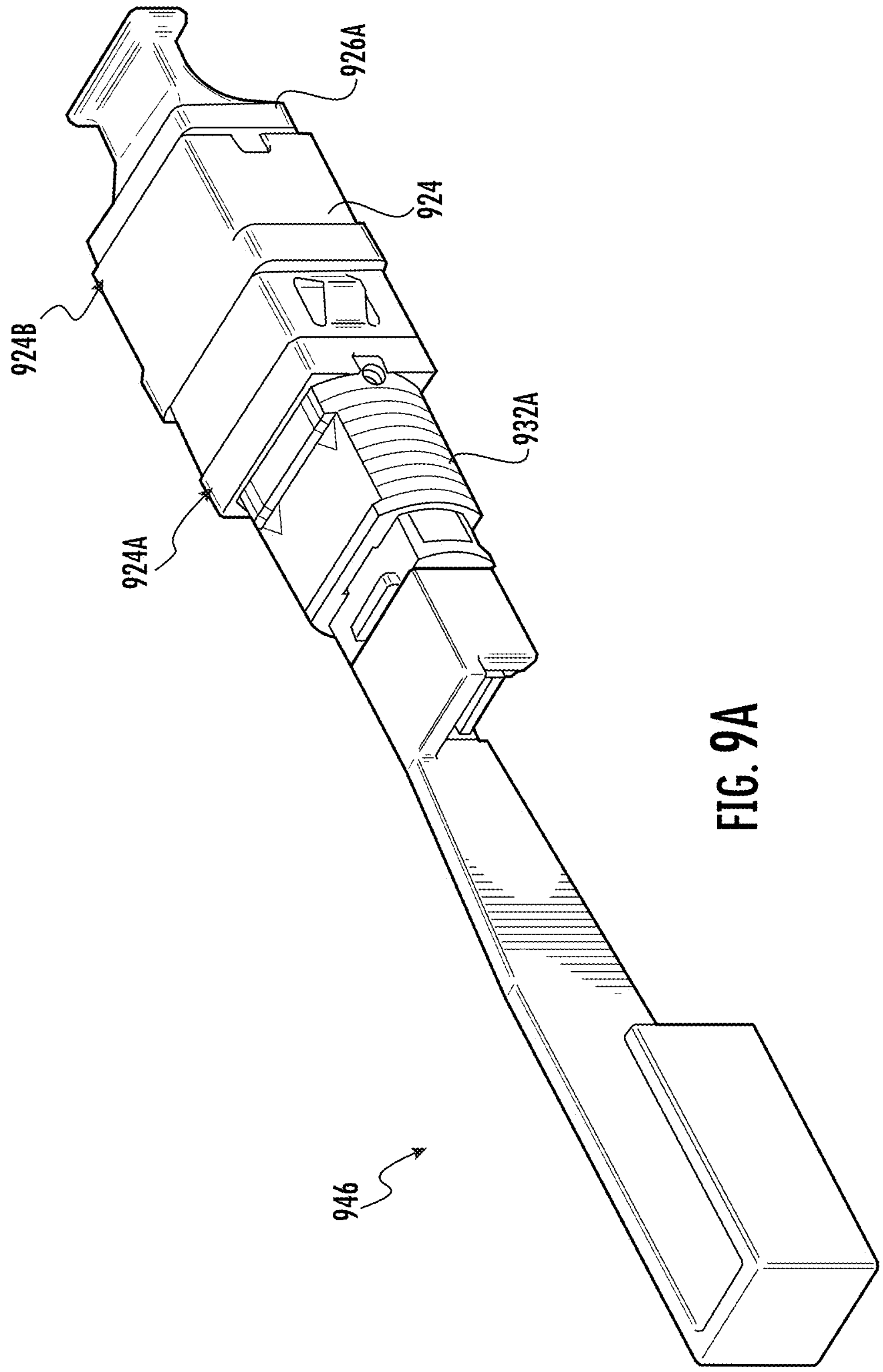
FIG. 9A is a perspective view illustrating another example transformable bracket that is attached to an example fiber optic connector where the fiber optic connector is attached to an example adapter, in accordance with some embodiments discussed herein.
Figure 9B:
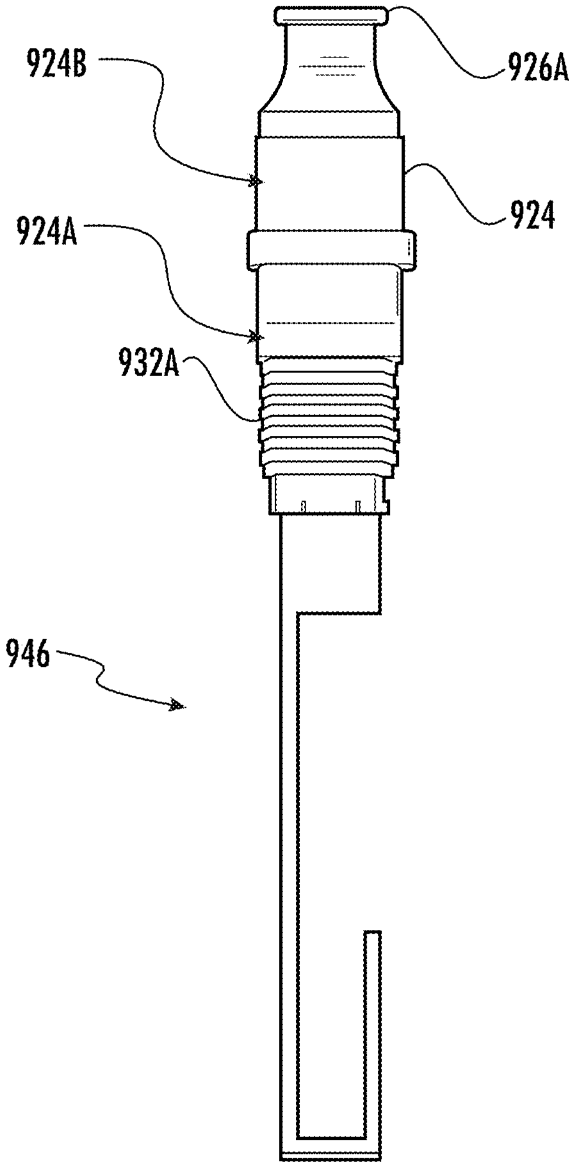
FIG. 9B is a top view illustrating the transformable bracket of FIG. 9A, in accordance with some embodiments discussed herein.
Figure 9C:
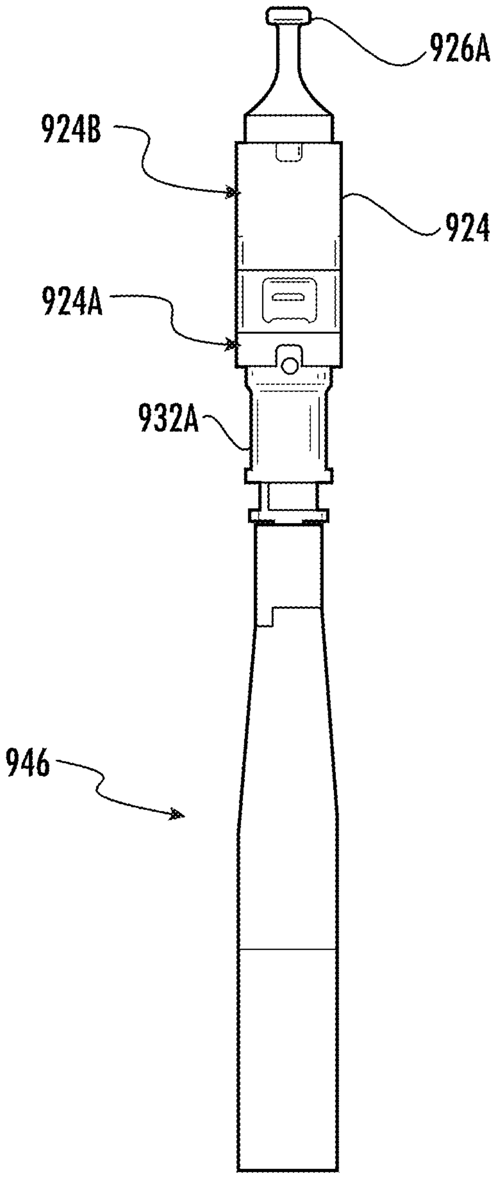
FIG. 9C is a right side view illustrating the transformable bracket of FIG. 9A, in accordance with some embodiments discussed herein.

Other transformable brackets are also contemplated, and FIGS. 9A-9J illustrate an additional example transformable bracket 946 that is contemplated. FIG. 9A is a perspective view illustrating another example transformable bracket 946 that is attached to an example fiber optic connector 960 where the fiber optic connector 960 is indirectly attached to an example adapter 924. Additionally, FIG. 9B is a top view illustrating the transformable bracket 946 of FIG. 9A, and FIG. 9C is a right side view illustrating the transformable bracket 946 of FIG. 9A.

An adapter 924 may be provided, and a dust cap 926A may be attached to the adapter 924 at an output side 924B when the adapter 924 is not in use. A first MPO connector housing 932A may be attached to the adapter 924 on an input side 924A of the adapter 924. In some embodiments, the first MPO connector housing 932A may be preinstalled within the adapter 924, and the first MPO connector housing 932A may be configured to be removed or attached to the adapter 924 as desired. The transformable bracket 946 may be attached to another fiber optic connector 960 (see FIGS. 9D-9F), and this fiber optic connector 960 may be attached to the first MPO connector housing 932A. In the embodiment illustrated in FIGS. 9D-9F, the fiber optic connector 960 is a Fast-Track MPO Ferrule. Together, the fiber optic connector 960 and the first MPO connector housing 932A may form a Fast-Track MPO connector. The transformable bracket 946 may include the same features provided for transformable brackets described above such as an elongated body and a routing feature.

Figure 9D:
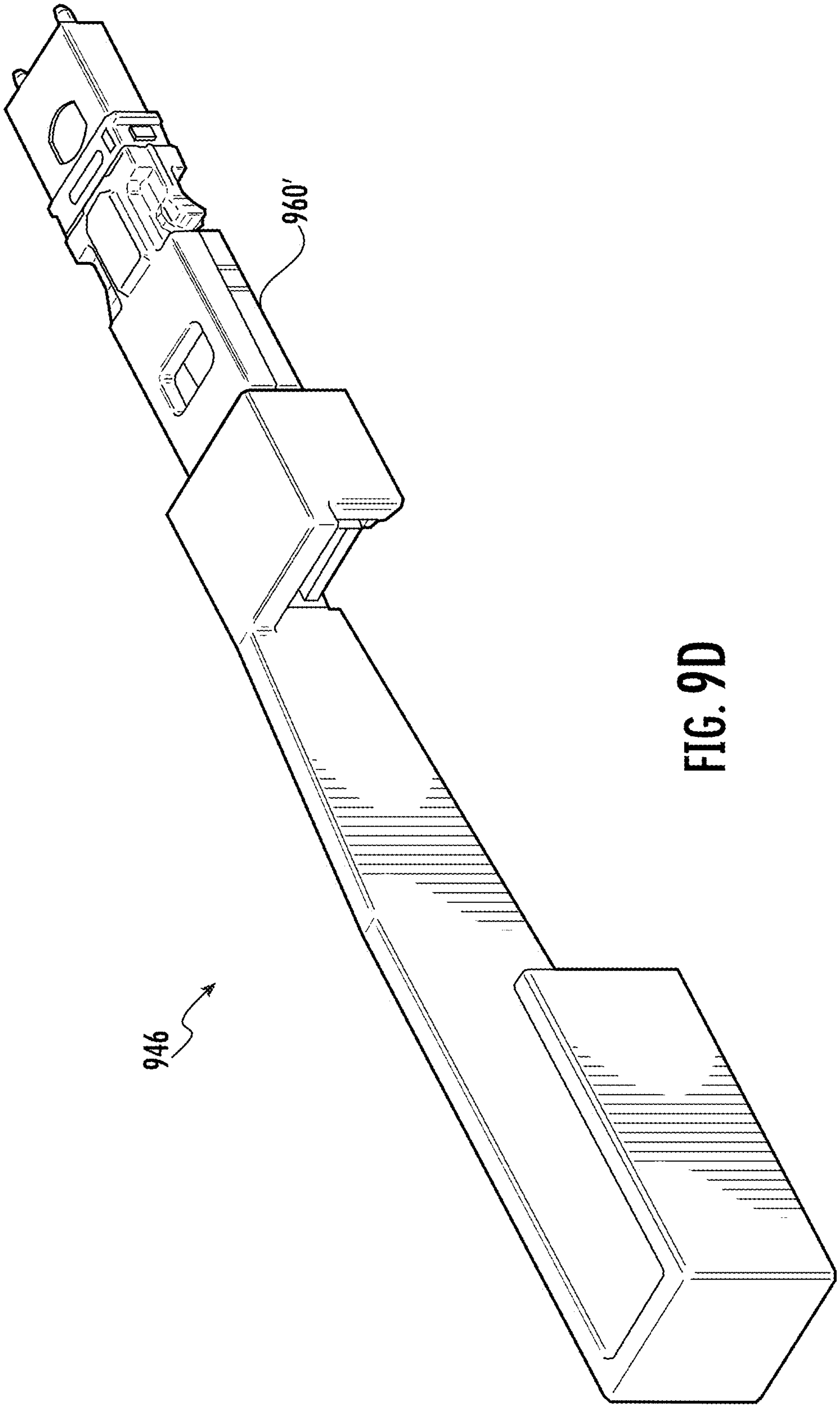
FIG. 9D is a perspective view illustrating the transformable bracket and fiber optic connector of FIG. 9A, in accordance with some embodiments discussed herein.
Figure 9E:
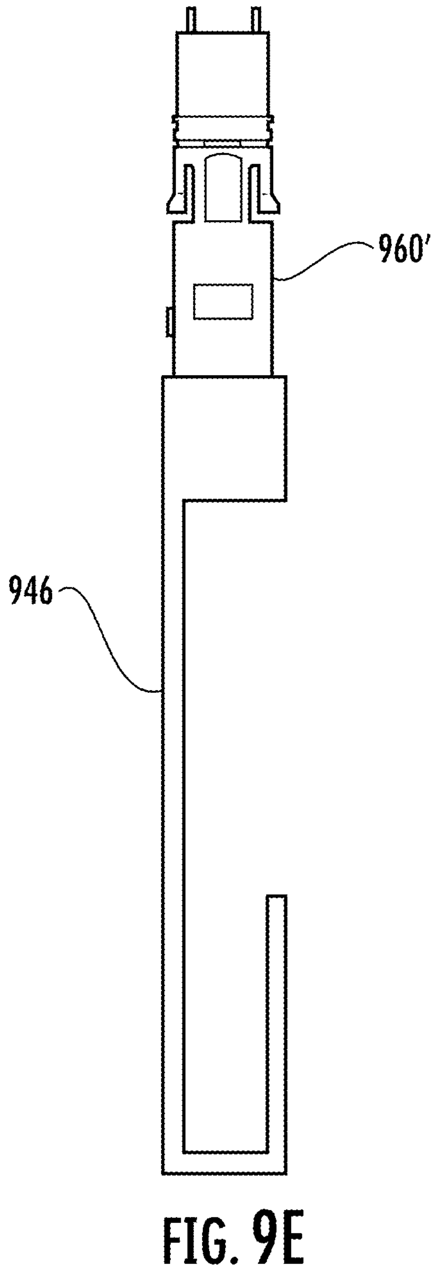
FIG. 9E is a top view illustrating the example transformable bracket and fiber optic connector of FIG. 9A, in accordance with some embodiments discussed herein.
Figure 9F:
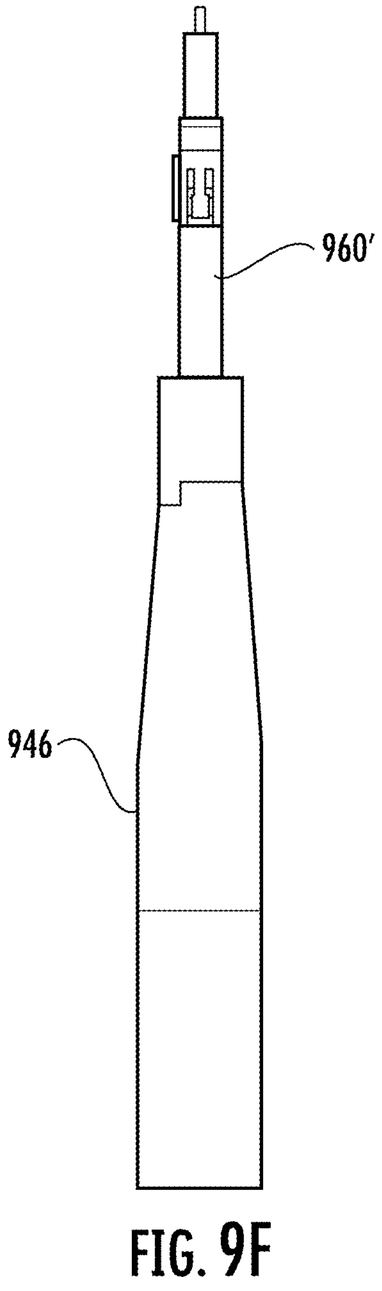
FIG. 9F is a right side view illustrating the example transformable bracket and fiber optic connector of FIG. 9A, in accordance with some embodiments discussed herein.

As noted above, the transformable bracket 946 may be attached to a fiber optic connector 960, and this attachment is illustrated in FIGS. 9D-9F. FIG. 9D is a perspective view illustrating the transformable bracket 946 and fiber optic connector 960 of FIG. 9A. Additionally, FIG. 9E is a top view illustrating the example transformable bracket 946 and fiber optic connector 960 of FIG. 9A, and FIG. 9F is a side view illustrating the example transformable bracket 946 and fiber optic connector 960 of FIG. 9A. The fiber optic connector 960 illustrated in FIGS. 9D-9F may be attached to the first MPO connector housing 932A, resulting in the assembly illustrated in FIGS. 9A-9C. As noted above, the fiber optic connector 960 may be a Fast-Track MPO Ferrule.

Figure 9G:
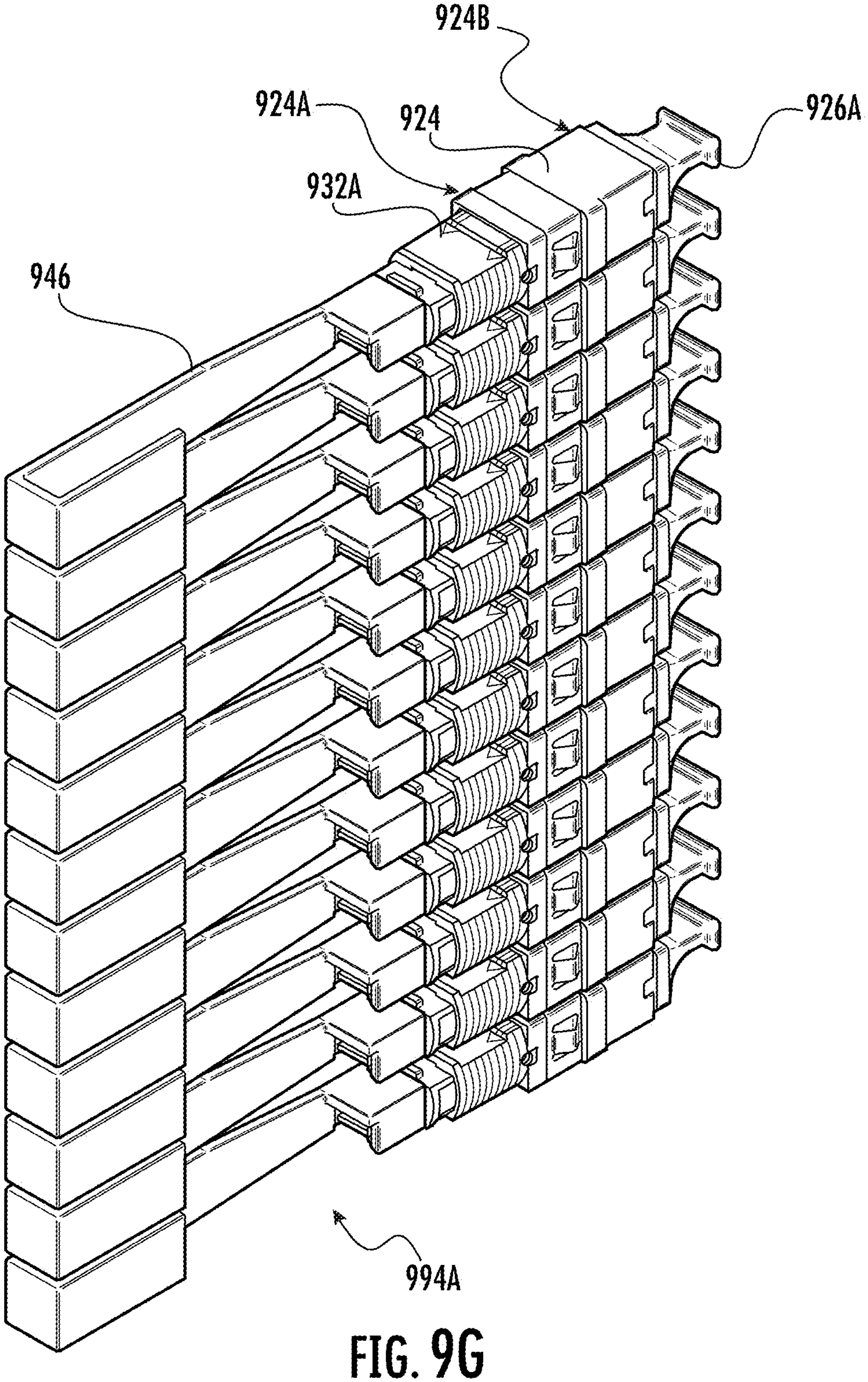
FIG. 9G is a perspective view illustrating a plurality of the transformable brackets of FIG. 9A that collectively form a vertical cable guide, in accordance with some embodiments discussed herein.
Figure 9H:
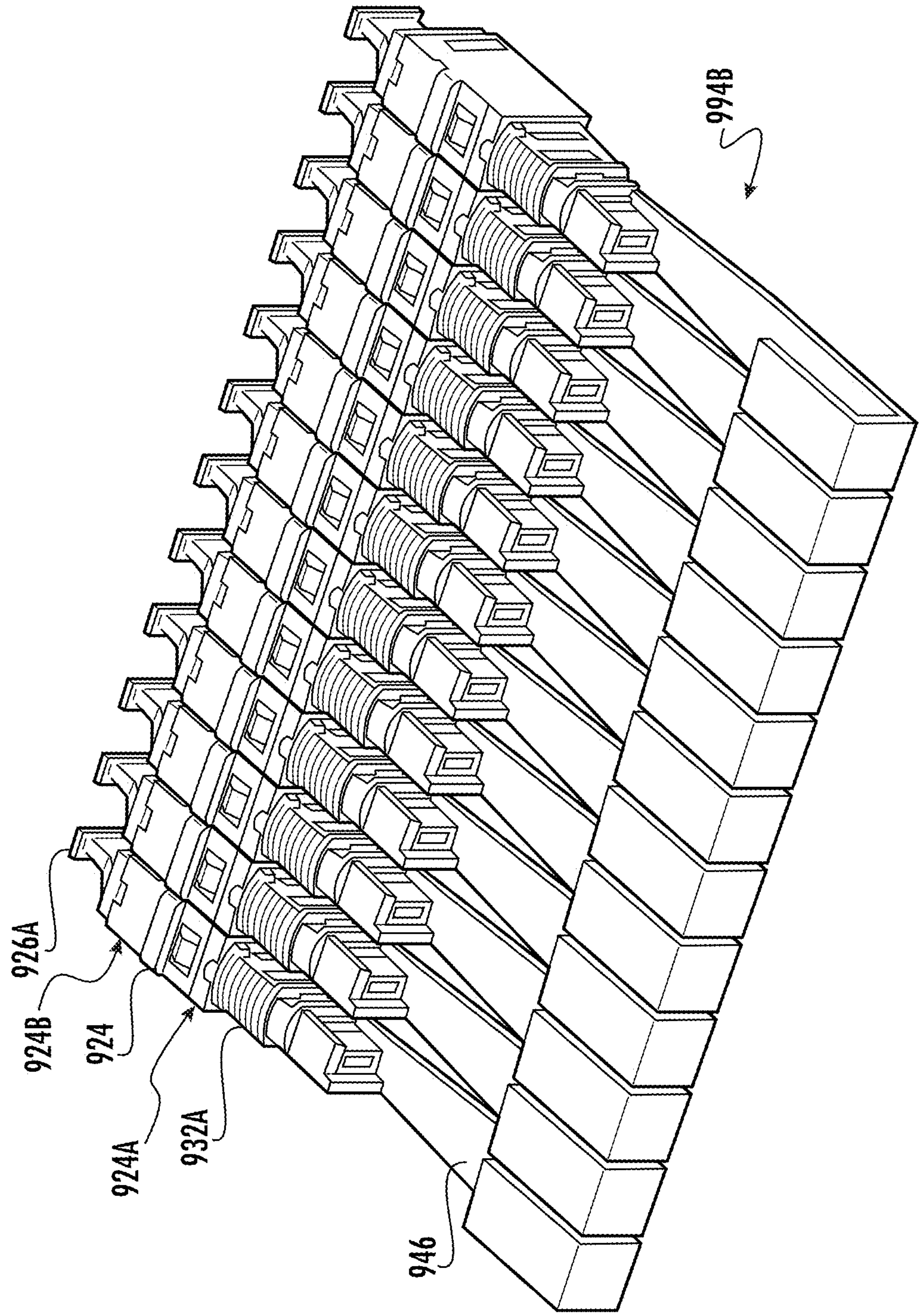
FIG. 9H is a perspective view illustrating a plurality of example transformable brackets similar to the transformable bracket of FIG. 9A where the transformable brackets collectively form a tray or a horizontal cable guide, in accordance with some embodiments discussed herein.
Figure 9I:
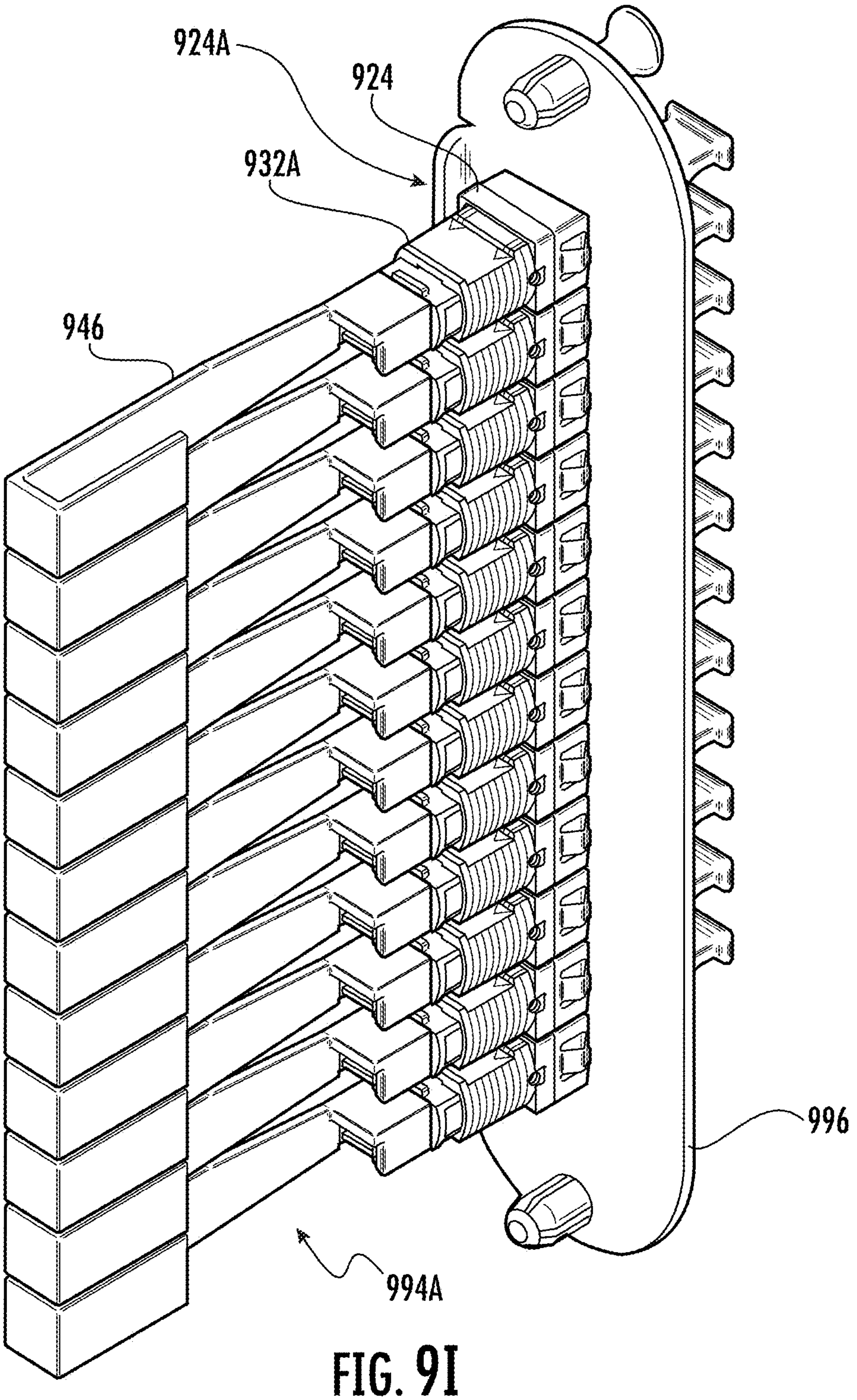
FIG. 9I is a perspective view illustrating a plurality of example transformable brackets similar to the transformable bracket of FIG. 9A where the transformable brackets collectively form a vertical cable guide, in accordance with some embodiments discussed herein.

As noted with certain embodiments discussed above, transformable brackets 946 may collectively form a vertical or horizontal cable guide to urge fiber optic cables in a specified direction. For example, FIG. 9G illustrates a plurality of the transformable brackets 946 of FIG. 9A that collectively form a vertical cable guide 994A, and FIG. 9H illustrates a plurality of example transformable brackets 946 where the transformable brackets 946 collectively form a tray 994B (e.g., a horizontal cable guide). As illustrated in FIGS. 9G and 9H, the transformable brackets 946 may be adjusted to allow fiber optic cables to be guided horizontally to the left, horizontally to the right, upward, or downward.

Figure 9J:
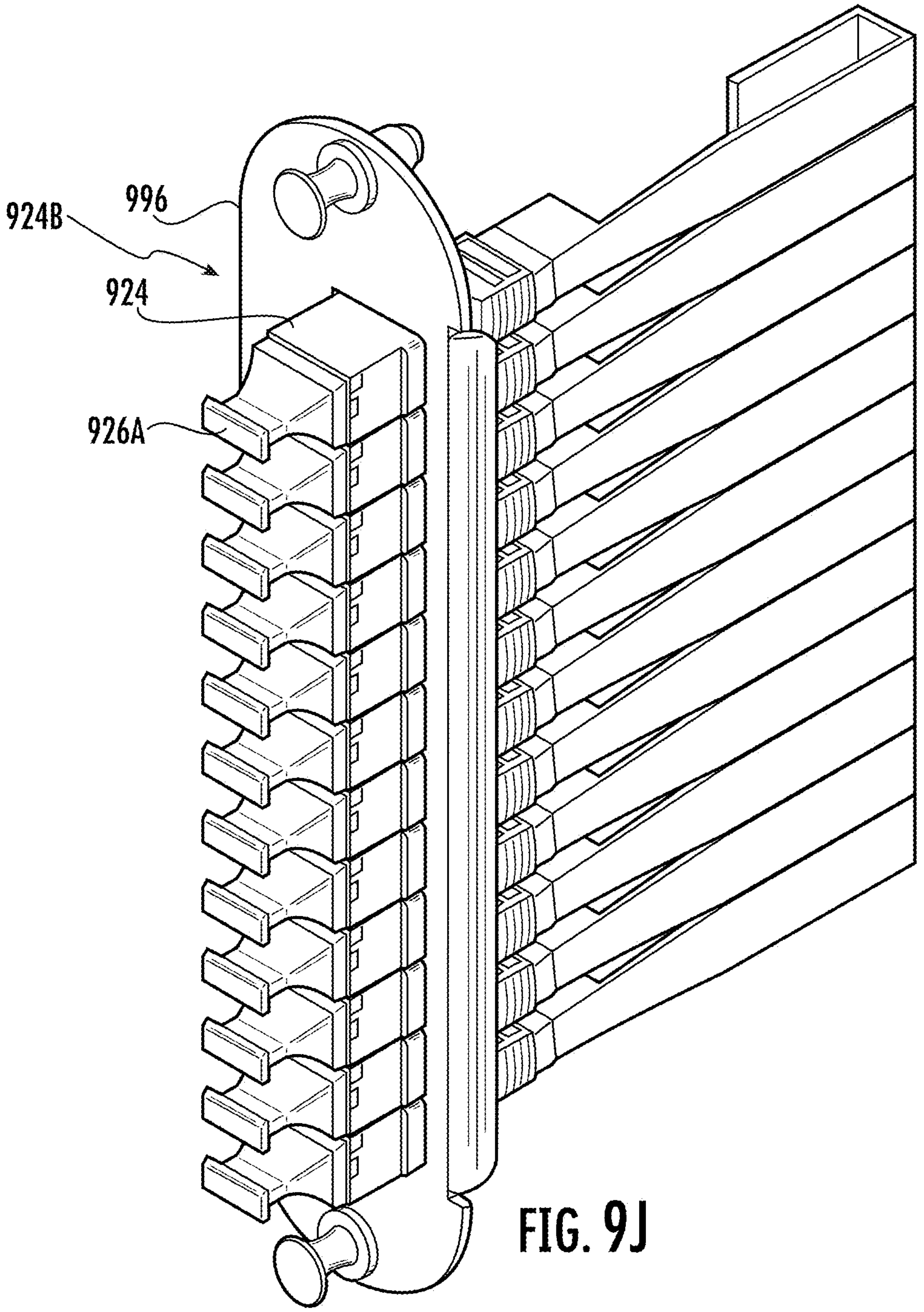
FIG. 9J is a rear perspective view illustrating a rear side of a plate of FIG. 9I and adapters secured therein, in accordance with some embodiments discussed herein.

Additionally, adapters 924 may be secured within a mounting plate 996 and/or a panel 314 (see FIG. 3C). FIGS. 91 and 9J illustrate a plurality of example transformable brackets 946 similar to the transformable bracket of FIG. 9A where the transformable brackets 946 collectively form a vertical cable guide 994A. To form a vertical cable guide 994A, a plurality of transformable brackets 946 may be aligned vertically so that the routing features of each of the plurality of transformable brackets 946 are aligned. Here, the transformable brackets 946 are indirectly attached to adapters 924, and the adapters 924 are secured within the plate 996. In FIG. 9J, a rear side of the plate 996 of FIG. 9I may be seen and with adapters 924 secured therein. A dust cap 926A may be provided at the adapter 924 until a connector can be provided at the adapter 924 to protect the adapter 924 from dust and other elements.

A cable retention clip and a cable strain relief system are also contemplated. Features of the cable retention clip are discussed first, and then features of the larger cable strain relief system are explored.

Figure 10A:
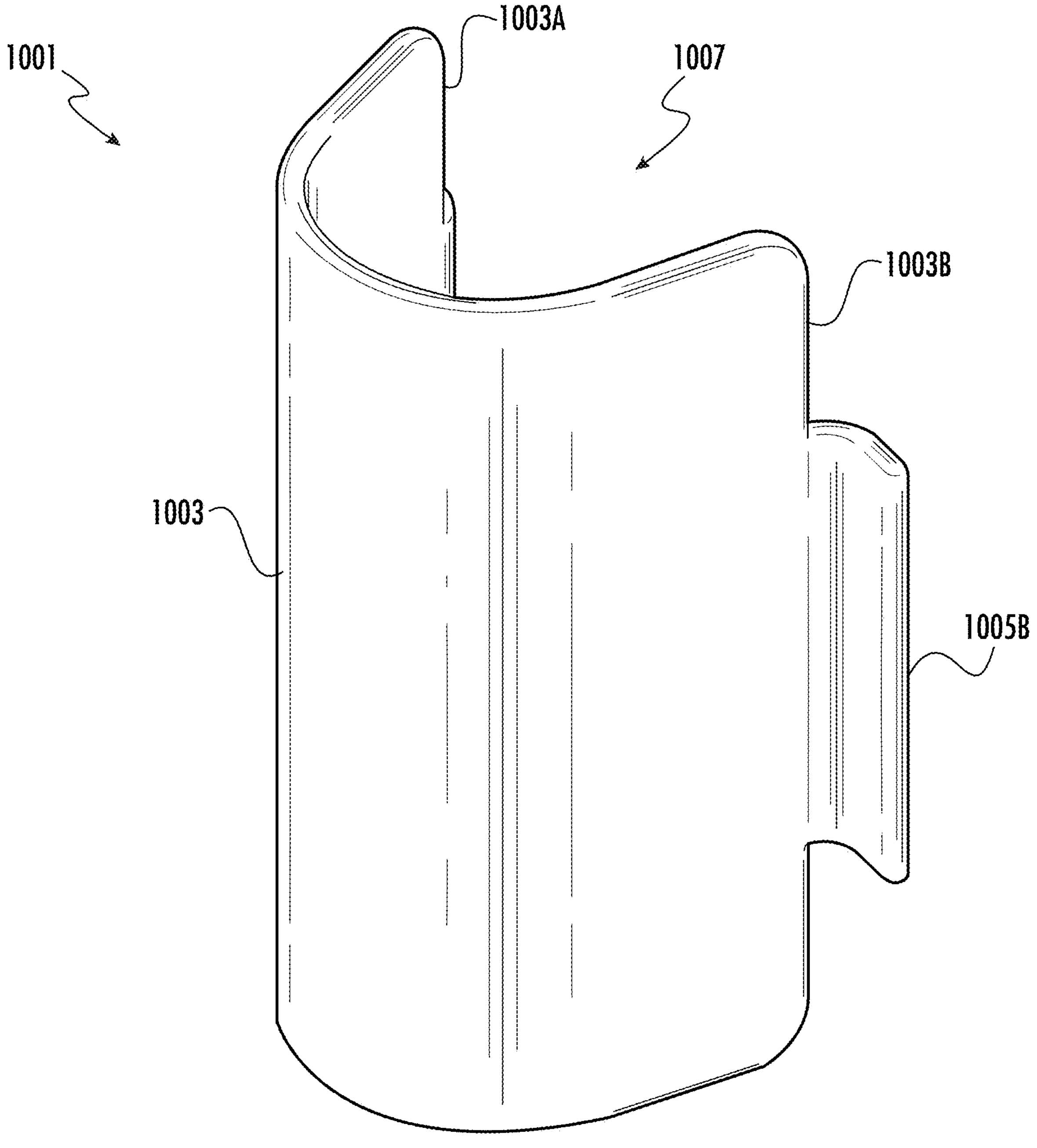
FIG. 10A is a front perspective view illustrating an example cable retention clip, in accordance with some embodiments discussed herein.
Figure 10B:
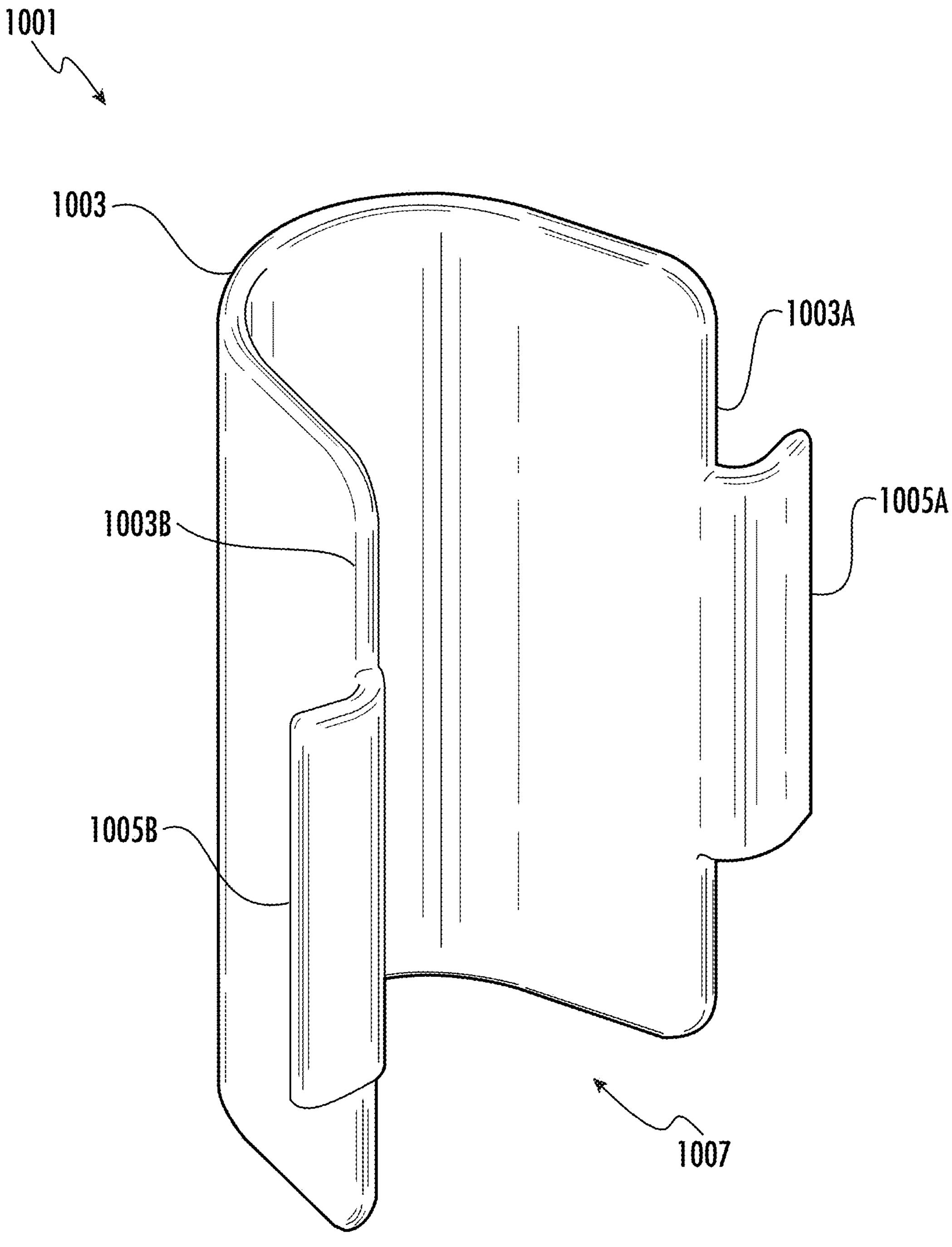
FIG. 10B is a rear perspective view illustrating the cable retention clip of FIG. 10A, in accordance with some embodiments discussed herein.
Figure 10C:
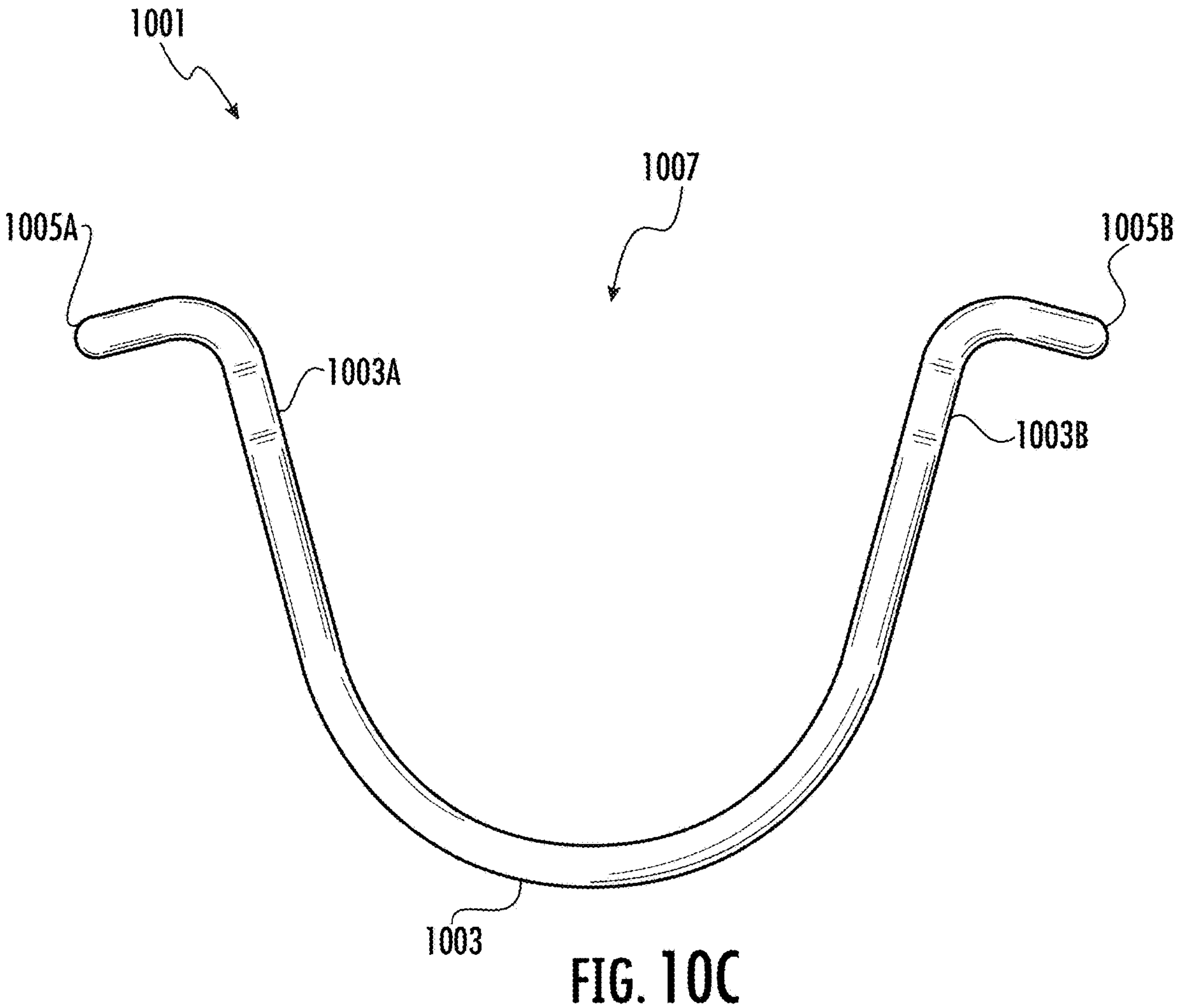
FIG. 10C is a top view illustrating the cable retention clip of FIG. 10A, in accordance with some embodiments discussed herein.
Figure 10D:
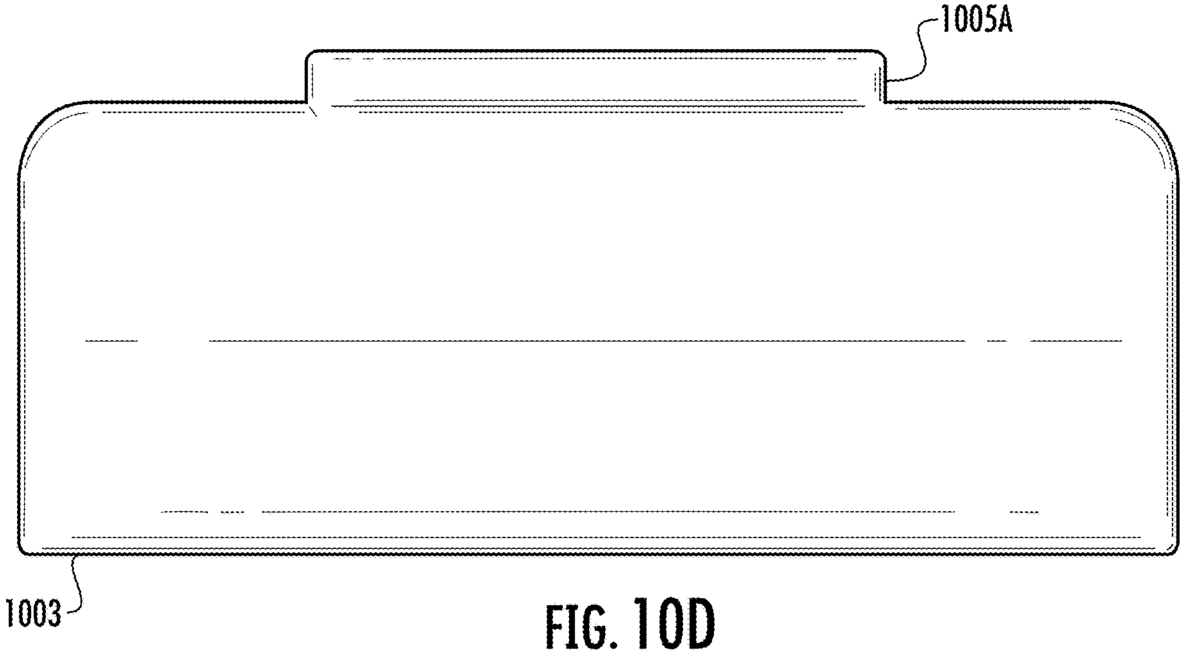
FIG. 10D is a side view illustrating the cable retention clip of FIG. 10A, in accordance with some embodiments discussed herein.

FIG. 10A is a front perspective view illustrating an example cable retention clip 1001. Additionally, the cable retention clip 1001 of FIG. 10A is illustrated in a rear perspective view in FIG. 10B, a top view in FIG. 10C, and a side view in FIG. 10D. The cable retention clip 1001 may include a body 1003. The body 1003 may define a concave, curved shape, and this concave shape may define a recess 1007. This recess 1007 may be configured to receive a fiber optic cable 1010A (see FIGS. 10E-10G). The body 1003 may be configured to attach a fiber optic cable 1010A (see FIGS. 10E-10G) between the body 1003 and a friction element 1021 (see FIG. 10G) of the cable retention plate 1009 (see FIG. 10G). While a friction element 1021 is illustrated on the cable retention plate 1009 in FIG. 10G, a friction element 1021 may be implemented on a cable retention clip 1001 in some embodiments to provide strain relief to a fiber optic cable 1010A within the cable retention clip 1001. Additionally, friction elements 1021 may possess a variety of shapes, sizes, and/or materials. For example, the friction element 1021 may be curved, have indentations, have a different thickness, be formed of rubber, etc.

The cable retention clip 1001 may also include a first clip tab 1005A and a second clip tab 1005B. The first clip tab 1005A and the second clip tab 1005B may extend at an angle from the body 1003. The first clip tab 1005A may be provided proximate to a first end 1003A of the body 1003, and the first clip tab 1005A may extend at an angle of between 60 degrees and 120 degrees relative to the first end 1003A of the body 1003. The second clip tab 1005B may be provided proximate to a second end 1003B of the body 1003, and the second clip tab 1005B may extend at an angle of between 60 degrees and 120 degrees relative to the second end 1003B of the body 1003. In some embodiments, the first clip tab 1005A and the second clip tab 1005B may be provided as a single, integral piece with the body 1003. The first clip tab 1005A and the second clip tab 1005B may be configured to be inserted into apertures 1011 (see FIG. 10G) defined within a mounting surface 1019 (see FIG. 10G) of a cable retention plate 1009 (see FIG. 10G).

Figure 10F:
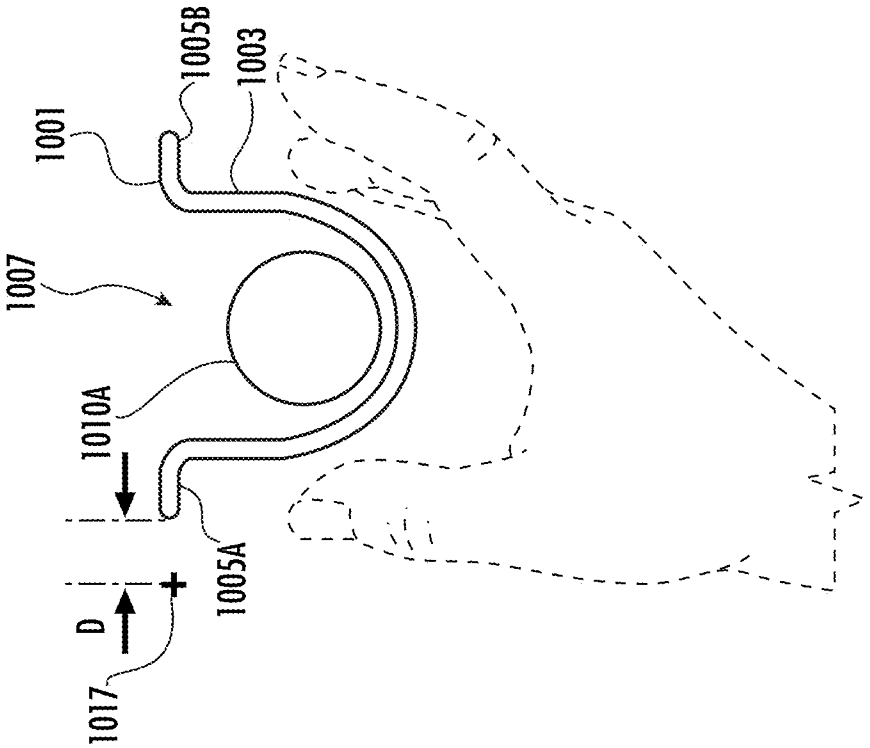
FIG. 10F is a schematic, top view illustrating the cable retention clip of FIG. 10A where the cable retention clip is in a compressed state, in accordance with some embodiments discussed herein.
Figure 10E:
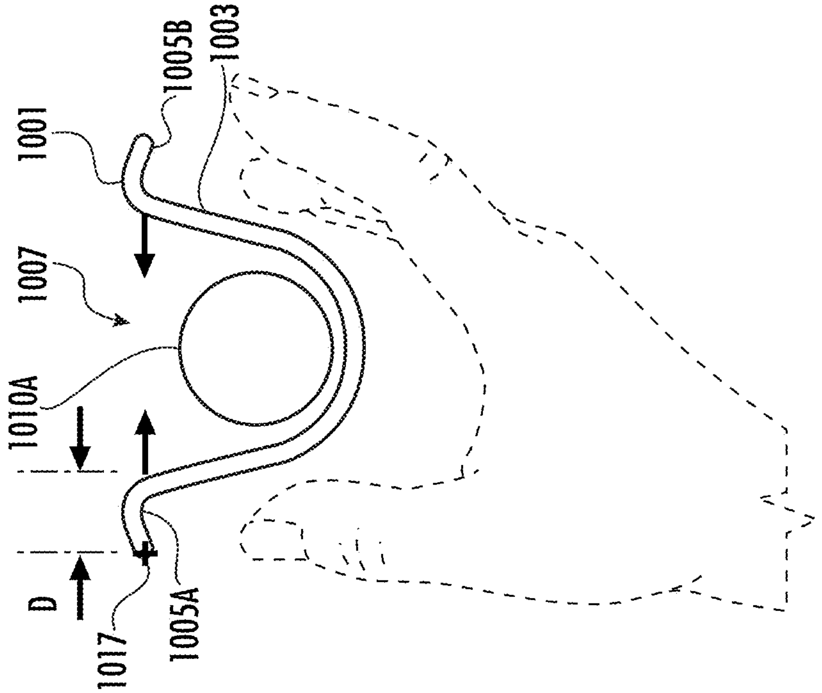
FIG. 10E is a schematic, top view illustrating the cable retention clip of FIG. 10A where the cable retention clip is in an uncompressed state, in accordance with some embodiments discussed herein.

The cable retention clip 1001 may be configured to move from a compressed state to an uncompressed state and vice versa. FIG. 10E illustrates the cable retention clip 1001 of FIG. 10A where the cable retention clip 1001 is in an uncompressed state, and FIG. 10F illustrates the cable retention clip 1001 of FIG. 10A where the cable retention clip 1001 is in a compressed state.

The cable retention clip 1001 may be configured to receive the application of a pinching force on the body 1003. The cable retention clip 1001 may remain in an uncompressed state as illustrated in FIG. 10F when no pinching force is applied to the cable retention clip 1001, and the cable retention clip 1001 may move to a compressed state as illustrated in FIG. 10E when a pinching force is applied to the cable retention clip 1001. In some embodiments, the cable retention clip 1001 may be configured to be attached to a cable retention plate 1009 (see FIG. 10G) solely by applying the pinching force, and the attachment may be accomplished without the need for any additional tools.

The cable retention clip 1001 may be sized so that the first clip tab 1005A and the second clip tab 1005B are configured to be inserted into the apertures 1011 (see FIG. 10G) when the cable retention clip 1001 is in the compressed state. By compressing the cable retention clip 1001, the first clip tab 1005A and the second clip tab 1005B may align with apertures 1011. The, the first clip tab 1005A and the second clip tab 1005B may be inserted into apertures 1011 while pinching force is being applied to the body 1003 of the cable retention clip 1001. By contrast, when the cable retention clip 1001 is in an uncompressed state, the first clip tab 1005A and the second clip tab 1005B may not be configured to be inserted into the apertures 1011. In the uncompressed state, the first clip tab 1005A and the second clip tab 1005B may not align with apertures 1011, so the first clip tab 1005A and the second clip tab 1005B may not be inserted into the apertures 1011.

Once the cable retention clip 1001 is compressed so that the first clip tab 1005A and the second clip tab 1005B are aligned with the apertures 1011, the first clip tab 1005A and the second clip tab 1005B can be inserted into the apertures 1011. Once the first clip tab 1005A and the second clip tab 1005B have extended past the cable retention plate 1009, a user may release any pinching force being applied to the cable retention clip 1001. This may cause the cable retention clip 1001 to expand, with the first clip tab 1005A and the second clip tab 1005B being retained behind the cable retention plate 1009. Thus, the cable retention clip 1001 may be attached to the cable retention plate 1009.

The cable retention clip 1001 may comprise flexible material in some embodiments. This material may allow the cable retention clip 1001 to elastically deform so that the tabs 1005A, 1005B may be fit into the apertures 1011. In some embodiments, the cable retention clip 1001 may be configured to deflect elastically from an uncompressed state to a compressed state, and a point on the cable retention clip 1001 may shift a distance D as the cable retention clip 1001 moves from an uncompressed state to a compressed state. This deflection is demonstrated in FIGS. 10E and 10F, with a point 1017 on the cable retention clip 1001 shifting a distance D as the cable retention clip 1001 moves from an uncompressed state to a compressed state. In some embodiments, the cable retention clip 1001 may be configured to accomplish 30% deflection through elastic bending (where the distance D is at least 30% of the distance from the extreme tip of the tab 1005A to the extreme tip of the tab 1005B). However, the amount of deflection may vary in other embodiments. The actual distance D may vary depending on the size, geometry, and material used for the cable retention clip 1001.

Figure 10G:
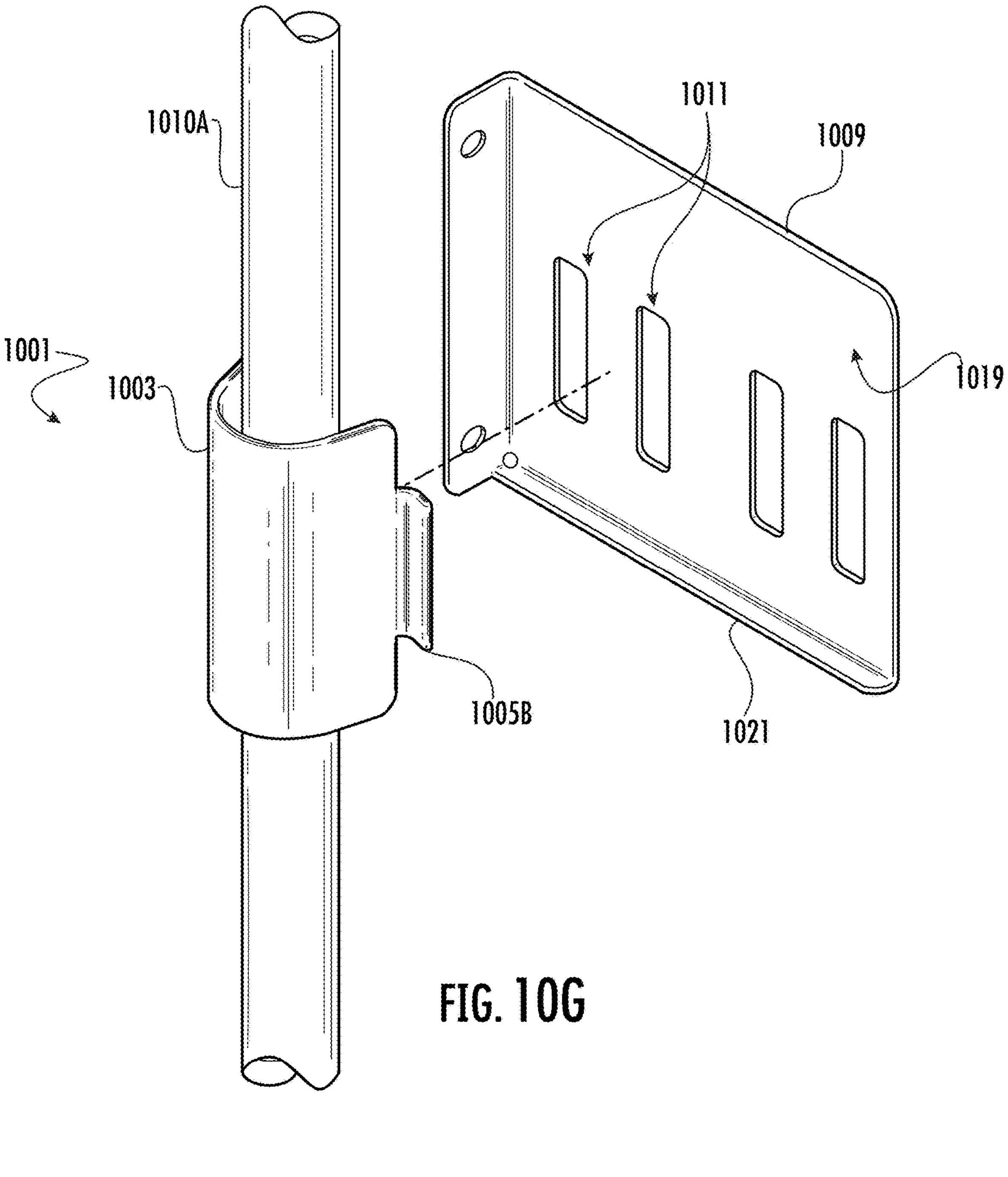
FIG. 10G is an exploded, perspective view illustrating an example cable strain relief system for the retention of fiber optic cables including the cable retention clip of FIG. 10A and an example cable retention plate, in accordance with some embodiments discussed herein.
Figure 10H:
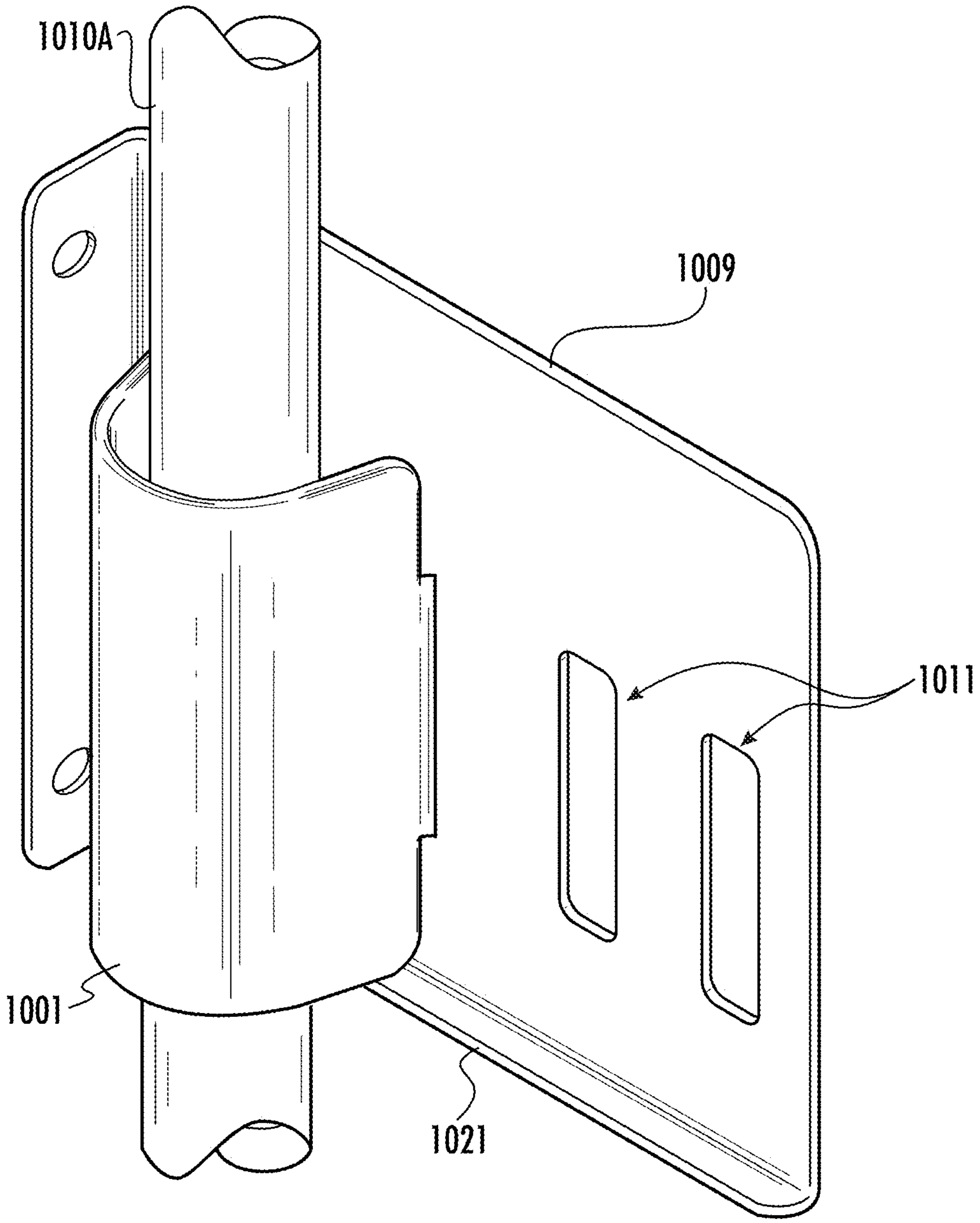
FIG. 10H is a perspective view illustrating the example cable strain relief system of FIG. 10G where the cable retention clip is attached to the cable retention plate, in accordance with some embodiments discussed herein.
Figure 10I:
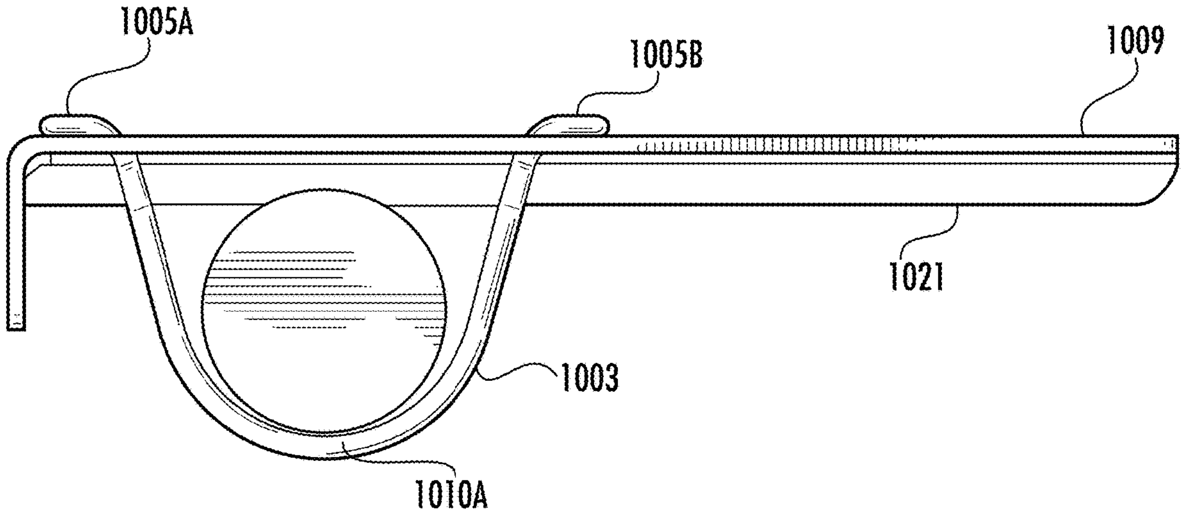
FIG. 10I is a top view illustrating the example cable strain relief system of FIG. 10G, in accordance with some embodiments discussed herein.

The cable retention plate 1009 and the cable retention clip 1001 may work together to form a cable strain relief system. FIG. 10G is an exploded, perspective view illustrating an example cable strain relief system for the retention of primary input cables 1010A including the cable retention clip 1001 of FIG. 10A and an example cable retention plate 1009. Additionally, FIGS. 10H and 10I are a perspective view and a top view respectively illustrating the example cable strain relief system of FIG. 10G where the cable retention clip 1001 is attached to the cable retention plate 1009.

A cable retention plate 1009 may be provided, and the cable retention plate 1009 may include a mounting surface 1019, and the mounting surface 1019 may include a plurality of apertures 1011. The cable retention plate 1009 may also include a friction element 1021. A cable retention clip 1001 may also be provided having the same features as the cable retention clip illustrated in FIGS. 10A-10F. The cable retention clip 1001 may have a first clip tab 1005A and the second clip tab 1005B, and these clip tabs 1005A, 1005B may be configured to be received within an aperture 1011. A fiber optic cable 1010A may be provided. The fiber optic cable 1010A may be inserted into the recess 1007 defined by the body 1003 and retained in the recess 1007 when the clip tabs 1005A, 1005B are received within apertures 1011. This fiber optic cable 1010A may define an axial direction extending along the length of the fiber optic cable 1010A. When the cable retention clip 1001 is attached to the cable retention plate 1009 and the fiber optic cable 1010A is provided between the cable retention clip 1001 and the cable retention plate 1009, the friction element 1021 may contact an outer sheathing of the fiber optic cable 1010A to provide strain relief to the fiber optic cable 1010A and to prevent the fiber optic cable 1010A from shifting axially relative to the cable retention plate 1009. The body 1003 and the friction element 1021 may be configured to contact the fiber optic cable 1010A in the recess 1007 when the at least one tab 1005A, 1005B is received within the at least one aperture 1011. In the depicted embodiment, the friction element 1021 is a flange or lip extending outward from the cable retention plate 1009. The flange or lip may extend substantially perpendicularly to the cable retention plate 1009. Alternatively, the flange or the lip of the friction element 1021 or may be angled in a cable routing direction, such that additional friction is applied when the fiber optic cable is pulled in the strain relieved direction. Other friction elements are also contemplated including one or more ridges or bumps disposed on the cable retention plate 1009 and/or the internal surface of the cable retention clip 1001. The fiber optic cable 1010A may extend along an axis, and the cable strain relief system may prevent the fiber optic cable 1010A from shifting along the axis (e.g. up and down in FIG. 10G). Thus, the system may provide strain relief to the fiber optic cable 1010A. A portion of the axial strain applied to the fiber optic cable 1010A may be transferred to the outer sheathing 227A (see FIG. 2A) of the fiber optic cable 1010A. However, the fiber optic cable 1010A may be configured so that axial strain does not transfer to internal fiber optic cables or optical fibers. Additionally, the fiber optic cable 1010A may substantially resist movement while also allowing for some elastic deformation of the outer sheathing 227A.

Figure 10J:
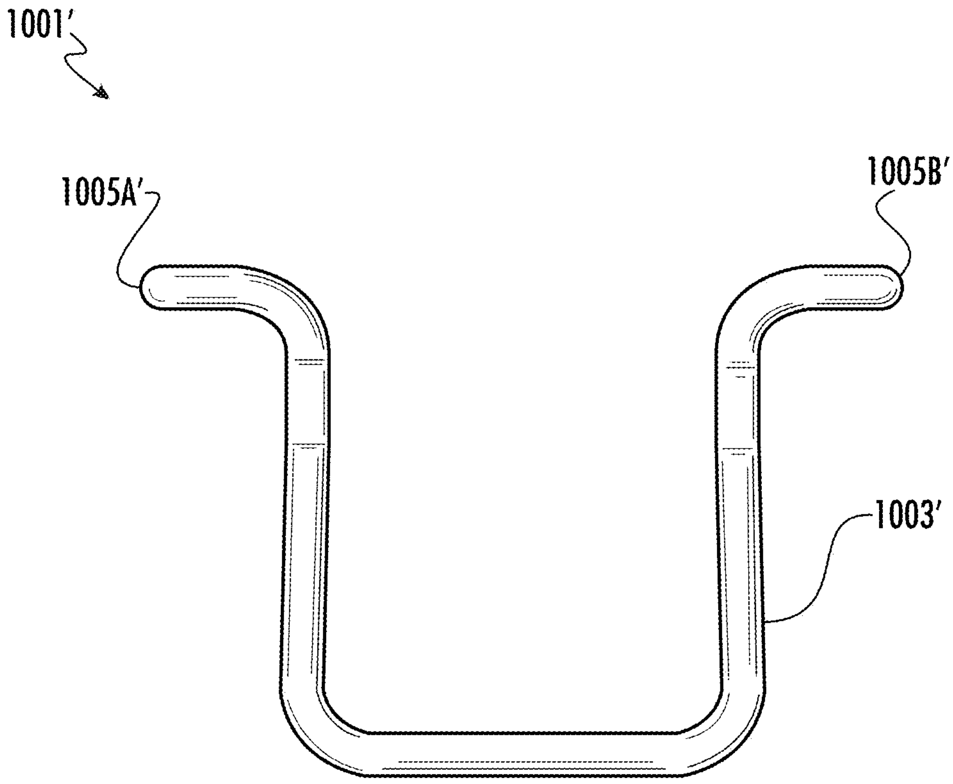
FIG. 10J is a top view illustrating another example cable retention clip, in accordance with some embodiments discussed herein.

The cable retention clip may be provided in a variety of shapes, and the shape of the cable retention clip is not limited to the shape of the cable retention clip 1001 illustrated in FIGS. 10A-10D. FIG. 10J provides an example of another example cable retention clip 1001'. In this embodiment, the body 1003' of the cable retention clip 1001' largely consists of flat surfaces and fillets so that the body 1003' generally possesses a rectilinear shape. However, a V-shape, a U-shape, a rectilinear shape, and other shapes may be used for the body 1003' and the cable retention clip 1001'.

Figure 11A:
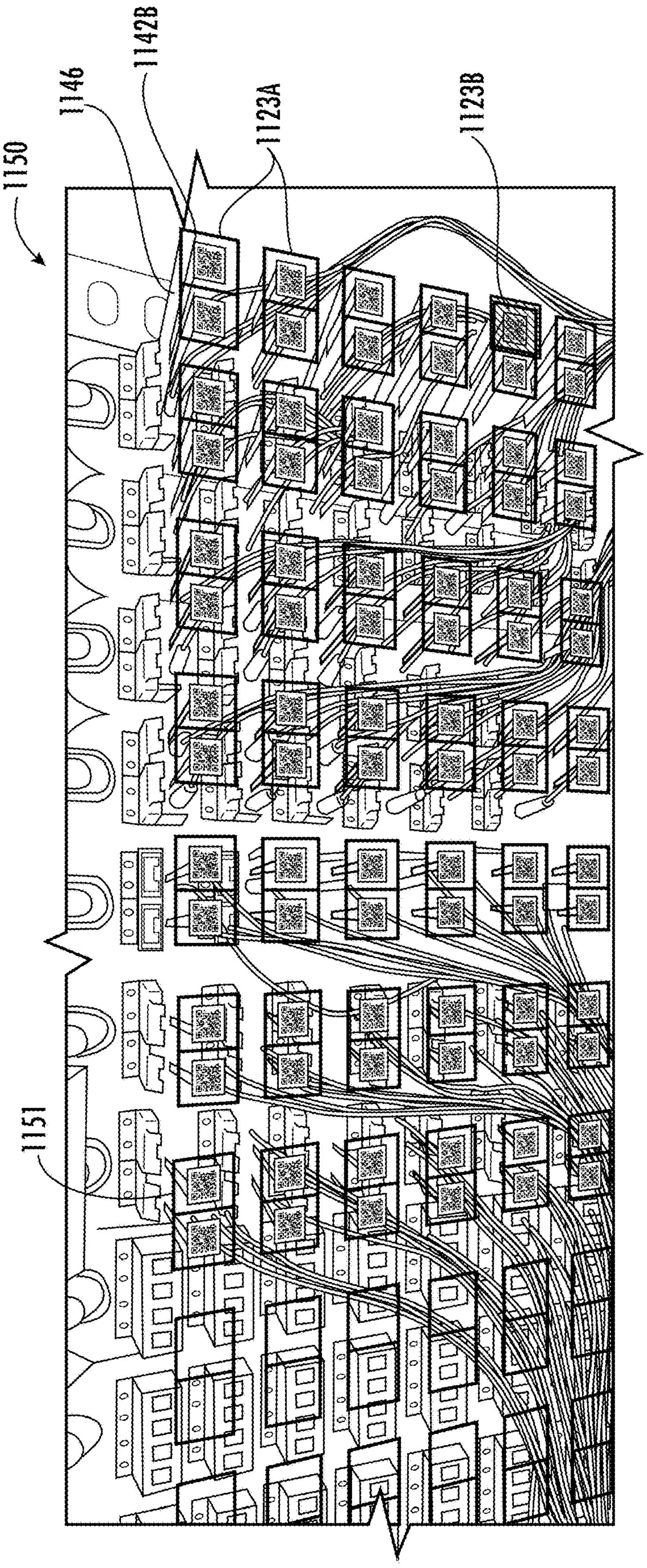
FIG. 11A is a perspective view illustrating an example search matrix that may be displayed to assist in identifying a specific port, in accordance with some embodiments discussed herein.
Figure 11B:
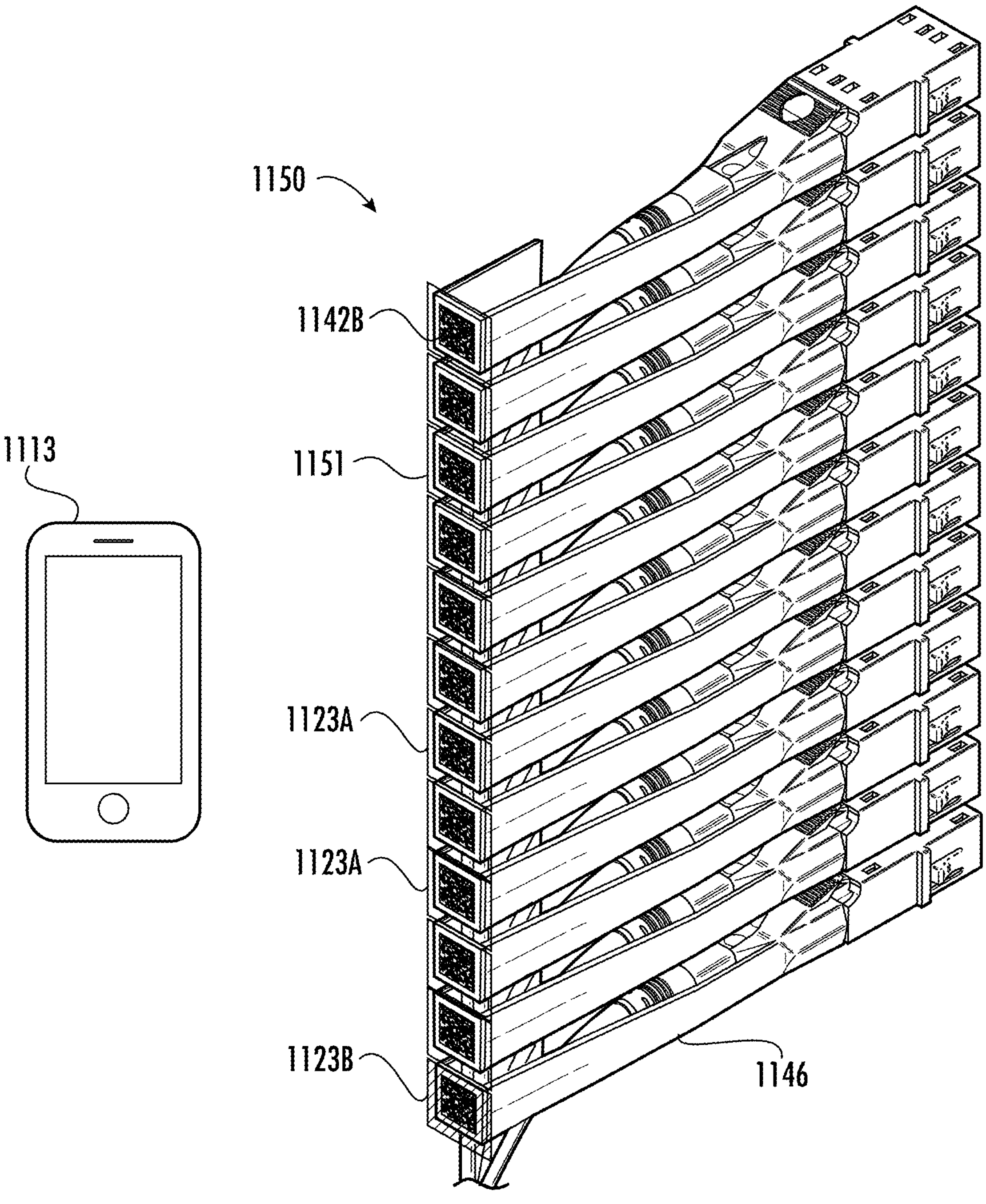
FIG. 11B is a perspective view illustrating another example search matrix that may be displayed to assist in identifying a specific port, in accordance with some embodiments discussed herein.

In some embodiments, a user may be guided to the correct installation port for installation of a connector. In some embodiments, the user may be guided through various instructions, such as, via text, mixed reality guidance using, for example, mixed reality glasses or a camera (e.g., on a mobile device), audible instructions, visual instructions, or any combination thereof. Example mixed reality guidance may be provided through the presentation of a search matrix 1150 to the user. FIG. 11A is a perspective view illustrating an example search matrix 1150 that may be displayed to assist in identifying a specific port or connector. FIG. 11B is a perspective view illustrating another example search matrix 1150 that may be displayed to assist in identifying a specific port or connector where only a single column of transformable brackets 1146 are illustrated.

As illustrated in FIG. 11A, a search matrix 1150 may be presented to a user showing the various positions of installation ports, transformable brackets 1146, and/or transformable bracket identifiers 1142B. The search matrix 1150 provided may identify a bounding area 1151 where installation ports are likely to be located by providing outlined boxes as illustrated in FIG. 11A. The search matrix 1150 may also emphasize certain positions in the search matrix 1150 by providing one or more emphasizing indicators 1123B. This is done in FIG. 11A by changing the color of a bounding area 1151 that is overlaid onto the correct installation port relative to the other bounding areas 1151. Where a bounding area 1151 is not being emphasized, a deemphasizing indicator 1123A may be provided at the bounding area 1151. In some embodiments, this deemphasizing indicator 1123A may be provided by leaving a bounding area 1151 unchanged and highlighting other bounding areas 1151. The search matrix 1150 may be created by scanning an anchor label identifier 342D (see FIG. 3C) located somewhere proximate to the panel 314 (see FIG. 3C) and extracting equipment information that may identify the installation port locations. In some embodiments, the search matrix 1150 may be presented to a user, and an example of this is illustrated in FIG. 11A. However, in other embodiments, the search matrix 1150 may not be presented to the user, and the search matrix 1150 may only be used by the system to identify a correct installation port or another component. Where the search matrix 1150 is not presented to the user, the system may be configured to prompt the user with text 1161 (see FIG. 11E) or an image identifying the installation port or appropriate equipment location.

A search matrix 1150 may be generated based on the equipment information and the location of at least one anchor label identifier 342D (see FIG. 3C). As depicted in FIG. 11A, each search matrix 1150 may include one or more bounding areas 1151 offset from the anchor label identifier 342D. Each of the bounding areas 1151 may define an area in which a port identifier is likely to be located, such as on a dust cap, an adapter, a transformable bracket, or the like. More particularly, the bounding areas 1151 define target locations for the machine vision system to search for an identifier. In some example embodiments, the search matrix 1150 may include the full area of a fiber optic cable apparatus 100 (see FIG. 1D), a shelf 112 (see FIG. 1D), panel 114 (see FIG. 1D), or the like. In other example embodiments, the search area may include a row or column associated with one or more fiber optic cable apparatuses 100 (see FIG. 1D), shelves 112 (see FIG. 1D), panels 114 (see FIG. 1D), or the like. In the depicted embodiment, the search matrix 1150 includes bounding areas 1151 extending within a single panel in eighteen columns and in six rows. However, the search matrix 1150 may be provided for multiple panels at a single time, and the search matrix 1150 may be provided for a larger number of rows and columns. The search matrix 1150 and bounding areas 1151 may be displayed on a I/O interface, such as an augmented reality overlay. The user may move the image capture device (e.g. 1113, FIG. 11D) about the presented identifiers (e.g. 1142B, FIG. 11A) to verify the components associated with the identifiers, as described below. In some embodiments, the search matrixes 1150 may utilize multiple anchor labels 342D (see FIG. 3C) to limit drift of the bounding areas 1151 as the distance from the anchor label 342D increases. For example, the search matrixes 1150 may utilize multiple anchor labels 342D associated with the shelf 112 (see FIG. 1D) to prevent drift of bounding areas 1151 farther from one corner or the other of the shelf 112 (see FIG. 1D). Additionally or alternatively, the anchor labels 342D associated with the panels 114 or anchor labels 342D associated with other components may also be utilized as the primary anchor label or to limit drift. Similar to the bounding areas 1151 utilized for connectors or installation ports, bounding areas may also be utilized for panel locations, or other equipment.

Figure 11C:
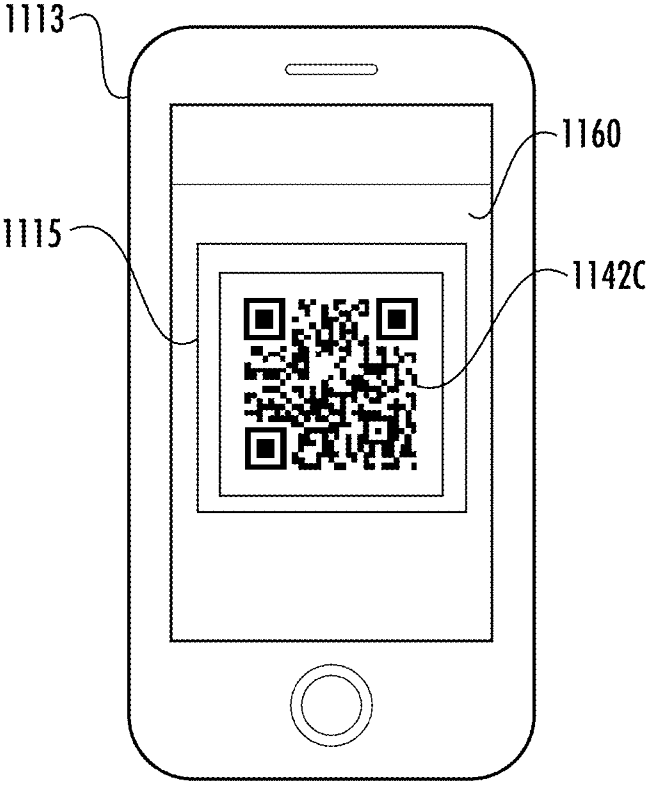
FIG. 11C is a schematic view illustrating an example image capture device configured to capture an identifier, in accordance with some embodiments discussed herein.
Figure 11D:
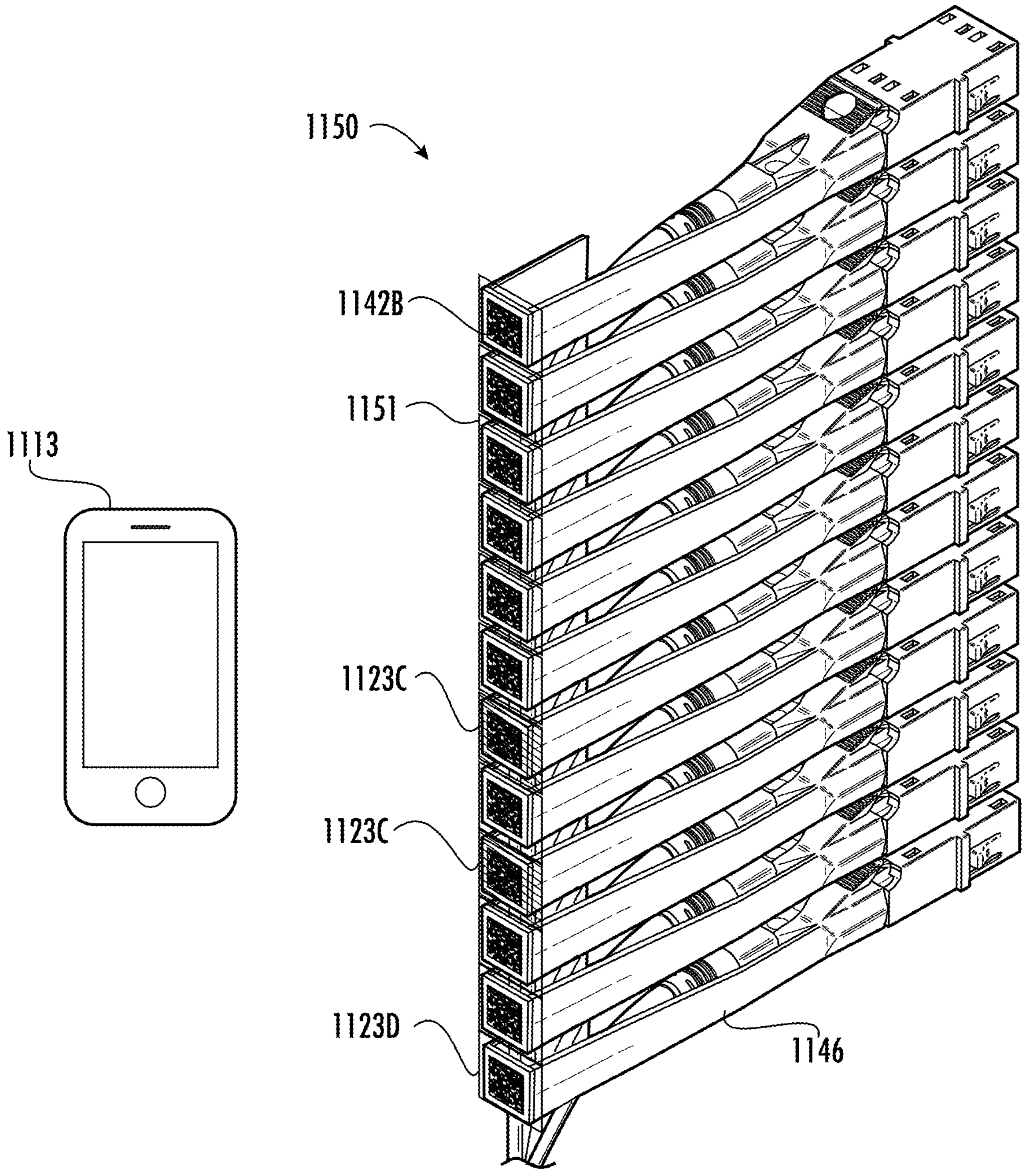
FIG. 11D is a perspective view illustrating another example search matrix that may be displayed to assist in identifying fiber optic connectors that are correctly or incorrectly installed, in accordance with some embodiments discussed herein.

Once the search matrix 1150 is generated, the search matrix 1150 may be persistent, e.g. utilized and/or displayed regardless of whether the anchor label 342D is within the image presented on an image capture device (e.g. 1113, FIG. 11D). The machine vision system may utilize one or more sensors, such as microelectromechanical system (MEMS) sensors, to determine relative movement of the image capture device (e.g. 1113, FIG. 11D) in reference to the fiber optic cable apparatus 100 (see FIG. 1D), shelves 112 (see FIG. 1D), panels 114 (see FIG. 1D), anchor labels 342D (see FIG. 3C), or the like. The relative movement of the image capture device (e.g. 1113, FIG. 11D) may, in turn, be used to determine the placement of the search matrix 1150. Additionally or alternatively, the machine vision system may compute position relationship between multiple images that one or more points, or objects, in common. For example, the machine vision system may utilize Visual-Inertial Odometry (VIO) algorithms, Simultaneous Location and Mapping (SLAM) algorithms, or other suitable methods.

In some embodiments, a search matrix 1150 may be generated based on the equipment information and a location of the anchor label 342D (see FIG. 3C). The search matrix 1150 may comprise one or more search matrix locations comprising bounding areas 1151 defining target locations of a plurality of installation ports disposed on the communication equipment. Each of the bounding areas 1151 may be disposed at a predetermined offset from the location of the anchor label 342D (see FIG. 3C).

The creation and use of the search matrix 1150 may be beneficial in several respects. The search matrix 1150 may permit bounding areas 1151 to be identified. Thus, to locate identifiers, a smaller area may need to be examined, and this may reduce the computational load. The system may look for identifiers in only the predetermined bounding areas 1151 of the search matrix 1150, and the system may not need to search for identifiers in areas outside of the predetermined bounding areas 1151 of the search matrix 1150. Because the use of the search matrix 1150 reduces the computational load, the time for installation may be reduced and the error rates may also be reduced. Additionally, because the system is searching for identifiers in the bounding areas 1151, the resulting associations may have a lower error rate that systems that scan a panel or multiple ports and derive port locations associated with labels.

FIG. 11B shows another example search matrix 1150 that may be presented to a user. As illustrated, a bounding area 1151 adjacent to the bottom transformable bracket identifier 1142B may be emphasized with an emphasizing indicator 1123B, and a deemphasizing indicator 1123A may be provided for other bounding areas 1151 within the search matrix 1150. Thus, a user may be led to the emphasizing indicator 1123B. An image capture device 1113 may be used to capture an identifier of the transformable bracket identifiers 1142B. The image capture device 1113 may also be used to capture other identifiers associated with the cable 510A" (see FIG. 5L). Based on the identifier(s), processing circuitry within the image capture device 1113 or within an additional device 1127' may identify a correct installation port 436A (see FIG. 4C) within an adapter 424 (see FIG. 4C) on a panel for inserting the fiber optic connector. The correct installation port may be determined by capturing a cable identifier associated with a fiber optic cable and/or by capturing a port identifier (e.g. a transformable bracket identifier 1142B, a dust cap identifier 1142A), extracting information from the identifier(s), and then retrieving from memory the correct installation port that the fiber optic cable should be installed in or the correct port identifier that the cable identifier is associated with.

Various image capture devices may be used to receive identifiers. FIG. 11C is a schematic view illustrating an example image capture device 1113 configured to receive an identifier. In FIG. 11C, the image capture device 1113 is provided in a mobile phone. However, the image capture device 1113 may be provided in a tablet, a headset, a wearable, smart glasses, a smart watch, a camera, a computer, or in another device. The image capture device 1113 may present a guide area 1115 to the user to assist the user in properly aligning the image capture device 1113 on the desired target. In the illustrated embodiment in FIG. 11C, the image capture device 1113 is being used to receive a fiber optic connector identifier 1142C provided on a fiber optic connector 1160. However, the image capture device 1113 could be similarly used to receive other identifiers such as a dust cap identifier 442A, a transformable bracket identifier 442B, an identifier associated with a first part 842B (see FIG. 8J) or a second part 842B' (see FIG. 8J) of a transformable bracket, an identifier associated with an MPO connector housing, etc.

Processing circuitry within the image capture device 1113 or processing circuitry within an additional device may receive a fiber optic connector identifier 1142C and, based on the received identifier, determine an installation port where the fiber optic connector should be properly installed. This determination may be completed using a search matrix 1150 and one or more transformable bracket identifiers 1142B. For example, using equipment information, a search matrix 1150 may be formed with several bounding areas 1151. The bounding areas 1151 may provide target areas where relevant identifiers (e.g. the transformable bracket identifiers 1142B) are likely to be located. An image capture device may search within the bounding areas 1151 to locate the transformable bracket identifier 1142B. A list of proper combinations of identifiers may be stored in memory, and the processing circuitry may determine the appropriate transformable bracket identifier 1142B based on the fiber optic connector identifier 1142C. The search matrix 1150 may be displayed to a user, and, once the appropriate transformable bracket identifier 1142B is located, the bounding area 1151 overlaid onto the transformable bracket identifier 1142B may be emphasized with an emphasizing indicator as illustrated in FIGS. 11A-11B.

In some embodiments, an anchor label identifier 342D (see FIG. 3C) may be utilized. While the anchor label identifier 342D is provided on a panel 314 in the illustrated embodiment of FIG. 3C, the anchor label identifier 342D may be provided at other locations, such as on a part of the housing 100A (see FIG. 1D), on an extension that protrudes from the panel 314, or at another location. The anchor label identifier 342D may be configured to be scanned so that useful equipment information may be extracted. This equipment information may include serial number, model number, number of panels, configuration or spacing of panels, number of installation ports, configuration of installation ports, or other suitable information. In some examples, equipment information extracted from the anchor label identifier 342D may be utilized to assist in the formation of a search matrix 1150. Bounding areas 1151 within the search matrix 1150 may be developed using the equipment information. Once the search matrix 1150 is formed, an image capture device may search for a transformable bracket identifier within the bounding area search matrix 1150. An identifier associated with the fiber optic cable may be scanned, and processing circuitry may determine the bounding area 1151 within the search matrix 1150 associated with the correct installation port. This may be done by extracting information from the identifier associated with the cable. The extracted information may be associated with a correct installation port in memory, and processing circuitry may retrieve an indication of the correct installation port from memory. Once retrieved, the processing circuitry may be configured to emphasize the correct installation port within the search matrix 1150. However, in other embodiments, no anchor label identifier 342D is used to form a search matrix 1150, and the search matrix 1150 may instead be formed using "dynamic anchor label identifiers", such as dust cap identifiers 542A and/or transformable bracket identifiers 542B. The identification of anchor label identifiers 342D and other identifiers may be made using a computer vision-based object recognition algorithm, for example. The predicted locations of installation ports identified by the search matrix 1150 may be determined relative to the location of the anchor label identifier 342D.

Anchor label identifiers 342D may be dedicated identifiers provided on a panel or other equipment. Alternatively, the anchor label identifier 342D may be provided as a dynamic anchor label identifier that is associated with the equipment, such as a connector or dust cap. For example, once a dust cap or an adapter has been installed in an installation port, the dust cap identifier 542A or an identifier associated with the adapter or a transformable bracket may become a dynamic anchor label identifier. Thereafter, each additional identifier that is associated with the anchor label identifier or the dynamic anchor label identifier may become another dynamic anchor label identifier. Once multiple anchor label identifiers are provided, some of the anchor label identifiers may be removed, moved, obscured, or reassociated without adversely impacting the search matrix 1150.

In some embodiments, a dust cap 538 may initially be provided in an installation port 436A (see FIG. 4C), and the dust cap 538 may have a dust cap identifier 542A. This dust cap identifier 542A may be associated with a particular installation port 436A. A transformable bracket (e.g. 546, FIG. 5C) may be provided alongside the dust cap 538, with the transformable bracket 546 attached to dust cap 538. However, in some embodiments, the transformable bracket 546 may initially be separated from the dust cap 538, and a user may selectively attach the transformable bracket 546 to the dust cap 538. The transformable bracket 546 may have a transformable bracket identifier 542B. The transformable bracket identifier 542B and the dust cap identifier 542A may both be captured by an image capture device, and processing circuitry (within the image capture device or elsewhere) may be configured to associate the transformable bracket identifier 542B and the dust cap identifier 542A within memory. This association may be done by associating information extracted from the two identifiers. The attachment of the transformable bracket 546 to the dust cap 538 may obscure the dust cap identifier 542A for an user, so the association of the transformable bracket identifier 542B with the dust cap identifier 542A may allow the particular transformable bracket identifier 542B to easily identify a specific transformable bracket 546, a specific dust cap 538, and a specific installation port 436A.

Once a user wishes to install a fiber optic cable within an installation port 436A, the transformable bracket 546 may be removed from the dust cap 538, and the dust cap 538 may be removed from the installation port 436A. The fiber optic cable (and associated connectors) may have an associated identifier (e.g. fiber optic connector identifiers 1142C, FIG.

11C), and the identifier 1142C associated with the fiber optic cable may be scanned and associated with the transformable bracket identifier 542B. By doing so, simply capturing the transformable bracket identifier 542B and extracting information therefrom may reveal an association with the fiber optic cable to be attached. This may be beneficial, as the cable identifier 1142C may potentially be obscured by other fiber optic cables or other objects. The transformable bracket 546 may then be selectively attached to the fiber optic cable.

Systems and methods are also contemplated for identifying fiber optic connectors that are correctly or incorrectly installed. FIG. 11D is a perspective view illustrating another example search matrix 1150 that may be displayed to assist in identifying fiber optic connectors that are correctly or incorrectly installed. As illustrated, a search matrix 1150 may be provided, and the various bounding areas 1151 within the search matrix 1150 may include a negative indicator 1123C or a positive indicator 1123D. Negative indicators 1123C may be presented when a determination has been made that a fiber optic connector is installed in an incorrect position, and positive indicators 1123D may be presented when a determination has been made that a fiber optic connector is installed in a correct position. Negative indicators 1123C and positive indicators 1123D may be color coded in some embodiments. For example, negative indicators 1123C may be presented in red highlighting and positive indicators 1123D may be presented in green highlighting, but the negative indicators 1123C and the positive indicators 1123D may be provided in other colors or forms as well. In some embodiments, blue highlighting may be provided to indicate a new association, but other colors or forms may be used in some embodiments. The indicators 1123C, 1124D may also be provided through text or shape indicators. Processing circuitry within the image capture device 1113 or processing circuitry within an additional device may receive identifiers associated with a fiber optic connector and, based on the received identifiers, determine whether the fiber optic connector has been installed in the correct port. This determination may be completed using one or more received transformable bracket identifiers 1142B. A list of proper combinations of identifiers may be stored in memory, and the processing circuitry may determine if the fiber optic connector is in the correct position based on the identifiers. Once the determination is made, a negative indicator 1123C or a positive indicator 1123D may be provided at the bounding area 1151 overlaid onto the transformable bracket identifier 1142B as illustrated in FIG. 11D.

Figure 11E:
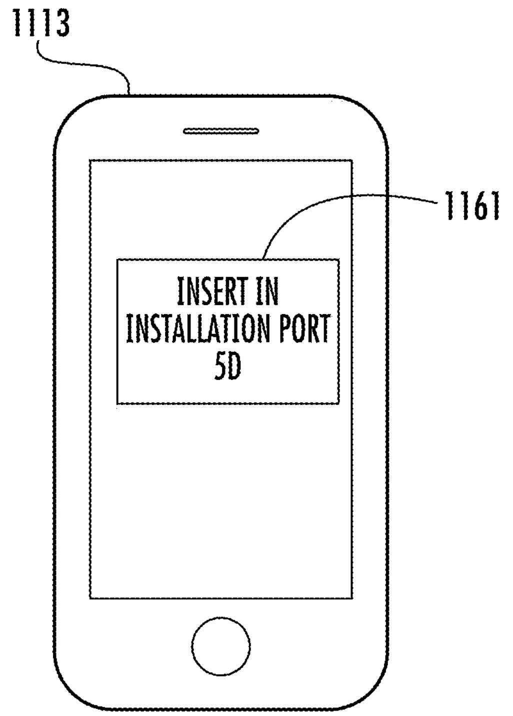
FIG. 11E is a schematic view illustrating an example image capture device configured to provide guidance to a user, in accordance with some embodiments discussed herein.

FIG. 11E is a schematic view illustrating an example image capture device 1113 providing guidance to a user. In this embodiment, guidance is provided by presenting text 1161 to the user. The text 1161 may instruct the user to install a cable in a specific installation port. The installation ports may be labelled so that they can be easily distinguished. For example, installation ports may be labelled to indicate their row and column (e.g. 5D, 3A, 7C, etc.). Alternatively, numerical labels may be used to distinguish the installation ports (e.g. port 1, 2, . . . 144, etc.). The text 1161 may include the relevant label for an installation port to guide the user to that installation port. This guidance may be presented to the user instead of or in addition to other guidance. For example, in some embodiments, an emphasizing indicator 1123B may be provided alongside text 1161.

Figure 12:
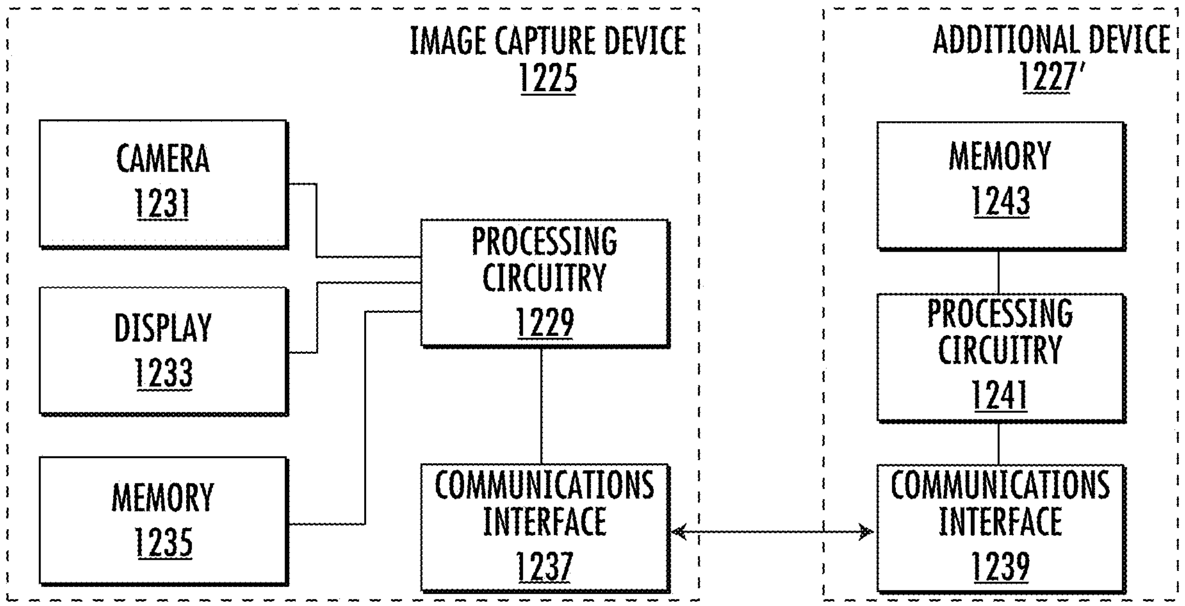
FIG. 12 is a block diagram illustrating an example image capture device that may assist in guiding a user as he or she is selectively securing fiber optic cables, in accordance with some embodiments discussed herein.

FIG. 12 is a block diagram illustrating an example image capture device 1225 that may assist in guiding a user as he or she is attaching cables. The image capture device 1225 may include processing circuitry 1229, a camera 1231, a display 1233, memory 1235, or a communications interface 1237. The camera 1231 may be used to receive pictures, including but not limited to pictures of dust cap identifiers 542A (see FIG. 5A), transformable bracket identifiers 1142B (see FIG. 11B), fiber optic connector identifiers 1142C (see FIG. 11C), etc. Information and identifiers may also be received at the communications interface 1237 from an additional device 1227' or from another device. Information and identifiers may be stored in memory 1235 within the image capture device 1225, but the information and identifiers may also be stored in memory 1243 at the additional device 1227'. In some embodiments, the identifiers themselves may not be stored in memory—instead, information extracted from the identifier may be saved in memory. For example, the association of a search matrix location associated with a particular port and the connector associated with the identifier may be stored to memory. The display 1233 within the image capture device 1225 may present pictures and other information to the user to assist the user in capturing picture. The display 1233 may also present menus and enable a user to retrieve identifiers and information from the memory 1235.

The processing circuitry 1229 within the image capture device 1225 and/or the processing circuitry 1241 within the additional device 1227' may be configured to perform various operations. For example, the processing circuitry 1229 and/or processing circuitry 1241 may develop and cause the presentation of a search matrix 1150 on the display 1233. Additionally, the processing circuitry 1229 and/or processing circuitry 1241 may provide emphasizing indicators 1123B at positions on the search matrix 1150 where a fiber optic connector should be installed, and the processing circuitry 1229 and/or processing circuitry 1241 may provide deemphasizing indicators 1123A at positions on the search matrix 1150 where a fiber optic connector should not be installed. The processing circuitry 1229 and/or processing circuitry 1241 may also determine where fiber optic connectors are correctly installed and where they are incorrectly installed, and the processing circuitry 1229 and/or processing circuitry 1241 may assign a negative indicator 1123C or a positive indicator 1123D based on the determination.

The image capture device 1225 may be used to initiate an application, and the application may include an augmented reality (AR) based label scanning software in some embodiments. In some embodiments, the image capture device 1225 may include a high-resolution scanning application that is linked to an AR based application. A 2D barcode scanner of the image capture device 1225 may be used to receive the identifier in some embodiments.

In some embodiments, an additional device 1227' may be used in addition to the image capture device 1225. The additional device 1227' may be used to perform some or all of the processing, or the additional device 1227' may be used to retain information within memory 1243. The additional device 1227' may include a communications interface 1239, and the communications interface 1239 may communicate with the communications interface 1237 of the image capture device 1225. This communication may occur through a wired connection (e.g. an ethernet connection) and/or a wireless connection. A wireless connection may be provided in a variety of ways, such as through Wi-Fi, BlueTooth, BlueTooth Low Energy (BLE), etc.

Figure 13:
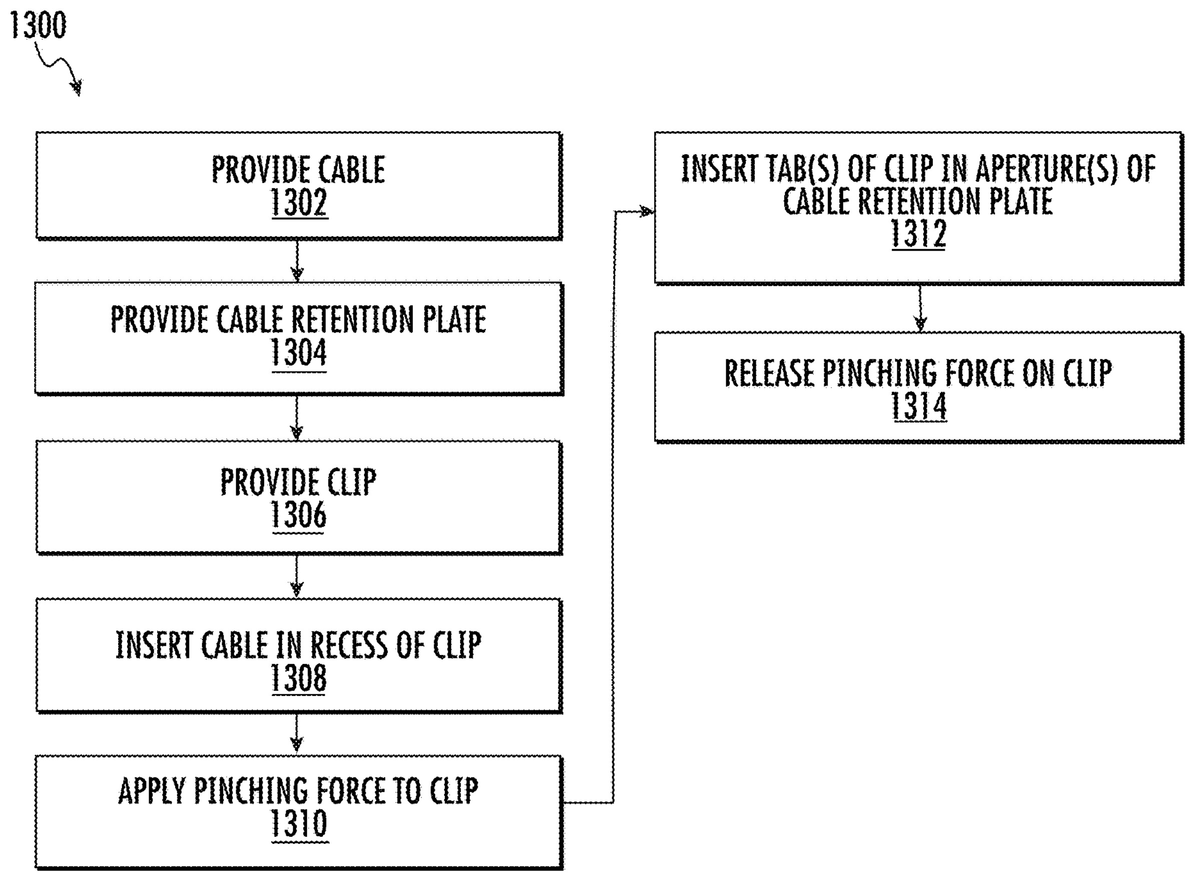
FIG. 13 is a flow chart illustrating an example method for installing a cable strain relief system, in accordance with some embodiments discussed herein.

As discussed above in reference to FIGS. 10A-10J, cable retention clips may be used alongside a cable retention plate to form a cable strain relief system. FIG. 13 is a flow chart illustrating an example method 1300 for installing a cable strain relief system. Various components may be provided for installation. At operation 1302, a fiber optic cable may be provided. At operation 1304, a cable retention plate may be provided. The cable retention plate may have a mounting surface defining at least one aperture and a friction element. In some embodiments, the friction element may be provided on the cable retention clip. At operation 1306, a cable retention clip may be provided. The cable retention clip may have a body defining a concave shape that defines a recess configured to receive the fiber optic cable. The cable retention clip may also include at least one tab extending at an angle from the body.

At operation 1308, the fiber optic cable may be inserted in a recess defined by the cable retention clip. At operation 1310, a pinching force may be applied to the cable retention clip. This pinching force may, for example, be applied at the body of the cable retention clip, causing the cable retention clip to shift to a compressed state. In this compressed state, tabs of the cable retention clip may align with apertures in the cable retention plate. At operation 1312, tabs may be inserted in the apertures of the cable retention plate. At operation 1314, the pinching force being applied to the cable retention clip may be released. This may leave the tabs secured behind the cable retention plate and result in attachment of the cable retention clip to the cable retention plate.

After the tabs have been received within the apertures and after the pinching force on the body of the cable retention clip has been released, the body and the friction element may be configured to contact the fiber optic cable in the recess. This may prevent the fiber optic cable from shifting along an axis (the axis that the fiber optic cable extends along). This may also reduce wear and tear on the fiber optic cables and their outer sheathing, and this may also make installation easier as fiber optic cables may be made more secure.

Figure 14A:
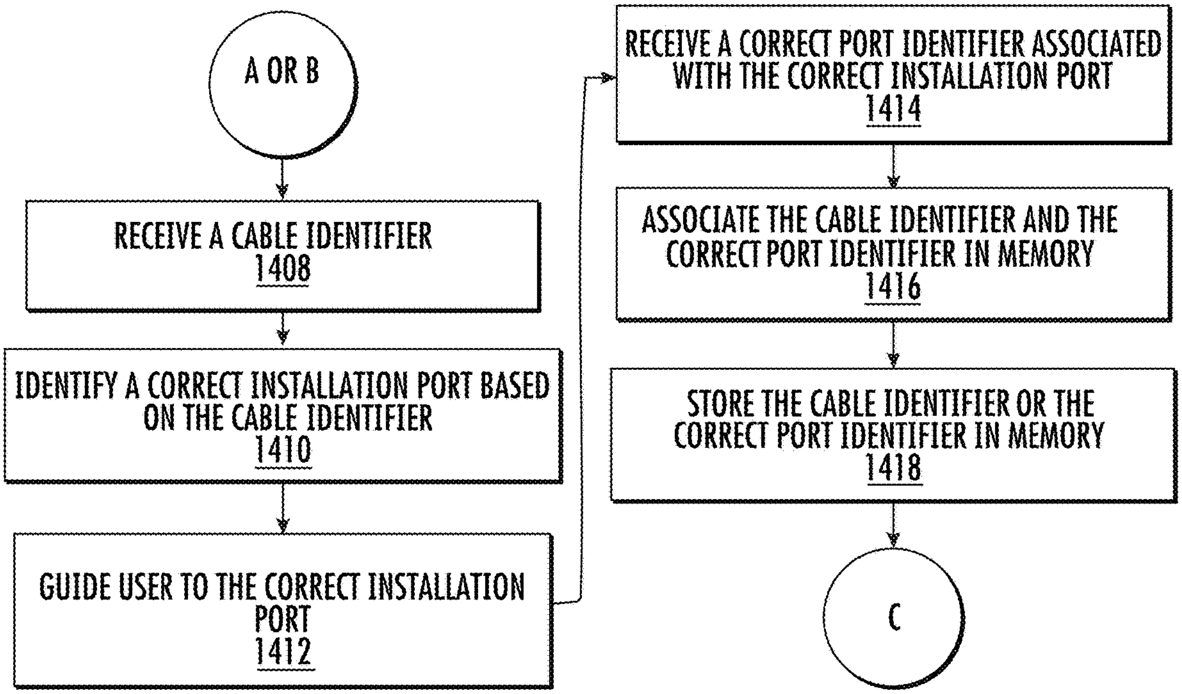
FIG. 14A is a flow chart illustrating an example method for assisting a user in installing a fiber optic cable connection, in accordance with some embodiments discussed herein.

Methods are also contemplated for assisting a user in installing a fiber optic cable connection. FIG. 14A is a flow chart illustrating an example method for assisting a user in installing a fiber optic cable connection.

At operation 1408, a cable identifier may be received. This cable identifier may be associated with a grouping of a plurality of fibers, and the plurality of fibers may be provided in a fiber optic cable. The plurality of fibers may terminate in a fiber optic connector. The cable identifier may, for example, be associated with a primary input cable, a secondary input cable, a tertiary input cable, a primary output cable, a secondary output cable, or a tertiary output cable. However, the cable identifier may be associated with multiple cables or with other sized cables.

At operation 1410, a correct installation port may be identified based on the cable identifier. The correct installation port may be provided on a panel. The panel may include a plurality of installation ports. In some embodiments, the panel may include at least seventy (70) installation ports. The panel may even include one hundred forty four (144) installation ports in some embodiments, and the installation ports may be spaced from each other to permit installation of cables to the installation ports without the need for additional tools, and yet still fit within the volumes and other dimensions noted herein. Processing circuitry may be provided that may identify the correct installation port by distinguishing between at least one hundred forty four (144) different installation ports, but the processing circuitry may be configured to distinguish between an even greater number of installation ports in other embodiments.

In some embodiments, the panel may be formed on a shelf and may be configured to enable connection of a plurality of fiber optic input cables on an input side to redistribute the plurality of the fiber optic input cables into a plurality of fiber optic output cables on an output side. The shelf may be configured to route at least two thousand (2,000) fibers on the input side and at least two thousand (2,000) fibers on the output side within a volume of 20 cubic feet or less. However, in other embodiments, the shelf may have a volume of 15 cubic feet or less, 10 cubic feet or less, or 8.2 cubic feet or less. This density of installation ports within the shelf and the panel may be arranged to still permit toolless installation. With toolless installation, fibers may be attached to installation ports by hand without the need for any installation tools. For example, fiber optic connectors associated with a cable may be attached to an MPO connector housing using a snap fit connection, making additional tools unnecessary.

At operation 1412, a user may be guided to the correct installation port, and the user may then connect the connector based on the guidance. Guidance may be provided on an image capture device or on another device, and the guidance may be provided with a display, smart (e.g., mixed reality) glasses, a phone, a computer, a tablet, etc. Other devices may also be used to provide guidance. This guidance may be provided through various instructions, such as, via text, mixed reality guidance, audible instructions, visual instructions, or any combination thereof. Example mixed reality guidance may include displaying the search matrix 1150 and emphasizing a bounding area 1151 overlaid onto the correct installation port. This may be done by highlighting the bounding area 1151 overlaid onto the correct installation port in a distinct color or providing an outline around the bounding area 1151. Emphasis may also be provided by creating a search matrix 1150 identifying locations of two or more installation ports, providing an identifier for each bounding area 1151 within the search matrix 1150, and emphasizing the identifier for the correct installation port to the user. Emphasis may also be provided in other ways, such as by providing textual instructions, audible instructions, etc.

In other embodiments, fiber optic cables may be configured to be selectively attached within one of a plurality of shelves, and each shelf within the plurality of shelves may have a shelf number. Guiding the user to the correct installation port for installation of the cable may be accomplished by presenting a correct shelf number to the user.

In order to guide a user to the correct installation port, a search matrix 1150 representative of a plurality of ports may be presented in some embodiments. The ports may include the correct installation port and a plurality of incorrect installation ports. The search matrix 1150 may present the plurality of incorrect installation ports in a first color, and the search matrix 1150 may present the correct installation ports in a second color. In this way, a user may readily identify the correct installation port, increasing the accuracy and efficiency of the installation. The colors may be presented using AR technology or technology on an image capture device. In some embodiments, the search matrix 1150 may even be created for one hundred or more installation ports.

In some embodiments, the search matrix 1150 may be created using one or more transformable bracket identifiers. The search matrix 1150 may be created using only transformable bracket identifiers, but it may also be created using transformable bracket identifiers as well as other points of reference, such as an anchor label identifier. The transformable bracket identifiers may be placed on an elongated body of a transformable bracket.

In some embodiments, a correct port identifier may be received and associated with a cable identifier in memory. At operation 1414, a correct port identifier may be received that is associated with the correct installation port. A "port identifier" is intended herein to mean any identifier associated with a port. These identifiers may, for example, include a dust cap identifier 542A (see FIG. 5A), a transformable bracket identifier 542B (see FIG. 5E), an identifier located on an adapter defining an installation port, an identifier located on the panel adjacent to the installation port, or an identifier provided on an MPO connector housing. Other port identifiers may also be used. At operation 1416, the cable identifier and the correct port identifier may be associated in memory. This may be done, for example, by extracting information from the two identifiers and associating the extracted information in memory. Additionally, at operation 1418, the cable identifier and/or the correct port identifier may be stored in memory in some embodiments.

Figure 14B:
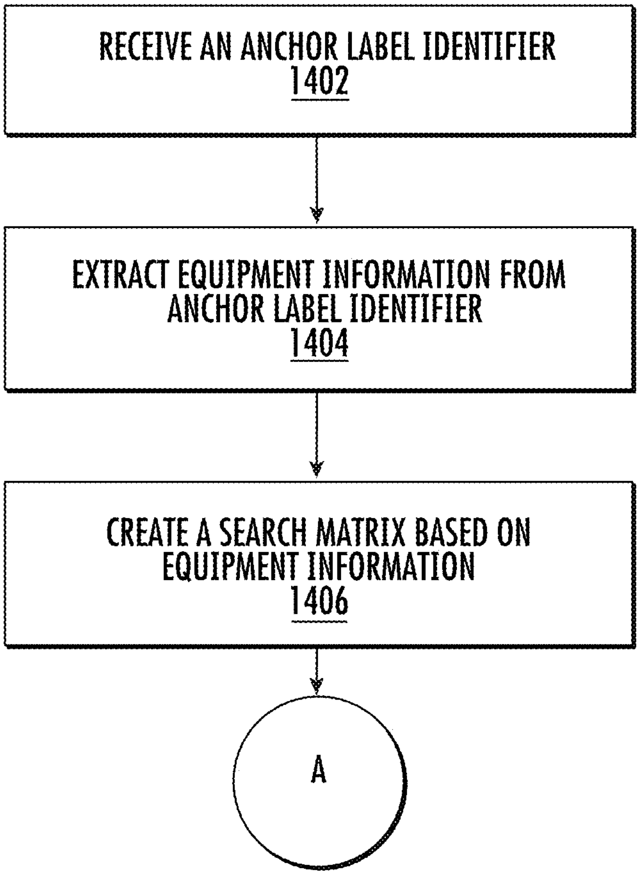
FIG. 14B is a flow chart illustrating an example method for the creation of a search matrix using anchor label identifiers, in accordance with some embodiments discussed herein.

FIG. 14B is a flow chart illustrating an example method for the creation of a search matrix 1150 (see, e.g., FIG. 11A) using anchor label identifiers. The operations presented in FIG. 14B may be performed before the operations presented in FIG. 14A in some embodiments, but operations may also be performed in other orders.

At operation 1402, an anchor label identifier may be received. This may be performed by capturing the identifier, by receiving the identifier from another device, or by receiving the identifier from another component. At operation 1404, equipment information may be extracted from the anchor label identifier. This equipment information may include a serial number, a model number, a number of panels, a configuration or spacing of panels, a number of installation ports, or a configuration of installation ports. However, other suitable information may also be provided within the equipment information.

At operation 1406, a search matrix may be created based on the equipment information. A search matrix may be presented similar to the one illustrated in FIG. 11A. This search matrix may identify locations of two or more installation ports based on the equipment information. However, the search matrix may also identify the locations of two or more installation ports based on the location of the anchor label identifier and one or more points of reference (e.g. relative locations of a plurality of port identifiers). The location of the anchor label identifier and one or more points of reference may be used to maintain proper positioning and proper sizing for the search matrix.

The method presented in FIG. 14B may then proceed into the operations illustrated in FIG. 14A. At operation 1412, guiding the user to the identified correct installation port for installation of the connector therein may be done using the search matrix that is created in operation 1406.

Figure 14C:
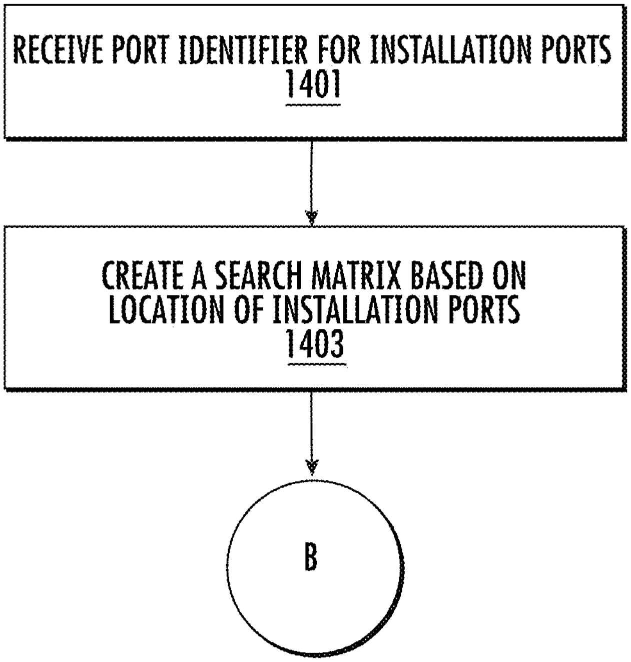
FIG. 14C is a flow chart illustrating an example method for the creation of a search matrix using port identifiers, in accordance with some embodiments discussed herein.

While FIG. 14B illustrates an example where a search matrix is created using equipment information extracted from an anchor label identifier, a search matrix may be created in other ways. FIG. 14C is a flow chart illustrating an example method for the creation of a search matrix using port identifiers. The operations presented in FIG. 14C may be performed before the operations presented in FIG. 14A in some embodiments, but operations may also be performed in other orders.

At operation 1401, a port identifier may be received for one or more installation ports. At operation 1403, a search matrix may be created based on the location of the port identifiers (e.g., the relative location of two or more port identifiers can be used to recognize a position within a search matrix). In this way, the search matrix may identify locations of the installation ports. Using the different port identifiers, the search matrix may be created and maintained with proper positioning and proper sizing. The method presented in FIG. 14C may then proceed into the operations illustrated in FIG. 14A. At operation 1412, guiding the user to the identified correct installation port for installation of the connector therein may be done using the search matrix that is created in operation 1403.

While FIGS. 14B and 14C illustrate approaches for the creation of a search matrix, other approaches may also be taken. In some embodiments, the search matrix may be created using both anchor label identifiers and port identifiers. In some embodiments, a port identifier such as a transformable bracket identifier associated with an installation port may effectively serve as an anchor label identifier after the transformable bracket has been installed at an installation port.

Figure 14D:
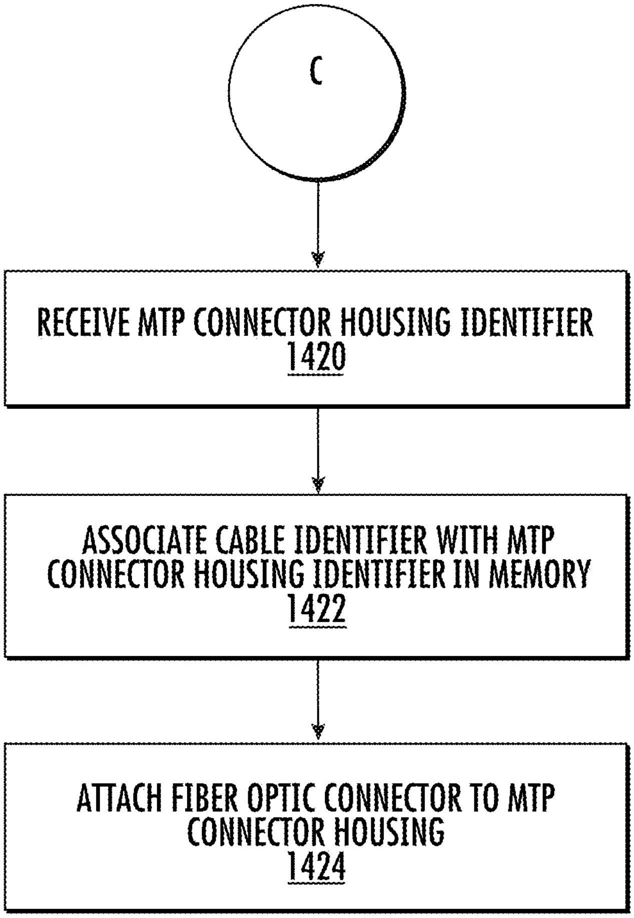
FIG. 14D is a flow chart illustrating an example method for the connection and association of an MPO Connector and a fiber optic cable, in accordance with some embodiments discussed herein.

FIG. 14D is a flow chart illustrating an example method for the connection and association of an MPO connector housing and a fiber optic cable. The operations presented in FIG. 14D may be performed after the operations presented in FIG. 14A in some embodiments, but operations may also be performed in other orders.

At operation 1420, an MPO connector housing identifier may be received, and this MPO connector housing identifier may be associated with an MPO connector housing. The MPO connector housing identifier may be placed on an exterior surface of an MPO connector housing in some embodiments. At operation 1422, a cable identifier may be associated with the MPO connector housing identifier in memory. This cable identifier may be the cable identifier that is received in operation 1408 of FIG. 14A in some embodiments. At operation 1424, the fiber optic connector may be attached to the MPO connector housing, and the connection of the fiber optic connector with the MPO connector housing may form a complete MPO connector. The formed MPO connector may be a standard MPO connector in some embodiments. In some embodiments, the fiber optic connector is a Fast-Track MPO Ferrule, and the fiber optic connector and the MPO connector housing, when attached, may form a Fast-Track MPO connector.

Figure 15:
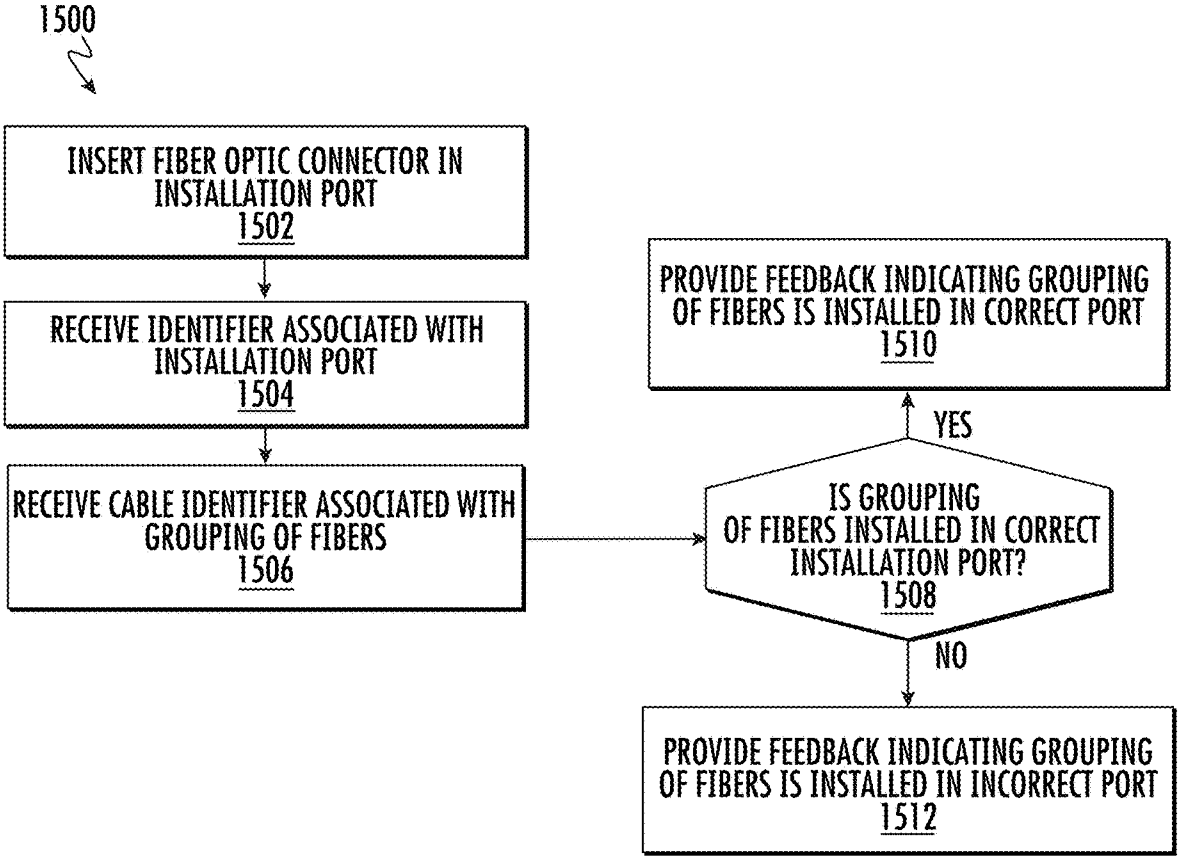
FIG. 15 is a flow chart illustrating an example method for providing feedback regarding the accuracy of connected fibers, in accordance with some embodiments discussed herein.

Once fibers are connected in installation ports, methods are provided for identifying fibers that are correctly installed and also identifying fibers that are not correctly installed. FIG. 15 is a flow chart illustrating an example method 1500 for providing feedback regarding the correct or incorrect installation of connected fibers. At operation 1502, a fiber optic connector may be inserted into an installation port. At operation 1504, a port identifier may be received that is associated with the installation port. At operation 1506, a cable identifier may be received that is associated with a grouping of fibers.

Processing circuitry 1229, 1241 within an image capture device 1225 (see FIG. 12) or within an additional device 1227' (see FIG. 12) may be configured to extract information from the port identifier and the cable identifier. Notably, in some embodiments, a transformable bracket identifier may be associated with a cable identifier such that receiving the transformable bracket identifier may associate with the cable identifier. Processing circuitry may retrieve from memory an indication of whether the port identifier and the cable identifier are correctly associated. The identification of anchor label identifiers and other identifiers may be made using a computer vision-based object recognition algorithm, for example. The predicted locations of installation ports identified by the search matrix may be determined relative to the location of the anchor label identifier.

In some embodiments, only the cable identifier (or the transformable bracket identifier associated therewith) may be needed along with the search matrix. In this regard, the location of the cable within the search matrix may be determined and compared with a stored proper installation position to see if the cable is in the correct or incorrect installation port.

At operation 1508, a determination may be made as to whether the grouping of fibers is installed in the correct installation port. If the grouping of fibers is installed in the correct installation port, the method 1500 may proceed to operation 1510 where feedback is provided indicating that the grouping of fibers is installed in the correct installation port. If the grouping of fibers is not installed in the correct installation port, the method 1500 may proceed to operation 1512 where feedback is provided indicating that the grouping of fibers is installed in an incorrect installation port.

Feedback may be provided in some embodiments to verify that a cable that is installed in a given installation port on an output side is correct based on the cable that has been installed on the input side. Additionally, feedback may be provided to verify that a cable that is installed in a given installation port on an input side is correct based on the cable that has been installed on the output side.

In some embodiments, a search matrix may be presented that shows the entire panel 314 (see FIG. 3C). Within the search matrix, a bounding area 1151 may be emphasized proximate to a fiber optic cable that is installed in an installation port. This emphasis may be provided (1) by highlighting the bounding area 1151 in a distinct color; (2) by providing an outline around the bounding area 1151; or (3) by creating a search matrix 1150 identifying locations of two or more installation ports, providing an identifier for each location within the search matrix 1151, and presenting the identifier for the incorrect installation port to the user. However, other approaches for providing emphasis may be used. Where multiple fiber optic cables are installed in incorrect installation ports, multiple bounding areas 1151 may be emphasized proximate to the fiber optic cables that are installed in incorrect installation ports.

In some embodiments, the methods described in the flow charts described above may be performed using an image capture device 1225 (see FIG. 12), processing circuitry, and memory, with the image capture device 1225 being configured to capture identifiers. The memory may have data stored therein representing software executable by the processing circuitry, and this memory may include instructions to perform the methods as described above. In some embodiments, the image capture device may be provided in at least one of a mobile phone, a tablet, a headset, a wearable, smart glasses, a smart watch, a camera, or a computer. However, other image capture devices may be used. Additionally, the processing circuitry may be located at the image capture device in some embodiments, but the processing circuitry may be provided at other locations as well.

Various identifiers have been referenced herein. These identifiers should be understood to include quick response (QR) codes, other codes, labels, text, symbols, and numbers. In some embodiments, the identifiers may be machine readable or human readable, or the identifiers may be machine readable with certain human readable features. For example, an identifier may be provided with a QR code or some other machine readable code, and the identifier may also include color coding within the QR code or within the area surrounding the QR code.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended to be construed to limit the present invention or otherwise to exclude any such other embodiments, adaptations, variations, modifications and equivalent arrangements.

What is claimed is:

1. A fiber optic cable apparatus, the fiber optic cable apparatus comprising:

a housing comprising a shelving portion and a cable routing portion, wherein the cable routing portion is positioned vertically adjacent to the shelving portion; and fiber optic connection equipment provided in the housing, the fiber optic connection equipment comprising a shelf positioned within the shelving portion, a front plate attached to the shelf, and at least one patch panel contacting the shelf, the patch panel comprising a plurality of adapters, wherein the at least one panel includes a plurality of adapters, wherein each adapter of the plurality of adapters is configured to receive, on an input side, an input connector for fibers from the fiber optic input cables, wherein each adapter of the plurality of adapters is configured to receive, on an output side, an output connector for fibers for the fiber optic output cables;

wherein the fiber optic connection equipment is configured to enable routing of a plurality of optical fibers within a volume of 200 cubic feet or less, wherein the plurality of optical fibers comprises at least twenty-thousand (20,000) optical fibers, wherein the plurality of optical fibers are provided by fiber optic input cables and fiber optic output cables, the fiber optic input cables having one or more first groupings of optical fibers and the fiber optic output cables having one or more second groupings of optical fibers, wherein the at least one patch panel is further configured to provide for connection within the housing of the fiber optic input cables to the fiber optic output cables, wherein at least one of the one or more first groupings is different than at least one of the one or more second groupings; and wherein the front plate extends outwardly from a top surface of the shelf into the cable routing portion at an angle relative to the top surface of the shelf, wherein the angle ranges between about 30 degrees and less than about 90 degrees, and wherein the front plate includes a plurality of cable attachment features configured to selectively secure fiber optic cables within the cable routing portion, wherein the at least one patch panel is oriented vertically extending above the top surface of the shelf in a perpendicular orientation relative to the front plate, wherein each adapter of the plurality of adapters is configured to receive a horizontally oriented input connector and a horizontally oriented output connector.

2. The fiber optic cable apparatus of claim 1, wherein at least one of the one or more first groupings of fiber optic input cables is selected from the group consisting of a cable having 3,456 optical fibers, a cable having 2,880 optical fibers, and a cable having 576 optical fibers, and wherein at least one of the one or more second groupings of fiber optic output cables is selected from the group consisting of a cable having 288 optical fibers, a cable having 144 optical fibers, a cable having 96 optical fibers, and a cable having 24 optical fibers.

3. The fiber optic cable apparatus of claim 1, wherein the one or more first groupings of fiber optic input cables includes a cable having 3,456 optical fibers, and wherein the one or more second groupings of fiber optic output cables includes a cable having 288 optical fibers and a cable having 96 optical fibers.

4. The fiber optic cable apparatus of claim 1, wherein the one or more first groupings of fiber optic input cables includes at least one of a cable having 2,880 optical fibers or a cable having 144 optical fibers, and wherein the one or more second groupings of fiber optic output cables includes a cable having 576 optical fibers.

5. The fiber optic cable apparatus of claim 1, wherein the fiber optic connection equipment includes one or more shelves, wherein each of the one or more shelves includes a panel that is configured to support connection of a plurality of the fiber optic input cables on an input side to the fiber optic output cables on an output side, wherein each of the one or more shelves is configured to route at least three thousand four hundred fifty six (3,456) fibers on the input side and at least three thousand four hundred fifty six (3,456) fibers on the output side within a shelf volume, wherein the shelf volume is 20 cubic feet or less.

6. The fiber optic cable apparatus of claim 5, wherein a plurality of the one or more shelves are arranged in a vertical-stack.

7. The fiber optic cable apparatus of claim 6, wherein the cable routing portion has a top with an opening, wherein the opening is configured to receive at least one of the fiber optic input cables having the one more first groupings of optical fibers and at least one of the fiber optic output cables having the one or more second groupings therethrough.

8. The fiber optic cable apparatus of claim 7, wherein the fiber optic connection equipment includes at least two mounting plates extending horizontally into the cable routing portion toward the shelving portion, wherein each of the at least two mounting plates comprises an attachment feature that is configured to secure one of the fiber optic input cables or one of the fiber optic output cables, wherein the at least two mounting plates are configured to securely position the fiber optic input cables or the fiber optic output cables in staggered positions within the cable routing portion.

9. The fiber optic cable apparatus of claim 5, wherein the fiber optic connection equipment is modular.

10. The fiber optic cable apparatus of claim 5, wherein the shelf volume is 8.2 cubic feet or less.

11. The fiber optic cable apparatus of claim 1, wherein the plurality of adapters includes at least 70 adapters.

12. The fiber optic cable apparatus of claim 11, wherein the plurality of adapters includes at least 144 adapters.

13. The fiber optic cable apparatus of claim 1, wherein the at least one patch panel includes ten patch panels.

14. The fiber optic cable apparatus of claim 1, wherein the plurality of fibers comprises at least twenty-five thousand (25,000) fibers.

15. The fiber optic cable apparatus of claim 14, wherein the plurality of fibers comprises at least thirty thousand (30,000) fibers.

16. The fiber optic cable apparatus of claim 15, wherein the plurality of fibers comprises at least thirty four thousand five hundred sixty (34,560) fibers.

17. A fiber optic cable apparatus, comprising:

a housing comprising a shelving portion and a cable routing portion, wherein the cable routing portion is positioned vertically adjacent to the shelving portion; and fiber optic connection equipment provided in the housing, the fiber optic connection equipment comprising a shelf positioned within the shelving portion, a front plate attached to the shelf, and at least one patch panel contacting the shelf, the patch panel comprising a plurality of adapters, wherein the at least one panel includes a plurality of adapters, wherein each adapter of the plurality of adapters is configured to receive, on an input side, an input connector for fibers from the fiber optic input cables, wherein each adapter of the plurality of adapters is configured to receive, on an output side, an output connector for fibers for the fiber optic output cables, wherein the fiber optic connection equipment is configured to enable routing of a plurality of optical fibers, wherein the plurality of optical fibers are provided by fiber optic input cables and fiber optic output cables, the fiber optic input cables having one or more first groupings of optical fibers and the fiber optic output cables having one or more second groupings of optical fibers, the one or more first groupings being different than the one or more second groupings, wherein the at least one patch panel is further configured to provide for connection within the housing of the fiber optic input cables to the fiber optic output cables, wherein the housing is configured to hold a plurality of the one or more shelves arranged in a vertical-stack, wherein the housing defines a shelving portion and a cable routing portion, wherein the cable routing portion has a top with an opening, and wherein the opening is configured to receive at least one of the fiber optic input cables and at least one of the fiber optic output cables therethrough; and wherein the front plate extends outwardly from a top surface of the shelf into the cable routing portion at an angle relative to the top surface of the shelf, wherein the angle ranges between about 30 degrees and less than about 90 degrees, and wherein the front plate includes a plurality of cable attachment features configured to selectively secure fiber optic cables within the cable routing portion, wherein the at least one patch panel is oriented vertically extending above the top surface of the shelf in a perpendicular orientation relative to the front plate, wherein each adapter of the plurality of adapters is configured to receive a horizontally oriented input connector and a horizontally oriented output connector.

18. The fiber optic cable apparatus of claim 17, wherein each of the one or more shelves includes a patch panel that is configured to enable connection of a plurality of the fiber optic input cables on an input side to a plurality of the fiber optic output cables on an output side to define the second groupings of the fiber optic output cables, wherein each of the one or more shelves is configured to route at least two thousand (2,000) fibers on the input side and at least two thousand (2,000) fibers on the output side within a volume of 8.2 cubic feet or less.

19. The fiber optic cable apparatus of claim 17, wherein each of the one or more shelves includes a patch panel that includes a plurality of adapters, wherein each adapter of the plurality of adapters is configured to receive, on an input side, an input connector for fibers from the fiber optic input cables, wherein each adapter of the plurality of adapters is configured to receive, on an output side, an output connector for fibers for the fiber optic output cables, wherein the plurality of adapters includes at least 70 adapters.

20. A fiber optic cable apparatus, comprising:

a housing comprising a shelving portion and a cable routing portion, wherein the cable routing portion is positioned vertically adjacent to the shelving portion; and a plurality of shelves positioned within the shelving portion, a plurality of front plates with each of the plurality of front plates extending from a shelf of the plurality of shelves, and a plurality of patch panels, wherein each of the plurality of shelves has at least one patch panel from the plurality of patch panels attached thereto, wherein the plurality of shelves are configured to be attached to the housing, wherein the plurality of shelves and the plurality of patch panels are configured to enable routing of a plurality of optical fibers, wherein the plurality of optical fibers are provided by fiber optic input cables and fiber optic output cables, the fiber optic input cables having one or more first groupings of optical fibers and the fiber optic output cables having one or more second groupings of optical fibers, the one or more first groupings being different than the one or more second groupings, wherein each of the patch panels includes a plurality of adapters, wherein each adapter of the plurality of adapters is configured to receive, on an input side, an input connector for fibers from the fiber optic input cables, wherein each adapter of the plurality of adapters is configured to receive, on an output side, an output connector for fibers for the fiber optic output cables;

wherein the plurality of patch panels is further configured to provide for connection within the housing of the fiber optic input cables to the fiber optic output cables, wherein the housing is configured to hold the plurality of shelves arranged in a vertical-stack, wherein the housing defines a shelving portion and a cable routing portion, wherein the cable routing portion has a top with an opening, and wherein the opening is configured to receive at least one of the fiber optic input cables and at least one of the fiber optic output cables therethrough; and wherein each of the plurality of the front plates extends outwardly from a top surface of each shelf of the plurality of shelves into the cable routing portion at an angle relative to the top surface of each shelf of the plurality of shelves, wherein the angle ranges between about 30 degrees and less than about 90 degrees, and wherein each of the plurality of front plates includes a plurality of cable attachment features configured to selectively secure fiber optic cables within the cable routing portion, wherein the at least one patch panel is oriented vertically extending above the top surface of the shelf in a perpendicular orientation relative to the front plate, wherein each adapter of the plurality of adapters is configured to receive a horizontally oriented input connector and a horizontally oriented output connector.

21. The fiber optic apparatus of claim 20, wherein the shelves have an input side and an output side, wherein a shelf of the plurality of shelves is configured to receive at least 100 fibers per cubic foot on the input side, wherein the shelf is configured to receive at least 100 fibers per cubic foot on the output side.

22. The fiber optic apparatus of claim 21, wherein the shelf is configured to receive at least 172 fibers per cubic foot on the input side, wherein the shelf is configured to receive at least 172 fibers per cubic foot on the output side.

23. The fiber optic apparatus of claim 20, wherein each of the plurality of patch panels has a panel input side and a panel output side, wherein a panel of the plurality of patch panels is configured to receive at least 500 fibers per square foot on the panel input side, wherein the panel is configured to receive at least 500 fibers per square foot on the panel output side.

24. The fiber optic apparatus of claim 23, wherein the panel is configured to receive at least 864 fibers per square foot on the input side, wherein the panel is configured to receive at least 864 fibers per square foot on the output side.

* * * * *